United States Patent

Ballas et al.

[15] 3,653,072

[45] Mar. 28, 1972

[54] PROCESS FOR PRODUCING CIRCUIT ARTWORK UTILIZING A DATA PROCESSING MACHINE

[72] Inventors: Joseph A. Ballas, Dallas; Robert A. Penick, Richardson, both of Tex.

[73] Assignee: Texas Instruments Incorporated, Dallas, Tex.

[22] Filed: Jan. 8, 1970

[21] Appl. No.: 1,366

[52] U.S. Cl. ........................................444/001, 235/151.11

[51] Int. Cl. ........................................................G06f 15/46

[58] Field of Search .................235/150, 151, 151.1, 151.11; 340/172.5

[56] References Cited

OTHER PUBLICATIONS

Lee: An Algarithum for Path Connections IRE Transactions on Electric Comp. Sept. 1961 p. 346– 365

Lawler: Electrical Assemblies with a minimum of Interconnections IRE Trans. on Electronic Computers Feb. 1962 P. 86–88

Breuer: General Survey of Design Automation IEEE Proceedings Vol. 54, Dec. 1966 p. 1708– 1721

Hyman et al.: Computer Automated Design: Advances in El. Packaging Symposium August, 1967 p. IECP4/3– 1 to 14

Hays: Computer Aided Design Transactions on Computers, Vol. C–18, Jan. 1969 p. 1–10

Dietmeyer et al: Logic Design Automation Transactions on Computers, Vol. C–18, Jan. 1969 p. 11– 22

*Primary Examiner*—Felix D. Gruber

*Attorney*—James O. Dixon, Andrew M. Hassell, Harold Levine, Melvin Sharp, John E. Vandigriff, Henry T. Olsen, Michael A. Sileo, Jr. and Gary C. Honeycutt

[57] ABSTRACT

Artwork for a logic circuit to be fabricated by printed circuit board techniques is produced by a data processing machine programmed to run a packaging routine, a placement routine, and a routing routine, in addition to check routines. All logic elements for a particular circuit are coded and identified prior to carrying out any of the machine run routines. This circuit diagram information, along with mechanical criteria of the printed circuit board on which the circuit is to be fabricated, are supplied as input data to the data processing machine. The data processing machine first takes the coded circuit diagram information and checks it for errors. It then packages the individual logic elements into multi-element units (integrated circuits). Upon completion of the packaging routine, the data processor places the multi-element units within the limits of the mechanical criteria supplied as input data. After the packaging and placing routines have been completed, the machine routes interconnections between the terminal pins of the multi-element units using a numbered ordered maze restrained to proceed within pre-established limits.

24 Claims, 16 Drawing Figures

INVENTORS
JOSEPH A. BALLAS
ROBERT A. PENICK

INVENTORS:
JOSEPH A. BALLAS
ROBERT A. PENICK

INVENTORS
JOSEPH A. BALLAS
ROBERT A. PENICK

INVENTORS:
JOSEPH A. BALLAS
ROBERT A. PENICK

INVENTORS:
JOSEPH A. BALLAS
ROBERT A. PENICK

INVENTORS:
JOSEPH A. BALLAS
ROBERT A. PENICK

INVENTORS
JOSEPH A. BALLAS
ROBERT A. PENICK

INVENTORS:
JOSEPH A. BALLAS
ROBERT A. PENICK

PROCESS FOR PRODUCING CIRCUIT ARTWORK UTILIZING A DATA PROCESSING MACHINE

This invention relates to a circuit layout technique, and more particularly to a process for producing artwork for a logic circuit to be fabricated by printed circuit techniques.

Heretofore, the artwork for most logic circuits that were fabricated on a printed circuit board was drawn by hand using "cut and try" procedures. So long as the logic system was of a simple design, manual layout techniques produced accurate artwork for use in the manufacture of the printed circuit board. With the increased complexity of logic systems, the artwork produced by hand contained an unacceptable number of errors. Further, as the logic circuitry became more complex, the time required for the hand layout increased to a prohibitive level.

It was early recognized that data processing machines (computers) could be used to layout and produce the artwork for logic circuits. Many processes have been developed for use with data processing machines to assist in laying out and producing the artwork for a logic circuit. Most of these processes have been directed to routing techniques performed by a data processor to interconnect the various logic elements or packages of elements that have been previously assigned a given location.

An object of this invention is to provide a process for producing circuit artwork by means of a data processing machine. Another object of this invention is to produce circuit artwork by a data processing machine that runs a check routine on the input data. Yet another object of this invention is to produce circuit artwork by a data processing machine that assigns individual circuit elements to multielement packages. A further object of this invention is to provide a process for producing circuit artwork with a data processing machine that assigns multielement packages within limits of mechanical criteria. Yet another object of this invention is to provide a process for producing circuit artwork using a data processing machine to route interconnections between various terminal pins of multielement units previously located. Yet another object of this invention is to produce circuit artwork by a data processing machine that runs a check routine on the routed interconnections. A still further object of this invention is to provide a process for producing circuit artwork using a data processing machine that assigns individual circuit elements to a multielement package by repetitive steps that select the best multielement package. Still another object of this invention is to provide a process for producing circuit artwork using a data processing machine that places a multielement package within circuit criteria on the basis of a calculated score. An additional object of this invention is to provide a process for producing circuit artwork using a data processing machine that routes interconnections between elements by a numbered ordered maze constrained to run within preestablished limits.

In accordance with one process for producing circuit artwork, artwork for a logic system is produced by initially packaging individual circuit elements by a routine that selects the best multielement unit yet by a first comparison of one multielement unit with a multielement unit formed from elements of another type. After all the multielement units have been considered in a first pass, the best unit is then considered a fixed package and additional passes are made to select the best multielement unit by an additional series of comparisons. After each selection of a best multielement unit for a given comparison, the remaining multielement unit formed for that comparison is cancelled and a new multielement unit of that type will be formed in the subsequent pass. After completing the packaging routine, the multielement units are located on a printed circuit board within limits of mechanical criteria supplied as input data to the processing machine. After packaging and placing the circuit elements, routing interconnections are generated between terminal pins of the individual elements using a numbered ordered maze. To complete the process of defining interconnections between the elements, the routing information is conveyed to a plotter that generates the artwork for a desired logic system.

In accordance with another process for producing circuit artwork, coded information of a logic system including mechanical criteria is input data to a data processing machine. First, the data processor generates representations of multielement packages containing the individual elements of the logic system. After completion of the packaging routine, the multielement packages are located on a printed circuit board within limits of the mechanical criteria supplied to the machine. To locate the multielement packages formed by the packaging routine, the data processor computes a "score" for each multielement unit to be located. Starting with the best score, the packages are located in the best legitimate position available for that unit. The remaining units are then considered after recomputing a score for the effected units, starting with the best remaining score, and the unit with the highest score is placed in a best legitimate position. This process is repeated until all packages have been placed. After placing all the multielement packages on a score basis, the entire logic system is reinvestigated to determine if an improvement of the initial placement is possible. Upon completion of the placement routine, the data processor interconnects terminal pins of the individual circuit elements using a numbered ordered maze. Finally, the routing information is conveyed to a plotter that generates artwork for the logic system coded into the data processor.

In accordance with still another process for producing circuit artwork, circuit artwork for a logic system is generated using a plotter connected to the output of a data processor. Input information to the data processor includes identifying codes for each of the logic circuit elements, the element terminal pins, signature identification and mechanical criteria. First, the individual circuit elements are packaged into multielement units on the basis of the circuit identification codes, terminal pin codes, and signature codes. These multielement units are then located on a printed circuit board within mechanical criteria supplied as input data to the data processor. After packaging and placing the logic elements, interconnections between terminal pins of the various elements are established using a numbered ordered maze restrained to proceed within pre-established limits. Input information to the routing routine includes signal set groups which consist of pin identification (including X and Y coordinates) along with "-from-to" information. Starting at the first pin location in a pin listing, a numbered ordered maze is constructed within pre-established limits until it reaches a destination point. Upon reaching a destination point, a backtrack routine is called which establishes the shortest path within the maze back to the start point. The routing routine of the present invention includes three passes for interconnecting the various element terminal pins. Each pass restricts the maze progression to certain predefined limits. Upon completion of one run of the routine, the interconnections not completed on the first run may be attempted by running the routing routine again, each time changing the bounding criteria. After all the interconnections have been completed, a plotter is supplied the coded information produced by the data processing machine to generate artwork for the logic system of interest.

In accordance with yet another process for producing circuit artwork, a data processing machine supplies input information to a plotter that produces the circuit artwork. Input information to the data processor includes coded information defining the logic circuit. This coded information includes logic element coding, terminal pin coding, signature identification and mechanical criteria. Initially, the data processor calls a check routine that checks the coded input information to determine if errors exist in the logic diagram. For example, the input of a logic element may not be connected to a source, or a source may be connected to more elements than it is capable of driving without overloading. After checking to insure that the coded logic information contains no errors, a routine run by the data processor packages the logic elements into multielement units. These multielement units are located on a printed circuit board constrained by mechanical input criteria by a package placing routine. Next, a routing routine establishes coded data for interconnecting paths between terminal pins of the logic elements using a numbered ordered maze. The routing routine may be run as many times as desired in an attempt to complete all interconnections. Upon completion of the routing routine, the coded data representing the interconnecting paths is checked for completeness. Upon completion of the routing check, the coded routing data is conveyed to a plotter that produces artwork for a logic system.

A more complete understanding of the invention and its advantages will be apparent from the specification and claims and from the accompanying drawings illustrative of the invention.

Certain portions of the method herein disclosed are not our invention, but are the inventions of: MARK F. ESKEW and BEVERLY F. HYDE as defined by the claims of their application, Ser. No. 001,525 filed Jan. 8, 1970; JOHN W. HILL and CHARLES L. SATTERWHITE as defined by the claims of their application, Ser. No. 001,346, filed Jan. 8, 1970; and JOSEPH A. BALLAS and ROBERT A. PENICK as defined by the claims of their application, Ser. No. 001,447, filed Jan. 8, 1970; all such applications being assigned to the assignee of the present application.

Referring to the drawings.

INDEX

| | Column |
|---|---|
| Data Processor | 4 |
| Sample Circuit | 4 |
| General Process | 5 |
| Data Checking Routine | 7 |
| Packaging Routine | 8 |
| Package Placement | 59 |
| Routing Routine | 93 |
| Routing Check | 199 |
| Generating Artwork | 200 |

DATA PROCESSOR

Figure 1:
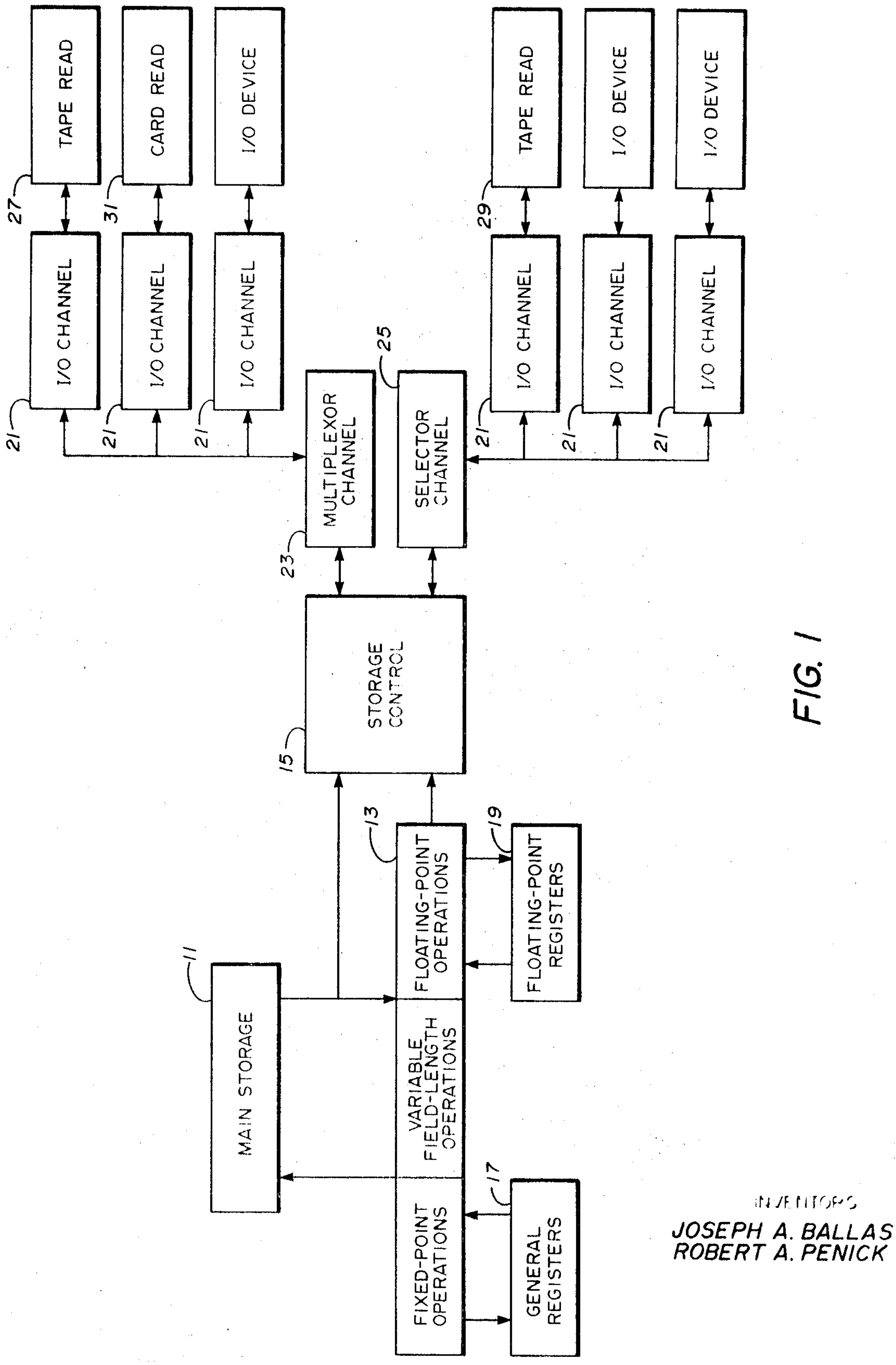
FIG. 1 is a block diagram of a data processing machine for generating instruction for the production of circuit artwork.

Referring to FIG. 1, there is shown a block diagram of a data processing machine for performing the heretofore described processes and producing instructions to be used in the generating of artwork for a printed circuit board. Data processing machines are described in numerous publications and a detailed description of each component is not deemed necessary. Such systems include a main storage 11 connected to an instruction and execution section 13 and storage control 15, both of which are part of a central processing unit. The central processing unit also includes a plurality of general registers 17 and several floating point registers 19. The central processing unit contains the facilities for addressing the main storage 11, for retrieving or storing information, for arithmetic and logical processing of data, for sequencing instructions in a desired order and for initiating a communication between storage and external devices.

External devices are coupled to the data processor by input/output channels 21 through either a multiplexer channel 23 or a selector channel 25. The multiplexer channel 23 separates the operation of high speed devices connected to the input/output channels 21. Selector channel 25 transmits data to or from a single input/output device at a time, and is capable of handling very high speed devices. To generate artwork for a printed circuit, the input devices connected to the channels 21 are tape read/write units, such as 27 and 29, a data card reader such as 31, or other similar units.

To generate circuit artwork with the system of FIG. 1, the required computer programs are read into the system from data cards by the data card reader 31. The storage control 15 causes the program data to be stored in the main storage 11 for use as required. In addition to program data, coded information defining the particular circuit of interest is also read into the system. Again, this may be by means of punched cards and the card reader 31. Additional information required to generate circuit artwork is in the form of mechanical criteria to define limits within which the data processor must operate.

Upon completion of the reading in of data to the machine, the instruction execution section 13 in conjunction with the main storage 11 and the storage control 15, operates with the registers 17 and 19 to perform the various processing steps required to produce instruction for circuit artwork. The final instructions are in the form of a coded tape as generated by the tape readers 27 or 29.

To produce circuit artwork instruction, the system of FIG. 1 requires four basic programs; the first program checks the coded circuit data for completeness and accuracy and the second program assigns circuit elements to package units. Following the packaging operation, the system generates representations locating each of the package units. After locating the packages within defined mechanical criteria, a fourth program generates representation of the interconnections between circuit pins, test points and connector pins. Following this, a fifth program is called from the main storage 11 to check for completion of the previous program. At the completion of each operation, a data tape is produced by one of the tape readers 27 or 29. The final data tape contains instructions which are used, in the process of generating the circuit artwork. The data tape instructions may be executed on the present computer system as hereinafter described, on any other computer system which is capable of utilizing or translating the data tape instructions or on such computer systems in another location.

SAMPLE CIRCUIT

Figure 2:
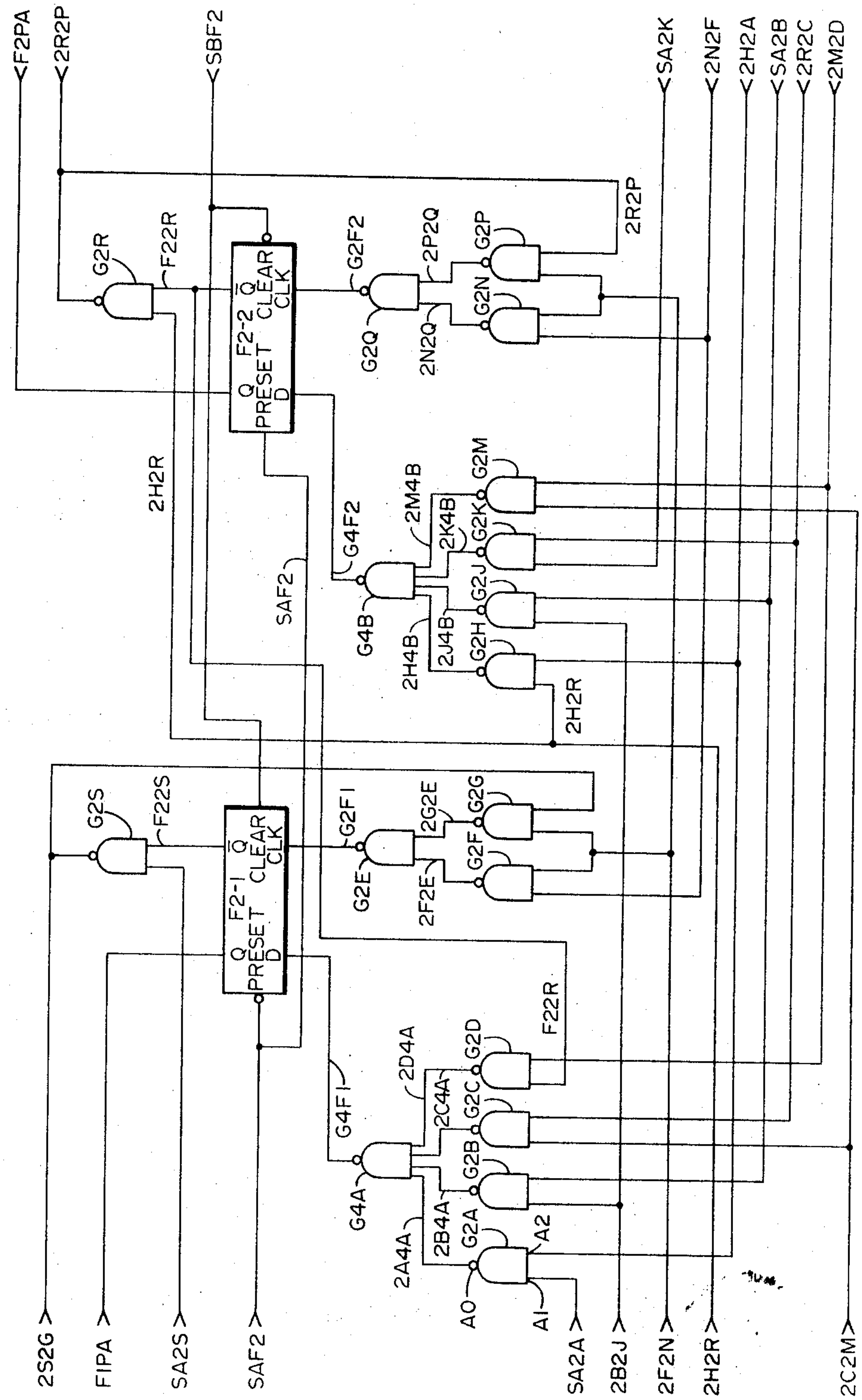
FIG. 2 is a schematic diagram of a logic system including coding information to be read into the data processing machine of FIG. 1 for generating artwork for a printed circuit board.

Referring to FIG. 2, the logic system shown is intended as an example for describing the operation of the data processing machine of FIG. 1 for generating artwork to be used in the fabrication of a printed circuit board for the circuit. As illustrated by the flow diagram of FIG. 3, logic diagram information (block 10) is coded into machine language (block 12) acceptable to the data processing machine of FIG. 1.

To code the logic diagram for use in generating artwork for a printed circuit board, the first step is to assign names to each functional element of the logic system. Considerable flexibility is permitted in the selection of alpha-numeric characters for element names, allowing a coder to relate the name chosen for each of the various functions back to the system identification. In FIG. 2, the various circuit elements (gates) are identified by three-place, alpha-numeric codes. All two-input gates have been identified by a G2 representation followed by a letter to distinguish one two-input gate from the next. Similarly, four-input gates have been identified with a G4 followed by an identifying letter. Thus, for the circuit example, the two-input gates have been designated as G2A, G2B, G2C, etc., and the four-input gates have been designated as G4A and G4B. There are also two flip-flops in the circuit; these are identified as F2–1 and F2–2.

After labeling all of the elements of the logic diagram, the next step in preparing coded information for a data processor is to label all the signature (signal) lines. The term "signature" originates from the concept that each signal line has a unique name and is normally driven by the output of one circuit element connecting to the inputs of several other functions. It is desirable, in many situations, to label the logic diagram with signatures that relate functionally to the operation of the circuit. For the example shown, however, alpha-numeric labels have been applied to the various signatures. In addition to identifying the various circuit elements and signature lines, each input and output terminal pin must be identified. This may be done by simply using A0, A1, A2, etc. for the various element terminal pins. A zero following the last letter of the identifying code may be used to signify an output terminal.

GENERAL PROCESS

After completely identifying the logic diagram, by labeling all elements, signature lines and terminal pins as described above the logic system is coded using a format acceptable to the data processing machine of FIG. 1 which contains the programs to be run. Prior to reading the coded information into the data processor, the coded information is manually checked (block 14 of FIG. 3) to minimize coding errors being read into the processing machine. One of the simplest ways to check for errors is to run the coded information through a computer printer to obtain a simple computer listing and manually check the computer listing.

In addition to coding the logic diagram into appropriate machine language, the data processor must also be programmed with information describing the desired configuration of the resultant printed circuit board. First, a rough estimate of the space required to accommodate the logic elements is prepared (block 16) by the programmer. Using this rough estimate, mechanical criteria for the finished circuit board is defined (block 18) by the programmer.

The next step is to code the mechanical criteria (block 20) into a language that will be accepted by the data processing machine of FIG. 1. This coded data is checked (block 22) for accuracy prior to storing it (block 24) into the data processor. One check made by step 22 is to determine if there is a reasonable probability of completing the interconnections for the logic system within the mechanical limits established.

In addition to the physical geometry (shape and size) of the desired circuit board, other mechanical criteria entered in the computer by the programmer at this time from his rough estimate: (1) the maximum number of board sides on which the routing interconnections should be made, (2) the number and location of input/output connectors, (3) an initial placement pattern for the element packages, (4) a definition of power and ground planes, and, (5) an initial definition of locations and dimensions where a two-sided or multilayer board utilizes bussing. Further, information referencing the location of rows, and columns of package locations, connector configurations, drill holes, tooling holes, etc., is coded and entered into language acceptable by the data processor.

Up to this point, steps 10, 12, 14, 16, 18, 20, 22 and 24 in the process have been performed manually to code the logic system (in terms of labeled elements, signature lines and terminal lines) and to code initial mechanical criteria for the circuit board so that they can be used by the data processing machine. At this time, both the coded logic system information and the coded mechanical criteria information are read into the data processing machine that is to generate a coded representation of the artwork required for the fabrication of the printed circuit board. The coded representation may be fed through the data processing machine directly to a plotter to produce the artwork or may be stored for example on tape so that the artwork may be produced at a future time or at a different location.

The process steps performed by the data processing machine are enclosed within the block 26. The first routine 28 run by the data processor is to further check the coding information describing the logic system in terms of labeled elements, signature lines and terminal lines to determine if a complete circuit or logic system has been defined. Also, the "fan out" of each logic element is checked to determine if it will be driving more logic elements than power available.

After the checking routine 28 has been completed, the coded logic information is used by a packaging routine 30 to assign the various logic elements to packages on a basis which will produce a routing pattern with short interconnecting paths. The packaging routine assigns the various logic elements to a particular package by a series of passes that selects the best multielement package formed for each element type. Upon completion of the packaging routine, all the logic elements have been assigned to a particular package which are identified by coded data.

Coded data of the multielement packages along with the mechanical input criteria will be next used in a package placement routine 32 for locating each of the logic element packages within the mechanical outline of the desired printed circuit board. In placing the multielement packages, those packages having the most connections to an input/output connector are identified so that they can be located nearest such input/output connector. After identifying packages for the connector positions, all the packages to be placed, including those identified for connector locations, are evaluated to compute a placement score. Detailed explanation of the placement score is later described beginning on page 35. The packages are then placed starting with the best score. The score of the packages affected by this placement are recomputed and the package with the best score placed in its best legitimate position. This sequence continues until all the packages have been placed. To improve the initial placement, the placement routine includes an interchange pass which considers all possible pair-wise interchanges. After completing the routine for placing the circuit element packages, the data processor contains coded information on the placement of each package, the X and Y coordinates of each terminal pin for each package, and the terminal pins to be interconnected.

Using this information, the data processor then runs a routing routine 34 that establishes the location of each interconnecting line of the logic system. The routing routine considers the X and Y coordinates of the terminal pins as start points and destination points and routes the interconnections in a numbered order. A numbered ordered maze and a backtracking technique are used to establish the various terminal pin interconnections. One complete run of the routine consists of three passes each have different bounding limitations for restricting the expansion of the numbered maze. After completing one run of the routine 34, additional runs may be made in an attempt to complete any incomplete interconnections. In the second and subsequent runs of the routine 34, the bounding limits are extended to allow additional area for expansion of the numbered maze.

After completing the routing routine, a check routine 36 considers each of the interconnections to determine if the routing routine has completed all the interconnections for the logic system. Assuming the routine 34 has not been able to complete all the interconnections, then the data processor prints out information which is used to manually alter and complete the interconnections. These alterations are then coded and re-entered into the data processor. Again, the check routine 36 checks to determine if the interconnection pattern has been completed.

Upon a determination that the routing has been completed, the coded routing information is read out and subsequently used to generate artwork, documentation, and tooling instructions (block 40). The actual artwork may be generated on a plotter of any well-known design. Tooling instructions may be in the form of a data tape produced by a machine responsive to the routing instructions.

At this time, a printed circuit board for the logic system may be fabricated by well-known techniques. If desired, the artwork may be manually verified (block 42), prior to the production of the printed circuit board (block 44).

DATA CHECKING ROUTINE

In one form of the data checking routine, three separate subroutines are used. The first subroutine checks the coded information of the logic system read from a deck of cards and produces a magnetic tape and a listing of each of the items checked. From the listing, errors noted by the first subroutine are flagged and corrected by preparing new data cards. The second subroutine uses the magnetic tape produced from the first subroutine and the corrected data card to again check the coded input information. This second subroutine produces an updated tape of correct information about the logic system. This updated tape is then read by the third subroutine that performs additional checks and produces a magnetic tape in a format that can be read by the packaging, placing, and routing routines.

Coded information of the logic system of FIG. 2 is manually checked and read into the data processing machine through an input/output channel 21. As the information is read into the data processing machine, it is stored in the machine's memory. In addition, the data processing machine has access to logic element information stored on a library tape. This tape contains, in coded form, a complete description of each logic element that may appear in the system of FIG. 2.

The coded input information of the logic system which has been stored in the data processing machine is initially checked by the routine 28 by comparison against the data of the information library. This check is primarily intended to determine if the correct code has been applied to the various logic elements and that such a device actually exists. The information library tape is also used to check the read-in information to determine if the correct code has been applied to the terminal pins of the logic elements.

Other checks made on the coded information are independent of the library information. Some of these additional checks are made simultaneously and others after previous checks have been completed. Depending on the check to be made, the coded input information may be rearranged and regrouped. One of the first group tests includes checking signatures to determine whether or not each signature (signal) has one source, that is, connects to a pin either on an input/output connector or on another element that constitutes a signal source. At the same time, a check is made to determine if any one signature has been used more than once in coding the logic system. To properly identify and keep separate each independent signature, a unique signature identifying code must be applied to each signal. A third check run on the signatures is to determine if the "fan out" from one logic element is in excess of an established limit. An excessive "fan out" from any one logic element will result in electrically overloading that element. A fourth check on the signatures determines if one signature has more than one source. These four checks are all made on the signatures after the data has been arranged by signature.

Additional checks made on the input data by the checking routine are on the logic elements themselves. A check is made for the purpose of finding any duplication of the identification code applied to the elements. A further check of the logic elements determines whether each element has at least one input signature and one output signature. Still another check on the logic elements determines if each pin has a unique identifying code. A final element check determines if any element has only one pin identified by a pin code.

After all the above checks have been made by the first subroutine, the printout at the end of the routine contains an error list outlining the errors noted. These errors are referred back to the appropriate coded data card which is corrected. Using the corrected data cards and a magnetic tape produced at the end of the first subroutine, the second subroutine of the check routine 28 performs the same checks as detailed above. This additional check is required since changing any of the data input cards may turn up errors which did not appear on the first subroutine check. For example, on the first subroutine check the "fan out" for a given element may have been within the established limit. As a result of correcting a data input card, this same element may now have a "fan out" greater than the established upper limit.

Again, after completion of the second check subroutine, a magnetic tape is made containing the coded input information checked and corrected for accuracy and completeness. A third subroutine is then run by the check routine 28 to make further checks and prepare a tape for use in the packaging, placing, and routing routines. Additional checks made in the third check subroutine include (a) determining if the X and Y coordinates of each pin on a multielement package fit a standard configuration. The third subroutine check also (b) determines if a signature appears at an input/output connector pin; if it does, then it must also appear at a multielement package.

Additional checks made during the third check subroutine are directed to preplaced and prepackaged elements. First, a check is made to determine if all preplaced elements have been assigned a multielement package. If elements are prepackaged, a check must be made to determine if they have been sequentially numbered. A third check is made to find if two or more preassigned elements of a multielement package have been assigned to the same position in a package. There is also a check made to determine if a preassigned element has been placed in a legitimate position for that element. As a last check, the third subroutine determines if more elements have been assigned to one multielement package than possible for that type.

The above checks made by the third subroutine are to detect "fatal" mistakes; any other mistakes are considered nonfatal while others will be passed. If a fatal mistake is detected, correction of the input data must be made and the subroutine checks one and two rerun. For the non-fatal mistakes, the packaging, placing, and routing routine may be run. If additional checks are made and errors detected the routine continues to run with the errors flagged. Upon completion of the third subroutine check, a magnetic tape is prepared that will be read by the packaging, placing, and routing routines, where required, as input data.

PACKAGING ROUTINE

Figure 3:
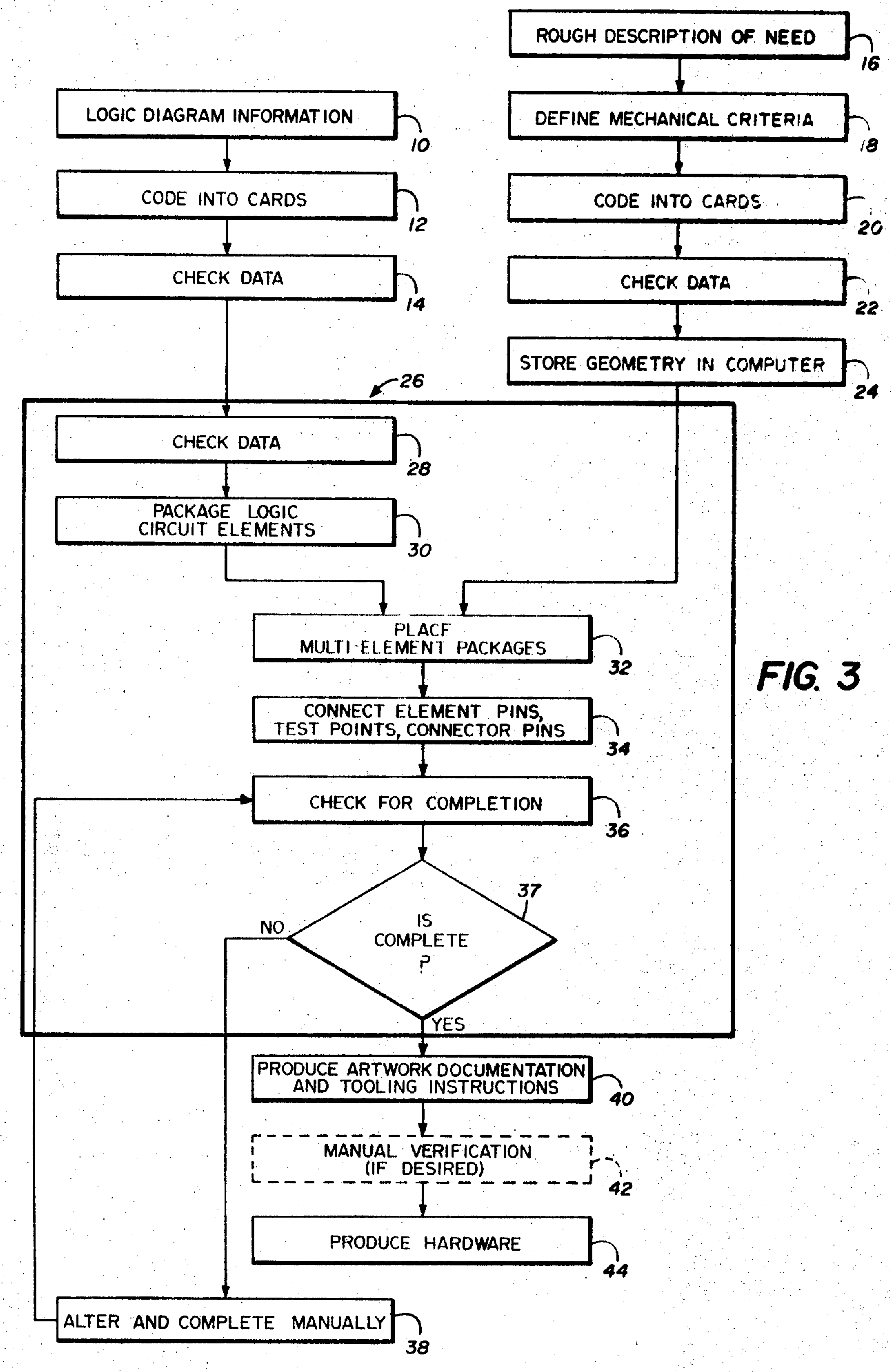
FIG. 3 is a flow chart of a process for producing artwork for a logic system of the type illustrated in FIG. 2.

Considering the next step (block 30) in the flow chart of FIG. 3, the elements of the logic system are packaged.

Figure 4:
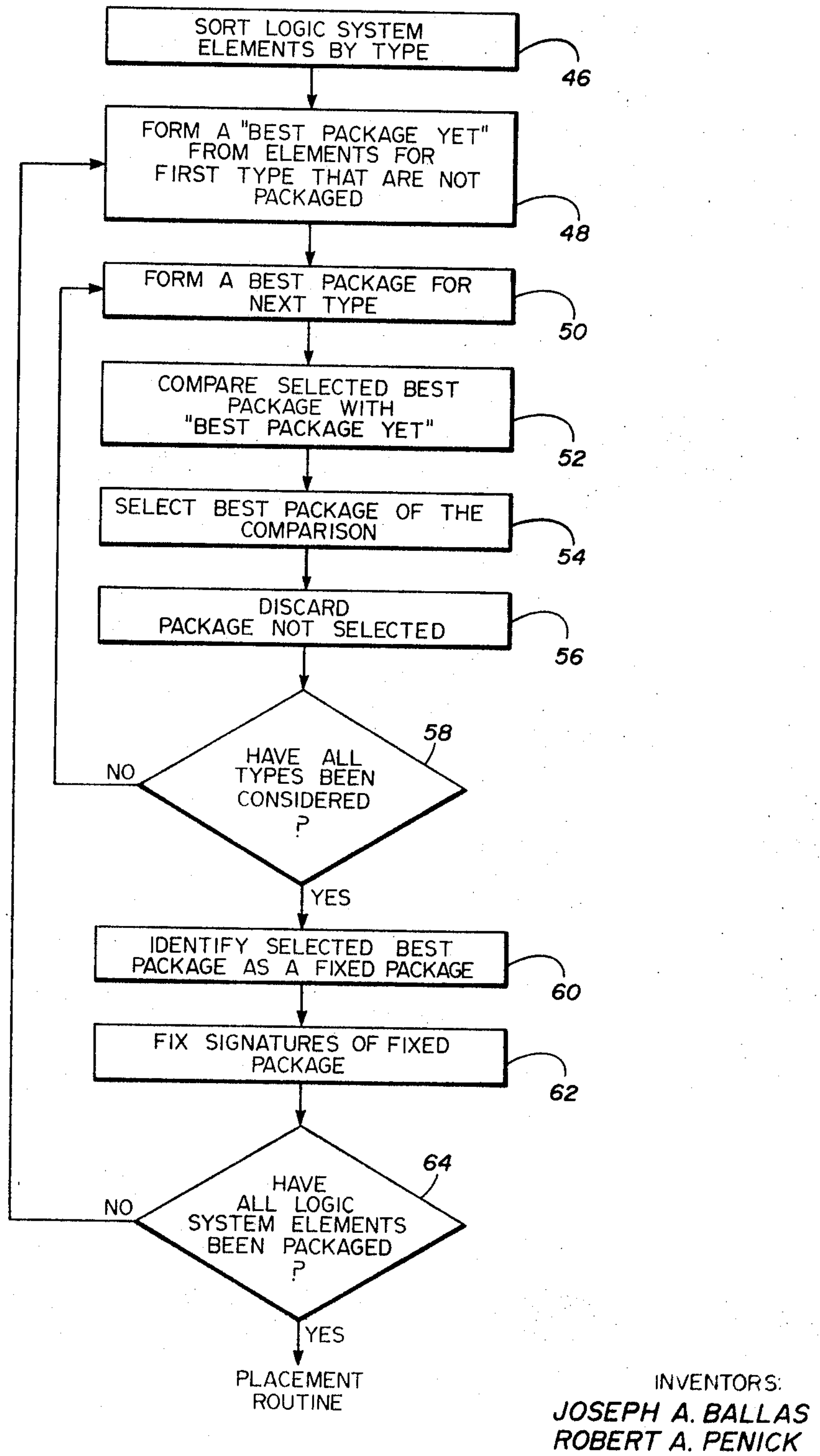
FIG. 4 is a flow chart of a routine run by a data processing machine for packaging circuit elements into multielement packages.

Referring to FIG. 4, there is shown a detailed flow chart of the steps performed in the packaging routine to generate coded information representing multielement packages composed of the elements of the logic system of FIG. 2. Initially, a sorting step 46 arranges the elements of the logic system into groups by types. That is, all two-input AND gates are grouped as one type, all four-input AND gates as a second type, OR gates as a third type, etc. The number of groups formed by the sorting step 46 will be determined by the logic system.

After sorting the logic elements by types, a best package step 48 forms a best package for the first type on the list resulting from step 46 from non-packaged elements. This best package is identified as a "best package yet." Next a best package step 50 forms a best package for the next type on the sorting list, again from elements not previously packaged. A comparison step 52, described in detail below, now compares the "best package yet" with the package formed by step 50. From the two best packages compared, one is selected, step 54, as the best package of the comparison.

The 'best package' is selected in accordance with pre-established criteria which are dictated by electronic design rules (i.e., unless certain laws of nature regarding electronic circuits are followed a circuit will not operate properly) and also pre-established criteria which simplifies the design of the circuit. In the described embodiment, the best package is selected during comparison step 52, the following data is compared utilizing a pre-established set of priorities. First, the number of critical connector signatures is compared and the best package is selected on the basis of the package with the greatest number of critical connector signatures. If neither of the compared packages has a critical connector signature or if both have the same number of such signatures, the connections to fixed packages is compared and the best package will be selected on the basis of the one connected to the greatest number of fixed packages. If neither of the compared packages connects to a fixed package, or they both connect to the same number of fixed packages, the number of fixed signatures of each is compared and the best package which will be selected on the basis of which has the greatest number of fixed signatures. To break a tie, should the compared packages both have the same number of fixed signatures or should neither of the packages contain fixed signatures, the best package will be selected by still another priority; that is, the number of signatures of each is compared and the package has the fewest number of signatures is selected. If this priority does not produce a selected best package, then the best package will be selected by a rule based on the order the coded data was read into the data processor.

The best package selected in step 54 is now considered the new "best package yet" for future comparisons if required. The package not selected remains on the sorting list but is temporarily discarded, step 56, and not further considered for the particular position under consideration.

At this time, an inquiry is made as to whether all types of elements have been considered in selecting the best package yet, step 58. If the answer to this inquiry is "no," then the routine returns to step 50 to form one new best package for the next type in the sorting list for comparison with the new best package yet at step 52. Steps 52 and 54 of comparing and selecting are again repeated for the new selected best package which results in a best package yet. The inquiry 58 is again made after discarding the package not selected in step 56 to determine if all the types have been considered for selecting a best package yet.

When the inquiry 58 results in a "yes" answer, the best package yet is identified in step 60 as the selected best package and is then considered a "fixed package." By definition, a fixed package is a prepackaged multielement unit or the best package yet resulting from the operation of steps 50, 52, 54, 56 and 58. Each time a best package is identified as a fixed best package, the signatures associated with that package are also considered fixed. By definition a fixed signature is one that is connected to a fixed package or a connector pin.

After fixing the signatures in step 62 of the fixed package identified in step 60, an inquiry is made as to whether or not all the logic system elements have been packaged. If the answer is "no," then the routine returns to step 48 to form a best package for the first type on the sorting list from non-packaged elements. The routine then runs again through the steps illustrated to identify a fixed package in step 60 and fix the signatures thereof in step 62. After step 62, the inquiry is again made as to whether all the logic system elements have been packaged. When the answer to this inquiry is "yes," the packaging routine is complete and all the logic elements of the logic system have been assigned to multielement packages. Each fixed package is represented by a code which contains the elements assigned thereto. This coded information is recorded on a direct access device which is then read by the placement routine 32 of FIG. 3.

To form the best package for each type in step 48, the procedure followed varies depending on the category into which the elements are classified. The three categories are: (1) the type has only one element per package, (2) all elements of one type can be packaged into one unit, and (3) the type has more than one element per package and more elements of the type are available than will fit into one package.

To form a best package for each of the above three categories, different priorities or rules are followed. For category (1) the logic elements of this type are first reviewed for the greatest number of critical connector signatures. The element that has the greatest number of critical connector signatures will be chosen as a best package for that type. When the elements of a given type have an equal number of such signatures, the element (of those tied) connected to the greatest number of fixed packages will be chosen as a best package. If the first two rules do not produce a best package for a particular type, the tied elements of that type are reviewed to determine which has the greatest number of fixed signatures. The element (of those tied) with the greatest number of fixed signatures for a particular type will then be chosen as the best package. If none of the remaining elements of a type which falls within category one has fixed signatures or there is a tie, the fourth rule to determine a best package for category one elements is on the basis of the fewest number of signatures. If this fourth rule (as applied to the tied elements) does not produce a best package for category one elements, a rule based on the order the coded data was read into the data processor is used to break ties.

To form a best package from elements within category two, the rule is that all remaining elements are packaged together. It is not necessary that all element locations of a package be utilized.

Category three elements will usually comprise the majority of the elements of a logic system. Rules for selecting a best package for elements in category three are divided into two sets; the first set is for selecting the first element to go into a package and the second set for selecting the remaining elements to form a best package.

To select the first element to form a best package, all the elements remaining in one type are considered to determine that one which has the greatest number of critical connector signatures. If any one of the elements has more critical connector signatures than the others, it will be chosen as the first element to form a multielement best package. Where none of the elements of a type have critical connector signatures, the first rule is not considered. If there is a tie between two or more elements, the first rule is disregarded as to the elements in the tie. Rule one, however, will then be used to consider other elements having critical connector signatures. After all the elements with critical connector signatures have been considered and a first element has not been chosen, then the second rule is applied to elements in the tie to determine the first element to form the multielement best package. According to rule two, the one element of those tied with the greatest number of signatures in common with a single input/output connector will be chosen as the first single element to form a new best package. Should rule two fail to produce a single first element because none of the tied elements have signatures in common with an input/output connector, the second rule is disregarded. If there is a tie between two or more of the elements, the second rule is disregarded as to the elements in the tie. Other elements having signatures in common with an input/output connector will be considered. When all such elements have been considered and a first element has not been chosen, a third rule is used to select the first element from among those tied. Rule three selects the first element from those tied for a multielement best package on the basis of the element with the greatest number of signatures in common with a single fixed package. If rule three fails to produce a single first element, rule four is considered. According to rule four, that element with the greatest number of signatures in common with a single non-fixed element of the same type will be selected as the first element in a multielement package. In the case of a tie between elements or should none of the elements have signatures in common with a single non-fixed element, rule four will not choose a single first element and rule five must be considered. For rule five, the tied elements are reviewed to determine which have signatures in common with the greatest number of non-fixed elements of the same type. When rule five fails to produce a first element, rule six is considered. Rule six is somewhat general and will almost always produce a first element for a new best package. According to rule six, the element with signatures in common with the greatest number of elements of any type will be selected as the first element of a new best package. If rule six fails to select a single first element, a rule based on the order the data was read into the system is used to select such an element. In the order of generality, rule one is the most restricted, and rule six the most general. The likelihood of finding a first element by any of the six rules is increased in the higher numbered rules.

After selecting a first element for a new package, the second set of rules will be used to select the remaining elements from those of one type to complete a best package for category three elements. To select the second, third, fourth, etc. element for a package, the first rule selects the element on the basis of which has the greatest number of critical connector signatures. Assuming that the routine is trying to select a second element, if rule one fails to select this element then rule two will determine which element has the greatest number of signatures in common with the partial package trying to be completed. When selecting the second element, the partial package will consist of only the first selected element. When none of the elements of a given type have signatures in common with the partial package, or should ties prevent selection of a second element, rule three will be considered to select the second element from among those tied. According to rule three, the second element for a package will be that one with the greatest number of signatures in common with the input/output connector and the greatest number of connections in common with the fixed package to which the first element chosen is connected. Although this rule appears to be restrictive, it is more general than rules one and two. When rule three fails to result in the selection of a second element, rule four will be used. Rule four selects an element from those tied on the basis of that one with signatures in common with the greatest number of elements of any type to which the partial package is connected. Note, that this is not between two elements of one type, but rather between all the elements in the logic system. Finally, should the first four rules fail to select a second element to be included with the first selected element, rule five will review the ties between elements of a given type to determine which has the greatest number of fixed signatures. The element from those tied with the greatest number of fixed signatures will then be chosen as the second element to form a best package. If rule five does not result in the selection of a second element, a rule based on the order the data was read into the data processor is used to break ties.

All remaining elements required to complete a best package for a given type in category three will be selected by the rules described above with regard to the selection of element two. The partially completed package used in the selection of elements by the second set of rules includes the previous selected elements.

For elements of category three, there are certain exceptions which override the rules for selecting the second, third, fourth, etc. elements to be assigned with the first selected element. An element having like input signatures and output signatures with the first selected element will be included in that package. This is one special condition that overrides the second set of rules. Another special condition is where the element has a special designation; that is, some special function elements must be packaged in a given configuration. For these cases, the second set of rules includes some variations.

Consider the situation where one special element is to be packaged with one standard element. The first element for the package is selected from the special elements in accordance with the first set of rules. The selection of a second element to be placed in a package with the special element will be in accordance with the second set of rules except that all special elements will be flagged as not available. In this situation, the second set of rules is restricted to the standard element type which can be packaged with the special element.

The step 48 of forming a best package yet is followed by the steps of forming a package for a comparison, step 50, comparing the package of step 50 with the best package yet, step 52, selecting the best package of the comparison, step 54, identifying the selected best package as a fixed package, step 60, and fixing the signatures of the fixed package step 62. When fixing the signatures of the fixed package, step 62, those signatures which are common to the input/output connector to which the first element chosen is connected are removed from the connector. Removing a signature from a connector affects all other elements with that same signature. Any rule which is based on connector signatures will not consider the removed signatures. Signatures are also removed from the fixed package that was considered in selecting a first element.

Referring again to the flow chart of FIG. 4, input data read from the direct access record produced by the third check subroutine is in the form of a code which defines each element of the logic system of FIG. 2 and includes an identification and signature coding. Assuming the use of an IBM 360 Computer to package the elements of the logic system, a program listing of instructions to generate representations of multielement packages is given in the Program Listing I. Instructions are listed in the program with identifier numbers corresponding to those assigned to the steps of the flow chart of FIG. 4. For example, the set of instructions from the beginning to a horizontal line identified as 46 are carried out in the step 46 of the flow chart of FIG. 4. Next, there is a set of instructions for a subroutine called by the main deck routine, also identified by 46. Thereafter there are lists of instructions performed in steps 48 and 50, 52 and 56, 54 etc., respectively. The program listing concludes with other subroutines which are called for in the preceeding program listing.

The language of the Program Listing I is Fortran and ALC.

PROGRAM LISTING I (46)

```
C PACKAGING--MAIN DECK
C
      COMMON/BLKB/NSIG,ISEC,IPOS,ITYPE,IFLAG,IGATE,IXPAND,NBYTE,NWORD,
     1IDUMY(32),JTYP(200),NONFXI(200),ISTRT(200),NGATE,NGROP,NCON,
     2ISIG(200),IPRINT(80),IHEAD(20)
```

```
      COMMON/BLKTAB/NUM(20),KSTRT(51),IGTYPN(1000),IODDC(1000),IPIN(1000
     1),IPCODE(1000),IPSEC(1000),IC(1000),ISG(1000),ISTUB(1000),KSG(200)
     3,JGATA1(1000),ISCN(1004),IPCO(1004),IPINN(1000),IEXTRA(20853)
      COMMON/BLKA/NGPS(50),NOP(51),NFSCN,NSTUB,NGATT,IBRD,NS,JGATA(1000)
     1,NPPG(1000),KGNA(1004),NAMA(1004),NAMB(1004)
      COMMON/BLKDIM/IMTC,IMNS,IMTYP,IMSTB,IMCON,IMPPG,IMGAT,IMPPN,IMGRP
      INTEGER*2ISTRT,JTYP,NONFX1
      CALL BCI(4,IBLNK,'    ')
      REWIND 71
      REWIND 72
      REWIND 10
      IMTC=1000
      IMNS=1024
      IMTYP=50
      IMSTB=1000
      IMCON=1000
      IMPPG=1000
      IMGAT=1000
      IMPPN=1000
      IMGRP=199
      IMNGPP=10
      READ(5,99) (IPRINT(J),J=1,80)
   99 FORMAT(80I1)
C
C  READ HEADER CARD
C
      READ(5,100)(IHEAD(J),J=1,20)
  100 FORMAT(20A4)
C
C  PRINT HEADER
C
      WRITE(6,101)(IHEAD(J),J=1,20)
  101 FORMAT(1H1,20A4,////)
      READ(10)N,(NUM(I),I=1,N)
      J=0
      NOP(1) = 1
      KSTRT(1)=1
      NTYPC=NUM(5)
      NS=NUM(3)-6
      IF(NTYPC.GT.IMTC)CALL PCKERR(1)
      IF(NS.GT.IMNS) CALL PCKERR(2)
      DO 1030 I=1,NTYPC
      READ(10,102)IDUMY(4),IDUMY(5),IDUMY(6),IODDC(I),IPINN(I),
     1IPIN(I),IPCODE(I),IPSEC(I)
  102 FORMAT(5X,3A4,1X,A1,1X,A4,1X,I4,4X,I1,3X,I2,41X)
      IF(I.EQ.1) GO TO 1010
      IF(IDUMY(1).EQ.IDUMY(4).AND.IDUMY(2).EQ.IDUMY(5).AND.IDUMY(3).EQ.
     1IDUMY(6)) GO TO 1020
 1010 J=J+1
      IF(J.GT.IMTYP) CALL PCKERR(3)
      NGPS(J)=IPCODE(I)
      IDUMY(1)=IDUMY(4)
      IDUMY(2)=IDUMY(5)
      IDUMY(3)=IDUMY(6)
      KSTRT(J+1)=KSTRT(J)
      NOP(J+1)=NOP(J)
 1020 IF(IODDC(I).NE.IBLNK)NOP(J+1)=NOP(J+1)+1
      IF(NGPS(J).LT.IPCODE(I))NGPS(J)=IPCODE(I)
      IF(NGPS(J).GT.IMNGPP) CALL PCKERR(10)
      KSTRT(J+1)=KSTRT(J+1)+1
      IGTYPN(I)=J
      IF(IPRINT(1).NE.0)WRITE(6,102)
     1IDUMY(4),IDUMY(5),IDUMY(6),IODDC(I),IPINN(I),IPCODE(I),
     2IPSEC(I),IGTYPN(I)
 1030 CONTINUE
      NTYPE=J
      N = J+1
      IF(IPRINT(2).NE.0)WRITE(6,104)
     1(KSTRT(I),NOP(I),NGPS(I),I=1,N)
  104 FORMAT(3I10)
      N=NUM(6)
      IF(N .EQ. 0) GO TO 2000
```

0275

```
      DO 1035 I=1,N
 1035 READ(10,103) J
  103 FORMAT(A4,76X)
 2000 NSTUB=0
      NREC=NUM(1)
      K=1
      DO 1045 I=1,NREC
      READ(10)N,IGA1,IGA2,J,J,J,J,IGN,J,J,J,KSCN,J,IC(K),J,J,ISG(K),ICOD
     1,IST,J,IPONT
      IF(IPRINT(3).NE.0)WRITE(6,105)
     1IGA1,IGA2,IGN,KSCN,IC(K),ISG(K),ICOD,IST,IPONT
  105 FORMAT(5X,2A4,10I5)
      ISG(K)=ISG(K)-6
      IF(ISG(K).LT.1) GO TO 1045
      IF(ICOD.EQ.0) GO TO 1040
      IF(IST.EQ.0) GO TO 1038
      NSTUB=NSTUB+1
      IF(NSTUB.GT.IMSTB) CALL PCKERR(4)
      ISTUB(NSTUB)=ISG(K)
 1038 K=K+1
      IF(K.GT.IMCON) CALL PCKERR(5)
      GO TO 1045
 1040 WRITE(72)IGA1,IGA2,IGN,KSCN,ISG(K),IPONT
 1045 CONTINUE
      K=K-1
      CALL ISORT(K,IC(1),ISG(1))
      NZ=0
      WRITE(72)(NZ,J=1,6)
      REWIND 72
      IC(K+1)=IC(K)+1
      NCON=0
      J=1
 1046 N=J
 1047 J=J+1
      IF( IC(N).EQ.IC(J)) GO TO 1047
      L=J-N
      I=J-1
      NCON=NCON+1
      KGNA(NCON)=0
      WRITE(71)NZ,NZ,L,(ISG(M),M=N,I),NZ
      IF(IPRINT(4).NE.0)WRITE(6,106)
     1NCON,KGNA(NCON),NZ,NZ,L,(ISG(M),M=N,I),NZ
  106 FORMAT(26I5)
      IF(I.NE.K) GO TO 1046
      L=0
      I=NCON+1
      NFSCN=0
      READ(72)NAMA(I),NAMB(I),KGNA(I),KSCNA,KSG(1),KPONT
 1050 J=1
      IXPAND=0
      IF(IODDC(KPONT).NE.IBLNK)IXPAND=32768
 1051 J=J+1
      READ(72)KG1,KG2,KGN1,KSCN1,KSG(J),KPONT1
      IF(KGN1.NE.KGNA(I)) GO TO 1055
      IF(IODDC(KPONT1).NE.IBLNK )IXPAND=32768
      GO TO 1051
 1055 JJ=J-1
      WRITE(71)NZ,IGTYPN(KPONT),JJ,(KSG(K),K=1,JJ),IXPAND
      IF(IPRINT(5).NE.0)WRITE(6,106)
     1I,KGNA(I),NZ,IGTYPN(KPONT),JJ,(KSG(K),K=1,JJ),IXPAND
      IF(KSCNA.EQ.0) GO TO 1060
      L=L+1
      IF(L.GT.IMPPG) CALL PCKERR(6)
      JGATA1(L)=KSCNA
      JGATA(L)=I
 1060 IF(KGN1.EQ.0) GO TO 1065
      I=I+1
      IF(I.GT.IMGAT) CALL PCKERR(7)
      NAMA(I)=KG1
      NAMB(I)=KG2
      KGNA(I)=KGN1
      KSCNA=KSCN1
```

```
      KSG(1)=KSG(J)
      KPONT=KPONT1
      GO TO 1050
 1065 NGATT=I
      N=NTYPE+1
      REWIND 72
      WRITE(71)(ISTUB(J),J=1,NSTUB)
      REWIND 71
      WRITE(72)(
     1IPINN(K), IPIN(K),IPCODE(K),IPSEC(K),IGTYPN(K),K=1,NTYPC),N,(KSTRT
     2(K),K=1,N)
      IF(L.EQ.0) GO TO 1075
      CALL ISORT(L,JGATA1(1),JGATA(1))
      NFSCN=JGATA1(L)
      NPPG(1)=1
      J=1
      K=1
 1066 DO 1067 M=K,L
      IF(JGATA1(K).NE.JGATA1(M)) GO TO 1070
 1067 CONTINUE
      NPPG(NFSCN+1)=L+1
      K = L+1
      IF(IPRINT(6).NE.0)WRITE(6,104)
     1(NPPG(J),JGATA1(J),JGATA(J),J=1,K)
      GO TO 1075
 1070 J=J+1
      IF(J.GT.IMPPN) CALL PCKERR(8)
      NPPG(J)=M
      K=M
      GO TO 1066
 1075 REWIND 72
      CALL MAINB
      STOP
      END
```

---

(46)

```
      SUBROUTINE MAINB
      COMMON /BLKTAB/IGATE1(1004),ISIG1(32,1004)
      COMMON/BLKB/NSIG,ISEC,IPOS,ITYPE,IFLAG,IGATE,IXPAND,NBYTE,NWORD,
     1IDUMY(32),JTYP(200),NONFX1(200),ISTRT(200),NGATE,NGROP,NCON,
     2ISIG(200),IPRINT(80),IHEAD(20)
      COMMON/BLKA/NGPS(50),NOP(51),NFSCN,NSTUB,NGATT,IBRD,NS,JGATA(1000)
     1,NPPG(1000),KGNA(1004),NAMA(1004),NAMB(1004)
      COMMON/BLKDIM/IMTC,IMNS,IMTYP,IMSTB,IMCON,IMPPG,IMGAT,IMPPN,IMGRP
      INTEGER*2 JTYP,NONFX1,ISTRT
      WRITE(6,801)
C
C COMPUTE NWORD AND NBYTE
C
      NWORD=(NS+31)/32
      NGATE=NGATT-NCON
      LL=NGATT+1
      NBYTE=(NS+7)/8
      IGATE1(LL)=0
      L=LL+1
      IGATE1(L)=L
      DO 77 I=1,NWORD
      DO 77 J=1,L
   77 ISIG1(I,J)=0
      L=0
C
C SET UP IGATE1 TABLE AND SIGNAL STRINGS FOR EACH COMPONENT
C
      DO 80 I=1,NGATT
      READ(71)ISEC,ITYPE,NSIG,(ISIG(J),J=1,NSIG),IXPAND
      IPOS=I
      IGATE=IPOS+IXPAND
      CALL STOSIG
   80 CONTINUE
C
C SORT IGATE1 TABLE ON SECTION/TYPE NUMBERS
```

```
C
      CALL LSORT(NGATE,IGATE1(NCON+1))
      IF(IPRINT(10).EQ.C) GC TO 10
      L=NGATT
      WRITE(6,802)NWORD,NBYTE,NGATT,NCON,NGATE
      WRITE(6,800)
      DO 79 NSIG=1,L
      CALL GATNUM
   79 WRITE(6,803) IGATE1(NSIG),(ISIG1(K,ISEC),K=1,NWORD)
      WRITE(6,800)
C
C DEFINE GROUPS OF GATES WHICH CAN BE PACKAGED TOGETHER
C
   10 CALL SETSTR
      IF(NGROP.GT.IMGRP) CALL PCKERR(9)
      ISTRT(NGROP+1)=ISTRT(NGROP)+NONFX1(NGROP)
      IF(IPRINT(11).EQ.0) GO TO 11
      WRITE(6,802)NGROP
      WRITE(6,800)
      WRITE(6,804)(JTYP(J),NCNFX1(J),ISTRT(J),J=1,NGROP)
      WRITE(6,804) ISTRT(NGRCP+1)
      WRITE(6,800)
   11 IF(NSTUB.EQ.0) GO TO 85
C
C SET UP STRING FOR STUBBED SIGNALS
C
      ISEC=0
      ITYPE=0
      IGATE=LL+1
      IPOS=LL+1
      NSIG=NSTUB
      READ(71)(ISIG(I),I=1,NSTUB)
      CALL STOSIG
   85 REWIND 71
      IFLAG = 214
      NSIG=LL
      IPOS=0
      IGATE1(LL)=LL
      DO 87 I=1,NCON
      ISEC=I
   87 CALL ANDOR
      IF(IPRINT(12).EQ.C) GO TO 12
      WRITE(6,803)IGATE1(LL),(ISIG1(J,LL),J=1,NWORD)
      WRITE(6,800)
      WRITE(6,803)IGATE1(LL+1),(ISIG1(J,LL+1),J=1,NWORD)
      WRITE(6,800)
   12 IF(NSTUB.EQ.0) GO TO 89
      NSIG = NGATT+2
      DO 88 ISEC =1,NCON
      CALL REMOVE
   88 CONTINUE
      IF(IPRINT(13).EQ.0) GO TO 89
      DO 94 N=1,NCON
   94 WRITE(6,803)IGATE1(N),(ISIG1(I,N),I=1,NWORD)
      WRITE(6,800)
   89 IF(NFSCN.EQ.0) GO TO 98
C
C SET UP SCN LEVEL SIGNAL STRINGS FOR PREPKG SCN'S
C
      DO 95 J=1,NFSCN
      IPOS=0
      IGATE=J
      K=0
      IFLAG = 214
      M=NPPG(J)
      N=NPPG(J+1)-1
      DO 90 L=M,N
      K=K+1
   90 ISIG(K)=JGATA(L)
      ISIG(K+1)=0
      CALL PREPKG
      DO 92 L = 1,NGROP
```

```
      IF(ITYPE.GE.ISTRT(L+1)) GO TO 92
      NONFX1(L)=NONFX1(L)-K
      GO TO 93
   92 CONTINUE
   93 L=JGATA(M)
      IF(IPRINT(14).EQ.0) GO TO 14
      WRITE(6,802)IGATE
      WRITE(6,803)IGATE1(NSIG),(ISIG1(I,L),I=1,NWORD)
      WRITE(6,800)
   14 ITYPE=0
C
C FIND MOST HIGHLY RELATED CONNECTOR FOR THIS SCN
C
      K=0
      IFLAG = 212
      IPOS=1
      DO 91 ISEC=1,NCON
      CALL ANDOR
      CALL CCUNT
      IF(IXPAND.LE.ITYPE) GO TO 91
      K=ISEC
      ITYPE = IXPAND
   91 CONTINUE
C
C UPDATE FIXED SIGNAL STRING
C
      IF(IPRINT(15).EQ.0) GO TO 15
      WRITE(6,803)IGATE1(K    ),(ISIG1(I,K    ),I=1,NWORD)
      WRITE(6,802)K,ITYPE
      WRITE(6,800)
   15 ISEC=NSIG
      NSIG=LL
      IFLAG=214
      IPOS=0
      CALL ANDOR
      NSIG=ISEC
      IF(K.EQ.0) GO TO 97
      ISEC=K
C
C REMOVE SIGNALS FROM CONNECTOR
C
      CALL REMOVE
   97 IF(NSTUB.EQ.0) GO TO 96
      ISEC=NGATT+2
C
C REMOVE SIGNALS FROM STUB LIST
C
      CALL REMOVE
   96 IF(IPRINT(16).EQ.0) GO TO 95
      WRITE(6,803)IGATE1(LL),(ISIG1(I,LL),I=1,NWORD)
      WRITE(6,800)
      WRITE(6,803)IGATE1(K),(ISIG1(I,K),I=1,NWORD)
      WRITE(6,800)
      WRITE(6,803)IGATE1(ISEC),(ISIG1(I,L    ),I=1,NWORD)
      WRITE(6,800)
   95 CONTINUE
      IF(IPRINT(17).EQ.0) GO TO 98
      WRITE(6,804)(JTYP(J),NONFX1(J),ISTRT(J),J=1,NGROP)
      L=NGATT+2
      WRITE(6,800)
      DO 99 NSIG=1,L
      CALL GATNUM
   99 WRITE(6,803)IGATE1(NSIG),(ISIG1(K,ISEC),K=1,NWORD)
   98 CALL COMBIN
      NZ=0
      WRITE(71)NZ,NZ,NZ
      CALL WRTOUT
  800 FORMAT(1H0)
  801 FORMAT(1H1)
  802 FORMAT(16I5)
  803 FORMAT(1X,Z8,1X,13(Z8,1X))
```

```
  804 FORMAT(3(1X,Z4))
      RETURN
      END
```

---

(48)(50)

```
      SUBROUTINE COMBIN
      COMMON /BLKTAB/IGATE1(1004),ISIG1(32,1004)
      COMMON /BLKB/NSIG,ISEC,IPOS,ITYPE,IFLAG,IGATE,IXPAND,NBYTE,NWORD,
     1IDUMY(32),JTYP(200),NONFX1(200),ISTRT(200),NGATE,NGROP,NCON,
     2ISIG(200),IPRINT(80),IHEAD(20)
      COMMON/BLKA/NGPS(50),NOP(51),NFSCN,NSTUB,NGATT,IBRD,NS,IFX1,IODDT,
     1IODDM,NGIP,IPGAT(10),NGINP,ISTUBP,ISFIX,ICONM,ISCNM,NFIXO,NSTUBO,
     2NSOSO,NSFIXO,IOBALL,IODUM,IGROP,IST,IEND,IEXTRA(1973),
     3          KGNA(1004),NAMA(1004),NAMB(1004)
      DIMENSION NAMSCN(10),IDNAMA(10),IDNAMB(10)
      INTEGER*2 ISTRT,JTYP,NONFX1,IOBALL,IODUM
      IF(IPRINT(18).EQ.0) GO TO 1001
      WRITE(6,2000)
 2000 FORMAT(15HOENTER COMBIN  )
C
C     SET UP POINTERS TO IGATE1 TABLE AND SIGNAL STRINGS
C
 1001 ISFIX=NGATT+1
      JFIX=NGATT+2
      IF(NSTUB.EQ.0) GO TO 1
      ISTUBP=JFIX
      JFIX=JFIX+1
    1 IFX1=JFIX+1
      IGATE1(IFX1)=IFX1
      IGATE1(JFIX)=JFIX
    2 NSOSC=100
      NFIXC=0
      NSFIXC=0
      NSTUBC=0
C
C
      DO 70 I=1,NGROP
      IGROP=I
      IF(NONFX1(I).LE.0) GO TO 70
      J=JTYP(I)
      IODDT=NOP(J+1)-NOP(J)
      IODDM=0
      NGIP=NGPS(J)
      IST=ISTRT(I)
      IEND=ISTRT(I+1)-1
      IF(NONFX1(I).LE.NGIP) GO TO 55
      IF(NGIP.LE.1) GO TO 40
C
C     GETFST FINDS BEST FIRST GATE TO FORM SCN WITH
C
    5 CALL GETFST
      IF(IPRINT(19).EQ.0) GO TO 1002
      WRITE(6,103) IPGAT(1)
      WRITE(6,500) ISCNM,IGATE1(ISCNM)
  500 FORMAT(1H+,10X,I5,5X,Z8)
  103 FORMAT(1X,I6)
 1002 ISEC=IPGAT(1)
      NSIG=IFX1
      CALL MOVE
C
C    GETSEC FINDS BEST REMAINING GATES TO COMPLETE SCN
C
      IF(NGINP.NE.NGIP) CALL GETSEC
```

---

(52)(56)

```
    7 IBESTC=0
      IF(IPRINT(20).EQ.0) GO TO 1005
      WRITE(6,102) (IPGAT(K),K=1,NGINP)
 1005 IF(NSTUB.EQ.0) GO TO 10
C
C    COMPARE STUBBED SIGNALS ON THIS SCN WITH BEST-SO-FAR
```

```
C
      NSIG=IFX1
      IFLAG=212
      ISEC=ISTUBP
      IPOS=1
      CALL ANDOR
      IF(IXPAND.NE.0) CALL COUNT
    8 IF(IXPAND-NSTUBC)70,10,9
    9 IBESTC=1
      NSTUBC=IXPAND
C
C   COMPARE SIGNALS IN COMMON WITH ALL FIXED ELEMENTS
C
   10 IFLAG=212
      NSIG=IFX1
      IPOS=1
      NTIL=0
      DO 15 ISEC=1,NGATT
      IF(ISEC.LE.NCON)GC TC 12
      IF(IGATE1(ISEC).GE.0) GO TO 15
   12 CALL ANDOR
      IF(IXPAND.NE.0)NTIL=NTIL+1
   15 CONTINUE
 1003 IF(IBESTC.NE.0) GO TO 17
      IF(NTIL-NFIXC)70,18,16
   16 IBESTC=1
   17 NFIXC=NTIL
C
C   COMPARE TOTAL NO. OF FIXED SIGNALS
C
   18 IFLAG=212
      NSIG=IFX1
      IPOS=1
      ISEC=ISFIX
      CALL ANDOR
      IF(IXPAND.NE.0)CALL COUNT
   21 IF(IBESTC.NE.0)GO TO 23
      IF(IXPAND-NSFIXC)70,24,22
   22 IBESTC=1
   23 NSFIXC=IXPAND
C
C    COMPARE TOTAL NUMBER OF SIGNALS
C
   24 IPOS=0
      NSIG=IFX1
      CALL COUNT
      NSOSO=IXPAND
   26 IF(IBESTC.NE.0)GO TO 29
      IF(NSOSO-NSOSC)29,70,70
```

---

(54)

```
   29 NSOSC=NSOSO
      NACON=ICONM
      NASCN=ISCNM
      NSIG=JFIX
      ISEC=IFX1
      CALL MOVE
      DO 30J=1,NGINP
   30 NAMSCN(J)=IPGAT(J)
      NFINAL=NGINP
      JGNUM=IGROP
      IF(IPRINT(22).EQ.0) GO TO 70
      WRITE(6,101)
      WRITE(6,102)(NAMSCN(J),J=1,NGINP)
      WRITE(6,103) NFINAL,JGNUM
      WRITE(6,102)NSTUBC,NFIXC,NSFIXC,NSOSC,NACON,NASCN
  102 FORMAT(20I6)
      GO TO 70
```

---

(48)(50)

```
C
C      ONEGPS FINDS BEST GATE AS A COMPLETE ONE GATE/SCN
```

```
C
   40 CALL ONEGPS
```

---

(52)(56)

```
      NGINP=1
      IBESTC=0
      IF(NSTUB.EQ.0) GO TO 42
      IF(NSTUBO-NSTUBC)70,42,41
   41 IBESTC=1
      NSTUBC=NSTUBO
      IF(IBESTC.NE.0) GO TO 46
   42 IF(NFIXO-NFIXC)70,47,45
   45 IBESTC=1
   46 NFIXC=NFIXO
   47 IF(IBESTC.NE.0) GO TO 51
      IF(NSFIXO-NSFIXC)70,26,50
   50 IBESTC=1
   51 NSFIXC=NSFIXO
      GO TO 26
```

---

(48)(50)

```
C
C       TEST FOR ANY ODDBALLS IN THIS GROUP
C
   55 IF(IODDT.EQ.0) GO TO 60
      K=ISTRT(I)
      KK=ISTRT(I+1)-1
      DO 58 J=K,KK
      IF(IGATE1(J).LE.0) GO TO 58
      IOBALL=IGATE1(J)
      IF(IOBALL.LT.0) GO TO 5
   58 CONTINUE
C
C     GROUP FORMS AN SCN WHEN THE TOTAL NO. OF GATES IN THIS GROUP IS LESS
C     THAN OR EQUAL TO THE MAXIMUM NO. OF GATES/SCN
C
   60 CALL GROUP
      GO TO 7
```

---

(58)

```
   70 CONTINUE
C
C     REMOVE SIGNALS IN COMMON WITH THIS SCN FROM CONNECTORS, FIXED SCN'S,
C    AND STUBBED SIGNAL STRING
C
```

---

(60)

```
      IF(NACON.EQ.0) GO TO 72
      ISEC=NACON
      NSIG=JFIX
      CALL REMOVE
   72 IF(NASCN.EQ.0) GO TO 74
      ISEC=NASCN
      NSIG=JFIX
      CALL REMOVE
   74 IF(NSTUB.EQ.0) GO TO 75
      ISEC=ISTUBP
      NSIG=JFIX
      CALL REMOVE
      NSTUB=NSTUB-NSTUBC
C
C    SET IGATE1 = 0 FOR EACH GATE, EXCEPT THE FIRST,IN THIS SCN
C
   75 NFSCN=NFSCN+1
      DO 80 J=1,NFINAL
      NSIG=NAMSCN(J)
      WRITE(71)NFSCN,IGATE1(NSIG),J
      CALL GATNUM
      IF(J.GT.1) IGATE1(NSIG)=0
      IDNAMA(J)=NAMA(ISEC)
   80 IDNAMB(J)=NAMB(ISEC)
      IF(IPRINT(23).EQ.0) GO TO 1004
```

```
      WRITE(6,101)
      WRITE(6,103)NFSCN
      WRITE(6,100) (IDNAMA(J),IDNAMB(J),NAMSCN(J),J=1,NFINAL)
  101 FORMAT(1H0)
  100 FORMAT(2X,2A4,2X,I6)
 1004 NSIG=NAMSCN(1)
      ISEC=JFIX
      CALL MOVE
      ISEC=NFSCN
      CALL FIGATE
      NONFX1(JGNUM)=NONFX1(JGNUM)-NFINAL
```

---

(62)

```
      IFLAG=214
      IPOS=0
      NSIG=ISFIX
      ISEC=JFIX
      CALL ANDOR
```

---

(64)

```
      DO 85 J=1,NGROP
C
C   TEST FOR ANY GATE NOT YET PACKAGED
C
      IF(NONFX1(J).GT.0) GO TO 2
   85 CONTINUE
      RETURN
      END
```

---

(48)(50)

```
      SUBROUTINE GETFST
      COMMON /BLKTAB/IGATE1(1004),ISIG1(32,1004)
      COMMON /BLKB/NSIG,ISEC,IPOS,ITYPE,IFLAG,IGATE,IXPAND,NBYTE,NWORD,
     1IDUMY(32),JTYP(200),NONFX1(200),ISTRT(200),NGATE,NGROP,NCON,
     2ISIG(200),IPRINT(80),IHEAD(20)
      COMMON/BLKA/NGPS(50),NOP(51),NFSCN,NSTUB,NGATT,IBRD,NS,IFX1,IODDT,
     1IODDM,NGIP,IPGAT(10),NGINP,ISTUBP,ISFIX,ICONM,ISCNM,NFIXO,NSTUBO,
     2NSOSO,NSFIXO,IOBALL,IODUM,IGROP,IST,IEND,IEXTRA(1973),
     3          KGNA(1004),NAMA(1004),NAMB(1004)
      INTEGER*2 ISTRT,JTYP,NONFX1,IOBALL,IODUM
      ICONM=0
      NSTUBF=0
      NELMF=0
      NGLTF=0
      NSGLTF=0
      NCONF=0
      ISCNM=0
      NSCNF=0
      NGINP=0
      IPGAT(1)=0
C
C   TEST FOR ANY ODDBALLS IN THIS GROUP
C
      IF(IODDT.EQ.0)GO TO 7
      IDUM1=0
      IDUM2=0
      DO 5 J=IST,IEND
      IF(IGATE1(J).LE.0)GO TO 5
      IDUM1=IDUM1+1
      IOBALL=IGATE1(J)
      IF(IOBALL.LT.0)IDUM2=IDUM2+1
    5 CONTINUE
      IF(2*IDUM2.GE.IDUM1)IODDM=1
    7 IBESTF=0
      DO 50 J=IST,IEND
      IBESTF=0
      NELMF1=0
      NGLTF1=0
      IF(IGATE1(J).LE.0)GO TO 50
      IOBALL=IGATE1(J)
      IF(IODDM.EQ.1.AND.IOBALL.GE.0)GO TO 50
```

```
      IF(NSTUB.EQ.0)GO TO 12
C
C     COMPARE STUBBED SIGNALS ON THIS GATE WITH BEST-SO-FAR
C
      ISEC=ISTUBP
      IFLAG=212
      IPOS=1
      NSIG=J
      CALL ANDOR
      IF(IXPAND.NE.0)CALL CCUNT
      IF(IXPAND-NSTUBF)50,12,10
   10 IBESTF=1
      NSTUBF=IXPAND
C
C    COMPARE SIGNALS IN COMMON WITH A SINGLE CONNECTOR
C
   12 IDUM1=0
      IDUM2=0
      IDUM3=0
      IDUM4=0
      NSIG=J
      IFLAG=212
      IPOS=1
      DO 15 ISEC=1,NCON
      CALL ANDOR
      IF(IXPAND.EQ.0)GO TO 15
      NELMF1=NELMF1+1
      CALL COUNT
      IF(IXPAND.LE.IDUM1)GO TO 15
      IDUM1=IXPAND
      IDUM2=ISEC
   15 CONTINUE
      IF(IBESTF.NE.0)GO TO 18
      IF(IDUM1-NCONF)50,18,16
   16 IBESTF=1
   18 IF(NFSCN.EQ.0)GO TO 25
C
C     COMPARE SIGNALS IN COMMON WITH SINGLE SCN
C
      NSIG=J
      IFLAG=212
      IPOS=1
      L=NCON+1
      DO 20 ISEC=L,NGATT
      IF(IGATE1(ISEC).GE.0)GO TO 20
      CALL ANDOR
      IF(IXPAND.EQ.0)GO TO 20
      NELMF1=NELMF1+1
      CALL COUNT
      IF(IXPAND-IDUM3)20,20,21
   21 IDUM4 = ISEC
      IDUM3=IXPAND
   20 CONTINUE
      IF(IBESTF.NE.0)GO TO 25
      IF(IDUM3-NSCNF)50,25,22
   22 IBESTF=1
C
C    COMPARE SIGNALS IN COMMON WITH SINGLE NONFIXED GATE OF SAME GROUP
C
   25 NSIG=J
      IFLAG=212
      IPOS=1
      IDUM5=0
      DO 27 ISEC=IST,IEND
      IF(ISEC.EQ.J)GO TO 27
      IF(IGATE1(ISEC).LE.0)GO TO 27
      CALL ANDOR
      IF(IXPAND.EQ.0)GO TO 27
      NELMF1=NELMF1+1
      NGLTF1=NGLTF1+1
      CALL COUNT
      IF(IXPAND.LE.IDUM5)GO TO 27
```

```
      IDUM5=IXPAND
   27 CONTINUE
      IF(IBESTF.NE.0)GO TO 30
      IF(IDUM5-NSGLTF)50,32,29
   29 IBESTF=1
   30 NSGLTF=IDUM5
   32 IF(IBESTF.NE.0)GO TO 36
C
C     COMPARE SIGNALS IN COMMON WITH ALL NONFIXED GATES OF THIS GROUP
C
      IF(NGLTF1-NGLTF)50,38,34
   34 IBESTF=1
   36 NGLTF=NGLTF1
C
C    COMPARE SIGNALS IN COMMON WITH OTHER ELEMENTS
C
   38 NSIG=J
      IFLAG=212
      IPOS=1
      L=NCON+1
      DO 43 ISEC=L,NGATT
      IF(ISEC.GE.IST.AND.ISEC.LE.IEND)GO TO 43
      IF(IGATE1(ISEC).LE.0)GO TO 43
      CALL ANDOR
      IF(IXPAND.EQ.0)GO TO 43
      NELMF1=NELMF1+1
   43 CONTINUE
      IF(IBESTF.NE.0)GO TO 45
      IF(NELMF1-NELMF)50,50,45
   45 NELMF=NELMF1
      IPGAT(1)=J
      NSCNF=IDUM3
      ISCNM=IDUM4
      NCONF=IDUM1
      ICONM=IDUM2
   50 CONTINUE
      J=IPGAT(1)
      NGINP=1
      NSIG=J
      CALL GATNUM
      JGANM=ISEC
      IF(IODDT.EQ.0)GO TO 53
      IOBALL=IGATE1(NSIG)
      IF(IOBALL.LT.0)IODDM=1
   53 CALL POWER
      IF(IXPAND.EQ.0)RETURN
      DO 57 NSIG=IST,IEND
      IF(IGATE1(NSIG).LE.0)GO TO 57
      IF(NSIG.EQ.J)GO TO 57
      CALL POWER
      IF(IXPAND.EQ.0)GO TO 57
      CALL GATNUM
      DO 55 I=1,NWORD
      IF(ISIG1(I,JGANM).NE.ISIG1(I,ISEC))GO TO 57
   55 CONTINUE
      NGINP=NGINP+1
      IPGAT(NGINP)=NSIG
      IF(NGINP.EQ.NGIP)RETURN
   57 CONTINUE
      RETURN
      END
```

---

(48)

```
      SUBROUTINE GETSEC
      COMMON /BLKTAB/IGATE1(1004),ISIG1(32,1004)
      COMMON /BLKB/NSIG,ISEC,IPOS,ITYPE,IFLAG,IGATE,IXPAND,NBYTE,NWORD,
     1IDUMY(32),JTYP(200),NONFX1(200),ISTRT(200),NGATE,NGROP,NCON,
     2ISIG(200),IPRINT(80),IHEAD(20)
      COMMON/BLKA/NGPS(50),NOP(51),NFSCN,NSTUB,NGATT,IBRD,NS,IFX1,IODDT,
     1IODDM,NGIP,IPGAT(10),NGINP,ISTUBP,ISFIX,ICONM,ISCNM,NFIXO,NSTUBO,
     2NSOSO,NSFIXO,IOBALL,IODUM,IGROP,IST,IEND,IEXTRA(1973),
```

```
 3          KGNA(1004),NAMA(1004),NAMB(1004)
   INTEGER*2 ISTRT,JTYP,NONFX1,IOBALL,IODUM
 1 NSTUBS=0
   NSPPS=-1
   NSCPS=0
   NELMIS=0
   NFIXS=0
   NUMGAT=NGIP-NGINP
   NEXTG=NGINP+1
   IPGAT(NEXTG)=0
   IBESTS=0
   DO 55 J=IST,IEND
   IF(IGATE1(J).LE.0) GO TO 55
   DO 10 I=1,NGINP
   IF(J.EQ.IPGAT(I))GO TO 55
10 CONTINUE
   IF(IODDT.EQ.0)GO TO 12
   IOBALL=IGATE1(J)
   IF(IOBALL.LT.0.AND.IODDM.NE.0)GO TO 55
12 NSIG=J
   NPOWL1=0
   CALL POWER
   IF(IXPAND.EQ.0)GO TO 20
   IDUM1=1
   CALL GATNUM
   JGANM=ISEC
   DO 18 NSIG=IST,IEND
   IF(IGATE1(NSIG).LE.0)GO TO 18
   IF(NSIG.EQ.J)GO TO 18
   CALL POWER
   IF(IXPAND.EQ.0)GO TO 18
   CALL GATNUM
   DO 15 I=1,NWORD
   IF(ISIG1(I,JGANM).NE.ISIG1(I,ISEC))GO TO 18
15 CONTINUE
   IDUM1=IDUM1+1
18 CONTINUE
   NPOWL1=IDUM1-(IDUM1/NGIP)*NGIP
   IF(NPOWL1.EQ.0)GO TO 55
   IF(NUMGAT.LT.NPOWL1)GO TO 55
20 IBESTS=0
   IF(NSTUB.EQ.0)GO TO 26
   ISEC=ISTUBP
   IFLAG=212
   IPOS=1
   NSIG=J
   CALL ANDOR
   IF(IXPAND.EQ.0)GO TO 22
   CALL COUNT
22 IF(IXPAND-NSTUBS)55,26,24
24 IBESTS=1
   NSTUBS=IXPAND
26 ISEC=IFX1
   NSIG=J
   IPOS=1
   IFLAG=212
   CALL ANDOR
   IF(IXPAND.EQ.0)GO TO 28
   CALL COUNT
28 IF(IBESTS.NE.0)GO TO 31
   IF(IXPAND-NSPPS)55,32,30
30 IBESTS=1
31 NSPPS=IXPAND
32 IDUM1=0
   NSIG=J
   IPOS=1
   IFLAG=212
   IF(ICONM.EQ.0)GO TO 34
   ISEC=ICONM
   CALL ANDOR
   IF(IXPAND.EQ.0)GO TO 34
   CALL COUNT
```

```
      IDUM1=IXPAND
   34 IF(ISCNM.EQ.0)GO TO 36
      ISEC=ISCNM
      CALL ANDOR
      IF(IXPAND.EQ.0)GO TO 36
      CALL CCUNT
      IDUM1=IDUM1+IXPAND
   36 IF(IBESTS.NE.0) GO TO 39
      IF(IDUM1-NSCPS)55,40,38
   38 IBESTS=1
   39 NSCPS=IDUM1
   40 IDUM1=0
      IFLAG=212
      IPOS=1
      DO 44 I=1,NGATT
      IF(IGATE1(I).EQ.0)GO TC 44
      IF(I.EQ.J)GO TO 44
      ISEC=J
      NSIG=I
      CALL ANDOR
      IF(IXPAND.EQ.0)GO TO 44
      ISEC=IFX1
      CALL ANDOR
      IF(IXPAND.NE.0)IDUM1=IDUM1+1
   44 CONTINUE
      IF(IBESTS.NE.0)GO TO 47
      IF(IDUM1-NELMIS)55,48,45
   45 IBESTS=1
   47 NELMIS=IDUM1
   48 ISEC=J
      IFLAG=212
      IPOS=1
      NSIG=ISFIX
      CALL ANDOR
      IF(IXPAND.EQ.0)GO TO 50
      CALL COUNT
   50 IF(IBESTS.NE.0)GO TO 54
      IF(IXPAND-NFIXS)55,55,52
   52 IBESTS=1
   54 NFIXS=IXPAND
      IPGAT(NEXTG)=J
      NPOWL=NPOWL1
   55 CONTINUE
      J=IPGAT(NEXTG)
      IF(J.EQ.0)RETURN
      NGINP=NGINP+1
      IF(IODDT.EQ.0)GO TO 60
      IOBALL=IGATE1(J)
      IF(IOBALL.GT.0)GO TO 60
      IODDM=1
      RETURN
   60 IFLAG=214
      NSIG=IFX1
      IPOS=0
      ISEC=J
      CALL ANDOR
      IF(NPOWL.LE.1)GO TC 73
      IDUM1=1
      NSIG=J
      CALL GATNUM
      JGANM=ISEC
      DO 70 NSIG=IST,IEND
      IF(IGATE1(NSIG).LE.0)GC TO 70
      IF(NSIG.EQ.J)GO TC 70
      CALL POWER
      IF(IXPAND.EQ.0)GO TO 70
      CALL GATNUM
      DO 65 I=1,NWORD
      IF(ISIG1(I,JGANM).NE.ISIG1(I,ISEC))GO TO 70
   65 CONTINUE
      NGINP=NGINP+1
      IPGAT(NGINP)=NSIG
```

```
      IDUM1=IDUM1+1
      IF(IDUM1.EQ.NPOWL)GO TC 73
   70 CONTINUE
      WRITE(6,100)
  100 FORMAT(1H1,' FATAL PACKAGING PROGRAM ERROR OCCURRED IN '/,
     1 10X,' SUBROUTINE GETSEC; CONTACT D.A.D. PERSONNEL')
      STOP 2
   73 IF(NGINP.LT.NGIP)GC TC 1
      RETURN
      END
```

(48)

```
      SUBROUTINE ONEGPS
      COMMON /BLKTAB/IGATE1(1004),ISIG1(32,1004)
      COMMON /BLKB/NSIG,ISEC,IPOS,ITYPE,IFLAG,IGATE,IXPAND,NBYTE,NWORD,
     1IDUMY(32),JTYP(200),NONFX1(200),ISTRT(200),NGATE,NGROP,NCON,
     2ISIG(200),IPRINT(80),IHEAD(20)
      COMMON/BLKA/NGPS(50),NOP(51),NFSCN,NSTUB,NGATT,IBRD,NS,IFX1,IODDT,
     1IODDM,NGIP,IPGAT(10),NGINP,ISTUBP,ISFIX,ICONM,ISCNM,NFIXO,NSTUBO,
     2NSOSO,NSFIXO,IOBALL,IODUM,IGROP,IST,IEND,IEXTRA(1973),
     3         KGNA(1004),NAMA(1004),NAMB(1004)
      INTEGER*2 ISTRT,JTYP,NCNFX1,IOBALL,IODUM
      ICONM=0
      ISCNM=0
      NSTUBO=0
      NFIXO=0
      NSFIXO=0
      NSOSO=100
      DO 30 J =IST,IEND
      IF(IGATE1(J).LE.0) GO TO 30
      IBESTO=0
      IF(NSTUB.EQ.0) GO TO 10
      NSIG=J
      IFLAG=212
      ISEC=ISTUBP
      IPOS=1
      CALL ANDOR
      IF(IXPAND.EQ.0) GC TO 5
      CALL COUNT
    5 IF(IXPAND-NSTUBO)30,10,7
    7 IBESTO=1
      NSTUBO=IXPAND
   10 IFLAG=212
      NSIG=J
      IPOS=1
      IDUM1=0
      DO 15 ISEC=1,NGATT
      IF(ISEC.LE.NCON) GO TO 12
      IF(IGATE1(ISEC).GE.0) GO TC 15
   12 CALL ANDOR
      IF(IXPAND.NE.0)IDUM1=IDUM1+1
   15 CONTINUE
      IF(IBESTO.NE.0) GC TO 17
      IF(IDUM1-NFIXO)30,18,16
   16 IBESTO=1
   17 NFIXO=IDUM1
   18 IFLAG=212
      NSIG=J
      IPOS=1
      ISEC=ISFIX
      CALL ANDOR
      IF(IXPAND.EQ.0) GC TO 21
      CALL COUNT
   21 IF(IBESTO.NE.0) GO TO 23
      IF(IXPAND-NSFIXO)30,24,22
   22 IBESTO=1
   23 NSFIXO=IXPAND
   24 IPOS=0
      NSIG=J
      CALL COUNT
      IF(IBESTO.NE.0) GC TC 29
```

```
      IF(IXPAND-NSOSO)29,30,30
   29 NSOSO=IXPAND
      IPGAT(1)=J
   30 CONTINUE
      ISEC=IPGAT(1)
      NSIG=IFX1
      CALL MOVE
      IPOS=1
      IFLAG=212
      IDUM1=0
      DO 40 NSIG=1,NCON
      CALL ANDOR
      IF(IXPAND.EQ.0) GO TO 40
      CALL COUNT
      IF(IXPAND-IDUM1)40,40,35
   35 IDUM1=IXPAND
      ICONM=NSIG
   40 CONTINUE
      IF(NFSCN.EQ.0) RETURN
      L=NCON+1
      IDUM1=0
      DO 50 NSIG=L,NGATT
      IF(IGATE1(NSIG).GE.0)  GO TO 50
      CALL ANDOR
      IF(IXPAND.EQ.0) GO TO 50
      CALL COUNT
      IF(IXPAND-IDUM1)50,50,45
   45 IDUM1=IXPAND
      ISCNM=NSIG
   50 CONTINUE
      RETURN
      END
```

---

(48)

```
      SUBROUTINE GROUP
      COMMON /BLKTAB/IGATE1(1004),ISIG1(32,1004)
      COMMON /BLKB/NSIG,ISEC,IPOS,ITYPE,IFLAG,IGATE,IXPAND,NBYTE,NWORD,
     1IDUMY(32),JTYP(200),NONFX1(200),ISTRT(200),NGATE,NGROP,NCON,
     2ISIG(200),IPRINT(80),IHEAD(20)
      COMMON/BLKA/NGPS(50),NOP(51),NFSCN,NSTUB,NGATT,IBRD,NS,IFX1,IODOT,
     1IODDM,NGIP,IPGAT(10),NGINP,ISTUBP,ISFIX,ICONM,ISCNM,NFIXO,NSTUBO,
     2NSOSO,NSFIXO,IOBALL,IODUM,IGROP,IST,IEND,IEXTRA(1973),
     3            KGNA(1004),NAMA(1004),NAMB(1004)
      INTEGER*2 ISTRT,JTYP,NONFX1,IOBALL,IODUM
      ISCNM=0
      ICONM=0
      NGINP=0
      DO 40 J=IST,IEND
      IF(IGATE1(J).LE.0) GO TO 40
      IF(NGINP.NE.0) GO TO 30
      NGINP=1
      IPGAT(1)=J
      ISEC=J
      NSIG=IFX1
      CALL MOVE
      IPOS=1
      IFLAG=212
      IDUM1=0
      DO 10 NSIG=1,NCON
      CALL ANDOR
      IF(IXPAND.EQ.0) GO TO 10
      CALL COUNT
      IF(IXPAND-IDUM1) 10,10,7
    7 IDUM1=IXPAND
      ICONM=NSIG
   10 CONTINUE
      IF(NFSCN.EQ.0) GO TO 40
      IDUM1=0
      L=NCON+1
      ISEC=J
      IPOS=1
```

```
      IFLAG=212
      DO 20 NSIG=L,NGATT
      IF(IGATE1(NSIG).GE.0) GO TO 20
      CALL ANDOR
      IF(IXPAND.EQ.0) GO TO 20
      CALL CCUNT
      IF(IXPAND-IDUM1)20,20,15
   15 IDUM1=IXPAND
      ISCNM=NSIG
   20 CONTINUE
      GO TO 40
   30 NGINP=NGINP+1
      IPGAT(NGINP)=J
      IPOS=0
      NSIG=IFX1
      IFLAG=214
      ISEC=J
      CALL ANDOR
   40 CONTINUE
      RETURN
      END
```

---

(48)

```
      SUBROUTINE WRTOUT
      COMMON/BLKA/NGPS(50),NOP(51),NFSCN,NSTUB,NGATT,IBRD,NS,JGATA(1000)
     1,NPPG(1000),KGNA(1004),NAMA(1004),NAMB(1004)
      COMMON/BLKB/NSIG,ISEC,IPOS,ITYPE,IFLAG,IGATE,IXPAND,NBYTE,NWORD,
     1IDUMY(32),JTYP(20C),NONFX1(200),ISTRT(200),NGATE,NGROP,NCON,
     2ISIG(200),IPRINT(80),IHEAD(20)
      COMMON/BLKTAB/NUM(20),KSTRT(51),IGTYPN(1000),IODDC(1000),IPIN(1000
     1),IPCODE(1000),IPSEC(1000),IC(1000),ISG(1000),ISTUB(1000),KSG(200)
     3,JGATA1(1000),ISCN(1004),IPCO(1004),IPINN(1000),IEXTRA(20853)
      INTEGER*2ISTRT,JTYP,NONFX1
      REWIND 10
      REWIND 11
      REWIND 71
      REWIND 72
      READ (10)N,(NUM(I),I=1,N)
      NTYPC=NUM(5)
      NUM(4)=NFSCN
      WRITE(11)N,(NUM(J),J=1,N)
      IF(IPRINT(24).EQ.1) WRITE(6,101)N,(NUM(J),J=1,N)
  101 FORMAT(10I10)
  102 FORMAT(10X,20A4)
      NREC=NUM(1)
      N=NTYPC+NUM(6)
      DO 10 I=1,N
      READ(10,100)(IDUMY(J),J=1,20)
      IF(IPRINT(24).EQ.1) WRITE(6,102)(IDUMY(J),J=1,20)
   10 WRITE(11,100)(IDUMY(J),J=1,20)
  100 FORMAT(20A4)
      NSIG=1
   20 READ(71) J,NUM(1),I
      IF(J      .EQ.0) GO TO 25
      CALL GATNUM
      K=KGNA(ISEC)
      ISCN(K)=J
      IPCO(K)=I
      GO TO 20
   25 READ(72)(
     1IPINN(J),IPIN(J),IPCODE(J),IPSEC(J),IGTYPN(J),J=1,NTYPC),N,(KSTRT
     2(K),K=1,N)
      DO 45 J=1,NREC
      READ(10)N,(IDUMY(K),K=1,N)
      IF(IDUMY(17).NE.0) GO TO 40
      IF(IDUMY(11).NE.0) GO TO 40
      K=IDUMY(7)
      IDUMY(11)=ISCN(K)
      IDUMY(14)=IPCO(K)
      K=IDUMY(20)
      IF(IDUMY(14).EQ.IPCODE(K)) GO TO 40
```

```
      I=IGTYPN(K)
      IB=KSTRT(I)
      IE=KSTRT(I+1)-1
      DO 30 L=IB,IE
      IF(IDUMY(14).NE.IPCODE(L).OR.IPSEC(K).NE.IPSEC(L)) GO TO 30
      IDUMY(20)=L
      IDUMY(15)=IPIN(L)
      IDUMY(3)=IPINN(L)
      GO TO 40
   30 CONTINUE
      WRITE(6,200)
  200 FORMAT(1H1,' FATAL ERROR IN PACKAGING SUBROUTINE WRTOUT.'/,
     1  10X, 'INVALID ELEMENT # OR PIN SEQUENCE # ENCOUNTERED '/,
     2  10X,'WHILE ATTEMPTING TO UPDATE THE FOLLOWING RECORD...')
      WRITE(6,103) N,(IDUMY(L),L=1,N)
      WRITE(6,201) IDUMY(14),IPSEC(K)
  201 FORMAT('OELEMENT # = ', I5, '; PIN SEQUENCE # = ', I5)
      STOP
   40 WRITE(11)N,(IDUMY(L),L=1,N)
      IF(IPRINT(24).EQ.1)WRITE(6,103)N,(IDUMY(L),L=1,N)
  103 FORMAT(I5,1X,2A4,1X,A4,1X,3A4,I4,1X,3A4,10I5)
   45 CONTINUE
      REWIND 10
      REWIND 11
      RETURN
      END
```

---

(48)

```
      SUBROUTINE PCKERR(I)
      WRITE(6,100) I
  100 FORMAT(43H1**** ERROR **** DIMENSION EXCEEDED CODE = ,I5)
      STOP
      END
 INCLUDE A(RAPPKG)
 INCLUDE A(JOE63PKC)
 ENTRY MAIN
         ENTRY ANDOR
         ENTRY COUNT
         ENTRY FIGATE
         ENTRY GATNUM
         ENTRY MOVE
         ENTRY POWER
         ENTRY PREPKG
         ENTRY REMOVE
         ENTRY SETSTR
         ENTRY STOSIG
*   THIS ROUTINE WILL'AND/OR' NSIG POSITION WITH THE ISEC POSITION
*   AND PLACE THE RESULT IN NSIG IF IPOS = 0  OR PLACE THE RESULT
*   IN IDUMY IF IPOS IS NOT EQUAL TO ZERO . IFLAG =D4 IF THE'AND'
*   OPERATION IS REQUIRED. IFLAG = D6 IF THE 'OR'OPERATION IS REQUIRED
*   D6 HEX.= 214 DEC.    D4 HEX. = 212 DEC 99 IXPAND IS SET TO ZERO IF
*   IF THE RESULT IS ZERO .IXPAND IS SET TO ONE IF THE RESULT IS NOT
*   ZERO
         USING *,15
ANDOR    STM   14,4,12(13)
         USING BLKB,14
         L     14,ABTBB+4
         MVC   INST3(1),IFLAG+3    MODIFY INSTRUCTIONS
         MVC   INST5(1),IFLAG+3    AND OR OR ROUTINE REQUIRED
         USING BLKTAB,1
         L     1,ABTBB
         L     2,NSIG
         BCTR  2,0                 NSIG-1
         SLL   2,2                 4(NSIG-1)
         LA    3,IGATE1
         LA    2,0(2,3)            ADR(IGATE1(4(NSIG-1)))
         L     2,0(0,2)            IGATE1(4(NSIG-1))
         N     2,MASK              GATE NUMBER FOR NSIG
         SLL   2,7                 128(GATE NUMBER)
         LA    0,TAB-128
         AR    2,0                 TAB POSITION FOR NSIG
```

```
         L      4,ISEC
         BCTR   4,0                   ISEC-1
         SLL    4,2                   4(ISEC-1)
         LA     4,0(4,3)              ADR(IGATE1(4(ISEC-1)))
         L      4,0(0,4)              IGATE1(4(ISEC-1))
         N      4,MASK                GATE NUMBER FOR ISEC
         SLL    4,7                   128(GATE NUMBER)
         AR     4,0                   TABPOSITION FOR ISEC
         L      3,NBYTE
         BCTR   3,0                   NBYTE -1
         L      0,IPOS                TEST  THE TYPE OF
         LTR    0,0                      ANDOR  REQUEST
         BC     7,OR1
         STC    3,INST3+1
INST3    OC     0(0,2),0(4)
         BC     15,OR3                NSIG(POS)
OR1      MVI    IDUMY,X'00'           IF OR  THEN
         BCTR   3,0                   ZERO IDUMY
         STC    3,INST6+1
INST6    MVC    IDUMY+1,IDUMY
         LA     3,1(0,3)              ANDOR  ISEC( POS) WITH
OR2      STC    3,INST4+1
INST4    OC     IDUMY(0),0(2)
         STC    3,INST5+1
INST5    OC     IDUMY(0),0(4)
OR3      BC     8,OR4
         LA     0,1(0,0)
         BC     15,OR5
OR4      LA     0,0(0,0)
OR5      ST     0,IXPAND
         LM     14,4,12(13)           RETURN
         MVI    12(13),X'FF'
         BCR    15,14
*    'COUNT' FINDS NUMBER OF 1-BITS IN 1 OF 2 STRINGS, IDUMY OR THE
*STRING IN TAB POINTED TO INDIRECTLY BY NSIG. COUNT NSIG IF IPOS=0.
*OTHERWISE COUNT IDUMY STRING
*    NBYTE=STRING LENGTH IN BYTES
*    IXPAND=COUNT TO BE RETURNED
         DROP   1,14
         USING  *,15
COUNT    STM    14,4,12(13)
         USING  BLKB,14
         L      14,ABTBB+4
         USING  BLKTAB,3
         L      3,ABTBB
         L      0,IPOS
         LTR    0,0
         BC     7,COUNTO              BRANCH IF IPOS NOT=0
         L      1,NSIG                GET ABS ADRES OF NSIG STRING
         BCTR   1,0                   *
         SLL    1,2                   *
         LA     4,IGATE1              *
         LA     1,0(1,4)              *
         L      1,0(0,1)              *
         N      1,MASK                *
         SLL    1,7                   *
         LA     4,TAB-128             *
         LA     1,0(1,4)              REG1=ABS ADRES OF NSIG STRING
         BC     15,COUNT1
COUNTO   LA     1,IDUMY               REG1=ABS ADRES OF IDUMY STRING
COUNT1   BCTR   1,0                   SUB 1
         LA     2,0(0,0)
         LR     0,2                   REG0=REG2=0
         L      4,NBYTE               STRING LENGTH
         BCTR   4,0                   SUB 1
         DROP   3
         LR     3,4
         AR     3,1                   REG3 = ABS ADRES OF END OF STRING-1
COUNT2   STC    4,COUNT3+1            SET LENGTH FIELD
COUNT3   TRT    1(0,1),CTABLE         COUNT 1'S IN NEXT NONZERO BYTE
         BC     8,COUNT4              *
         AR     0,2                   *
```

```
         LR     4,3                    *
         SR     4,1                    *
         BC     10,COUNT2              *
COUNT4   ST     0,IXPAND               STORE COUNT IN EXPAND
         LM     14,4,12(13)            RETURN SEQ
         MVI    12(13),X'FF'
         BCR    15,14
         DROP   14
         USING  *,15
FIGATE   STM    1,4,24(13)
         USING  BLKB,1
         L      1,ABTBB+4
         USING  BLKTAB,2
         L      2,ABTBB
         L      3,NSIG
         BCTR   3,0
         SLL    3,2
         LA     4,IGATE1
         LA     3,0(3,4)               ADR(IGATE1(NSIG))
         NC     0(4,3),MASK
         OI     0(3),X'8C'
         OC     0(2,3),ISEC+2
         LM     1,4,24(13)
         MVI    12(13),X'FF'
         BCR    15,14
         DROP   1,2
         USING  *,15
GATNUM   STM    1,4,24(13)
         USING  BLKB,1
         L      1,ABTBB+4
         USING  BLKTAB,2
         L      2,ABTBB
         L      3,NSIG
         BCTR   3,0
         SLL    3,2
         LA     4,IGATE1
         LA     3,0(3,4)               ADR(IGATE1(NSIG))
         L      3,0(0,3)
         N      3,MASK
         ST     3,ISEC
         LM     1,4,24(13)
         MVI    12(13),X'FF'
         BCR    15,14
         DROP   1,2
         USING  *,15
MOVE     STM    0,5,20(13)
         USING  BLKB,1
         L      1,ABTBB+4
         USING  BLKTAB,2
         L      2,ABTBB
         L      3,ISEC
         BCTR   3,0                    ISEC-1
         SLL    3,2
         LA     4,IGATE1
         LA     3,0(3,4)               ADR(IGATE1(ISEC))
         L      3,0(0,3)
         N      3,MASK                 GATE NUMBER
         SLL    3,7
         LA     0,TAB-128
         AR     3,0                    REG. 3 IS BASE FOR ISEC POSITION
         L      5,NSIG
         BCTR   5,0
         SLL    5,2
         LA     5,0(5,4)               ADR(IGATE1(NSIG))
         L      5,0(0,5)
         N      5,MASK                 GATE NUMBER
         SLL    5,7
         AR     5,0                    REG. 5 IS BASE FOR NSIG POSITION
         L      4,NBYTE
         BCTR   4,0
         STC    4,MOVE1+1
MOVE1    MVC    0(0,5),0(3)
```

```
         LM    0,5,20(13)
         MVI   12(13),X'FF'
         BCR   15,14
         DROP  1,2
         USING *,15
POWER    STM   1,4,24(13)
         USING BLKB,1
         L     1,ABTBB+4
         USING BLKTAB,2
         L     2,ABTBB
         L     3,NSIG
         BCTR  3,0
         SLL   3,2
         LA    4,IGATE1
         LA    3,0(3,4)             ADR(IGATE1(NSIG))
         TM    2(3),X'4C'
         BC    7,POWER1
         LA    4,0(0,0)             NOT A POWER PARALLEL
         BC    15,POWER2
POWER1   LA    4,1(0,0)
POWER2   ST    4,IXPAND
         LM    1,4,24(13)
         MVI   12(13),X'FF'
         BCR   15,14
*    'PREPKG' SETS UP IGATE1 AND TAB TABLES FOR A PREPACKAGED SCN.  ALL
*SIGNALS ARE.REPRESENTED IN ONE TAB STRING (DETERMINED BY THE GATE
*NUMBER IN FIRST WORD OF ISIG). THE RELATED IGATE1 WORD IS PACKED WITH
*A 1 SIGN BIT, SCN# IN HO HALFWORD AND GATE # IN LO HALFWORD.  IGATE1
*WORDS FOR THE OTHER GATES IN THE SCN ARE SET TO ZERO.
*    IGATE=SCN #,ISIG CONTAINS GATE #'S.
*    ITYPE = RETURNED IGATE1 POINTER
         DROP  1,2
         USING *,15
PREPKG   STM   14,10,12(13)
         USING BLKTAB,10
         L     10,ABTBB
         USING BLKB,6
         L     6,ABTBB+4
         ST    13,SAVE+4
         LA    9,SAVE
         ST    9,8(0,13)
         LR    13,9
         LR    9,15
         L     5,NEG4               SET UP FOR BXH LOOP IN 'SEARCH'...
         L     4,NGATE              *REG5=-4
         BCTR  4,0                  *REG4 WILL INDEX IGATE1 TABLE
         SLL   4,2
         LR    7,4
         L     3,NCON               *
         SLL   3,2                  *
         LA    1,IGATE1             *REG3=ABS ADRES OF 1ST 'GATE WORD'
         LA    3,0(3,1)             *  IN IGATE1
         LA    1,0(0,0)             *REG1 WILL INDEX ISIG TABLE
         BAL   2,SEARCH             BRANCH TO SEARCH
         ST    0,0(4,3)             STORE GATE # IN LO HALFWORD
         L     0,IGATE              C(IGATE)=SCN NUMBER
         STH   0,0(4,3)             STORE SCNNUMBER IN HO HALFWORD
         LR    2,4
         SRL   2,2
         A     2,NCON
         LA    2,1(0,2)
         ST    2,ITYPE
         LA    2,0(4,3)
         OI    0(2),X'80'           SET SIGN BIT TO 1
         LA    0,IGATE1             SET UP NSIG FOR CALL TO ANDOR...
         A     0,NEG4
         SR    2,0                  *
         SRL   2,2                  *
         ST    2,NSIG               *
         CNOP  0,4
         B     *+8
ENTRYPT  DC    V(ANDOR)             ENTRY POINT ADR.
```

```
PREPKG1  LA    1,4(0,1)            SET UP FOR EXIT TEST OF NEXT SEARCH
         L     2,ISIG(1)           *
         LTR   2,2                 *TEST
         BC    8,PREPKG2           BRANCH TO RETURN SEQ IF ISIG(1)=0
         LR    4,7
         BAL   2,SEARCH            BRANCH TO SEARCH
         LA    0,IGATE1            SET UP ISEC FOR CALL TO ANDOR...
         A     0,NEG4
         LA    2,0(4,3)            *
         SR    2,0                 *
         SRL   2,2                 *
         ST    2,ISEC              *
         L     15,ENTRYPT
         BALR  14,15
         LA    2,0(0,0)            *
         ST    2,0(4,3)            *
         LR    15,9
         BC    15,PREPKG1
PREPKG2  L     13,SAVE+4
         LM    14,10,12(13)         REUTRN SEQ
         MVI   12(13),X'FF'        *
         BCR   15,14               *
*    'SEARCH' SEARCHES THE LO HALFWORDS OF THE IGATE1 TABLE FOR GATE
*NUMBERS GIVEN IN ISIG.  OPERATES UNDER BASE REGS IN 'PREPKG'.
SEARCH   L     0,0(4,3)
         N     0,MASK
         CL    0,ISIG(1)
         BCR   8,2
         BXH   4,5,SEARCH
         CALL PRINT,(ZERC,FORMAT),VL
         CALL  EXIT
ZERO     DC    F'0'
FORMAT   DC    C'(''1FATAL ERROR IN PACKAGING SUBR. SEARCH (ALC)'')'
*   THIS ROUTINE WILL REMOVE THE ONE BITS FORM THE ISEC POSITION
*   COORESPONDING TO THE ONE BITS IN THE NSIG PCSITION. THIS ROUTINE
*   USES THE IDUMY ARRAY AS TEMPORARY STORAGE.
         DROP  6,10
         USING *,15
REMOVE   STM   14,4,12(13)
         USING BLKB,14
         L     14,ABTBB+4
         USING BLKTAB,1
         L     1,ABTBB
         L     2,ISEC
         BCTR  2,0                 ISEC-1
         SLL   2,2                 4(ISEC-1)
         LA    3,IGATE1
         LA    2,0(2,3)            ADR(IGATE1(4(ISEC-1)))
         L     2,0(0,2)            IGATE1(4(ISEC-1))
         N     2,MASK              GATE NUMBER FROM ISEC
         SLL   2,7                 128(GATE NUMBER)
         LA    0,TAB-128
         AR    2,0                 TABPOSITION FOR ISEC
         L     4,NSIG
         BCTR  4,0                 NSIG-1
         SLL   4,2                 4(NSIG-1)
         LA    4,0(4,3)            ADR(IGATE1(4(NSIG-1)))
         L     4,0(0,4)            IGATE1(4(NSIG-1))
         N     4,MASK              GATE NUMBER FCR NSIG
         SLL   4,7                 128(GATE NUMBER)
         AR    4,0                 TAB POSITION FOR NSIG
         L     3,NBYTE
         BCTR  3,0                 NBYTE-1
         STC   3,REMOVE1+1         SET UP INSTRUCTIONS FOR REMOVING
         STC   3,REMOVE2+1
         STC   3,REMOVE3+1
REMOVE1  MVC   IDUMY(0),0(2)        IDUMY =TAB(ISEC)
REMOVE2  XC    IDUMY(0),0(4)        IDUMY = XOR(IDUMY,TAB(NSIG)
REMOVE3  NC    0(0,2),IDUMY         TAB(ISEC) =AND(TAB(ISEC),IDUMY)
         LM    14,4,12(13)          RETURN
         MVI   12(13),X'FF'
         BCR   15,14
```

```
*   THIS ROUTINE FINDS THE TYPE OF,THE STARTING WORD FOR,AND THE NUMBER
*   OF GATES IN EACH GROUP IN THE JIYP,ISTRI, AND MONFX1 ARRAYS
*   RESPECTIVELY.SETS NGROP = NUMBER OF DIFFERENT GROUPS.THIS ROUTINE
*   ALSO SETS POWER PARALLEL FLAGS ON GATES WITH LIKE SIGNALS
         DROP  1,14
         USING *,15
SETSTR   STM   14,12,12(13)
         USING BLKB,8
         L     8,ABTBB+4                FIND TYPE OF,STARTING WORD FOR, AND
         USING BLKTAB,1                 NUMBER IN EACH GROUP
         L     1,ABTBB
         LA    3,0(0,0)                 JTYP,ISTRT,AND NONFX1 INDEX
         L     2,NCON
         SLL   2,2                      4(NCON)
         LR    5,3                      OLD SECTION AND TYPE
         LR    6,3
SETSTR1  LH    0,IGATE1(2)              SECTION AND TYPE
         CR    0,5                      COMPARE PREVIOUS
         BC    8,SETSTR2
         LR    5,0                      REPLACE OF SECTION FOR UPEI
         STH   6,JTYP(3)                ZERO JTYP(2)
         STC   0,JTYP+1(3)              TYPE FOR I'TH GROUP
         LR    4,2                      COMPUTE STARTING WORD
         SRL   4,2
         LA    4,1(0,4)
         STH   4,ISTRT(3)               STORE I'TH STARTING WORD
         SH    4,ISTRT-2(3)             COMPUTE NUMBER IN PREVIOUS GROUP
         STH   4,NONFX1-2(3)
         LTR   0,0                      TEST FOR END
         BC    8,SETSTR3                BRANCH IF END
         LA    3,2(0,3)                 SET UP INDEX FOR NEXT GROUP
SETSTR2  LA    2,4(0,2)                 INDEX FOR NEXT GATE
         BC    15,SETSTR1               LOOK AT NEXT GATE
SETSTP3  STH   6,NONFX1(3)              MARK END OF NONFX1 TABLE
         SRL   3,1
         ST    3,NGROP                  NUMBER OF GRCUPS
         LA    11,TAB                   FIND AND SET THE PROPER BIT POSITION
         L     2,NBYTE                  FOR POWER PARALLEL
         BCTR  2,0                      NBYTH-1
         LA    7,IGATE1
         L     6,NCON
         S     6,TWO                    NCON-2
         SLL   6,2                      4(NCON-2)
         AR    7,6                      ADR(IGATE1)+4(NCON-2)
         TS    IFLAG                    SET INDICATER TO ALL ONES
         LA    6,4(0,0)                 INCREMENTING REGISTER
         LA    3,0(0,0)                 INDEX ON GROUP   (I)
SETSTR4  LH    5,NONFX1(3)              LOOP ON GROUP
         LTR   5,5                      TEST IF THROUGH
         BC    8,SETSTR9                RETURN IF ZERO
         LA    3,2(0,3)                 INCREMENT GROUP REGISTER
         LR    4,7                      ADR(IGATE1)+4(NCON-2)(OUTER LOOP REG
         LA    4,8(0,4)                 ADR(IGATE1)+4(NCON-2)+8
         SLL   5,2                      4(NONFIX(I))
         AR    7,5                      ADR(IGATE1(+4(NCON-2)
SETSTR5  TM    2(4),X'C0'               TEST IF ODD-BALL OR PARALLEL FLAGGED
         BC    7,SETSTR8                SKIP TO NEXT GATE IF YES,START OF
         LH    12,2(0,4)                SET UP REGISTER TO PCINT TO FIRST
         BCTR  12,0                     GATE
         SLL   12,7
         AR    12,11                    POSITION OF FIRST GATE
         LR    5,4                     OUTER LOOP. START INNER LOOP WITH
SETSTR6  TM    6(5),X'C0'               NEXT GATE.
         BC    7,SETSTR7                TEST IF ODD-BALL OR PARALLEL FLAGGED
         LH    14,6(0,5)                SET UP REGISTER TO PCINT TO SECOND
         BCTR  14,0                     GATE
         SLL   14,7
         AR    14,11                    POSITION OF SECOND GATE
         EX    2,INST2                  COMPARE SIGNALS CN GATES
         BC    7,SETSTR7                BRANCH ON NOT EQUAL
         MVI   IFLAG,X'00'              SET INDICATER TO ZERO
         OI    6(5),X'40'               SET PARALLEL FLAG CN SECOND GATE
```

```
SETSTR7  BXLE   5,6,SETSTR6            LOOP TO GET NEXT SECOND GATE
         TS     IFLAG                  TEST IF INDICATER WAS ZEROD
         BC     7,SETSTR8              BRANCH IF NOT ZEROD
         OI     2(4),X'4C'             SET PARALLEL FLAG ON FIRST GATE
SETSTR8  BXLE   4,6,SETSTR5            LOOP TO GET NEXT FIRST GATE
         BC     15,SETSTR4             BRANCH TO GET NEXT GROUP
SETSTR9  LM     14,12,12(13)           RETURN
         MVI    12(13),X'FF'
         BCR    15,14
*    1STOSIG' ACCEPTS A POINTER FOR IGATE1 AND A LIST OF SIGNAL NUMBERS
*FOR A GATE.  TH5 IGATE1 WORD IS PACKED WITH SECTION #, TYPE # AND GATE
*#.  THE SIGNAL #'S ARE CONVERTED TO 1-BITS IN A TAB STRING.
         DROP   1,8
         USING  *,15
STOSIG   STM    1,8,24(13)
         USING  BLKTAB,2
         L      2,ABTBB
         USING  BLKB,3
         L      3,ABTBB+4
         L      4,IPOS                 SET UP TO PACK IGATE1(IPOS)
         BCTR   4,0                    *
         LR     1,4                    *
         SLL    4,2                    *
         LA     4,0(4,2)               *
         MVC    0(1,4),ISEC+3          PACK SECTION # IN HO BYTE
         MVC    1(1,4),ITYPE+3         PACK TYPE # IN NEXT BYTE
         MVC    2(2,4),IGATE+2         PACK GATE # IN LO HALFWORD
         LA     8,M1TAB                SET UP TO SET 1-BITS IN TAB STRING
         SLL    1,7                    *
         LA     4,TAB                  *
         LA     1,0(1,4)               *
         DROP   2                      *
         L      2,NSIG                 *SET UP FOR BXH LOOP
         BCTR   2,0                    **
         SLL    2,2                    **
         L      5,NEG4                 **
STOSIG1  LR     4,1                    CONVERT SIGNAL NUMBERS TO 1-BITS
         L      6,ISIG(2)              *
         BCTR   6,0                    *
         SRDL   6,3                    *
         LA     4,0(4,6)               *
         LA     6,0(0,0)               *
         SLDL   6,3                    *
         LA     6,0(6,8)               *
         OC     0(1,4),0(6)            *
         BXH    2,5,STOSIG1            *
         LM     1,8,24(13)             RETURN SEQ
         MVI    12(13),X'FF'           *
         BCR    15,14                  *
INST2    CLC    0(0,12),0(14)
         DS     0F
MASK     DC     X'00003FFF'
M1TAB    DC     X'8040201008040201'
NEG4     DC     F'-4'
ONE      DC     F'1'
TWO      DC     F'2'
SAVE     DS     18F
CTABLE   DC     X'00010102010202030102020302030304'
         DC     X'01020203020303040203030403040405'
         DC     X'01020203020303040203030403040405'
         DC     X'02030304030404050304040504050506'
         DC     X'01020203020303040203030403040405'
         DC     X'02030304030404050304040504050506'
         DC     X'02030304030404050304040504050506'
         DC     X'03040405040505060405050605060607'
         DC     X'01020203020303040203030403040405'
         DC     X'02030304030404050304040504050506'
         DC     X'02030304030404050304040504050506'
         DC     X'03040405040505060405050605060607'
         DC     X'02030304030404050304040504050506'
         DC     X'03040405040505060405050605060607'
         DC     X'03040405040505060405050605060607'
```

```
         DC      X'04050506050606070506060706070708'
ABTBB    DC      V(BLKTAB,BLKB)
BLKTAB   DSECT
IGATE1   DS      1004F
TAB      DS      1004CL128
BLKB     DSECT
NSIG     DS      F
ISEC     DS      F
IPOS     DS      F
ITYPE    DS      F
IFLAG    DS      F
IGATE    DS      F
IXPAND   DS      F
NBYTF    DS      F
NWORD    DS      F
IDUMY    DS      CL128
JTYP     DS      200H
NONFX1   DS      200H
ISTRT    DS      200H
NGATE    DS      F
NGROP    DS      F
NCON     DS      F
ISIG     DS      200F
         END
```

PACKAGE PLACEMENT

Figure 5:
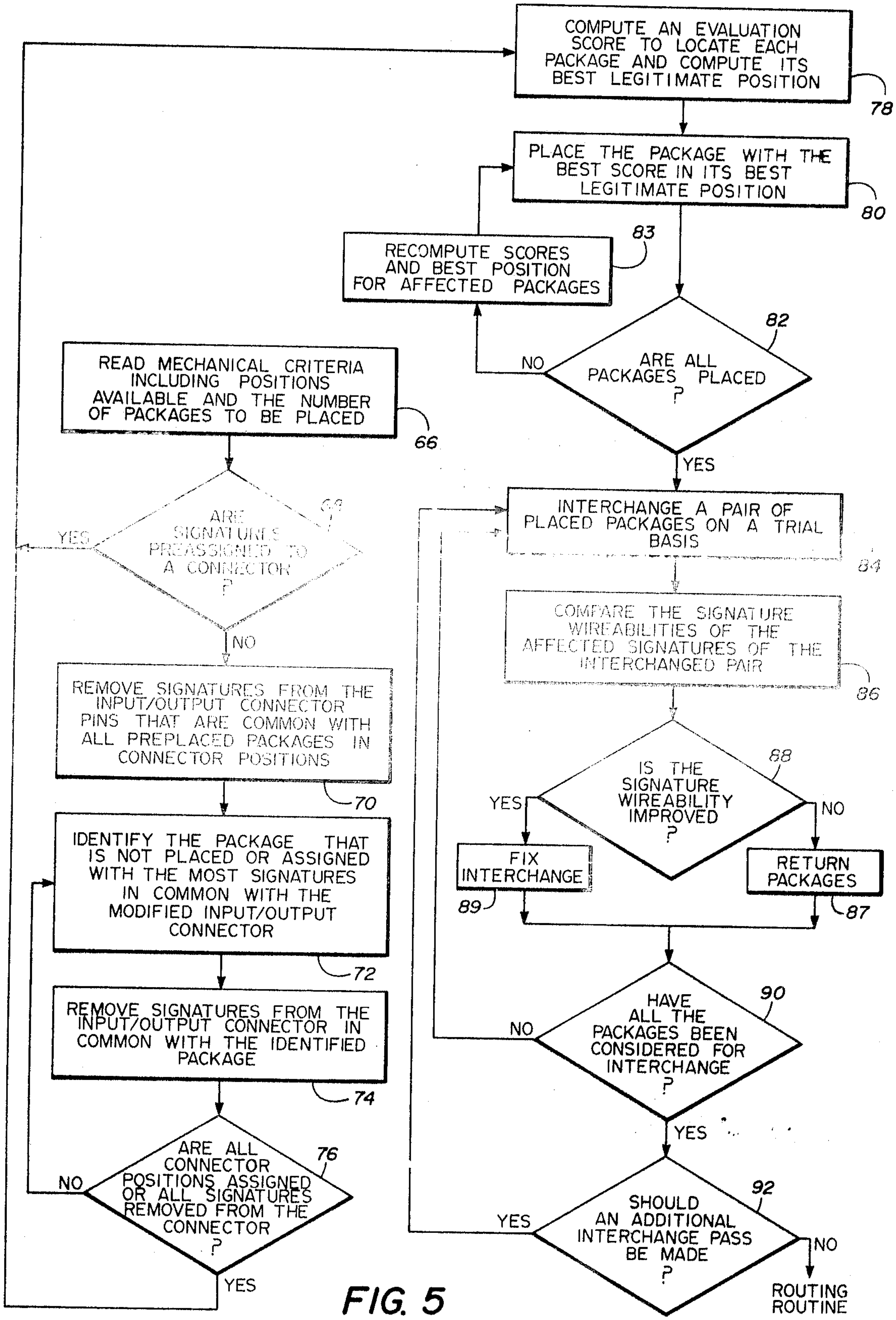
FIG. 5 is a flow chart of a routine run by a data processing machine for placing multielement packages on a printed circuit board within mechanical criteria.

Upon completion of the packaging routine, the routine for formulating a representation of the placement of the packages on a printed circuit board is run. Referring to FIG. 5, there is shown a flow diagram of the steps for formulating a representation of the placement of the packages formed in the packing routine and prepackaged elements onto a printed circuit board. First, at step 66, input data is read into the routine. Input data to the placing routine includes a coded logic diagram description of inter-element and input/output connector interconnections, coordinates of possible package positions on the printed circuit board, information describing which elements are packaged together (from the packaging routine and prepackaged input data) and the number of positions to be considered "connector positions." Input information to the placement routine also includes the number of packages to be placed. Placement input information is obtained from three sources, the direct access record produced by the third check subroutine, the output of the packaging routine, and the printed circuit board geometry as stored by step 24, referring to FIG. 3.

After reading all the required input data, an inquiry 68 is made to determine if any of the signatures of the logic system have been preassigned to an input/output connector. If the answer to this inquiry is "yes," then the first three steps are omitted and the routine proceeds to the fourth step. If the inquiry 68 results in a "no" answer, the next step in the package placement routine is a signature removing step 70 which removes signatures from the input/output connector that are common with all preplaced packages in connector positions. When a signature is removed from an input/output connector, it is no longer considered to be occurring on the connector for placement purposes. The result of this signature removal step is to produce a modified connector, which by definition is a connector with only part of the original connector signatures still appearing thereon.

Using the modified connector representation, step 72 identifies the multielement package still to be placed with the most signatures in common with the modified connector. Note that this package is merely identified or flagged at this time as a package having signatures in common with the connector. These packages are identified such that in the actual placement routine, they may be placed in a "connector position." A "connector position" is defined as one physically located within a preestablished number of rows from the actual connector location. Connector location is part of the input data supplied to the placement routine. After identifying the package with the most signatures in common with the modified input/output connector, a signature-removing step 74 removes the signatures of the identified package that are in common with the input/output connector. This results in a further modified connector with fewer signatures to be considered.

The purpose of identifying packages with connector locations is to minimize the length of the interconnections to input/output connector. Once a package has been identified to be placed in a connector location, the connector signatures on this package become available at the package instead of the connector. Thus, interconnecting lines can be made to the package instead of extending to the input/output connector. For this reason, the signatures in common with the identified package and the connector are removed from the connector.

After removal, an inquiry 76 is made to determine if all the signatures have been removed from the input/output connector or all the connector positions assigned. If the answer to this inquiry is in the negative, the routine returns to the step 72 to identify a package still to be placed, not previously identified, which has the most signatures in common with the last modification of the input/output connector. Again, signatures in common with the identified package and the connector are removed from the connector to produce another modified connector. Inquiry 76 is again made to determine if the connector still contains signatures or connector positions are available. Steps 72 and 74 are continually repeated until the answer to inquiry 76 is "yes."

A "yes" answer from inquiry 76 advances the placement routine to step 78 which is the first step in the actual formation of a representation of the placement of a package in a board location. At step 78, a score is computed for each package to be placed for its best legitimate position (to be defined). This score is for the purpose of determining the order in which the packages are to be considered for placement. The score is computed for all the packages, including those identified previously as connector position packages. It is calculated in accordance with the expression: The number of elements in previously located packages to which the elements of the package under consideration are connected, divided by the total number of elements in the complete logic system to which the package under consideration is connected. Thus, the score for any one package may change as other packages are placed.

After a score has been computed for each package to be located, a placing step 80 assigns the package with the best score in the best legitimate position for that package. A "legitimate position" is defined as a position for the package under consideration that is available for placement and is not already occupied by a package previously placed. To be a legitimate position, the position cannot have an identity different from the identity of the package being placed. For example, if a package is identified as a connector position package, then a connector position is the only legitimate position for that package. The "best" legitimate position for a package is that legitimate position which yields the minimum value for the sum of the signature wireabilities for those signatures which occur on the package. Thus, to assign a package to a position, it must be a legitimate position for that package and it must be the best legitimate position.

If two packages have an equal score for being placed next, then the package with the smallest minimum signature wireability will be placed first. Signature wireability is defined as the semi-perimeter of the smallest rectangle which encloses the pins at which this signature occurs. This value is initially computed in step 78 for computation of the evaluating score for locating each package.

After formulating a representation of the placement of the package with the best score in its best legitimate position, an inquiry 82 is made to determine if all the packages have representatively been placed. A negative answer to this inquiry causes the routine to advance to step 83 to recompute the evaluating score and signature wireability for those packages affected by the formulation of a representation of the placement of a package in step 80. Using the recomputed scores and the original scores, the routine returns to step 80 to formulate a representation of the placement of the package with the best score in its best legitimate position. Again, the inquiry 82 will be made to determine if additional packages are to be placed. Steps 80 and 83 will be repeated until the inquiry 82 produces a "yes" answer indicating that all packages have been assigned a position.

Formulating a representation of the placement of all the packages, however, does not complete the placement routine. Phase two of the placement routine is now run. Phase two is concerned with improving the initial placement implemented by steps 78, 80 and 83. Starting at a pre-established position on the printed circuit board and proceeding in a predetermined pattern, the the representation of the placed packages previously formulated are interchanged on a pair-wise basis. Interchange step 84 considers the first pair of packages and interchanges them on a trial basis. After the interchange, the sum of the signature wireabilities of the effected signatures on each of the two packages that have been interchanged is computed. Also, the sum of the signature wireabilities of the effected signatures prior to the trial interchange for each of the two packages as previously computed is recalled. Using the computed values and the recalled value of signature wireabilities, a comparing step 86 compares the sum of the signature wireabilities of the pair in the exchange position and of the pair in the original position. An inquiry 88 is then made to determine if the sum of the signature wireabilities in the exchanged position is less than the sum of the signature wireabilities in the original position. A positive response to this inquiry indicates an improvement has been made in the interconnection pattern and the routine advances to step 89. Step 89 fixes the interchange and a representation of the new position for the two effected packages is generated. A negative response to inquiry 88 will result if the sum of the signature wireabilities in the original position for the packages being considered is less than or equal to the sum of the signature wireabilities in the exchanged position. A "no" response to the inquiry 88 advances the routine to step 87 which returns the package representations to their original position and the trial exchange is ignored.

After either step 87 or 89, an inquiry is made into whether all the package representations have been considered for interchange. A negative answer to this inquiry causes the placement routine to return to step 84 and interchange the next pair of placed package representations on a trial basis. Signature wireabilities for the exchanged pair both before and after the exchange will be compared to determine if an improvement in the signature wireability results. The interchange phase (phase two) of the placement routine generally results in shorter interconnections between terminal pins.

Steps 84, 86 and inquiry 88 are repeated so long as the inquiry 90 produces a negative answer. When inquiry 90 produces a "yes" answer, an inquiry 92 is made to determine if additional interchange passes should be made. Additional interchange passes will be attempted if the total improvement from the previous pass was greater than 1 percent of the total wireability. Otherwise, placement is considered completed and the resulting package positions are coded and the program stops. Total signature wireability is defined as the sum of all the signature wireabilities of all the packages in the logic system.

In the representative placement and interchange of the packages, no distinction is made between a package identified as a connector location package and other packages. That is, except that the only legitimate positions for the packages identified for a connector location are those positions which have been designated by input data as connector positions. Likewise, the connector positions are not legitimate positions for packages not identified in step 72.

Referring again to step 66, this and all subsequent steps in the placement routine may be run on an IBM 360 Computer, to generate a direct access record containing coded information identifying each package with a printed circuit board location. A program listing of instructions for the steps of the placement routine is given in the Program Listing II. In the Program Listing II, instructions are again listed with identifier numbers corresponding to those assigned to the steps of the Flow Chart of FIG. 5. The general instructions performed in step 66 are followed by a subroutine "FSTROW" which is called by step 66 when required. The next listing are the instructions for the inquiry 68 followed by instructions performed in step 70 if the answer to inquiry 68 is "no." Further instructions correspond to steps 70, 72, 74, and 76, followed by a subroutine "SETCON" and subroutine "REMOVE." Subroutine "PSIG" is called during completion of steps 78 and 83; subroutine "COMPAR" and subroutine "BEST" are followed by subroutines "CGATP," "PLACE," "MSGT," "-WIRE," "INPCH," "SETGMS," "REPLAC" and "GO" which concludes Program Listing II.

PROGRAM LISTING II (66)

```
 INTEGER*2IGATE,JSIGN
 COMMON/BLK2/IXCOL(50),IYROW(50),IGATE(2,6000),JSIGN(2,6000),
1IGTET(400),IGT(400),IGPOS(400),IPTYP(400),LOCY(400),LOCX(400),ISIG
2ET(1024),IEXTRA(7344)
 COMMON/BLK1/IHEAD(20) ,IOPT(30)
 COMMON/BLK4/NG,NFG,NSIG,NCON,NSCN,NPIN,NPOSC,NPINT,NROW,NCOL,
1NAL,NFRS,NFRP,NCS1,NCS
 CCMMON/BLK5/NCSA,NFRP1,NCSA1,IDGAT(300)
```

```
      CALL BCI(4,IBLNK,'     ')
      REWIND 11
      READ(5,100)(IOPT(I),I=1,30)
      IF(IOPT(1).EQ.1)WRITE(6,200)(IOPT(I),I=1,30)
      READ(5,101)(IHEAD(I),I=1,20)
      WRITE(6,201)(IHEAD(I),I=1,20)
      READ(5,108)NROW,(IYROW(I),I=1,NROW)
      IF(IOPT(1).EQ.1)WRITE(6,208)NROW,(IYROW(I),I=1,NROW)
      READ(5,108)NCOL,(IXCOL(I),I=1,NCOL)
      IF(IOPT(1).EQ.1)WRITE(6,208)NCOL,(IXCOL(I),I=1,NCOL)
      NCSA= 0
      L=0
      I=0
      READ(11)N,NPIN,NGATE,NSIG,NSCN,NTYP,NMAP
      IF(IOPT(1).EQ.1)WRITE(6,202)N,NPIN,NGATE,NSIG,NSCN,NTYP,NMAP
      N=NTYP+NMAP
      DO 5 K=1,N
      READ(11,101)(ISIGET(J),J=1,20)
      IF(IOPT(1).NE.0)WRITE(6,201)(ISIGET(J),J=1,20)
    5 CONTINUE
      DO 20 K=1,NPIN
      READ(11)N,(ISIGET(J),J=1,N)
      IF(IOPT(1).EQ.1)WRITE(6,203)N,(ISIGET(J),J=1,N)
      IF(ISIGET(16).LT.7)GO TO 20
      IF(ISIGET(17).EQ.0)GO TO 10
      IF(ISIGET(13).EQ.0)CALL ERROR(101)
      I=I+1
      ISC=NSCN+ISIGET(13)
      IGATE(1,I)=ISC
      IGATE(2,I)=ISIGET(16)-6
      JSIGN(1,I)=1
      IF(ISIGET(3) .EQ. IBLNK)GO TO 9
      JSIGN(1,I) = -1
      NCSA= NCSA + 1
    9 JSIGN(2,I) = ISIGET(13)
      L=L+1
      GO TO 19
   10 I=I+1
      IGATE(1,I)=ISIGET(11)
      IGATE(2,I)=ISIGET(16)-6
      JSIGN(1,I)=ISIGET(12)+1
      IF(ISIGET(13).GT.NCOL.OR.JSIGN(1,I).GT.NROW)CALL ERROR(103)
      JSIGN(2,I)=ISIGET(13)
   19 IF(IOPT(1 ).EQ.1)WRITE(6,202)IGATE(1,I),IGATE(2,I),JSIGN(1,I),JSIG
     1N(2,I)
   20 CONTINUE
      NSIG=NSIG-6
      NCON=L
      NPIN=I-L
      NPINT=I
      IF(NPIN.EQ.NPINT) CALL ERROR(102)
      CALL SETCON
      CALL FSTROW
      CALL ISORT(NPINT,JSIGN)
      L=1
      K=1
      ISIGET(1)=1
      DO 35 J=1,NPINT
      IF(JSIGN(1,J).EQ.JSIGN(1,L))GO TO 35
      K=K+1
      ISIGET(K)=J
      L=J
   35 CONTINUE
      IF(NSIG.NE.K)CALL ERROR(106)
      K=K+1
      ISIGET(K)=NPINT+1
      IB=1
      DO 47 K=1,NSIG
      IE=ISIGET(K+1)-1
      L=0
      DO 37 J=IB,IE
      JSIGN(1,J)=0
```

```
      KK=JSIGN(2,J)
      JSIGN(2,J)=IGATE(2,J)
      IGATE(2,J)=KK
      IF(IGPOS(KK).NE.0)L=1
   37 CONTINUE
      IF(L.NE.0)ISIGET(K)=-ISIGET(K)
   47 IB=IE+1
      IF(IOPT(6).EQ.1)WRITE(6,209)(JSIGN(2,I),I=1,NPINT)
      N=NSIG+1
      IF(IOPT(5).EQ.1)WRITE(6,211)(I,ISIGET(I),I=1,N)
      IF(IOPT(8).EQ.1)WRITE(6,209)(IGATE(2,I),I=1,NPINT)
      CALL GO
      REWIND 10
      REWIND 11
      STOP
  100 FORMAT(80I1)
  101 FORMAT(20A4)
  108 FORMAT(16I5)
  200 FORMAT(1H1,9X,80I1)
  201 FORMAT(10X,20A4)
  202 FORMAT(20I5)
  203 FORMAT(I10,2X,2A4,2X,A4,2X,3A4,I5,2X,3A4,  10I5)
  208 FORMAT(10X,16I5)
  209 FCRMAT(10X,20I5)
  211 FORMAT(2I10)
      END
```

---

(66)

```
      SUBROUTINE FSTROW
      COMMON/BLK2/IXCOL(50),IYROW(50),IGATE(  6000),JSIGN(  6000),
     1IGTET(400),IGT(400),IGPOS(400),IPTYP(400),LOCY(400),LOCX(400),ISIG
     2ET(1024),IR(1000),IC(1000),IEXTRA(5344)
      COMMON/BLK1/IHEAD(20) ,IOPT(30)
      COMMON/BLK4/NG,NFG,NSIG,NCON,NSCN,NPIN,NPOSC,NPINT,NROW,NCOL,
     1NAL,NFRS,NFRP,NCS1,NCS
      COMMON/BLK5/NCSA,NFRP1,NCSA1,IDGAT(300)
C
C     NFRP1 COUNTS THE NUMBER OF FLAGGED FIRST RCW SCN WHICH
C     HAVE ASSIGNED SIGNALS
C
      NFRP=0
      NFRP1 = 0
      READ(5,100) NAL,NFRS
      IF(IOPT(1).NE.0)WRITE(6,100)NAL,NFRS
      READ(5,100)(IR(I),IC(I),I=1,NAL)
      IF(IOPT(1).NE.0)WRITE(6,100)(IR(I),IC(I),I=1,NAL)
      N=NSCN-NFG+NPOSC
      NALS=NAL-N+1
      IF(NALS.LE.0) CALL ERRCR(112)
      CALL ISORT(N,IR(NALS),IC(NALS))
      K=NFG
      DO 10 I=NALS,NAL
      L=IR(I)+1
      M=IC(I)
      IF(IR(I).LE.NFRS)NFRP=NFRP+1
      K=K+1
      IPTYP(K) = 2
      LOCX(K)=IXCOL(M)
   10 LOCY(K)=IYROW(L)
      DO 12 I=1,NSCN
      IF(IGPOS(I).EQ.0)IGT(I)=2
   12 CONTINUE
      IF(NFRS.EQ.0)GC TC 45
```

---

(68)

```
      NN = NSCN + 1
```

---

(70)

```
   15 IB1 = IABS(IGTET(NN))
      IE1=IGTET(NG+1)
      NCS1=IE1-IB1
```

```
      IE1=IE1-1
      IF(NCS1.EQ.0) CALL ERROR(107)
      NCS=NCS1
      NCSA1 = NCSA
      IF(NFG .EQ. NPOSC)GO TO 23
      MM=IYROW(NFRS+1)
      DO 20 I=1,NSCN
      IF(IGPOS(I).EQ.0) GO TO 20
      K=IGPOS(I)
      IF(LOCY(K).GT.MM)GO TO 20
      CALL REMOVE(I,IB1,IE1,K,NAS)
----------------------------------------------------------------------
                                                                  (76)
      NCS = NCS - K
      NCSA = NCSA - NAS
      IF(NCS .EQ. 0)GO TO 33
----------------------------------------------------------------------
                                                                  (70)
      DO 18 KL=IB1,IE1
      IF(IGATE(KL).LT.0)IGATE(KL)=0
   18 CONTINUE
   20 CONTINUE
----------------------------------------------------------------------
                                                                  (72)
   23 IF(NFRP.EQ.0) GO TO 33
      IB=NFG+1
      IE=NFRP+NFG
      DO 30 J=IB,IE
      NCS2=0
      NAS1 = 0
      DO 25 I=1,NSCN
      IF(IGPOS(I).NE.0)GO TO 25
      CALL REMOVE(I,IB1,IE1,K,NAS)
      IF(NAS .LT. NAS1)GO TO 22
      IF(NAS .GT. NAS1)GO TO 21
      IF(K.LE.NCS2) GO TO 22
   21 NCS2 = K
      NAS1 = NAS
      MM=I
 22   DO 24 KL =IB1,IE1
  24  IGATE(KL) = IABS(IGATE(KL))
   25 CONTINUE
      IF(NCS2.EQ.0)CALL ERROR(108)
      IF(NAS1 .NE. 0)GO TO 26
      IGT(MM) = 1
      GO TO 27
   26 IGT(MM) = -1
      NFRP1 = NFRP1 + 1
   27 IPTYP(J) = 1
----------------------------------------------------------------------
                                                                  (76)
      NCS=NCS-NCS2
      NCSA = NCSA - NAS1
      IF(NCS.EQ.0)GO TO 33
----------------------------------------------------------------------
                                                                  (74)
      CALL REMOVE(MM,IB1,IE1,K,NAS)
      DO 28 KL=IB1,IE1
      IF(IGATE(KL).LT.0)IGATE(KL)=0
   28 CONTINUE
   30 CONTINUE
   33 WRITE(6,102)NCS1,NCS
      WRITE(6,103)NCSA1,NCSA
      IF(NG .NE. NSCN + NPOSC)CALL ERROR(109)
C
C     MOVE CONNECTOR SIGNALS STORED IN IOGAT TABLE INTO IGATE TABLE
C
      DO 35 KL=IB1,IE1
      MI=KL - NPIN
   35 IGATE(KL) = IABS(IOGAT(MI))
   45 IF(IOPT(9).EQ.1)WRITE(6,200)NG,NFG,NSIG,NCON,NSCN,NPIN,NPOSC,NPINT
     1,NFRP,NAL,NFRS,NCS1,NCS,NFRP1
```

```
      IF(IOPT(7).EQ.0)RETURN
      N=NG+1
      WRITE(6,201)(I,IGTET(I),IGPOS(I),IGT(I),LOCX(I),LOCY(I),IPTYP(I),
     1I=1,N)
      RETURN
  100 FORMAT(16I5)
  102 FORMAT(8H1OF THE ,I5,17H CONNECTOR SIGNAL,I5,30H DO NOT OCCUR ON T
     1HE FIRST ROW)
  103 FORMAT(8H0OF THE ,I5,26H ASSIGNED CONNECTOR SIGNAL,I5,30H DO NOT O
     1CCUR ON THE FIRST ROW)
  200 FORMAT(10X,20I5)
  201 FORMAT(7I10)
      END
```

---

(66)

```
      SUBROUTINE SETCON
      INTEGER*2IGATE,JSIGN
      COMMON/BLK5/NCSA,NFRP1,NCSA1,IDGAT(300)
      COMMON/BLK2/IXCOL(50),IYROW(50),IGATE(2,6000),JSIGN(2,6000),
     1IGTET(400),IGT(400),IGPOS(400),IPTYP(400),LOCY(400),LOCX(400),ISIG
     2ET(1024),IEXTRA(7344)
      COMMON/BLK1/IHEAD(20) ,IOPT(30)
      COMMON/BLK4/NG,NFG,NSIG,NCON,NSCN,NPIN,NPOSC,NPINT,NROW,NCOL,
     1NAL,NFRS,NFRP,NCS1,NCS
      DO 3 J=1,NSCN
    3 IGPOS(J)=0
      CALL ISORT(NPINT,IGATE,JSIGN)
      I=NSCN+1
      N=0
      J=NPIN+1
    5 LAST = IGATE(1,J)
      DO 10 K=J,NPINT
      IF(IGATE(1,K).NE.LAST      )GO TO 11
      IGATE(1,K)=I
   10 CONTINUE
      K=NPINT+1
   11 N=N+1
      IGT(I)=0
      IPTYP(N)=0
      IGPOS(I)=N
      KK=JSIGN(2,J)
      LOCX(N)=-IXCOL(KK)
      LOCY(N)=IYROW(1)
      IF(K.GT.NPINT)GO TO 15
      J=K
      I=I+1
      GO TO 5
   15 NG=I
      NPOSC=N
      DO 20 J=1,NPIN
      JJ=IGATE(1,J)
      KK=JSIGN(2,J)
      IF(KK.EQ.0)GO TO 20
      IF(IGPOS(JJ).NE.0)GO TO 20
      N=N+1
      IGT(JJ)=0
      IGPOS(JJ)=N
      IPTYP(N)=0
      LOCX(N)=-IXCOL(KK)
      KK=JSIGN(1,J)
      LOCY(N)=IYROW(KK)
   20 CONTINUE
      NFG=N
      IGTET(1)=1
      IF(IGPOS(1).NE.0)IGTET(1)=-1
      M=0
      K=1
      L=1
      DO 25 J=2,NPINT
      IF(IGATE(1,J).NE.IGATE(1,L))GO TO 24
      IF(IGATE(2,J).EQ.IGATE(2,L))GO TO 35
```

```
23 L=L+1
   IGATE(1,L)=IGATE(1,J)
   JSIGN(1,L) = JSIGN(1,J)
   IGATE(2,L)=IGATE(2,J)
   JSIGN(2,L) = JSIGN(2,J)
   GO TO 25
24 K=K+1
   IGTET(K)=L+1
   IF(K.EQ.NSCN+1)M=L
   IF(IGPOS(K).NE.0)IGTET(K)=-IGTET(K)
   GO TO 23
35 IF(K.LE.NSCN)GO TC 25
   IF(JSIGN(1,J).GT.C)GO TO 25
   JSIGN(1,L) = -1
25 CONTINUE
   IF(M.EQ.0)CALL ERROR(104)
   NPIN=M
   IF(K.NE.NG)CALL ERROR(105)
   NPINT=L
   K=K+1
   IGTET(K)=L+1
C     SET UP IDGAT TABLE TO INDICATE ASSIGNED SIGNALS
   DO 29 M=1,NCON
   K=M + NPIN
   IDGAT(M)= IGATE(2,K)
   IF(JSIGN(1,K) .LT. 0)IDGAT(M)= -IDGAT(M)
29 CONTINUE
   DO 30 J=1,NPINT
   JSIGN(1,J)=IGATE(2,J)
   JSIGN(2,J)=IGATE(1,J)
30 IGATE(1,J)=0
   IF(IOPT(2).EQ.1)WRITE(6,209)NG,NFG,NSIG,NCON,NSCN,NPIN,NPOSC,NPINT
   IF(IOPT(3).EQ.0)GC TO 40
   N=NG+1
   WRITE(6,210)(I,IGTET(I),IGPOS(I),IGT(I),LOCX(I),LOCY(I),IPTYP(I),
  1I=1,N)
40 IF(IOPT(4).EQ.1)WRITE(6,209)(IGATE(2,I),I=1,NPINT)
   RETURN
209 FORMAT(10X,20I5)
210 FORMAT(7I10)
   END
```

---

```
   SUBROUTINE OUTAPE
   COMMON/BLK4/NG,NFG,NSIG,NCON,NSCN,NPIN,NPOSC,NPINT,NROW,NCOL,
  1NAL,NFRS,NFRP,NCS1,NCS
   COMMON/BLK1/IHEAD(20) ,IOPT(30)
   COMMON/BLK2/IXCOL(50),IYROW(50),IGATE(6000),JSIGN(6000),
  1IGTET(400),IGT(400),IGPOS(400),IPTYP(400),LOCY(400),LOCX(400),
  2ISIGET(1024),IXMEAS(1024),IYMEAS(1024),ISX(1024),ILX(1024),
  3ISY(1024),ILY(1024),IRATIO(400),ISP(400),IBPOS(400)
   REWIND 11
   REWIND 10
   READ(11)N,(ISP(I),I=1,N)
   WRITE(10)N,(ISP(I),I=1,N)
   IF(IOPT(15).NE.0)WRITE(6,100)N,(ISP(I),I=1,N)
   NJ=ISP(5)+ISP(6)
   NPIN=ISP(1)
   CIN = ISP(5)
   JJ = 0
   DO 5 J=1,NJ
   READ(11,102)(ISP(I),I=1,20)
   WRITE(10,102)(ISP(I),I=1,20)
   JJ = JJ + 1
   IF( J .EQ. CIN + 1 ) JJ=1
   IF(IOPT(15) .NE. C) WRITE(6,103) JJ, (ISP(I),I=1,20)
 5 CONTINUE
   DO 20 J=1,NPIN
   READ(11)N,(ISP(I),I=1,N)
   IF(ISP(17).NE.0)GO TO 19
   K=ISP(11)
```

```
      K=IGPOS(K)
      DO 10 I=1,NROW
      IF(IYROW(I).NE.LOCY(K))GO TO 10
      ISP(12)=I-1
      GO TO 12
   10 CONTINUE
      CALL ERROR(110)
   12 DO 15 I=1,NCOL
      IF(IXCOL(I).NE.LOCX(K))GO TO 15
      ISP(13)=I
      GO TO 19
   15 CONTINUE
      CALL ERROR(111)
   19 WRITE(10)N,(ISP(I),I=1,N)
      IF(IOPT(15).NE.0)WRITE(6,101)J,N,(ISP(I),I=1,N)
   20 CONTINUE
      RETURN
  100 FORMAT(20I5)
  101 FORMAT(' (',I6,')',I5,2X,2A4,2X,A4,2X,3A4,I5,2X,3A4,11I5)
  102 FORMAT(20A4)
  103 FORMAT(10X,'(',I4,')', 20A4)
      END
```

---

```
      SUBROUTINE ERROR(J)
      WRITE(6,100)J
  100 FORMAT(25H ERROR***CONDITION NUMBER,I5)
      STOP
      END
```

---

(70)(74)

```
      SUBROUTINE REMOVE(I,IB1,IE1,K,NAS)
      COMMON/BLK5/NCSA,NFRP1,NCSA1,IDGAT(300)
      COMMON/BLK4/NG,NFG,NSIG,NCON,NSCN,NPIN,NPCSC,NPINT,NROW,NCOL,
     1NAL,NFRS,NFRP,NSC1,NCS
      COMMON/BLK2/IXCOL(50),IYROW(50),IGATE(  6000),JSIGN(  6000),
     1IGTET(400),IGT(400),IGPOS(400),IPTYP(400),LOCY(400),LOCX(400),ISIG
     2ET(1024),IR(1000),IC(1000),IEXTRA(5344)
      K=0
      NAS=0
      IB=IABS(IGTET(I))
      IE=IABS(IGTET(I+1))-1
      DO 10 J=IB1,IE1
      IF(IGATE(J).LE.0) GO TO 10
      DO 5 L=IB,IE
      IF(IGATE(J).NE.IGATE(L))GO TO 5
      IGATE(J)=-IGATE(J)
      K=K+1
      LL=J-NPIN
      IF(IDGAT(LL).GT.0)GO TO 10
      NAS=NAS+1
      GO TO 10
    5 CONTINUE
   10 CONTINUE
      RETURN
      END
```

---

(78)(83)

```
      SUBROUTINE PSIG(ISNUM,KFLAG)
      COMMON/BLK1/IHEAD(20) ,IOPT(30)
      COMMON/BLK2/IXCOL(50),IYROW(50),IGATE(6000),JSIGN(6000),
     1IGTET(400),IGT(400),IGPOS(400),IPTYP(400),LOCY(400),LOCX(400),
     2ISIGET(1024),IXMEAS(1024),IYMEAS(1024),ISX(1024),ILX(1024),
     3ISY(1024),ILY(1024),IRATIO(400),ISP(400),IBPOS(400)
      COMMON/BLKA/IDUM1,IDUM2,IDUM3,MEAS,NBL,IP(3),NFG1,IX,IY,IT2,IT3,
     1IOLDP,ITEMP,IEXTRA
      COMMON/BLK3/ITSP,KYL,KYS,KXL,KXS,ITEM(25),ITEM1(25),ITEM2(25),
     1ITEM3(25),ITEM4(25),ITEM5(25)
      COMMON/BLK4/NG,NFG,NSIG,NCON,NSCN,NPIN,NPCSC,NPINT,NROW,NCOL,
```

```
1NAL,NFRS,NFRP,NSC1,NCS
 COMMON/BLK5/NCSA,NFRP1,NCSA1,IDGAT(300)
 IT2=ISNUM
 IT4=IABS(IT2)
 IF(IT2.GT.0) GO TO 10
 IF(ISIGET(IT4).GE.0) GO TO 6
 KXS=ISX(IT4)
 KXL=ILX(IT4)
 KYS=ISY(IT4)
 KYL=ILY(IT4)
 CALL COMPAR
 GO TO 30
6 KXS=IX
 KXL=IX
 KYS=IY
 KYL=IY
 GO TO 30
10 IT2=0
 IE=IABS(ISIGET(IT4+1))-1
 IB=IABS(ISIGET(IT4))
 DO 25 I=IB,IE
 K=IGATE(I)
 IF(KFLAG.NE.0) GO TO 15
 IF(IGTET(K).GE.0) GO TO 25
15 J=IGPOS(K)
 IF(IT2.EQ.0) GO TO 20
 IF(J .GT. NPOSC)GO TO 17
 IX = KXS
 DO 16 KN=1,NCON
 IF(IT4 .EQ. -IDGAT(KN))GO TO 17
16 CONTINUE
 GO TO 18
17 IX = IABS(LOCX(J))
18 IY = LOCY(J)
 CALL COMPAR
 GO TO 25
20 IT2=-1
 IF(J .GT. NPOSC)GO TO 22
 KXS = 999999
 KXL = 0
 DO 21 KN=1,NCON
 IF(IT4 .EQ. -IDGAT(KN))GO TO 22
21 CONTINUE
 GO TO 23
22 KXS=IABS(LOCX(J))
 KXL=IABS(LOCX(J))
23 KYS= LOCY(J)
 KYL=LOCY(J)
25 CONTINUE
 IF(KFLAG.NE.0)RETURN
 IF(IT2.EQ.0) RETURN
30 ISX(IT4)=KXS
 ILX(IT4)=KXL
 ISY(IT4)=KYS
 ILY(IT4)=KYL
 IXMEAS(IT4)=KXL-KXS
 IF(KXS .EQ. 999999)IXMEAS(IT4)=0
 IYMEAS(IT4)=KYL-KYS
 IF(ISIGET(IT4).GT.0)ISIGET(IT4)=-ISIGET(IT4)
 RETURN
 END
```

---

(78)(83)

```
 SUBROUTINE COMPAR
 COMMON/BLK1/IHEAD(20) ,IOPT(30)
 COMMON/BLK2/IXCOL(50),IYROW(50),IGATE(6000),JSIGN(6000),
1IGTET(400),IGT(400),IGPOS(400),IPTYP(400),LOCY(400),LOCX(400),
2ISIGET(1024),IXMEAS(1024),IYMEAS(1024),ISX(1024),ILX(1024),
3ISY(1024),ILY(1024),IRATIO(400),ISP(400),IBPOS(400)
 COMMON/BLKA/IDUM1,IDUM2,IDUM3,MEAS,NBL,IP(3),NFG1,IX,IY,IT2,IT3,
1IOLDP,ITEMP,IEXTRA
```

```
      COMMON/BLK3/ITSP,KYL,KYS,KXL,KXS,ITEM(25),ITEM1(25),ITEM2(25),
     1ITEM3(25),ITEM4(25),ITEM5(25)
      IF(IX-KXS)5,15,10
    5 KXS=IX
   10 IF(IX.LE.KXL)GO TO 15
      KXL=IX
   15 IF(IY-KYS)20,30,25
   20 KYS=IY
      GO TO 30
   25 IF(IY.GT.KYL)KYL=IY
   30 CONTINUE
      RETURN
      END
```

---

(78)

```
      SUBROUTINE BEST
      COMMON/BLK1/IHEAD(20) ,IOPT(30)
      COMMON/BLK2/IXCOL(50),IYROW(50),IGATE(6000),JSIGN(6000),
     1IGTET(400),IGT(400),IGPOS(400),IPTYP(400),LOCY(400),LOCX(400),
     2ISIGET(1024),IXMEAS(1024),IYMEAS(1024),ISX(1024),ILX(1024),
     3ISY(1024),ILY(1024),IRATIO(400),ISP(400),IBPOS(400)
      COMMON/BLK4/NG,NFG,NSIG,NCON,NSCN,NPIN,NPOSC,NPINT,NROW,NCOL,
     1NAL,NFRS,NFRP,NCS1,NCS
      COMMON/BLKA/IDUM1,IDUM2,IDUM3,MEAS,NBL,IP(3),NFG1,IX,IY,IT2,IT3,
     1IOLDP,ITEMP,IEXTRA
      DO 20 I=1,NG
      IF(IGPOS(I).NE.0) GO TO 15
      CALL GGATP(I)
      IF(NBL.EQ.0) GO TO 15
      IF(IP(1).NE.0)GO TO 20
      CALL ERROR(2)
   15 IRATIO(I)=0
      ISP(I)=0
      IBPOS(I)=0
   20 CONTINUE
      RETURN
      END
```

---

(78)(83)

```
      SUBROUTINE GGATP(IGNUM)
      COMMON/BLK1/IHEAD(20) ,IOPT(30)
      COMMON/BLK2/IXCOL(50),IYROW(50),IGATE(6000),JSIGN(6000),
     1IGTET(400),IGT(400),IGPOS(400),IPTYP(400),LOCY(400),LOCX(400),
     2ISIGET(1024),IXMEAS(1024),IYMEAS(1024),ISX(1024),ILX(1024),
     3ISY(1024),ILY(1024),IRATIO(400),ISP(400),IBPOS(400)
      COMMON/BLK4/NG,NFG,NSIG,NCON,NSCN,NPIN,NPOSC,NPINT,NROW,NCOL,
     1NAL,NFRS,NFRP,NCS1,NCS
      COMMON/BLKA/IDUM1,IDUM2,IDUM3,MEAS,NBL,IP(3),NFG1,IX,IY,IT2,IT3,
     1IOLDP,ITEMP,IEXTRA
      COMMON/BLK3/ITSP,KYL,KYS,KXL,KXS,ITEM(25),ITEM1(25),ITEM2(25),
     1ITEM3(25),ITEM4(25),ITEM5(25)
C
C     GIVEN A GATE THE GGATE ROUTINE COMPUTES THE RATIO,SEMIPERIMETER
C     AND BEST POSITION TO PLACE THIS GATE
C
      MEAS=999999
      NBL=0
      IP(1)=0
      IP(2)=0
      IP(3)=0
      ITEMP = IABS(IGT(IGNUM))
      IE=IABS(IGTET(IGNUM+1))-1
      IB=IABS(IGTET(IGNUM))
      IFS=0
      DO 10 I=IB,IE
      J=JSIGN(I)
      IP(1)=IABS(ISIGET(J))
      IE1=IABS(ISIGET(J+1))
C     IP(3)EQUALS TOTAL NO. OF GATES CONNECTED TO THIS GATE
      IP(3)=IP(3)-1-IP(1)+IE1
```

```
      IF(ISIGET(J).GE.0) GO TO 10
      IFS=IFS+1
      IF(IFS.LE.25) GO TO 7
      CALL ERROR(1)
    7 ITEM(IFS)=IXMEAS(J)
      ITEM1(IFS)=IYMEAS(J)
      ITEM2(IFS)=ISX(J)
      ITEM3(IFS)=ILX(J)
      ITEM4(IFS)=ISY(J)
      ITEM5(IFS)=ILY(J)
      IE1=IE1-1
      IB1=IP(1)
      DO 5 K=IB1,IE1
C     IP(2) COUNTS THE NO. OF FIXED GATES CONNECTED TO THIS GATE
      KK=IGATE(K)
      IF(IGTET(KK)       .LT.0)IP(2)=IP(2)+1024
    5 CONTINUE
   10 CONTINUE
      IP(1) =0
      IF(IFS.EQ.0) RETURN
      NBL=IP(2)/IP(3)
      IX=0
      IY=0
      J=NFG+1
      DO 40 I=J,NG
      IF(LOCX(I).LT.0) GO TO 40
C     COMPARE POSITION TYPE WITH GATE TYPE
      IF(IPTYP(I).NE.ITEMP)GO TO 40
      IX=LOCX(I)
      IY=LOCY(I)
      IT3=0
C     THIS LOOP COMPARES OLD AND NEW MEASURES KEEPING THE LARGEST
      DO 30 K=1,IFS
      KXS=IABS(IX-ITEM2(K))
      KXL=IABS(IX-ITEM3(K))
      KYS=IABS(IY-ITEM4(K))
      KYL=IABS(IY-ITEM5(K))
      IF(ITEM2(K).EQ.999999)GO TO 18
      IF(KXS.GE.KXL)GO TO 17
      IF(KXL.GE.ITEM(K)) GO TO 15
      IT2=ITEM(K)
      GO TO 20
   15 IT2=KXL
      GO TO 20
   17 IF(KXS.GE.ITEM(K)) GO TO 19
      IT2=ITEM(K)
      GO TO 20
   19 IT2=KXS
      GO TO 20
   18 IT2 = 0
   20 IF(KYS.GE.KYL)GO TO 27
      IF(KYL.GE.ITEM1(K))GO TO 25
      IT3=IT2+ITEM1(K)+IT3
      GO TO 30
   25 IT3=IT2+KYL+IT3
      GO TO 30
   27 IF(KYS.GE.ITEM1(K)) GO TO 29
      IT3=IT2+ITEM1(K)+IT3
      GO TO 30
   29 IT3=IT2+KYS+IT3
   30 CONTINUE
      IF(IT3.GE.MEAS) GO TO 40
      MEAS=IT3
C     IP(1) IS THE BEST POSITION TO PLACE THIS GATE
      IP(1)=I
   40 CONTINUE
      IF(NBL.EQ.0) RETURN
      IRATIO(IGNUM)=NBL
      ISP(IGNUM)=MEAS
      IBPOS(IGNUM)=IP(1)
      RETURN
      END
```

```
      SUBROUTINE PLACE(JG,KG)
      COMMON/BLK1/IHEAD(20) ,IOPT(30)
      COMMON/BLK2/IXCOL(50),IYROW(50),IGATE(6000),JSIGN(6000),
     1IGTET(400),IGT(400),IGPOS(400),IPTYP(400),LOCY(400),LOCX(400),
     2ISIGET(1024),IXMEAS(1024),IYMEAS(1024),ISX(1024),ILX(1024),
     3ISY(1024),ILY(1024),IRATIO(400),ISP(400),IBPOS(400)
      COMMON/BLK4/NG,NFG,NSIG,NCON,NSCN,NPIN,NPCSC,NPINT,NROW,NCOL,
     1NAL,NFRS,NFRP,NCS1,NCS
      COMMON/BLK5/NCSA,NFRP1,NCSA1,IDGAT(300)
      COMMON/BLKA/IDUM1,IDUM2,IDUM3,MEAS,NBL,IP(3),NFG1,IX,IY,IT2,IT3,
     1IOLDP,ITEMP,IEXTRA
C
C     PLACE ROUTINE SELECTS A GATE TO PLACE BY COMPARTING THE RATIOS AND
C     S.P. OF ALL THE GATES. HAVING SELECTED A GATE AND POSITION,THE
C     GATE AND THE LOCATION ARE FIXED BY MINUSING IGTET AND LOCX.PLACE
C     CALLS MCG,MSGET,MIBOG,MIBFS,AND MIBFP.
C
C     PLACE FIRST ROW SCN WITH ASSIGNED SIGNALS FIRST
    5 IDUM2=999999
      IDUM1=0
C     THIS LOOP FINDS GATE WITH BEST RATIO AND S.P. THEN STORES THE GATE
C     NO. IN IDUM3
      KP = NFG + NFRP1
      DO 20 I=1,NG
      IF(IBPOS(I).EQ.0) GO TO 20
      IF(NFG1 .GE. KP)GO TO 9
      IF(IGT(I) .NE. -1)GO TO 20
    9 IF(IRATIO(I) - IDUM1)20,15,10
   10 IDUM1=IRATIO(I)
      GO TO 18
   15 IF(ISP(I).GE.IDUM2)GO TO 20
   18 IDUM2=ISP(I)
      IDUM3=I
   20 CONTINUE
      IF(IDUM1.NE.0)GO TO 33
      IF(NFG1.LT.KP)CALL ERROR(3)
C*********************************************************************
C  THIS LOOP ASSIGNS AN SCN WITH RATIO=0 TO THE FIRST
C  AVAILABLE VALID POSITION
C*********************************************************************
      DO 25 I=1,NG
      IF(IGPOS(I) .NE.0)GO TO 25
      K = NFG + 1
      DO 22 J=K,NG
      IF(LOCX(J).LT.0)GO TO 22
      IF(IGT(I).NE.IPTYP(J))GO TO 22
      IDUM3 = I
      IBPOS(I) = J
      WRITE(6,100)I,J
  100 FORMAT(1X,'SCN NUMBER ',I5,'HAD A RATIO OF 0 AND WAS ARBITRARILY
     1 PLACED IN POSITION ' ,I5)
      GO TO 33
   22 CONTINUE
      CALL ERROR(113)
   25 CONTINUE
      CALL ERROR(114)
   33 IOLDP=IBPOS(IDUM3)
      JG=IDUM3
      KG=IOLDP
      IGPOS(JG)=IOLDP
C     FIX GATE BY MAKING IGTET AND LOCX MINUS
      IGTET(JG)=-IGTET(JG)
      LOCX(KG)=-LOCX(KG)
      IRATIO(JG)=0
      ISP(JG)=0
      IBPOS(JG)=0
C     UP THE COUNT OF NUMBER OF FIXED GATES
   35 NFG1=NFG1+1
      IEXTRA=IDUM3
```

```
      CALL MSGET
```
---
(82)
```
      IF(NG.EQ.NFG1)RETURN
   45 CALL MIBFS
      CALL MIBFP
      RETURN
      END
```
---
(83)
```
      SUBROUTINE MSGET
      COMMON/BLK1/IHEAD(20) ,IOPT(30)
      COMMON/BLK2/IXCOL(50),IYROW(50),IGATE(6000),JSIGN(6000),
     1IGTET(400),IGT(400),IGPOS(400),IPTYP(400),LOCY(400),LOCX(400),
     2ISIGET(1024),IXMEAS(1024),IYMEAS(1024),ISX(1024),ILX(1024),
     3ISY(1024),ILY(1024),IRATIO(400),ISP(400),IBPOS(400)
      COMMON/BLKA/IDUM1,IDUM2,IDUM3,MEAS,NBL,IP(3),NFG1,IX,IY,IT2,IT3,
     1IOLDP,ITEMP,IEXTRA
C
C     THE ROUTINE MSGET MODIFIES SIGET,IXMEAS AND IYMEAS. MSGET CALLS
C     PSIG.
C
C     MODIFY EACH GATE IN IEXTRA
      K=IEXTRA
      IE=IABS(IGTET(K+1))-1
      IB=IABS(IGTET(K))
      J=IGPOS(K)
      IX=IABS(LOCX(J))
      IY=LOCY(J)
      DO 20 J=IB,IE
      K=-JSIGN(J)
   20 CALL PSIG(K,0)
      RETURN
      END
```
---
(83)
```
      SUBROUTINE MIBFS
      COMMON/BLK1/IHEAD(20) ,IOPT(30)
      COMMON/BLK2/IXCOL(50),IYROW(50),IGATE(6000),JSIGN(6000),
     1IGTET(400),IGT(400),IGPOS(400),IPTYP(400),LOCY(400),LOCX(400),
     2ISIGET(1024),IXMEAS(1024),IYMEAS(1024),ISX(1024),ILX(1024),
     3ISY(1024),ILY(1024),IRATIO(400),ISP(400),IBPOS(400)
      COMMON/BLKA/IDUM1,IDUM2,IDUM3,MEAS,NBL,IP(3),NFG1,IX,IY,IT2,IT3,
     1IOLDP,ITEMP,IEXTRA
C
C     MIBFS MODIFIES IRATIO,ISP.AND IBPOS FOR SIGNALS. MIBFS CALLS GGATP
C
      K=IEXTRA
      IE=IABS(IGTET(K+1))-1
      IB=IABS(IGTET(K))
      DO 30 J=IB,IE
      K=JSIGN(J)
      IE1=IABS(ISIGET(K+1))-1
      IB1= IABS(ISIGET(K))
C     LOOP ON GATES THIS SIGNAL GOES TO AND MODIFY TABLES ONLY IF THEY
C     HAVEN'T ALREADY BEEN MCDIFIED
      DO 20 K=IB1,IE1
      L=IGATE(K)
      IF(IRATIO(L).LT.0)GO TC 20
      IF(IGPOS(L).NE.0)GO TO 15
      CALL GGATP(L)
      IF(NBL.EQ.0)CALL ERROR(8)
      IF(IP(1).EQ.0)CALL ERROR(11)
   15 IRATIO(L)=-IRATIO(L)
   20 CONTINUE
   30 CONTINUE
      RETURN
      END
```
---
(83)

```
      SUBROUTINE MIBFP
      COMMON/BLK1/IHEAD(20) ,IOPT(30)
      COMMON/BLK2/IXCOL(50),IYROW(50),IGATE(6000),JSIGN(6000),
     1IGTET(400),IGT(400),IGPOS(400),IPTYP(400),LOCY(400),LOCX(400),
     2ISIGET(1024),IXMEAS(1024),IYMEAS(1024),ISX(1024),ILX(1024),
     3ISY(1024),ILY(1024),IRATIO(400),ISP(400),IBPOS(400)
      COMMON/BLK4/NG,NFG,NSIG,NCON,NSCN,NPIN,NPOSC,NPINT,NROW,NCOL,
     1NAL,NFRS,NFRP,NCS1,NCS
      COMMON/BLKA/IDUM1,IDUM2,IDUM3,MEAS,NBL,IP(3),NFG1,IX,IY,IT2,IT3,
     1IOLDP,ITEMP,IEXTRA
C
C     MIBFP MODIFIES IRATIO,ISP,AND IBPOS FOR POSITION. IT CALLS GGATP
C     FOR GATES WHICH HAVEN'T BEEN MODIFIED IN MIBOG OR MIBFS.
C
      DO 20 I=1,NG
C     HAVE  TABLES BEEN MODIFIED YET
      IF(IRATIO(I).LE.0)GO TO 10
      IF(IBPOS(I).NE.IOLDP)GO TO 20
      CALL GGATP(I)
      IF(IP(1).EQ.0)CALL ERROR(4)
      GO TO 20
   10 IRATIO(I)=-IRATIO(I)
   20 CONTINUE
      RETURN
      END
```

---

(84)

```
      SUBROUTINE WIRE
      COMMON/BLK1/IHEAD(20) ,IOPT(30)
      COMMON/BLK2/IXCOL(50),IYROW(50),IGATE(6000),JSIGN(6000),
     1IGTET(400),IGT(400),IGPOS(400),IPTYP(400),LOCY(400),LOCX(400),
     2ISIGET(1024),IXMEAS(1024),IYMEAS(1024),ISX(1024),ILX(1024),
     3ISY(1024),ILY(1024),IRATIO(400),ISP(400),IBPOS(400)
      COMMON/BLK3/ITSP,KYL,KYS,KXL,KXS,ITEM(25),ITEM1(25),ITEM2(25),
     1ITEM3(25),ITEM4(25),ITEM5(25)
      COMMON/BLK4/NG,NFG,NSIG,NCON,NSCN,NPIN,NPOSC,NPINT,NROW,NCOL,
     1NAL,NFRS,NFRP,NCS1,NCS
C
C     WIRE MAKES ALL ENTRIES IN IGTET AND ISIGET POSITIVE. THE TOTAL
C     SEMIPERIMETER(ITSP) IS COMPUTED. OLD X AND Y MEASURES ARE ADDED
C     TOGETHER TO GET A NEW MEASURE NOW FOUND IN IXMEAS TABLE. THIS
C     ROUTINE SETS UP TABLES FOR INTERCHANGE.
C
      DO 10 I=1,NG
C     IS THIS A CONNECTOR
      IF(IGPOS(I).LE.NFG)GO TO 10
      IF(IGTET(I).GT.0)CALL ERROR(9)
      IGTET(I)=-IGTET(I)
   10 LOCX(I)=IABS(LOCX(I))
      ITSP=0
C     COMPUTE TOTAL S.P.
      DO 20 I=1,NSIG
      IF(ISIGET(I).GT.0)CALL ERROR(10)
      IXMEAS(I)=IXMEAS(I)+IYMEAS(I)
      ITSP=ITSP+IXMEAS(I)
      ISIGET(I)=-ISIGET(I)
   20 CONTINUE
      RETURN
      END
```

---

(84)

```
      SUBROUTINE INTCH
      COMMON/BLK1/IHEAD(20) ,IOPT(30)
      COMMON/BLK2/IXCOL(50),IYROW(50),IGATE(6000),JSIGN(6000),
     1IGTET(400),IGT(400),IGPOS(400),IPTYP(400),LOCY(400),LOCX(400),
     2ISIGET(1024),IXMEAS(1024),IYMEAS(1024),ISX(1024),ILX(1024),
     3ISY(1024),ILY(1024),IRATIO(400),ISP(400),IBPOS(400)
      COMMON/BLK3/ITSP,KYL,KYS,KXL,KXS,IPOS(50),IPOME(50),IPASS,ITNCS,
     1NCOMP,JDUM1,JDUM2, ITSP1,ITSP2,NPD,IDELTA,IEXT(41)
      COMMON/BLK4/NG,NFG,NSIG,NCON,NSCN,NPIN,NPOSC,NPINT,NROW,NCOL,
     1NAL,NFRS,NFRP,NCS1,NCS
```

```
C
C  INTCH CALLS READ,SETGMS,AND GMS,INTCH PERFORMS PAIRWISE INTERCHANGES
C  ON ALL GATE AND STORES TEMPORARY INFORMATION IN IPDS AND IPDME TABLES
C  INTCH RETURNS CONTROL AFTER TOTAL SP HAS BEEN REDUCED TO PRESCRIBED
C  LIMITS
C
      NCOMP=0
      ITSP1=ITSP
      IPASS=0
      KXL=0
      KXS=0
      KYL=0
      KYS=0
      CALL READ(2)
C     ITNCS IS NUMBER OF INTERCHANGES THIS PASS
   10 ITNCS=0
      IPASS=IPASS+1
      ITSP2=ITSP
      N=NG-1
C     GATE INFORMATION FOR PAIRWISE IS SET UP
      DO 60 I=1,N
      IF(IGTET(I).LT.0) GO TO 60
      JDUM1=IGPOS(I)
      IB=I+1
      DO 50 J=IB,NG
      IF(IGTET(J).LT.0) GO TO 50
      IF(IABS(IGT(I)).NE.IABS(IGT(J)))GO TO 50
      JDUM2=IGPOS(J)
C  UP THE COUNTER FOR NO.OF ATTEMPTED INTERCHANGES AND SWITCH GATE LOC
      NCOMP=NCOMP+1
      IGPOS(I)=JDUM2
      IGPOS(J)=JDUM1
      CALL SETGMS(I,J)
C     NPD COUNTS ENTRIES IN IPDS TABLE
      IF(NPD.EQ.0) GO TO 20
      CALL GMS
--------------------------------------------------------------------
                                                                (88)
      IF(IDELTA.GT.0) GO TO 30
--------------------------------------------------------------------
                                                                (87)
C     CHANGE GATES BACK TO ORIGINAL POSITIONS
   20 IGPOS(I)=JDUM1
      IGPOS(J)=JDUM2
      GO TO 50
--------------------------------------------------------------------
                                                                (89)
   30 ITSP=ITSP-IDELTA
      ITNCS=ITNCS+1
      JDUM1=JDUM2
      DO 40 K=1,NPD
      KK=IPDS(K)
   40 IXMEAS(KK)=IPDME(K)
--------------------------------------------------------------------
                                                                (90)
   50 CONTINUE
   60 CONTINUE
--------------------------------------------------------------------
                                                                (92)
      JDUM1=ITSP1-ITSP
      JDUM2=ITSP2-ITSP
      CALL READ(1)
      IF(100*JDUM2.LE.ITSP)RETURN
      GO TO 10
      END
--------------------------------------------------------------------
                                                                (86)
      SUBROUTINE SETGMS(I,J)
      COMMON/BLK1/IHEAD(20) ,ICPT(30)
      COMMON/BLK2/IXCOL(50),IYROW(50),IGATE(6000),JSIGN(6000),
     1IGTET(400),IGT(400),IGPOS(400),IPTYP(400),LOCY(400),LOCX(400),
```

```
     2ISIGET(1024),IXMEAS(1024),IYMEAS(1024),ISX(1024),ILX(1024),
     3ISY(1024),ILY(1024),IRATIO(400),ISP(400),IBPOS(400)
      COMMON/BLK3/ITSP,KYL,KYS,KXL,KXS,IPDS(50),IPDME(50),IPASS,ITNCS,
     1NCOMP,JDUM1,JDUM2, ITSP1,ITSP2,NPD,IDELTA,IEXT(41)
C
C     SETGMS BUILDS IPDS TABLE. A TABLE OF SIGNALS TO HAVE MEASURES
C     RECOMPUTED
C
      NPD=0
      IB=IABS(IGTET(I))
      IE=IABS(IGTET(I+1))-1
      IB1=IABS(IGTET(J))
      IE1=IABS(IGTET(J+1))-1
C     THIS LOOP LOOKS AT SIGNALS ON EACH GATE. ANY COMMON SIGNALS ARE
C     DISREGARDED.ALL OTHER SIGNALS ARE ENTERED IN IPDS TABLE
      DO 20 K=IB,IE
      KK=JSIGN(K)
      IF(IXMEAS(KK).EQ.0) GO TO 20
      DO 10 L=IB1,IE1
      IF(JSIGN(K).NE.JSIGN(L)) GO TO 10
      JSIGN(L)=-JSIGN(L)
      GO TO 20
   10 CONTINUE
      NPD=NPD+1
      IPDS(NPD)=JSIGN(K)
   20 CONTINUE
      DO 40 L=IB1,IE1
      IF(JSIGN(L).GT.0)GO TO 30
      JSIGN(L)=-JSIGN(L)
      GO TO 40
   30 JJ=JSIGN(L)
      IF(IXMEAS(JJ).EQ.0) GO TO 40
      NPD=NPD+1
      IPDS(NPD)=JSIGN(L)
   40 CONTINUE
      RETURN
      END
```

---

(86)

```
      SUBROUTINE GMS
      COMMON/BLK1/IHEAD(20) ,IOPT(30)
      COMMON/BLK2/IXCOL(50),IYROW(50),IGATE(6000),JSIGN(6000),
     1IGTET(400),IGT(400),IGPOS(400),IPTYP(400),LOCY(400),LOCX(400),
     2ISIGET(1024),IXMEAS(1024),IYMEAS(1024),ISX(1024),ILX(1024),
     3ISY(1024),ILY(1024),IRATIO(400),ISP(400),IBPOS(400)
      COMMON/BLK3/ITSP,KYL,KYS,KXL,KXS,IPDS(50),IPDME(50),IPASS,ITNCS,
     1NCOMP,JDUM1,JDUM2, ITSP1,ITSP2,NPD,IDELTA,IEXT(41)
C
C     GMS CALL PSIG FOR EACH SIGNAL IN IPDS AND PLACES NEWLY CALCULATED
C     MEASURES IN IPME
C
      IDELTA = 0
      DO 10 I=1,NPD
      CALL PSIG(IPDS(I),1)
      IPDME(I)=KYL+KXL-KXS-KYS
      JJ=IPDS(I)
   10 IDELTA=IXMEAS(JJ)-IPDME(I)+IDELTA
      RETURN
      END
```

---

```
      SUBROUTINE READ(K)
      COMMON/BLK1/IHEAD(20) ,IOPT(30)
      COMMON/BLK3/ITSP,KYL,KYS,KXL,KXS,IPDS(50),IPDME(50),IPASS,ITNCS,
     1NCOMP,JDUM1,JDUM2, ITSP1,ITSP2,NPD,IDELTA,IEXT(41)
      GO TO (1,2),K
    1 WRITE(6,109)IPASS,ITNCS,NCOMP,ITSP,JDUM1,JDUM2
      RETURN
    2 WRITE(6,102)(IHEAD(J),J=1,20)
      WRITE(6,116)
```

```
      WRITE(6,117)
      WRITE(6,112)
      RETURN
  102 FORMAT(1H1,20A4,A2,////)
  109 FORMAT(I14,I13,3I16,I14)
  112 FORMAT(1H0)
  116 FORMAT(10X,4HPASS,6X,25HINTERCHANGES TOTAL NUMBER,4X,11HWIREABILIT
     1Y,8X,5HTOTAL,7X,11HIMPROVEMENT)
  117 FORMAT(10X,6HNUMBER,5X, 9HTHIS PASS,5X,9HATTEMPTED,22X,11HIMPROVEM
     1ENT,6X,9HTHIS PASS)
      END
```

(74)

(78)

```
      SUBROUTINE GO
      COMMON/BLK1/IHEAD(20) ,IOPT(30)
      COMMON/BLK2/IXCOL(50),IYROW(50),IGATE(6000),JSIGN(6000),
     1IGTET(400),IGT(400),IGPOS(400),IPTYP(400),LOCY(400),LOCX(400),
     2ISIGET(1024),IXMEAS(1024),IYMEAS(1024),ISX(1024),ILX(1024),
     3ISY(1024),ILY(1024),IRATIO(400),ISP(400),IBPOS(400)
      COMMON/BLK4/NG,NFG,NSIG,NCON,NSCN,NPIN,NPCSC,NPINT,NROW,NCOL,
     1NAL,NFRS,NFRP,NCS1,NCS
      COMMON/BLKA/IDUM1,IDUM2,IDUM3,MEAS,NBL,IP(3),NFG1,IX,IY,IT2,IT3,
     1IOLDP,ITEMP,IEXTRA
      DO 10 I=1,NSIG
      ISX(I)=0
      ILX(I)=0
      ISY(I)=0
      ILY(I)=0
      IXMEAS(I)=0
   10 IYMEAS(I)=0
      NFG1=NFG
      DO 40 J=1,NSIG
      CALL PSIG(J,0)
      IF(IOPT(11).EQ.1)WRITE(6,100)J,ISIGET(J),IXMEAS(J),IYMEAS(J),ISX(J
     1),ILX(J),ISY(J),ILY(J)
   40 CONTINUE
      CALL BEST
      IF(IOPT(12).EQ.0)GO TO 50
      DO 45 I=1,NG
   45 WRITE(6,100)I,IGTET(I),IRATIO(I),ISP(I),IBPOS(I)
   50 CONTINUE
      I=NFG+1
C
C     INITIAL PLACEMENT
C
      DO 500 L=I,NG
      CALL PLACE(JG,KG)
      IF(IOPT(10).EQ.1) WRITE(6,100)JG,KG
  500 CONTINUE
      CALL WIRE
      IF(IOPT(13).EQ.0)GO TO 60
      DO 55 I=1,NG
   55 WRITE(6,100)I,IGTET(I),IGPOS(I),IGT(I),IPTYP(I)
   60 CONTINUE
C
C     INTERCHANGE
C
      CALL INTCH
      IF(IOPT(14).EQ.0)GO TO 70
      DO 65 I=1,NG
   65 WRITE(6,100)I,IGTET(I),IGPOS(I),IGT(I),IPTYP(I)
   70 CONTINUE
      CALL OUTAPE
      RETURN
  100 FORMAT (20I5)
      END
```

ROUTING ROUTINE

Upon completion of the placement routine, the data processor now contains sufficient information to generate routing instructions for the interconnecting paths between pins of the various packages. Input information to the routing routine includes the previously checked input data, data on the assignment of logic elements to multielement packages and data on the placement of the multielement packages. Initially, the routing routine assembles the input data into signal sets. A signal set consists of all the pins in the logic system having the same signature. Starting with one of the signal sets, the various element pins in the set are designated either "from" or "to" pins or both.

To identify each pin as a "from" or "to" pin, a pin list for one of the signal sets is compiled and divided into two groups, (1) connector and test point pins, and (2) internal pins. An internal pin from this list is randomly selected for the first "-from" pin. Starting with this first "from" pin, the closest internal pin is chosen as the "to" pin. The closest pin is determined by the least semi-perimeter distance. Semi-perimeter is a term defined as half the circumference of a rectangle which has the "from" pin at one corner and the "to" pin at the diagonally opposite corner. Information designating a "from-to" for the first set is stored with the signal set information. If additional internal pins remain to be assigned a"from" on "to" designation, a "from" pin is chosen from the remaining internal pins. The pin chosen will be that one closest to any pin already included in a "from-to" designation which will be the "to" pin. The closest pin will again be that one with the least semi-perimeter distance.

After all the internal pins have been assigned a "from-to" designation, the connector pins and test pins are considered. The test pins and connector pins are now assigned a "from-to" designation with the internal pins being considered the "to" pin in each designation.

When all the connector pins and test pins of a signal set have been assigned, a "from-to" designation, an inquiry is made as to whether any additional signal sets remain to be considered for "from-to" designation. If additional signal sets remain, the preceding "from-to" routine is repeated until all signal sets have been considered. Note that each signal set consists of a list of start and destination pins, and the interconnecting path (if any) for each signature.

After completing the computation of the "from-to" for each signal set, the total semi-perimeter for each signal set is computed. Total semi-perimeter for a signal set is computed by totaling the semi-perimeter for each "from-to" of the set. The total semi-perimeter for each signal set is retained and used for computing an order in which the signal sets will be considered for routing. The total semi-perimeters for the signal sets are sorted and arranged in an order starting with the least and proceeding to the largest. This ordering of the signal sets is then used to complete the routing routine.

Figure 6:
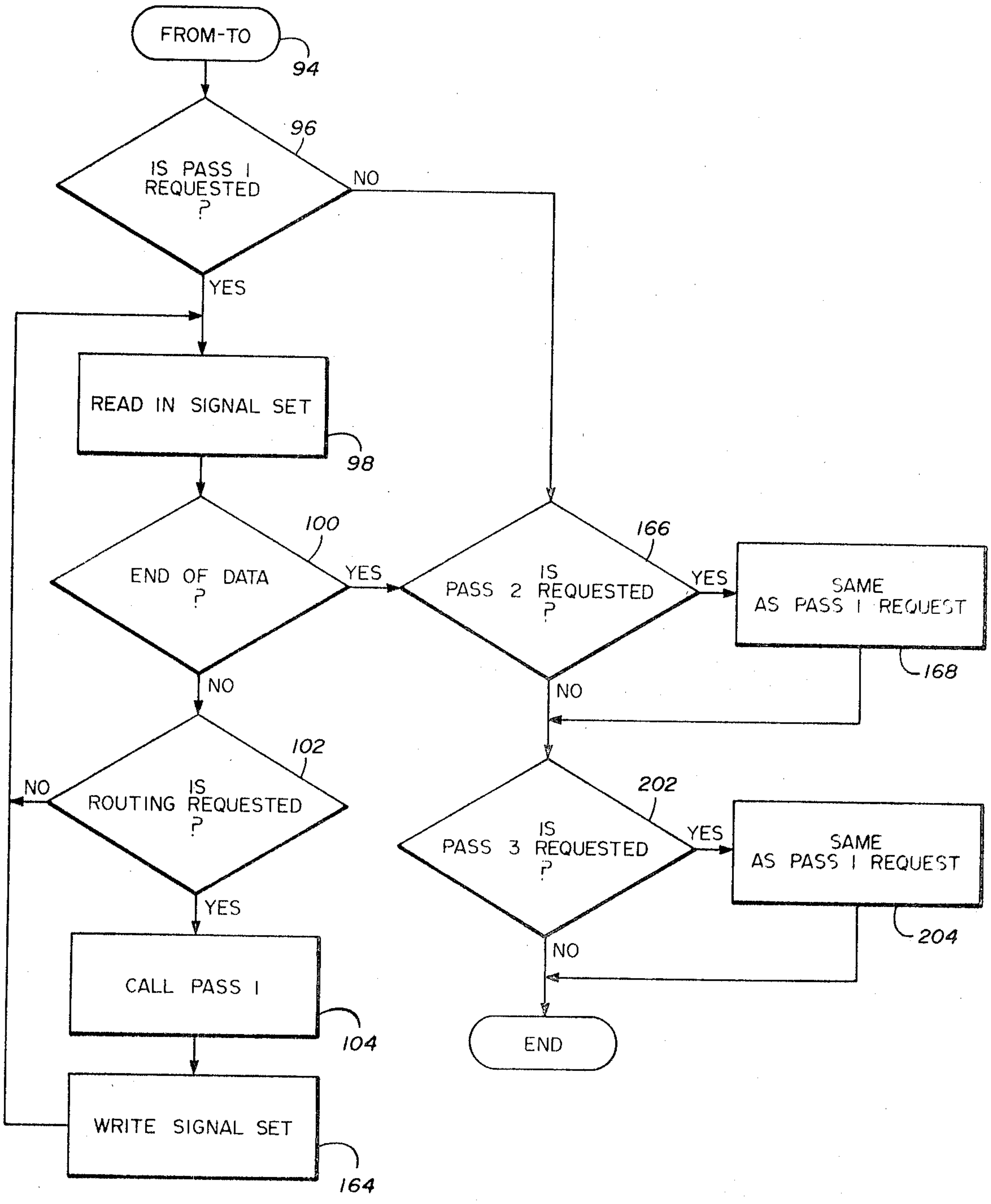
FIG. 6 is a flow chart of the routing routine run by a data processing machine for interconnecting element pins on a printed circuit board.

Referring to FIG. 6, there is shown a flow chart of the routing routine 34. After reading in all the input data and computing the start and destination points and the signal set order in step 94, an inquiry 96 is made to determine if pass one of the routing routine has been requested. If the answer is negative, the routing routine skips pass one and proceeds to pass two. A "yes" answer to the inquiry 96 advances the routing routine to step 98 wherein the signal set information is read into the routine.

After reading in the signal set information, an inquiry 100 is made to determine if all the interconnections that can be made have been completed or if additional routing in pass one is required. A negative answer indicates that additional interconnections remain to be routed. If additional interconnections remain, an inquiry 102 questions whether routing of these interconnections is requested. A "yes" answer to inquiry 102 advances the routing routine to step 104 which calls a subroutine identified as "pass one."

Figure 7:
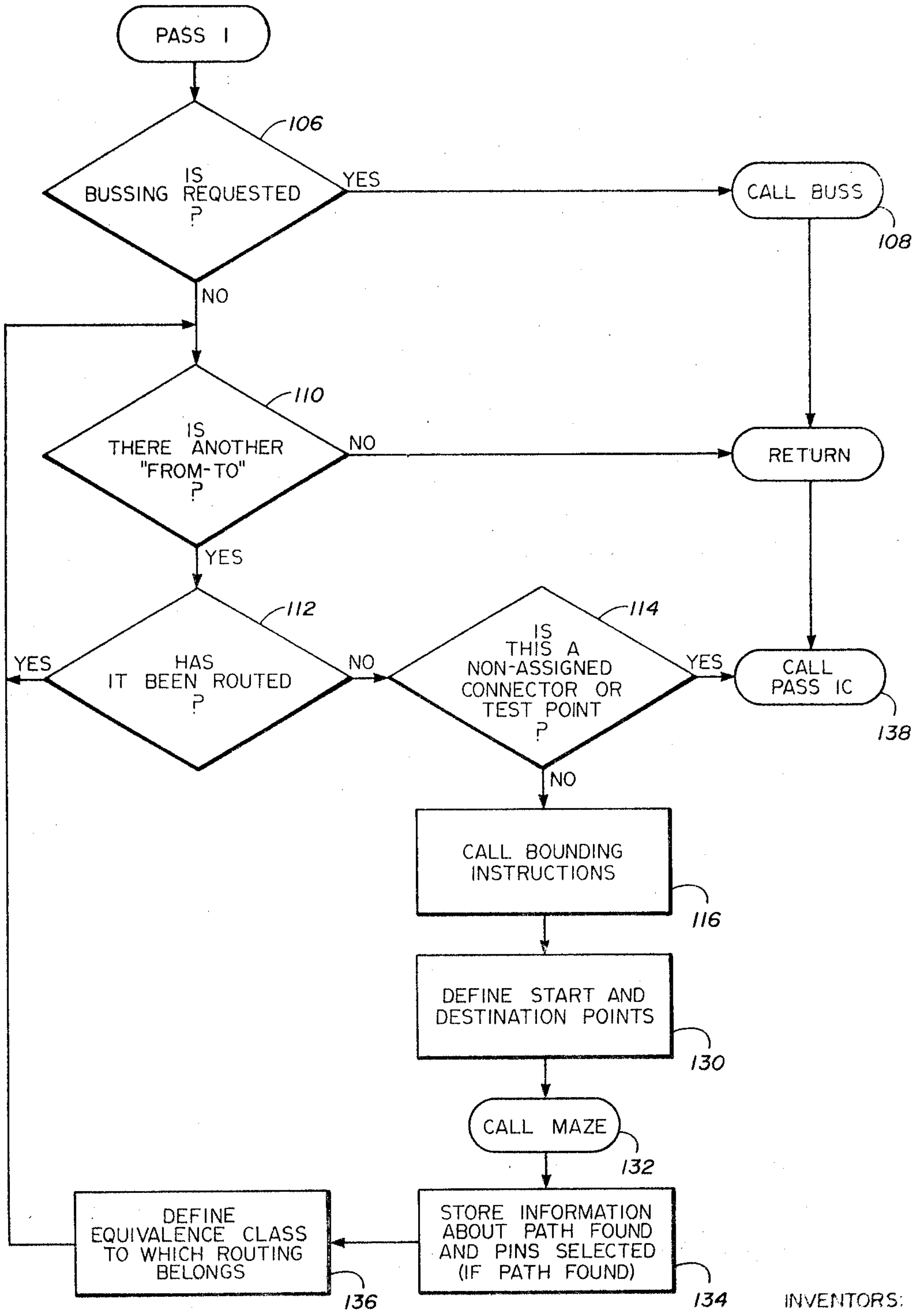
FIG. 7 is a flow chart of a pass one subroutine called by the routing routine of FIG. 6.

Referring to FIG. 7, there is shown a flow chart of the pass one subroutine. For pass one routing, the routine starts by a series of inquiries as to what action is required. The first inquiry 106 determines if the pass is for the purposes of routing to bus bars (e.g., power lines and ground lines) or routing interconnections between start and destination points. If the answer to inquiry 106 is "yes," a bussing subroutine 108 is called to lay out the bussing routes. Upon completion of bus routing, the routing routine returns to the step 104 of FIG. 6.

A negative response to inquiry 106 advances the pass one subroutine to an inquiry 110 to determine if there is another interconnection to be made. If the answer to this inquiry is "-no", the routing routine returns to step 104. A "yes" answer to inquiry 110 advances the routine to another inquiry 112 to determine if the interconnection has been routed. If the interconnection has been routed, inquiry 112 results in a "yes" answer which returns the pass one routine to inquiry 110 which then produces a "no" answer to return the routing routine to step 104. A "no" answer to inquiry 112 advances the pass one routine to inquiry 114. Inquiry 114 asks if the interconnection that remains is to a connector or test point. A negative response to inquiry 114 advances the pass one routine to step 116 which calls in bounding instructions.

Bounding defines the area in which the route of the interconnecting path may be located. For pass one, the bounds restrict the path to substantially a vertical direction on one side of a two-sided printed circuit board and to a substantially horizontal direction on the opposite side of the printed circuit board. Routing lines placed on one side of the printed circuit board are defined as "Class 1" lines and routing paths on the opposite side of the board are defined as "Class 2" lines. For pass one, both Class 1 and Class 2 lines are possible. To define the bounding area for pass one, a unique $\Delta$ X and $\Delta$ Y is read in for the start point and destination point.

Figure 11A:
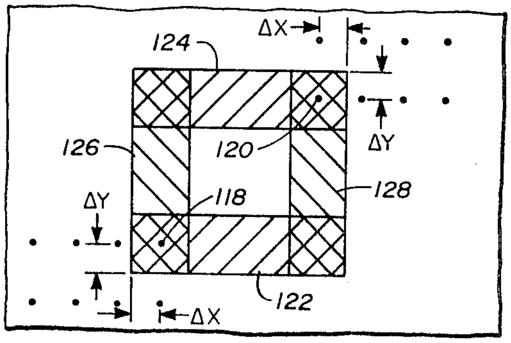
FIGS. 11A, 11B and 11C illustrate bounding limitations for the three subroutines of FIGS. 7, 8 and 9, respectively.

Referring to FIG. 11A, there is illustrated the bounding limits for pass one. Pin 118 is the start point and pin 120 the destination point. The horizontal distance between the pin 118 and a vertical projection from the pin 120 plus a $\Delta$ X for the pins 118 and 120 establishes the vertical bounding lines 126 and 128. Similarly, the vertical distance between the pin 118 and a horizontal projection from the pin 120 plus a $\Delta$ Y for the pins 118 and 120 establishes the horizontal bounding lines 122 and 124. Horizontal areas in FIG. 11A are on the top of the printed circuit board, while the vertical areas are on the bottom.

After reading in the bounding instructions for pass one for the particular pins in question, the pass one subroutine advances to step 130 where the start and destination points are defined. In FIG. 11A, the pin 118 has been defined as a start point and the pin 120 as a destination point. After reading in this information, the pass one subroutine calls in a maze subroutine which develops a numbered ordered maze within the bounding limits.

There are various maze routines available; for example, a 1, 2, 3 maze may be developed from the pin 118 to the pin 120. The maze routine fills in the cells of the printed circuit board contained within the bounding limits starting at pin 118 until the maze reaches the pin 120. Upon reaching the pin 120, the numbered ordered maze stops and a backtracking routine is called. In the backtracking routine, the maze numbers are followed backward until a next consecutive number cannot be found. This implies that the start point has been reached. Any path which the backtracking routine establishes is considered the shortest path defined by the maze. There may be, however, a choice of shortest paths. In this case, the backtrack routine makes a choice as to which path to follow.

The rules for establishing which of the shortest paths that will be selected are determined by input data to the maze routine. At the beginning of the routing program, the numbers 1 through 9 are read in as channel priorities. These numbers are sequentially assigned to each horizontal row of cells. Similarly, these numbers are assigned to each column of vertical cells. Thus, each cell has a vertical priority and a horizontal priority. The "priority" of each cell on the board is then determined by the sum of row and column priorities.

The only time the channel priorities are used in the backtracking routine is when a decision has to be made between surrounding cells which have the correct consecutive cell number. As a rule, it is desirable for the interconnecting paths to be as straight as possible; however, when a decision has to be made between surrounding cells which have the correct consecutive cell number, the path decision is determined by one of two rules. According to rule 1, if the priority of any or all of the cells surrounding the present position is greater than or equal to that of the present cell position, the path will follow the cell with the largest priority. If there is a tie in priorities, and one of these choices is to go straight, the path will proceed in a straight direction. According to rule 2, if the priority of all the surrounding cells is less than that of the present cell position, a decision will be made to proceed straight if possible.

With the bounding limitation as illustrated in FIG. 11A for pass one, the numbered ordered maze and backtracking routine will change from one side of the printed circuit board to the other. Where the interconnecting path as established by the backtracking routine passes through the board a "-feedthrough" is made. A feedthrough from Class 1 to Class 2 may only be made at the intersection of the vertical and horizontal areas.

Upon completion of the maze routine 132, pass one advances to step 134 which stores the information required to establish an interconnecting path between pins 118 and 120. This information includes the location of the pins 118 and 120 along with the location of any feedthroughs. Next, the pass one routine defines the equivalence class in step 136 to which the interconnecting path belongs.

An equivalence class is defined as each cell of the interconnecting path between pin 118 and 120. Originally, these pins were defined as a single start-point and a single destination-point. Once the interconnection path has been established, pins 118 and 120 along with the interconnecting path form an equivalence class. Within a signal set, pins and interconnecting lines which are connected are assigned the same equivalence number and thus define an equivalence class. When two different equivalence classes are connected, as they may be, they are assigned like equivalence numbers.

After defining the equivalence class of the interconnecting path between pins 118 and 120, the pass one subroutine returns to inquiry 110 to determine if there is another start-point and destination-point that needs to be interconnected. Note that all cells in the equivalence class between pins 118 and 120 may now be considered as a "start" point or a "-destination" point. Thus, on subsequent runs of the maze routine 132 for the equivalence class of pins 118 and 120, the maze will be developed "from" multiple points or "to" multiple points. These are defined as multiple "from" points and multiple "to" points, respectively. If the answer is "no", as explained previously, the routing routine returns to step 104 of FIG. 6. Assuming another path has to be established and that inquiry 112 advances the routine to inquiry 114, the question is now asked whether the path is to a connector pin or a test point. A "no" answer to inquiry 114 will cause the steps 116, 130, 132, 134, and 136 to be repeated. A "yes" answer to the inquiry 114 will call a connector routine 138. Routine 138 is a special subroutine for establishing interconnecting paths between input/output connectors and element pins.

Figure 10:
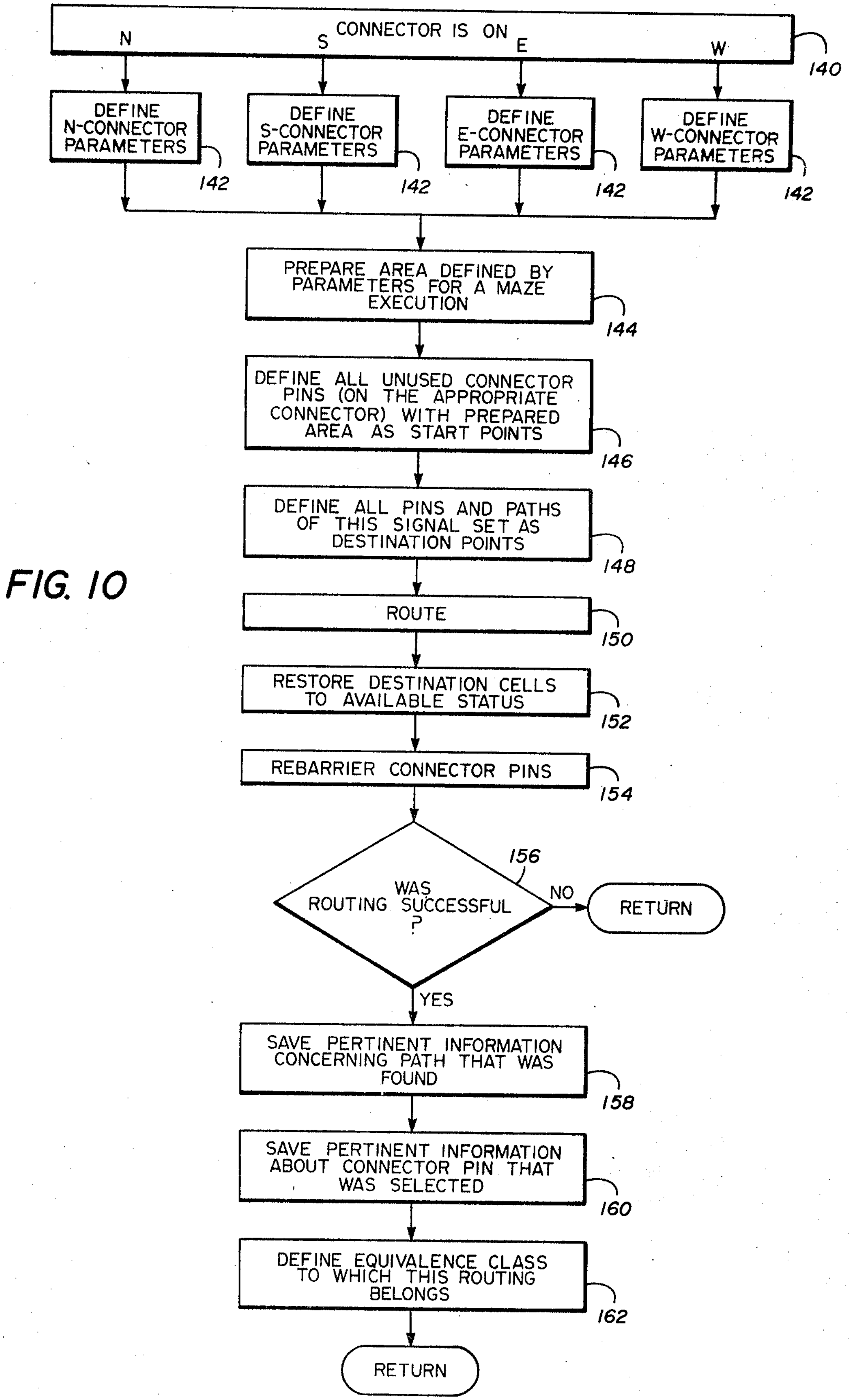
FIG. 10 is a flow chart of a connector subroutine called by the routing routine of FIG. 6.

Referring to FIG. 10, there is shown a flow chart for the connector routine 138. Initially, the connector routine identifies the connector position in step 140 as "north," "south," "east" or "west" connector. Depending on the connector location, step 142 defines the connector parameters. After defining the connector parameters, a bounding step 144 establishes the bounding area as defined by the parameters of step 142 for a maze execution. When the connector routine runs in the pass one subroutine, the bounding area is established by a Δ X and Δ Y for the pin element to be connected to the connector. This bounding area will appear as a relatively narrow channel in either a horizontal or vertical direction, depending on the connector location. When the bounding area has been defined by step 144, the connector routine proceeds to step 146 where all unused connector pins in the bounding area are defined. All the unused connector pins in the bounding area are start points for the maze expansion. After defining the connector start-points, step 148 defines all element pins and interconnecting paths as destination points. When both the start points and destination points have been defined, routing step 150 carries out the numbered ordered maze and backtracking procedures. These are the same as described earlier.

At the completion of the step 150, a number of housekeeping steps are required. First, in step 152, destination points not used in the established path are returned to an available status. In step 154, the unused connector pins are also returned to an available status. At this time, an inquiry 156 is made as to whether the routing was successful. If not successful, the connector routine 138 terminates and the routing routine returns to instruction 104 of FIG. 6. In this case, the routing to that connector must be established by hand.

If the inquiry 156 results in a "yes" answer, additional housekeeping steps are required. In step 158, pertinent information concerning the established path is stored. In step 160, information regarding the connector pin that was selected is also stored. Finally, in step 162, the equivalence class of the established path is defined. After step 162, the routing routine returns to the pass one subroutine which in turn returns to instruction 104.

If the positive response to the inquiry 114 was due to an unassigned test point, the connector routine 138 will be called. The connector routine 138 also established interconnecting paths to the circuit test points. Initially, the connector routine identifies the test point location in step 140 and defines the point parameters in step 142. The routine then proceeds as described above for a connector pin.

Returning to FIG. 6, upon completion of step 104 (the pass one subroutine), instruction 164 writes a signal set for the established interconnecting path. After step 164, the routing routine returns to step 98. Inquiry 100 is again made and if additional data is available, steps 102, 104 and 164 are repeated. If the inquiry 100 produces a "yes" answer, the routing routine makes the inquiry 166 to determine if a second pass is requested to establish interconnections between pins that were not interconnected in pass one. If the inquiry 166 results in a "yes" answer, the routing routine proceeds to step 168. Step 168 includes a pass two routing procedure.

Figure 8:
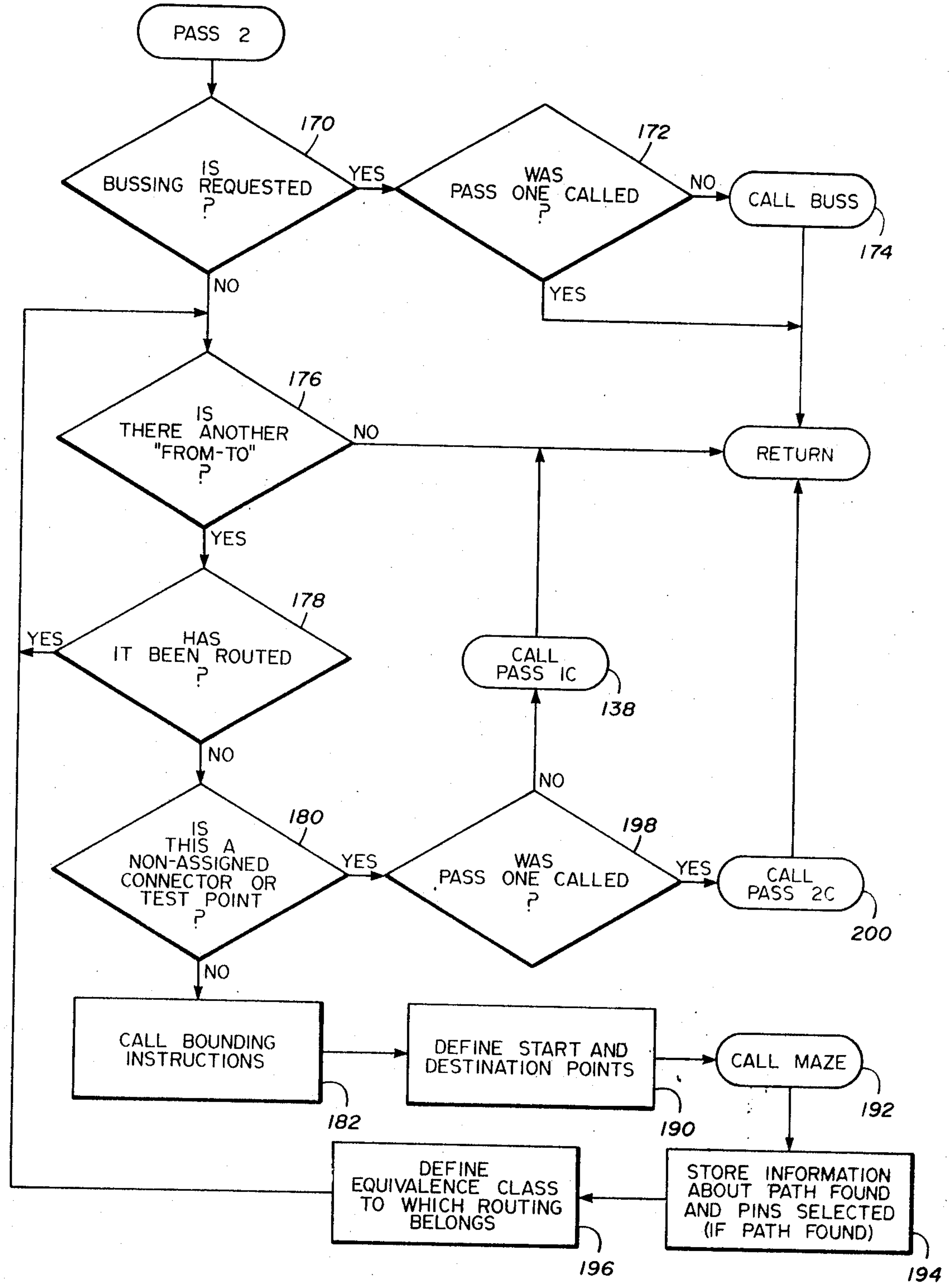
FIG. 8 is a flow chart of a pass two subroutine called by the routing routine of FIG. 6.

Referring to FIG. 8, there is shown a flow diagram of the pass two subroutine. This routine is basically the same as that illustrated in FIG. 7, that is, the pass one subroutine. First, an inquiry 170 is made to determine if bussing has been requested. When the bussing inquiry 170 produces a "yes" answer, an inquiry 172 questions whether the pass one routine was called. If the pass one routine was called, the routing returns to step 168. If pass one was not called, the bussing routine 174 is called. Upon completion of the routine 174, the routing routine returns to instruction 168.

When the inquiry 170 produces a "no" answer, the inquiries 176, 178 and 180 are the same as inquiries 110, 112 and 114, respectively of the pass one subroutine. A negative response to the inquiry 180 advances the pass two subroutine to the bounding step 182. Bounding instruction for pass two differs somewhat than from pass one.

Figure 11B:
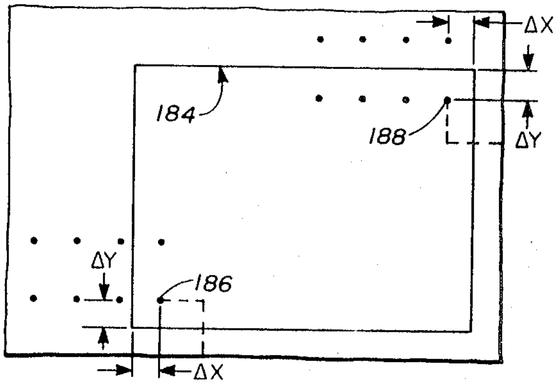

Referring to FIG. 11B, there is shown a bounding area 184 in the form of a rectangle which includes the pins 186 and 188, to be interconnected. The area enclosed by the rectangle 184 is defined by a Δ X and a Δ Y for the pin 186 and a Δ X and a Δ Y for the pin 188. Both Class 1 and Class 2 routing is possible in the bounding area of pass two.

After the bounding instructions have been established in step 182, the start and destination points are defined in step 190. Note that, in FIG. 11B, the pin 186 and the pin 188 are part of an equivalence class since they both have been previously interconnected to another pin. Candidates for start points and destination points are the cells of the pins themselves and interconnecting lines of the same equivalence class as the start or destination pin. Multiple start points are said to occur when there exists more than one start point. The same is true for a destination point. In total, there are four possible situations between start and destination points. As explained previously, there may be a single pin start point and a single pin destination point. Also, as illustrated in FIG. 11B, there may be multiple start points in an equivalence class and multiple destination points also of an equivalence class. A third situation that can occur is a single start point to multiple destination points of the same equivalence class. The fourth situation would be from multiple start points of the same equivalence class to a single destination point. When the fourth situation occurs, the start point and the destination points are interchanged.

Upon completion of the definition of the start and destination points in step 190, pass two calls the maze routine 192. This is a similar routine to the maze routine 132 of pass one. Upon completion of the maze routine 192, the pass two subroutine advances to step 194 and then to 196 which correspond to steps 134 and 136, respectively, of FIG. 7. After step 196, pass two routing proceeds in the same order as described previously with respect to pass one routing.

If inquiry 180 of the pass two subroutine produces a "yes" answer, an inquiry 198 determines whether pass one was called. If pass one was not called, the connector routine 138 is called. Connector routine 138 has been described with reference to the flow chart of FIG. 10. A "yes" answer from the inquiry 198 calls up a connector routine 200. Connector routine 200 is similar to the routine illustrated in FIG. 10, with the exception that step 144 is modified to define a different bounding area. For the connector routine 200, the bounding area resembles that of FIG. 11B. All pins and paths for the signal set to be routed are considered. The bounding area is defined by a Δ X and a Δ Y extension from the most extreme pins with respect to the defined connector. Upon completion of the connector routine 200, the routing routine returns to the instruction 168 of FIG. 6.

Upon completion of step 168, an inquiry 202 is made to determine if pass three routing is requested in the routing routine. A negative answer to inquiry 202 ends the routing routine. A "yes" answer to the inquiry 202 advances the routing routine to step 204 which requests pass three routing.

Figure 9:
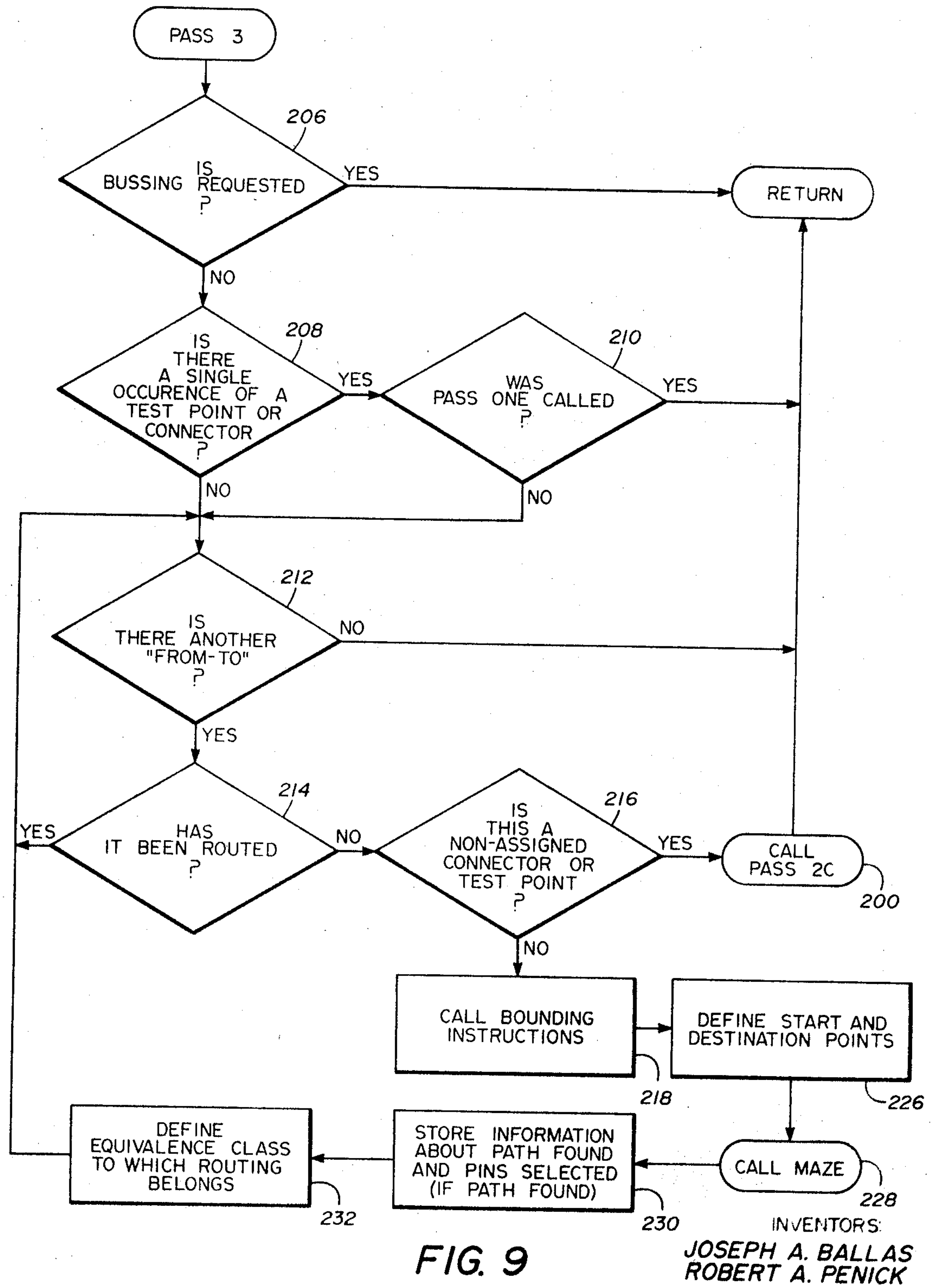
FIG. 9 is a flow chart of a pass three subroutine called by the routing routine of FIG. 6.

Referring to FIG. 9, there is shown a flow diagram for the pass three subroutine. The pass three subroutine is similar to the previously described two pass routines. An initial inquiry 206 asks if bussing is to be required. If bussing is required, pass three routing is not run and the routine returns to instruction 204. When the answer to inquiry 206 is "no," an inquiry 208 is made to determine if there is a single occurrence of a test point or connector pin. If the answer to inquiry 208 is "yes," an inquiry 210 is made to determine if pass one routing was called. A "yes" answer to the inquiry 210 cancels the rest of the pass three subroutine and the routing returns to instruction 204. A "no" answer to the inquiry 210 or a "no" answer to inquiry 208 advances pass three routing to the inquiry 212. Inquiry 212 is the same as inquiry 110 of pass one. A "no" response to inquiry 212 returns the system to instruction 204. A "yes" response to the inquiry 212 advances the pass three subroutine to inquiry 214 and 216 which are the same as inquiries 112 and 114, respectively, of FIG. 7. The "yes" response to inquiry 216 calls connector routine 200 which has been described previously. A "no" response to the inquiry 216 advances the pass three subroutine to step 218 which calls bounding instructions for pass three routing.

Figure 11C:
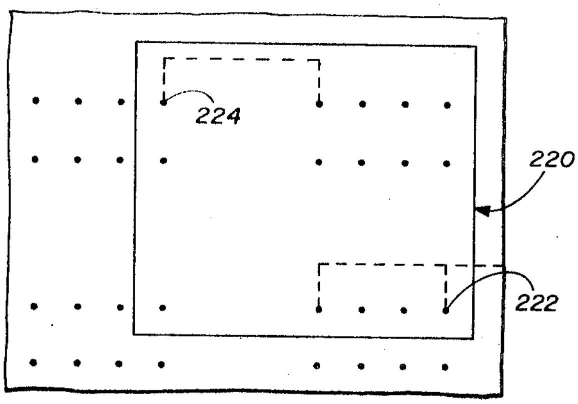

Referring to FIG. 11C, there is shown a rectangle 220 that outlines bounding limitations for the pass three subroutine. Thus, pass three, like pass two, is restricted to a rectangular bounding area. This rectangle defines both Class 1 and Class 2 routing. In pass three routing, however, the bounding is made with regard to the pins of two equivalence classes defined as the start and destination points. For pass three routing, the Δ X and Δ Y which establishes the outer limits of the rectangle 220 are applied to the smallest $x$, $y$ coordinates and the largest $x$, $y$ coordinates of pins of the two equivalence classes. In FIG. 11C, the Δ X and Δ Y are applied to the start pin 222 and the destination pin 224. These pins are of separate equivalence classes. As described earlier, with respect to FIG. 11B, there will be multiple start points and multiple destination points when routing between the start pin 222 and the destination pin 224.

Returning to FIG. 9, after the bounding instructions have been read in and the step 226 run to define the start and destination points, a maze 228 is called. The maze 228 is similar to the maze 132 of the pass one subroutine. The same numbered ordered maze expands from the multiple start points until it reaches one of the multiple destination points. The backtracking routine then establishes the shortest path using channel priorities when required. Upon completion of the backtracking, steps 230 and 232, which are similar to steps 134 and 136, respectively, of FIG. 7 are run. The pass three subroutine then returns to the inquiry 212.

Again, as in the case of both pass one and pass two routings, pass three continues until the answer to inquiry 212 is negative. This indicates that all the interconnections that can be made have been made.

A "no" response to the inquiry 212 returns the routing routine to the instruction 204, and the routing routine ends. If additional runs of the routing routine are required, step 94 of FIG. 6 is again initiated. On subsequent runs, the pass one subroutine is usually not requested because of the limited bounding which this pass requires. Usually, after one run of the routing routine, the pins that have not been interconnected cannot be fitted into the limited bounding of pass one. For subsequent runs of the routing routine, the Δ X and Δ Y of the pass two and pass three routings are expanded to include additional board area.

Referring again to FIG. 6, the flow chart shows the routing routine which includes several subroutines. Assuming the use of a computer, such as an IBM 360, to run the routing routine, a program listing of instructions for routing a logic system is given in the Program Listing III. The instructions, starting with instruction 101 and continuing through instruction 297, are general instructions required for operation of the routine of FIG. 6. After completing the instruction 297, the routine asks the inquiry 96 and proceeds to instruction 310. If the answer to inquiry 96 was "yes," then after instruction 310 the read-in signal step 98 is completed. After instruction 312, the end of data inquiry 100 is made and the program continues through instruction 322. A "no" response to inquiry 100, after instruction 322, advances the routine to the routing request of inquiry 102. The routine continues through instruction 325 at which time the step 104 is initiated which calls the pass one subroutine. Upon completion of the pass one subroutine, the program of Listing III continues at instruction 326. After completing the instruction 372, the process advances to the "-write signal set" step 164. From instruction 373 through instruction 458, the steps 98, 100, 102, 104 and 164 are repeated until the inquiry 100 produces a "yes" answer. After instruction 458, the routine asks the inquiry 166 and the process continues through step 471. After instruction 471, the read-in signal step 98 is repeated for pass two routing. The inquiry 102 is made after instruction 483 and the process continues to instruction 486. At instruction 486, the pass two subroutine is called. This corresponds to step 104 of FIG. 6. Upon completion of the pass two subroutine, the operation continues through instruction 496 at which time a signal set is written. From instructions 497 through 588, the routine continues until all interconnections that can be completed are made.

If pass one was not called, resulting in a "no" answer to inquiry 96, then the routine would skip some of the previous instructions and begin with instruction 598 to call pass two. Instructions 598 through 706 are for the situation where pass two has been called, after pass one has been omitted. After instruction 706, the inquiry 202 is made to determine if pass three is requested. A "yes" answer to inquiry 202 advances the routine to 204 which follows the same sequence as pass one and two. Pass three continues from instruction 707 to instruction 723 at which time a signal set is read in. After reading in the signal set and completing instruction 724, the end of data inquiry 100 is made. The routine continues through instruction 734 to ask the inquiry whether routing has been requested. If requested, the process continues to call pass three after instruction 738. Upon completion of the pass three subroutine, the program continues through instruction 746 at which time a signal set is written. Instructions 748 through 892 complete all pass three routings; this completes the routing routine.

Initially, the program listed in the Program Listing III calls a "from-to" subroutine, step 94, to establish start and destination points. As explained, input information to the "from-to" subroutine will be supplied by the third check subroutine, the packaging routine and the placement routine. A program listing of the "from-to" subroutine is given in the Program Listing IV. The Program Listing IV set out the general instructions of the "from-to" subroutine.

In the routing routine, when the answer to inquiry 102 is "yes," the pass one subroutine 104 is called. A program listing for the pass one subroutine is given in the Program Listing V. The first pages of Listing V are general operating instructions thereafter the inquiry 106 is made. A "yes" response to inquiry 106 advances the program through two additional lines of instructions to call the bussing routine 108. A "no" response to the inquiry 106 advances the routine to the inquiry 110 to determine if there is another "from-to." A "yes" response to inquiry 110 advances the routine to the following instructions. The inquiry 112 is then made and the routine advances through three more lines of instructions to the inquiry 114. After the inquiry 114, a "yes" response calls the pass 1C subroutine 138. If the pass 1C subroutine is called, the routine continues. A "no" response to the inquiry 114 advances the program and bounding instructions are called. After completing the step 116, the start and destination points are defined in step 130. The routine advances through the instructions until the step 132 is activated to call the maze. Maze instructions follow. After completing the maze, the routine continues to step 134 for storing the information about the path found and the pins selected. Next, the step 136 defines the equivalence class to which the routing belongs. The instructions completed in the step 136 are listed near the end of the Program Listing V.

During the run of the pass one subroutine, if the answer to inquiry 120 is "yes," a connector subroutine 138 is called. A program listing for the connector subroutine is given in the Program Listing VI. The first 30 instructions are general to the operation of the program. Instructions 131 through 144 are to identify and define a North connector. Instructions 145 through 159 are to identify and define a South connector. Similarly, 160 through 173 and 174 through 195 are to identify and define an East or West connector, respectively. Instructions 196 through 226 comprise step 144 of the flow diagram of FIG. 10. Instructions 227 through 237 comprise step 146 and instructions 238 through 241 make up the step 148 of the connector subroutine. The routing step 150 includes the instructions 242 through 245 with instructions 247 through 252 comprising the step 152. Instruction 252 of the listing is the start of the rebarrier connector pin step 154 followed by instructions 261 through 266 for the inquiry 156. A "yes" answer to the inquiry 156 advances the program to step 158 which is the set of instructions starting at 267 instructions are completed in step 162. The numbered instructions 300 through 315 define the step 160 with instructions 316 and 317 required to return the program to the pass one routine.

Upon completion of the pass one subroutine, the routing routine of the Program Listing III continues. If the answer to inquiry 166 of the routing routine is "yes," then the pass two subroutine is called. A program listing for the pass two subroutine is given in the Program Listing VII. The Program Listing VII starts with several general instructions followed by the inquiry 170. Instructions which follows are the inquiry 172 followed by the step 174. A "no" response to the inquiry 170 advances the program to step 176. Also listed are the instructions for step 178, inquiry 180, inquiry 198 with the step 138 called upon a negative response to inquiry 198. A "yes" response to this last inquiry advances the program to step 200 with the instructions as listed. A "no" response to inquiry 180 advances the program to step 182. The following are the instructions for defining the start and destination points of step 190. Instructions for the maze routine 192 are listed thereafter. Also listed are the instructions for the storing information step 194 and the equivalence class definition step 192.

During the run of the pass two subroutine illustrated in FIG. 8, if the answer to the inquiry 198 is "yes," a connector subroutine 200 is called. The connector subroutine 200 is basically the same as the connector subroutine 138 of the pass one subroutine illustrated in FIG. 7. A program listing for the connector subroutine 200 is given in the Program Listing VIII. The instructions for each of the various steps of the connector subroutine 200 are identified in the listing VIII. Since these are similar to the Program Listing VI, a detailed breakdown of this listing is not considered necessary.

Upon completion of the pass two subroutine, the routing routine continues. If an answer to inquiry 202 is "yes," the routing routine calls the pass three subroutine. A program listing of the pass three subroutine is given in the Program listing IX. Instructions of the listing are the inquiries 206, 208, 210, 212, 214 and 216. Instructions for calling the connector subroutine 200 are listed thereafter. A "no" response to the inquiry 216 advances the program to step 218. Instructions for step 226 follow.

The maze routine step 228 comes next, followed by instructions for steps 230 and 232. Upon completion of the pass three routine, the data processing machine of FIG. 1 advances to the next step in the processing of circuit artwork.

PRCGRAM LISTING III

```
      SUBROUTINE MAZEM
C   CONTROL PROGRAM FOR GENERAL MULTILAYER AND AUTCMATRIX MAZE
C
C
      COMMON/FRNT1/IFRNT1(3000)
      COMMON/FRNT2/IFRNT2(3000)
      COMMON/PASSBK/IDLX1,IDLY1,IDLX2,IDLY2,IDLX3,IDLY3,IDLXC1,IDLYC1,ID
     1LXC2,IDLYC2,ICAL1,ICAL2,ICAL3
      COMMON/MZBLK/MZTB(40000)
      COMMON/ARRBLK/ICNTRL(25),IPNFT(800),ISPCNT(20),ISPDEF(1000)
      COMMON/REFBLK/IX,IY,IYCON,IZ,IZCON,IXMAX,IYMAX,IZMAX,IXMIN,IYMIN,
     1IZMIN,JXMAX,JYMAX,JZMAX,JXMIN,JYMIN,JZMIN,IPKNO,IFRDIM,IYCON2,
     2IZCON2,IYCPZC,IYCP1,LAYTYP(5),IZTB(20),IFRDMS
      COMMON/BNDBLK/IXZL,IYZL,IZZL,IXZH,IYZH,IZZH,IXHL,IYHL,IXHH,IYHH,
```

```
     1IXVL,IYVL,IXVH,IYVH,IDLX,IDLY,IDCX,IDCY
      COMMON/TRKBLK/IDMPTH,IWTCH,INDEX,IXST,IYST,IZST,IXDS,IYDS,IZDS,
     1IXWT(125),IYWT(125),IPTH(1000)
      COMMON/STDSBK/NUMST,NUMDST,IR1CON,ICUIT,ICIMSD,ISTDST(50)
      COMMON/BUSBLK/IBUSX,IBUSY,IFDTH
      COMMON/CNTBK/NCNT
      DIMENSION IHDR(80)
      DIMENSION DIR(14)
      DIMENSION KINO(5000),KCNO(1000),KTNO(1000),KANO(1000)
      DIMENSION NAM(12),ISEL(100,5)
      DATA IAUT/'AUTO'/
      DATA DIR/'N','N','N','N','N','N','N','N','N','N','N','S','E','W'/
      DATA IPR/'PRIN'/,IZE/'ZERO'/,ION/'ONLY'/,IBLNK/'    '/
      DATA ICRD/'CARD'/
      DATA IPLT/'RIBB'/
      DATA KALL/'ALL '/
      DATA LALL/'NONE'/
      DATA LEADX/Z00010201/,NEXTX/Z02010201/,LEADY/Z00010202/,
     1NY1/Z01020201/,NY2/Z02020102/,NY3/ZC2010202/
      INTEGER ENDA,ENDB,ENDC
      DATA ENDA/'END '/,ENDB/'OF D'/,ENDC/'ATA '/
      READ(72) ISTOP
      IF(ISTOP.EQ.1) STOP
C
C  IF "ISTOP" IS 0, CONTINUE.
C
      READ(5,988)(IHDR(I),I=1,79)
  988 FORMAT(1X,79A1)
      WRITE(6,98)(IHDR(I),I=1,79)
   98 FORMAT(1H1,79A1)
      READ (5,114) IPRNT,IZERO,IONLY
  114 FORMAT(A4,2X,A4,1X,A4)
      READ(5,555) JALL
C BOARD MINS, MAXS, AND ROUTING LAYER MIN AND MAX.
      READ(72) IXMAX,IYMAX,IZMAX,IXMIN,IYMIN,IZMIN,JZMAX,JZMIN
      READ(5,114) ICARD
      IF(ICARD.EQ.ICRD) READ(5,104) JZMAX,JZMIN
      WRITE(6,101) IXMIN,IYMIN,IZMIN,IXMAX,IYMAX,IZMAX
  101 FORMAT(1H0,20X,20HBOARD DIMENSIONS ARE,10X,6I10)
      WRITE(6,102) JZMIN,JZMAX
  102 FORMAT(1H0,43X, 14HROUTE LAYERS  ,I10,6H    TO,I10)
      READ(5,103) ICON
      NCNT=0
C
C  IF'ONLY' IS PRESENT THEN ONLY SELECTIVE ROUTING WILL BE USED IN THIS
C       ROUTER.  OTHERWISE THE ROUTING WILL BE DONE AS USUAL.
      READ (5,114) JONLY
C     READ SELECTIVE ROUTING CARDS UNTIL "END" IS FOUND.
C       STORE SIGNAL NAMES AND ROUTING MINS AND MAXS IN A 100X5 ARRAY.
      KNT=0
    1 READ(5,115) IEND,NMR,(NAM(I),I=1,12),LZMN,LZMX
  115 FORMAT(A4,5X,I1,10X,12A4,2X,2I5)
      IF(IEND.EQ.ENDA) GO TO 11112
      WRITE(6,116) IEND,NMR,(NAM(I),I=1,12),LZMN,LZMX
  116 FORMAT(1X,A4,5X,I1,10X,12A4,2X,2I5)
      IF((NMR.GE.1).AND.(NMR.LE.4)) GO TO 11110
      WRITE (6,117)
  117 FORMAT (1H1,'********** ABOVE CARD HAS NUMBER OTHER THAN 1
     1THROUGH 4 IN COLUMN 10.  PROGRAM STOPPED')
      STOP
11110 J=0
      DO 11111 I=1,NMR
      KNT=KNT+1
      J=J+1
      ISEL(KNT,1)=NAM(J)
      J=J+1
      ISEL(KNT,2)=NAM(J)
      J=J+1
      ISEL(KNT,3)=NAM(J)
      ISEL(KNT,4)=LZMN
      ISEL(KNT,5)=LZMX
11111 CONTINUE
      GO TO 1
```

```
11112 CONTINUE
C
C  READ SPECIAL ARRAYS
C
      READ(72)ISPCNT
      IH=ISPCNT(19)
      IF(IH.NE.0) READ(72)(ISPDEF(I),I=1,IH)
C
C  READ MZTB
      READ(72) MZTB
C
C  IFRDIM IS DIM.OF FRON1, FRONT2 ARRAYS. IDIMSD IS 1/3 THIS NUMBER&
C     USED IN "MAINDF" TO DETERMINE HOW MANY START POINTS MAY BE LOADED.
C  THEN IFRDIM*4 GIVES BYTE NOTATION OF LENGTH, AND "PAKSET" ADDS THIS
C     NUMBER TO ADDRESS OF (FRONT1-12) TO GIVE LIMIT OF LOADING FRONT1 IN
C     MAZER. THIS NUMBER STORED BACK IN IFRDIM OF REFBLK. SIMILARLY FOR
C     IFRDMS WITH ADDRESS OF FRONT2.
C
C
C  IF IFRDIM OR IDMPTH ARE CHANGED, THE COMMON BLOCKS MUST BE CHANGED ALSO.
C  IDMPTH IS NUMBER OF TURN POINTS ALLOWED.  IT IS DIM.OF IPTH IN TRKBLK.
      IFRDIM=3000
      IDIMSD=IFRDIM/3
      IFRDIM=IFRDIM*4
C IDMPTH USED IN TRACKR ACCORDING TO BYTE NOTATION
      IDMPTH=3996
C
C
      CALL PAKSET
      READ(5,103) IWTCH
  103 FORMAT(3I10)
      IF(IWTCH.EQ.0)IFEED=40
      IF(IWTCH.EQ.1)IFEED=55
      WRITE(6,108)
      WRITE(6,109)IFEED
  109 FORMAT(1H0,5X,I2,' MIL FEED-THROUGHS USED')
C
C     ARE FEED-THROUGHS ALLOWED OVER BUSS BARS?
C        A FEED THROUGH BARRIER BECAUSE OF PACKAGES, RANDOM BARRIERS,
C        ETC., OVERRIDE THIS PERMIT.
C
      READ(72) IFDTH
C
C  IF DATA CARD IS "RIBBON" WELDING CAN BE DONE ONLY FROM RIGHT OR
C   LEFT OF PIN.  PASS 1, 2, 3 WILL CHECK "NUMDST" FOR CODE OF
C    1.  IF THIS CODE IS PRESENT, THEY CALL A SUBROUTINE TO PUT A
C    SPECIAL BARRIER CADE ABOVE AND BELOW THE PINSOF THE EQUIVALENCE
C    SET.  THESE ARE REMOVED AT END OF PASS FOR ENTIRE SIGNAL SET..
C    REGULAR BARRIERS ARE NOT DISTURBED
C
      READ(5,555) IRIB
      IF(IRIB.NE.IPLT) NUMDST = 0
      IF(IRIB.EQ.IPLT) NUMDST = 1
  555 FORMAT(1A4)
C
C     DELTA X AND Y FOR EACH OF THREE PASSES. CONN. DELTAS SAME FOR BOTH
C        PASSES.
      READ(5,104) IDLX1,IDLY1,IDLX2,IDLY2,IDLX3,IDLY3
      READ(5,104) IDLXC1,IDLYC1,IDLXC2,IDLYC2
      READ(5,104) IBUSX,IBUSY
  104 FORMAT(8I5)
C PASS OPTION (PASSES 1, 2, 1 AND 2, OR 1 AND 2 AND 3, OR 2 AND 3<
      READ(5,105) ICAL1,ICAL2,ICAL3
  105 FORMAT(4X,I2,8X,I2,8X,I2)
C IF ONLY THREE CALLED, CHANGE TO TWO
      IF((ICAL1.EQ.0).AND.(ICAL2.EQ.0).AND.(ICAL3.EQ.3))GO TO 2
C IF ONLY THREE ARE ONE CALLED, CHANGE TO TWO & ONE
      IF((ICAL1.EQ.1).AND.(ICAL2.EQ.0).AND.(ICAL3.EQ.3))GO TO 3
      GO TO 4
    2 ICAL2=2
      ICAL3=0
      WRITE(6,108)
      WRITE(6,110)
```

```
  110 FORMAT(1H0,'PASS 3 NOT TO BE CALLED BY ITSELF. PROGRAM WILL CALL
     1PASS 2 INSTEAD.')
      GO TO 4
    3 ICAL2=2
      ICAL3=0
      WRITE(6,108)
      WRITE(6,111)
  111 FORMAT(1H0,'PASSES 1 AND 3 NOT ALLOWABLE COMBINATION.  PROGRAM WIL
     1L CALL PASSES 1 AND 2 INSTEAD')
C ICNTRL STORAGE TEMPORARILY USED TO READ IN CODES FOR VERTICAL AND HORIZON
C LAYERS.  PACK THEM BY BYTES INTO LAYTYP WITH 0 LEADING FOR FIRST LAYER.
    4 READ(5,106) (ICNTRL(I),I=1,19)
  106 FORMAT(80I1)
C PAK4 SUBROUTINE PACKS IN ARRAY LAYTYP
      CALL PAK4(LAYTYP,1,0,ICNTRL(1),ICNTRL(2),ICNTRL(3))
      CALL PAK4(LAYTYP,2,ICNTRL(4),ICNTRL(5),ICNTRL(6),ICNTRL(7))
      CALL PAK4(LAYTYP,3,ICNTRL(8),ICNTRL(9),ICNTRL(10),ICNTRL(11))
      CALL PAK4(LAYTYP,4,ICNTRL(12),ICNTRL(13),ICNTRL(14),ICNTRL(15))
      CALL PAK4(LAYTYP,5,ICNTRL(16),ICNTRL(17),ICNTRL(18),ICNTRL(19))
      WRITE(6,107) LAYTYP
  107 FORMAT(1H0,8Z16)
      READ(5,555) ICHANL
      IF(ICHANL.NE.IAUT) GO TO 405
C     NO CARDS FOLLOW. CHANNEL PRIORITIES FOR AUTOMATRIX ARE GENERATED.
      IXWT(1)=LEADX
      DO 403 J=2,125
  403 IXWT(J)=NEXTX
      WRITE(6,107) IXWT
      IYWT(1)=LEADY
      DO 404 J=2,125,3
      IYWT(J)=NY1
      IYWT(J+1)=NY2
  404 IYWT(J+2)=NY3
      GO TO 11
C ARRAY IPATH STORAGE EMPLOYED TO READ IN NUMBERS FOR CHANNEL PRIORITY.  TH
C ARE PACKED BY BYTES INTO IXWT.
  405 READ(5,106)(IPTH(I),I=1,499)
      K=1
      M1=0
      M2=1
      M3=2
      M4=3
      CALL PAK4(IXWT,K,0,IPTH(1),IPTH(2),IPTH(3))
      DO 5 J=1,124
      K=K+1
      M1=M1+4
      M2=M2+4
      M3=M3+4
      M4=M4+4
      CALL PAK4(IXWT,K,IPTH(M1),IPTH(M2),IPTH(M3),IPTH(M4))
    5 CONTINUE
      WRITE(6,107) IXWT
C SAME FOR IYWT.
      READ(5,106) (IPTH(I),I=1,499)
      K=1
      CALL PAK4(IYWT,K,0,IPTH(1),IPTH(2),IPTH(3))
      M1=0
      M2=1
      M3=2
      M4=3
      DO 10 J=1,124
      K=K+1
      M1=M1+4
      M2=M2+4
      M3=M3+4
      M4=M4+4
      CALL PAK4(IYWT,K,IPTH(M1),IPTH(M2),IPTH(M3),IPTH(M4))
   10 CONTINUE
   11 CONTINUE
C INITIATYING ERROR COUNTERS   BUSS, INTERNAL, ASSIGNED CONNECTORS, TURN PO
C AND CONNECTOR FAILURES.
      WRITE(6,107) IYWT
```

```
      KBUSF=0
      KINTF=0
      KACNF=0
      KCONF=0
      KTPTF=0
C READY TO CALL PASS1
C CALL PASSES DETERMINED BY ICAL1, ICAL2, AND ICAL3, AND BOUND BY PASSBK
C
C IF  PASS 1 ONLY OR PASS2 ONLY, READ 71, WRITE 91.
C
C IF  PASS1 AND PASS2 OR PASS2 AND PASS3, READ 71, WRITE 73, READ 73,
C     WRITE 91.
C
C IF  ALL PASSES, USE 71, 73, 74, 91.
C
C FOR ALL PASSES CHECK ICNTRL(17). IF 0, THERE WERE NO FAILURES AND
C    PASS MAY BE SKIPPED.
C
--------------------------------------------------------------------------
                                                                      (96)
C  IS PASS1 REQUESTED?
C
      IF(ICAL1.NE.1) GO TO 57
C
C PASS1 TO BE CALLED
C
C DELTA X AND Y FOR CONNECTOR.
      IDLX=IDLX1
      IDLY=IDLY1
      IDCX=IDLXC1
      IDCY=IDLYC1
      WRITE(6,112)ICAL1,IDLX,IDLY,IDCX,IDCY
  112 FORMAT(1H0,'PASS ',I1,' BEING CALLED WITH DELTA X OF',I3,', DELTA
     1 Y OF',I3,' AND CONNECTOR DELTA X AND Y OF',I3,' AND',I3)
--------------------------------------------------------------------------
                                                                      (98)
C
C  READ IN SIGNAL SET
C .
C READ IN ICNTRL ARRAY BEGINNING WITH SIGNAL NO., ETC.
   20 READ(71) ICNTRL
  152 FORMAT(1H0,10I10)
--------------------------------------------------------------------------
                                                                     (100)
C
C  END OF DATA?
C
C TEST TO SEE IF ALL SIGNALS COMPLETED.
      IF((ICNTRL(2).EQ.ENDA).AND.(ICNTRL(3).EQ.ENDB).AND.(ICNTRL(4).EQ.E
     1NDC)) GO TO 30
C NO. OF PIN ENTRIES
      M=ICNTRL(7)
      READ (71)(IPNFT(I),I=1,M)
      MM=ICNTRL(7)+1
C NO. OF ENTRIES IN ARRAY IPNFT
      N=ICNTRL(8)+M
      IF(N.NE.M) READ(71)(IPNFT(I),I=MM,N)
      INDEX=ICNTRL(9)
      IF(INDEX.NE.0) READ(71)(IPTH(I),I=1,INDEX)
C
--------------------------------------------------------------------------
                                                                     (102)
C
C  IS ROUTING REQUESTED
C
C IF SIGNAL NUMBER IS 0 OR -1, DO NOT ROUTE, DO NOT LIST
      IF(ICNTRL(1).LE.(-2)) GO TO 197
      IF(ICNTRL(17).EQ.0) GO TO 197
      IF(NCNT.GE.ICON) GO TO 197
C
C     CHECK FOR SIGNAL NAME = SELECTIVE ROUTING NAME. IF FOUND,
C       SET ROUTING MIN AND MAX TO THOSE SPECIFIED. RESTORE WHEN
```

```
C       FINISHED.
      LZMN=JZMIN
      LZMX=JZMAX
      IF(KNT.EQ.0) GO TO 11116
      DO 11115 I=1,KNT
      IF((ICNTRL(2).NE.ISEL(I,1)).OR.(ICNTRL(3).NE.ISEL(I,2)).OR.
     1(ICNTRL(4).NE.ISEL(I,3))) GO TO 11115
      JZMIN=ISEL(I,4)
      JZMAX=ISEL(I,5)
      GO TO 11116
11115 CONTINUE
      IF(JONLY.EQ.ION) GC TO 197
```

(104)

```
      CALL PASS1
C
      JZMIN=LZMN
      JZMAX=LZMX
      M=ICNTRL(7)
      MM=ICNTRL(7)+1
      N=ICNTRL(8)+M
      IF(KALL.NE.JALL) ICNTRL(20)=1
      IF(LALL.EQ.JALL) ICNTRL(20)=0
C TEST  TO CALL PASS2
  197 IF(ICAL2.EQ.2) GO TO 27
      IF((KALL.NE.JALL).AND.(ICNTRL(20).EQ.0)) GC TO 25
C
C     THIS WAS FINAL PASS. PRINT CUT RESULTS.
C
  400 FORMAT(1X,I3,2X,3A4,65X,'PIN TYPES:')
C
  150 FORMAT(1H ,6HFROM (,I3 ,1H,,I3 ,6H) TO (,I3 ,1H,,I3 ,23H)*********
     1******SUCCESS,33X,I2,' TO ',I2)
C
  151 FORMAT(1H ,6HFROM (,I3 ,1H,,I3 ,6H) TO (,I3 ,1H,,I3 ,29H)*********
     1*********** FAILURE,27X,I2,' TO ',I2)
C
 1511 FORMAT(1H ,6HFROM (,I3 ,1H,,I3 ,6H) TO (,I3 ,1H,,I3 ,  ')*********
     1*********** FAILURE TO ASSIGNED CONNECTOR',5X,I2,' TO ',I2)
C
  153 FORMAT(1H ,'******************************** FAILURE TO NON-ASSIGN
     1ED CONNECTOR')
C
  154 FORMAT(1H ,'FROM (',I3,',',I3,') TO BUSSING   ********************
     1*****FAILURE',23X,I2)
C
  155 FORMAT(1H ,'FROM (',I3,',',I3,') TO BUSSING   ********************
     1*SUCCESS',27X,I2)
C
  156 FORMAT(1H ,6HFROM (,I3 ,1H,,I3 ,6H) TO (,I3 ,1H,,I3 ,  ')*********
     1******SUCCESS ON ASSIGNED CONNECTOR',11X,I2,' TO ',I2)
C
  157 FORMAT(1H ,6HFROM (,I3 ,1H,,I3 ,6H) TO (,I3 ,1H,,I3 ,  ')*********
     1****SUCCESS ON NON-ASSIGNED CONN PIN',3X,A2,I3,2X,I2,' TO ',I2)
C
  158 FORMAT(1H ,6HFROM (,I3 ,1H,,I3 ,6H) TO (,I3 ,1H,,I3 ,  ')*********
     1****SUCCESS ON NON-ASSIGNED TEST POINT ',A2,I3,2X,I2,' TO ',I2)
C
  159 FORMAT(1H ,'FROM (',I3,',',I3,') TO NON-ASSIGNED CONNECTOR *******
     1 FAILURE',26X,I2)
C
 1599 FORMAT(1H ,'FROM (',I3,',',I3,') TO NON-ASSIGNED TEST POINT ******
     1 FAILURE',26X,I2)
C
  160 FORMAT(1X,'ROUTING WAS NOT REQUESTED FOR THIS SIGNAL')
C
  161 FORMAT(1H ,5X,'X, Y, AND TYPE OF EACH PIN FOLLOWS:'/)
C
  162 FORMAT(3X,I3,2X,I3,2X,I2)
C
```

(106)

```
C  WRITE A SIGNAL SET
C
      WRITE(6,108)
      WRITE(6,400) ICNTRL(1),ICNTRL(2),ICNTRL(3),ICNTRL(4)
      WRITE(6,1088)
 1088 FORMAT(1H )
      IF(ICNTRL(1).GT.(-2)) GO TO 199
C
C PIN LIST, SIGNAL NAME GIVEN FOR SIGNAL NUMBERS OF <-1.
C
      WRITE(6,160)
      IF(ICNTRL(7).EQ.0) GO TO 25
      WRITE(6,161)
      DO 198 I=1,M,2
      CALL GET3(IPNFT,I,IPX,IPY,IPT)
      WRITE(6,162) IPX,IPY,IPT
  198 CONTINUE
      GO TO 25
  199 IF(ICNTRL(8).NE.0) GO TO 202
C
C     IF NO FROM-TO'S ARE GIVEN, SIGNAL IS ASSUMED TO BE BUSSING
C
      DO 201 II=1,M,2
      CALL GET3(IPNFT,II,IFX,IFY,IFT)
      CALL GET3(IPNFT,II+1,IEC,IBL,NON)
      IF(IEC.EQ.1) GO TO 200
C
C     IEC IS 1 FOR BUSSING SUCCESS, 0 FOR FAILURE
C
      WRITE(6,154) IFX,IFY,IFT
      KBUSF=KBUSF+1
      GO TO 201
  200 WRITE(6,155) IFX,IFY,IFT
  201 CONTINUE
      CALL LIST
      GO TO 25
C
C     LOOP FOR NON-BUSSING SIGNAL SETS
C
  202 DO 22 II=MM,N,2
      CALL GET3(IPNFT,II,IPN1,IPN2,IFTECL)
      IF((IFTECL.NE.0).OR.(IPN2.NE.0)) GO TO 21
C
C     FAILURE ON NON-ASSIGNED CONNECTOR OR TEST POINT. SINGLE INTERNAL
C       PINS HAVE SPECIAL PRINTOUT.
C
      IF(M.EQ.2) GO TO 203
      IF((ICNTRL(15).LT.0).AND.(II.EQ.(N-1))) GO TO 2022
C     CONNECTOR
      WRITE(6,153)
      KCONF=KCONF+1
      KCNO(KCONF)=ICNTRL(1)
      GO TO 22
C     TEST POINT
 2022 WRITE(6,1533)
      KTPTF=KTPTF+1
      KTNO(KTPTF)=ICNTRL(1)
      GO TO 22
  203 MPIN=ICNTRL(IPN1)
      CALL GET3(IPNFT,MPIN,IFX,IFY,IFT)
      IF((ICNTRL(10).LT.0).AND.(II.EQ.MM)) GO TO 204
C     TEST POINT
      WRITE(6,1599) IFX,IFY,IFT
      KTPTF=KTPTF+1
      KTNO(KTPTF)=ICNTRL(1)
      GO TO 22
C     CONNECTOR
  204 WRITE(6,159) IFX,IFY,IFT
      KCONF=KCONF+1
      KCNO(KCONF)=ICNTRL(1)
      GO TO 22
C
```

```
C     SUCCESS OR INTERNAL/ASSIGNED-CONN FAILURE
C
   21 CALL GET3(IPNFT,IPN1,IFX,IFY,IFT)
      CALL GET3(IPNFT,IPN2,ITX,ITY,ITT)
      CALL GET3(IPNFT, IPN1+1, IEA, IBA, NOA)
      CALL GET3(IPNFT,IPN2+1,IEC,IBL,NON)
      IF(IFTECL.NE.0) GO TO 211
C
C     FAILURE ON INTERNAL OR ASSIGNED CONN.
C
      IF (NOA.EQ.0) GO TO 210
C     ASSIGNED CONNECTOR
      WRITE(6,1511) IFX,IFY,ITX,ITY,IFT,ITT
      KACNF=KACNF+1
      KANO(KACNF)=ICNTRL(1)
      GO TO 22
C     INTERNAL
  210 WRITE(6,151) IFX,IFY,ITX,ITY,IFT,ITT
      KINTF=KINTF+1
      KINO(KINTF)=ICNTRL(1)
      GO TO 22
C
C     SUCCESS. PRINTOUT SPECIFIES IF CONNECTION INVOLUES INTERNAL
C        CONNECTIONS, ASSIGNED CONN. OR TP, NON-ASSIGNED CONN., OR
C        NON-ASSIGNED TP.
C
  211 IF(NON.EQ.2) IDIR=ICNTRL(18)
      IF(NON.EQ.3) IDIR=ICNTRL(19)
      IF((NON.EQ.0).AND.(NOA.EQ.0)) WRITE(6,150)IFX,IFY,ITX,ITY,IFT,ITT
      IF(NOA.EQ.1)  WRITE(6,156)  IFX,IFY,ITX,ITY,IFT,ITT
      IF(NON.EQ.2) WRITE(6,157) IFX,IFY,ITX,ITY,DIR(IDIR),IBL,IFT,ITT
      IF(NON.EQ.3) WRITE(6,158) IFX,IFY,ITX,ITY,DIR(IDIR),IBL,IFT,ITT
   22 CONTINUE
      CALL LIST
      ICNTRL(20)=0
C
C END OF PRINTOUT. WRITE MODIFIED CALSS STORAGE AND CONTINUE WITH NEXT
C      SIGNAL SET.
C
   25 WRITE(91)ICNTRL
      WRITE(91) (IPNFT(I),I=1,M)
      IF(N.NE.M)WRITE(91)(IPNFT(I),I=MM,N)
      IF(INDEX.NE.0)WRITE(91)(IPTH(I),I=1,INDEX)
      GO TO 20
   27 WRITE(73) ICNTRL
      WRITE(73)(IPNFT(I),I=1,M)
      IF(N.NE.M)WRITE(73)(IPNFT(I),I=MM,N)
      IF(INDEX.NE.0)WRITE(73)(IPTH(I),I=1,INDEX)
      GO TO 20
------------------------------------------------------------------------
C                                                                 (166)
C  IS PASS2 REQUESTED?
C
   30 IF(ICAL2.NE.2) GO TO 95
      WRITE(73) ICNTRL
      REWIND 73
C
C PASS2 TO BE CALLED. 1 CALLED ALREADY
C
   35 IDLX=IDLX2
      IDLY=IDLY2
      IDCX=IDLXC2
      IDCY=IDLYC2
      WRITE(6,112) ICAL2,IDLX,IDLY,IDCX,IDCY
------------------------------------------------------------------------
C                                                                  (98)
C  READ IN SIGNAL SET
C
   40 READ(73) ICNTRL
      IF((ICNTRL(2).EQ.ENDA).AND.(ICNTRL(3).EQ.ENDB).AND.(ICNTRL(4).EQ.E
     1NDC)) GO TO 55
```

```
      M=ICNTRL(7)
      READ(73)(IPNFT(I),I=1,M)
      MM=ICNTRL(7)+1
      N=ICNTRL(8)+M
      IF(N.NE.M) READ(73)(IPNFT(I),I=MM,N)
      INDEX=ICNTRL(9)
      IF(INDEX.NE.0) READ(73)(IPTH(I),I=1,INDEX)
C
C IF SIGNAL NUMBER IS 0 OR -1, DO NOT ROUTE, DO NOT LIST
```

---

(102)

```
C
C  IS ROUTING REQUESTED?
C
      IF(ICNTRL(1).LE.(-2)) GO TO 41
      IF(ICNTRL(17).EQ.0) GO TO 41
      IF(NCNT.GE.ICON) GO TO 41
C
C     CHECK FOR SIGNAL NAME = SELECTIVE ROUTING NAME. IF FOUND,
C       SET ROUTING MIN AND MAX TO THOSE SPECIFIED. RESTORE WHEN
C       FINISHED.
      LZMN=JZMIN
      LZMX=JZMAX
      IF(KNT.EQ.0) GO TO 11121
      DO 11120 I=1,KNT
      IF((ICNTRL(2).NE.ISEL(I,1)).OR.(ICNTRL(3).NE.ISEL(I,2)).OR.
     1(ICNTRL(4).NE.ISEL(I,3))) GO TO 11120
      JZMIN=ISEL(I,4)
      JZMAX=ISEL(I,5)
      GO TO 11121
11120 CONTINUE
      IF(JONLY.EQ.ION) GO TO 41
11121 CONTINUE
```

---

(104)

```
      CALL PASS2
C
      JZMIN=LZMN
      JZMAX=LZMX
      M=ICNTRL(7)
      MM=ICNTRL(7)+1
      N=ICNTRL(8)+M
      IF(KALL.NE.JALL) ICNTRL(20)=1
      IF(LALL.EQ.JALL) ICNTRL(20)=0
   41 IF(ICAL3.EQ.3) GO TO 53
      IF((KALL.NE.JALL).AND.(ICNTRL(20).EQ.0)) GO TO 50
C
C     THIS WAS FINAL PASS. PRINT OUT RESULTS.
C
  108 FORMAT(1H0)
```

---

(164)

```
C
C  WRITE SIGNAL SET
C
      WRITE(6,108)
      WRITE(6,400) ICNTRL(1),ICNTRL(2),ICNTRL(3),ICNTRL(4)
      WRITE(6,1088)
      IF(ICNTRL(1).GT.(-2)) GO TO 410
C
C PIN LIST, SIGNAL NAME GIVEN FOR SIGNAL NUMBERS OF <-1.
C
      WRITE(6,160)
      IF(ICNTRL(7).EQ.0)GO TO 50
      WRITE(6,161)
      DO 409 I=1,M,2
      CALL GET3(IPNFT,I,IPX,IPY,IPT)
      WRITE(6,162) IPX,IPY,IPT
  409 CONTINUE
      GO TO 50
  410 IF(ICNTRL(8).NE.0) GO TO 413
C
C     IF NO FROM-TO'S ARE GIVEN, SIGNAL IS ASSUMED TO BE BUSSING
```

```
C
      DO 412 II=1,M,2
      CALL GET3(IPNFT,II,IFX,IFY,IFT)
      CALL GET3(IPNFT,II+1,IEC,IBL,NON)
      IF(IEC.EQ.1) GO TO 411
C
C     IEC IS 1 FOR BUSSING SUCCESS, 0 FOR FAILURE
C
      WRITE(6,154) IFX,IFY,IFT
      KBUSF=KBUSF+1
      GO TO 412
  411 WRITE(6,155) IFX,IFY,IFT
  412 CONTINUE
      CALL LIST
      GO TO 50
C
C     LOOP FOR NON-BUSSING SIGNAL SETS
C
  413 DO 43 II=MM,N,2
      CALL GET3(IPNFT,II,IPN1,IPN2,IFTECL)
      IF((IFTECL.NE.0).OR.(IPN2.NE.0)) GO TO 42
C
C     FAILURE ON NON-ASSIGNED CONNECTOR OR TEST POINT. SINGLE INTERNAL
C       PINS HAVE SPECIAL PRINTOUT.
C
      IF(M.EQ.2) GO TO 414
      IF((ICNTRL(15).LT.0).AND.(II.EQ.(N-1))) GO TO 4133
C     CONNECTOR
      WRITE(6,153)
      KCONF=KCONF+1
      KCNO(KCONF)=ICNTRL(1)
      GO TO 43
C     TEST POINT
 4133 WRITE(6,1533)
      KTPTF=KTPTF+1
      KTNO(KTPTF)=ICNTRL(1)
      GO TO 43
  414 MPIN=ICNTRL(IPN1)
      CALL GET3(IPNFT,MPIN,IFX,IFY,IFT)
      IF((ICNTRL(10).LT.0).AND.(II.EQ.MM)) GO TO 415
C     TEST POINT
      WRITE(6,1599) IFX,IFY,IFT
      KTPTF=KTPTF+1
      KTNO(KTPTF)=ICNTRL(1)
      GO TO 43
C     CONNECTOR
  415 WRITE(6,159) IFX,IFY,IFT
      KCONF=KCONF+1
      KCNO(KCONF)=ICNTRL(1)
      GO TO 43
C
C     SUCCESS OR INTERNAL/ASSIGNED-CONN FAILURE
C
   42 CALL GET3(IPNFT,IPN1,IFX,IFY,IFT)
      CALL GET3(IPNFT,IPN2,ITX,ITY,ITT)
      CALL GET3(IPNFT,IPN1+1,IEA,IBA,NOA)
      CALL GET3(IPNFT,IPN2+1,IEC,IBL,NON)
      IF(IFTECL.NE.0) GO TO 422
C
C     FAILURE ON INTERNAL OR ASSIGNED CONN.
C
      IF (NOA.EQ.0) GO TO 420
C     ASSIGNED CONNECTOR
      WRITE(6,1511) IFX,IFY,ITX,ITY,IFT,ITT
      KACNF=KACNF+1
      KANO(KACNF)=ICNTRL(1)
      GO TO 43
C     INTERNAL
  420 WRITE(6,151) IFX,IFY,ITX,ITY,IFT,ITT
      KINTF=KINTF+1
      KINO(KINTF)=ICNTRL(1)
      GO TO 43
C
```

```
C     SUCCESS. PRINTOUT SPECIFIES IF CONNECTION INVOLVES INTERNAL
C        CONNECTIONS, ASSIGNED CONN. OR TP, NON-ASSIGNED CONN., OR
C        NON-ASSIGNED TP.
C
  422 IF(NON.EQ.2) IDIR=ICNTRL(18)
      IF(NON.EQ.3) IDIR=ICNTRL(19)
      IF((NON.EQ.0).AND.(NOA.EQ.0)) WRITE (6,150)IFX,IFY,ITX,ITY,IFT,ITT
      IF(NOA.EQ.1)  WRITE(6,156) IFX,IFY,ITX,ITY,IFT,ITT
      IF(NON.EQ.2) WRITE(6,157) IFX,IFY,ITX,ITY,DIR(IDIR),IBL,IFT,ITT
      IF(NON.EQ.3) WRITE(6,158) IFX,IFY,ITX,ITY,DIR(IDIR),IBL,IFT,ITT
   43 CONTINUE
      CALL LIST
      ICNTRL(20)=0
C
C END OF PRINTOUT. WRITE MODIFIED CALSS STORAGE AND CONTINUE WITH NEXT
C       SIGNAL SET.
C
   50 WRITE(91) ICNTRL
      WRITE(91) (IPNFT(I),I=1,M)
      IF(N.NE.M)WRITE(91)(IPNFT(I),I=MM,N)
      IF(INDEX.NE.0)WRITE(91)(IPTH(I),I=1,INDEX)
      GO TO 40
   53 WRITE(74) ICNTRL
      WRITE(74) (IPNFT(I),I=1,M)
      IF(N.NE.M)WRITE(74)(IPNFT(I),I=MM,N)
      IF(INDEX.NE.0)WRITE(74)(IPTH(I),I=1,INDEX)
      GO TO 40
   55 IF(ICAL3.NE.3) GO TO 95
      WRITE(74) ICNTRL
      REWIND 74
      ID=74
      GO TO 75
C
C PASS2 TO BE CALLED
C PASS1 WAS NOT CALLED
C
   57 IDLX=IDLX2
      IDLY=IDLY2
      IDCX=IDLXC1
      IDCY=IDLYC1
      WRITE(6,112) ICAL2,IDLX,IDLY,IDCX,IDCY
   60 READ(71) ICNTRL
      IF((ICNTRL(2).EQ.ENDA).AND.(ICNTRL(3).EQ.ENDB).AND.(ICNTRL(4).EQ.E
     1NDC)) GO TO 70
      M=ICNTRL(7)
      READ (71)(IPNFT(I),I=1,M)
      MM=ICNTRL(7)+1
      N=ICNTRL(8)+M
      IF(N.NE.M) READ(71)(IPNFT(I),I=MM,N)
      INDEX=ICNTRL(9)
      IF(INDEX.NE.0) READ(71)(IPTH(I),I=1,INDEX)
C
C IF SIGNAL NUMBER IS 0 OR -1, DO NOT ROUTE, DO NOT LIST
      IF(ICNTRL(1).LE.(-2)) GO TO 808
      IF(ICNTRL(17).EQ.0) GO TO 808
      IF(NCNT.GE.ICON) GO TO 808
C
C     CHECK FOR SIGNAL NAME = SELECTIVE ROUTING NAME. IF FOUND,
C       SET ROUTING MIN AND MAX TO THOSE SPECIFIED. RESTORE WHEN
C       FINISHED.
      LZMN=JZMIN
      LZMX=JZMAX
      IF(KNT.EQ.0) GO TO 11126
      DO 11125 I=1,KNT
      IF((ICNTRL(2).NE.ISEL(I,1)).OR.(ICNTRL(3).NE.ISEL(I,2)).OR.
     1(ICNTRL(4).NE.ISEL(I,3))) GO TO 11125
      JZMIN=ISEL(I,4)
      JZMAX=ISEL(I,5)
      GO TO 11126
11125 CONTINUE
      IF(JONLY.EQ.ION) GO TO 808
11126 CONTINUE
```

```
C
      CALL PASS2
C
      JZMIN=LZMN
      JZMAX=LZMX
      M=ICNTRL(7)
      MM=ICNTRL(7)+1
      N=ICNTRL(8)+M
      IF(KALL.NE.JALL) ICNTRL(20)=1
      IF(LALL.EQ.JALL) ICNTRL(20)=0
  808 IF(ICAL3.EQ.3) GO TO 67
      IF((KALL.NE.JALL).AND.(ICNTRL(20).EQ.0)) GO TC 65
C
C     THIS WAS FINAL PASS. PRINT OUT RESULTS.
C
      WRITE(6,108)
      WRITE(6,400) ICNTRL(1),ICNTRL(2),ICNTRL(3),ICNTRL(4)
      WRITE(6,1088)
      IF(ICNTRL(1).GT.(-2)) GO TC 810
C
C PIN LIST, SIGNAL NAME GIVEN FOR SIGNAL NUMBERS OF <-1.
C
      WRITE(6,160)
      IF(ICNTRL(7).EQ.0)GO TC 65
      WRITE(6,161)
      DO 809 I=1,M,2
      CALL GET3(IPNFT,I,IPX,IPY,IPT)
      WRITE(6,162) IPX,IPY,IPT
  809 CONTINUE
      GO TO 65
  810 IF(ICNTRL(8).NE.0) GO TO 813
C
C     IF NO FROM-TO'S ARE GIVEN, SIGNAL IS ASSUMED TO BE BUSSING
C
      DC 812 II=1,M,2
      CALL GET3(IPNFT,II,IFX,IFY,IFT)
      CALL GET3(IPNFT,II+1,IEC,IBL,NON)
      IF(IEC.EQ.1) GO TC 811
C
C     IEC IS 1 FOR BUSSING SUCCESS, 0 FOR FAILURE
C
      WRITE(6,154) IFX,IFY,IFT
      KBUSF=KBUSF+1
      GO TO 812
  811 WRITE(6,155) IFX,IFY,IFT
  812 CONTINUE
      CALL LIST
      GO TO 65
C
C     LOOP FOR NON-BUSSING SIGNAL SETS
C
  813 DO 62 II=MM,N,2
      CALL GET3(IPNFT,II,IPN1,IPN2,IFTECL)
      IF((IFTECL.NE.0).OR.(IPN2.NE.0)) GO TO 61
C
C     FAILURE ON NON-ASSIGNED CONNECTOR OR TEST POINT. SINGLE INTERNAL
C       PINS HAVE SPECIAL PRINTOUT.
C
      IF(M.EQ.2) GO TO 814
      IF((ICNTRL(15).LT.0).AND.(II.EQ.(N-1))) GO TO 8133
C     CONNECTOR
      WRITE(6,153)
      KCONF=KCONF+1
      KCNO(KCONF)=ICNTRL(1)
      GO TO 62
C     TEST POINT
 8133 WRITE(6,1533)
      KTPTF=KTPTF+1
      KTNO(KTPTF)=ICNTRL(1)
      GO TO 62
  814 MPIN=ICNTRL(IPN1)
      CALL GET3(IPNFT,MPIN,IFX,IFY,IFT)
```

```
      IF((ICNTRL(10).LT.0).AND.(II.EQ.MM)) GC TC 815
C     TEST POINT
      WRITE(6,1599) IFX,IFY,IFT
      KTPTF=KTPTF+1
      KTNO(KTPTF)=ICNTRL(1)
      GO TO 62
C     CONNECTOR
  815 WRITE(6,159) IFX,IFY,IFT
      KCONF=KCONF+1
      KCNO(KCONF)=ICNTRL(1)
      GO TO 62
C
C     SUCCESS OR INTERNAL/ASSIGNED-CONN FAILURE
C
   61 CALL GET3(IPNFT,IPN1,IFX,IFY,IFT)
      CALL GET3(IPNFT,IPN2,ITX,ITY,ITT)
      CALL GET3(IPNFT,IPN1+1,IEA,IBA,NOA)
      CALL GET3(IPNFT,IPN2+1,IEC,IBL,NON)
      IF(IFTECL.NE.0) GC TO 611
C
C     FAILURE ON INTERNAL OR ASSIGNED CONN.
C
      IF (NOA.EQ.0) GO TC 610
C     ASSIGNED CONNECTOR
      WRITE(6,1511) IFX,IFY,ITX,ITY,IFT,ITT
      KACNF=KACNF+1
      KANO(KACNF)=ICNTRL(1)
      GO TO 62
C     INTERNAL
  610 WRITE(6,151) IFX,IFY,ITX,ITY,IFT,ITT
      KINTF=KINTF+1
      KINO(KINTF)=ICNTRL(1)
      GO TO 62
C
C     SUCCESS. PRINTOUT SPECIFIES IF CONNECTION INVOLUES INTERNAL
C        CONNECTIONS, ASSIGNED CONN. OR TP, NON-ASSIGNED CONN., OR
C        NON-ASSIGNED TP.
C
  611 IF(NON.EQ.2) IDIR=ICNTRL(18)
      IF(NON.EQ.3) IDIR=ICNTRL(19)
      IF((NON.EQ.0).AND.(NOA.EQ.0)) WRITE (6,150)IFX,IFY,ITX,ITY,IFT,ITT
      IF(NOA.EQ.1)  WRITE(6,156) IFX,IFY,ITX,ITY,IFT,ITT
      IF(NON.EQ.2) WRITE(6,157) IFX,IFY,ITX,ITY,DIR(IDIR),IBL,IFT,ITT
      IF(NON.EQ.3) WRITE(6,158) IFX,IFY,ITX,ITY,DIR(IDIR),IBL,IFT,ITT
   62 CONTINUF
      CALL LIST
      ICNTRL(20)=0
C
C END OF PRINTOUT. WRITE MODIFIED CALSS STORAGE AND CONTINUE WITH NEXT
C      SIGNAL SET.
C
   65 WRITE(91)ICNTRL
      WRITE(91)(IPNFT(I),I=1,M)
      IF(N.NE.M)WRITE(91)(IPNFT(I),I=MM,N)
      IF(INDEX.NE.0)WRITE(91)(IPTH(I),I=1,INDEX)
      GO TO 60
   67 WRITE(73) ICNTRL
      WRITE(73) (IPNFT(I),I=1,M)
      IF(N.NE.M)WRITE(73)(IPNFT(I),I=MM,N)
      IF(INDEX.NE.0)WRITE(73)(IPTH(I),I=1,INDEX)
      GO TO 60
```

(202)

```
C
C  IS PASS3 REQUESTED?
C
   70 IF(ICAL3.NE.3) GO TO 95
      WRITE(73) ICNTRL
      ID=73
      REWIND ID
C
C PASS3 TO BE CALLED. 2 AND MAYBE 1 ALREADY CALLED.
C
```

```
   75 IDLX=IDLX3
      IDLY=IDLY3
      IDCX=IDLXC2
      IDCY=IDLYC2
      IF(ICAL1.EQ.0) WRITE(6,112) ICAL3,IDLX,IDLY,IDCX,IDCY
      IF(ICAL1.NE.0) WRITE(6,113) ICAL3,IDLX,IDLY
  113 FORMAT(1H0,'PASS ',I1,' BEING CALLED WITH DELTA X OF',I3,', DELTA
     1 Y OF',I3,' AND NC CONNECTOR PASS CALLED')
-----------------------------------------------------------------------
                                                                  (98)
C
C  READ IN SIGNAL SET
C
   80 READ(ID)  ICNTRL
-----------------------------------------------------------------------
                                                                 (100)
C
C  END OF DATA?
C
      IF((ICNTRL(2).EQ.ENDA).AND.(ICNTRL(3).EQ.ENDB).AND.(ICNTRL(4).EQ.E
     1NDC)) GO TO 95
      M=ICNTRL(7)
      READ(ID) (IPNFT(I),I=1,M)
      MM=ICNTRL(7)+1
      N=ICNTRL(8)+M
      IF(N.NE.M) READ(ID)(IPNFT(I),I=MM,N)
      INDEX=ICNTRL(9)
      IF(INDEX.NE.0) READ(ID)(IPTH(I),I=1,INDEX)
-----------------------------------------------------------------------
                                                                 (102)
C
C  IS ROUTING REQUESTED?
C
C IF SIGNAL NUMBER IS 0 OR -1, DO NOT ROUTE, DO NOT LIST
      IF(ICNTRL(1).LE.(-2)) GO TO 81
      IF(ICNTRL(17).EQ.0) GO TO 81
      IF(NCNT.GE.ICON) GO TO 81
C
C     CHECK FOR SIGNAL NAME = SELECTIVE ROUTING NAME. IF FOUND,
C       SET ROUTING MIN AND MAX TO THOSE SPECIFIED. RESTORE WHEN
C       FINISHED.
      LZMN=JZMIN
      LZMX=JZMAX
      IF(KNT.EQ.0) GO TO 11130
      DO 11130 I=1,KNT
      IF((ICNTRL(2).NE.ISEL(I,1)).OR.(ICNTRL(3).NE.ISEL(I,2)).OR.
     1(ICNTRL(4).NE.ISEL(I,3))) GO TO 11130
      JZMIN=ISEL(I,4)
      JZMAX=ISEL(I,5)
      GO TO 11131
11130 CONTINUE
      IF(JONLY.EQ.ION) GO TO 81
11131 CONTINUE
-----------------------------------------------------------------------
                                                                 (104)
      CALL PASS3
C
      JZMIN=LZMN
      JZMAX=LZMX
      M=ICNTRL(7)
      MM=ICNTRL(7)+1
      N=ICNTRL(8)+M
      IF(KALL.NE.JALL) ICNTRL(20)=1
      IF(LALL.EQ.JALL) ICNTRL(20)=0
C
C     THIS WAS FINAL PASS. PRINT OUT RESULTS.
C
   81 IF((KALL.NE.JALL).AND.(ICNTRL(20).EQ.0)) GO TO 84
-----------------------------------------------------------------------
                                                                 (164)
C
C  WRITE SIGNAL SET
```

```
C
      WRITE(6,108)
      WRITE(6,400) ICNTRL(1),ICNTRL(2),ICNTRL(3),ICNTRL(4)
      WRITE(6,1088)
      IF(ICNTRL(1).GT.(-2)) GO TO 910
C
C PIN LIST, SIGNAL NAME GIVEN FOR SIGNAL NUMBERS OF <-1.
C
      WRITE(6,160)
      IF(ICNTRL(7).EQ.0)GO TC 84
      WRITE(6,161)
      DO 909 I=1,M,2
      CALL GET3(IPNFT,I,IPX,IPY,IPT)
      WRITE(6,162) IPX,IPY,IPT
  909 CONTINUE
      GO TO 84
  910 IF(ICNTRL(8).NE.0) GO TO 913
C
C     IF NO FROM-TO'S ARE GIVEN, SIGNAL IS ASSUMED TO BE BUSSING
C
      DO 912 II=1,M,2
      CALL GET3(IPNFT,II,IFX,IFY,IFT)
      CALL GET3(IPNFT,II+1,IEC,IBL,NON)
      IF(IEC.EQ.1) GO TC 911
C
C     IEC IS 1 FOR BUSSING SUCCESS, 0 FOR FAILURE
C
      WRITE(6,154) IFX,IFY,IFT
      KBUSF=KBUSF+1
      GO TO 912
  911 WRITE(6,155) IFX,IFY,IFT
  912 CONTINUE
      CALL LIST
      GO TO 84
C
C     LOOP FOR NON-BUSSING SIGNAL SETS
C
  913 DO 83 II=MM,N,2
      CALL GET3(IPNFT,II,IPN1,IPN2,IFTECL)
      IF((IFTECL.NE.0).CR.(IPN2.NE.0)) GO TO 82
C
C     FAILURE ON NON-ASSIGNED CONNECTOR OR TEST POINT. SINGLE INTERNAL
C       PINS HAVE SPECIAL PRINTOUT.
C
      IF(M.EQ.2) GO TO 914
      IF((ICNTRL(15).LT.0).AND.(II.EQ.(N-1))) GO TO 9133
C     CONNECTOR
      WRITE(6,153)
      KCONF=KCONF+1
      KCNO(KCONF)=ICNTRL(1)
      GO TO 83
C     TEST POINT
 9133 WRITE(6,1533)
      KTPTF=KTPTF+1
      KTNO(KTPTF)=ICNTRL(1)
      GO TO 83
  914 MPIN=ICNTRL(IPN1)
      CALL GET3(IPNFT,MPIN,IFX,IFY,IFT)
      IF((ICNTRL(10).LT.0).AND.(II.EQ.MM)) GO TO 915
C     TEST POINT
      WRITE(6,1599) IFX,IFY,IFT
      KTPTF=KTPTF+1
      KTNO(KTPTF)=ICNTRL(1)
      GO TO 83
C     CONNECTOR
  915 WRITE(6,159) IFX,IFY,IFT
      KCONF=KCONF+1
      KCNO(KCONF)=ICNTRL(1)
      GO TO 83
C
C     SUCCESS OR INTERNAL/ASSIGNED-CONN FAILURE
C
```

```
   82 CALL GET3(IPNFT,IPN1,IFX,IFY,IFT)
      CALL GET3(IPNFT,IPN2,ITX,ITY,ITT)
      CALL GET3(IPNFT,IPN1+1,IEA,IBA,NOA)
      CALL GET3(IPNFT,IPN2+1,IEC,IBL,NON)
      IF(IFTECL.NE.0) GO TO 822
C
C     FAILURE ON INTERNAL OR ASSIGNED CONN.
C
      IF (NOA.EQ.0) GO TO 820
C     ASSIGNED CONNECTOR
      WRITE(6,1511) IFX,IFY,ITX,ITY,IFT,ITT
      KACNF=KACNF+1
      KANO(KACNF)=ICNTRL(1)
      GO TO 83
C     INTERNAL
  820 WRITE(6,151) IFX,IFY,ITX,ITY,IFT,ITT
      KINTF=KINTF+1
      KINO(KINTF)=ICNTRL(1)
      GO TO 83
C
C     SUCCESS. PRINTOUT SPECIFIES IF CONNECTION INVOLVES INTERNAL
C        CONNECTIONS, ASSIGNED CONN. OR TP, NON-ASSIGNED CONN., OR
C        NON-ASSIGNED TP.
C
  822 IF(NON.EQ.2) IDIR=ICNTRL(18)
      IF(NON.EQ.3) IDIR=ICNTRL(19)
      IF((NON.EQ.0).AND.(NOA.EQ.0)) WRITE (6,150)IFX,IFY,ITX,ITY,IFT,ITT
      IF(NOA.EQ.1)  WRITE(6,156) IFX,IFY,ITX,ITY,IFT,ITT
      IF(NON.EQ.2) WRITE(6,157) IFX,IFY,ITX,ITY,DIR(IDIR),IBL,IFT,ITT
      IF(NON.EQ.3) WRITE(6,158) IFX,IFY,ITX,ITY,DIR(IDIR),IBL,IFT,ITT
   83 CONTINUE
      CALL LIST
      ICNTRL(20)=0
C
C END OF PRINTOUT. WRITE MODIFIED CALSS STORAGE AND CONTINUE WITH NEXT
C      SIGNAL SET.
C
   84 WRITE(91) ICNTRL
      WRITE(91)(IPNFT(I),I=1,M)
      IF(N.NE.M)WRITE(91) (IPNFT(I),I=MM,N)
      IF(INDEX.NE.0)WRITE(91)(IPTH(I),I=1,INDEX)
      GO TO 80
   95 WRITE(91) ICNTRL
      REWIND 91
      WRITE(92) ISTOP
      WRITE(92) IXMAX,IYMAX,IZMAX,IXMIN,IYMIN,IZMIN,JZMAX,JZMIN
      WRITE(92)ISPCNT
      IH=ISPCNT(19)
      IF(IH.NE.0) WRITE(92)(ISPDEF(I),I=1,IH)
      WRITE(92) MZTB
      WRITE(92) IFDTH
   97 READ(72) IXT,IYT,ITT
      WRITE(92) IXT,IYT,ITT
      IF(IXT.GE.0) GO TO 97
      REWIND 92
      IF(KBUSF.NE.0) WRITE(7,12115) KBUSF
12115 FORMAT(1H0,10X,'TOTAL NUMBER OF FAILURES FOR BUSSING:',I5)
      IF(KINTF.EQ.0) GO TO 976
      WRITE(7,12116) KINTF
12116 FORMAT(1H0,10X,'TOTAL NUMBER OF FAILURES FOR INTERNAL CONNECTIONS:
     1',I5)
      WRITE(7,12117)
12117 FORMAT(1H0,15X,'SIGNAL NUMBER OF EACH FAILURE FOLLOWS:')
      WRITE(7,12118)(KINO(I),I=1,KINTF)
12118 FORMAT(1H ,17X,I10)
  976 IF(KACNF.EQ.0) GO TO 977
      WRITE(7,21160) KACNF
21160 FORMAT(1H0,10X,'TOTAL NUMBER OF FAILURES TO ASSIGNED CONNECTOR:
     1I5)
      WRITE(7,12117)
      WRITE(7,12118) (KANO(I),I=1,KACNF)
  977 IF(KCONF.EQ.0) GO TO 978
      WRITE(7,12119) KCONF
```

```
12119 FORMAT(1H0,10X,'TOTAL NUMBER OF FAILURES TO NON-ASSIGNED CONNECTOR
     1:',I5)
      WRITE(7,12117)
      WRITE(7,12118) (KCNO(I),I=1,KCONF)
  978 IF(KTPTF.EQ.0) GO TO 979
      WRITE(7,12120) KTPTF
12120 FORMAT(1H0,10X,'TOTAL NUMBER OF FAILURES TO NON-ASSIGNED TEST POIN
     1TS:',I5)
      WRITE(7,12117)
      WRITE(7,12118) (KTNO(I),I=1,KTPTF)
  979 WRITE(6,12121)
12121 FORMAT(1H0,'*****  END OF ROUTED SIGNALS  *****')
      IF(NCNT.GE.ICON) WRITE(6,12111) NCNT
12111 FORMAT(1H1,'*******************',I10,2X,'SUCCESSES REACHED ---
     1THIS PROGRAM TERMINATED.')
      IF(IPR.NE.IPRNT) RETURN
      IF(IZERO.NE.IBLNK) JZMIN=0
      IF(IZERO.EQ.ION) JZMAX=0
      JXMIN=IXMIN
      JXMAX=IXMAX
      JYMIN=IYMIN
      JYMAX=IYMAX
      CALL BDPRT
C MAZEM IS THE CONTROL SUBROUTINE.  IT READS IN THE SIGNALS, PIN LOCATIONS, TYPE
C TURN POINTS.  IT CHECKS PASS CALL CODES (ICAL1,ICAL2,ICAL3) AND CALLS
C COMBINATIONS OF THE PASS SUBROUTINES.  IT INITIATES AND MODIFIES ERROR AN
C  ERROR TYPE COUNTERS.  THIS SUBROUTINE CALLS PAKSET, PAK4, GET3,
C       LIST, PASS1, PASS2, AND PASS3.  IT PRINTS OUT INFORMATION--PIN
C      LOCATION, TYPE, SUCCESS-FAILURE INDICATORS, ETC.
C 2 CONTROL ARRAYS FOR EACH SIGNAL SET ARE ON THE DATA CELL, EACH
C   FOLLOWED BY TURN-POINT ARRAY
C CONTROL PROGRAM CALLS EACH SET INTO CORE (SEE COMMON/ARRBLK) FOR EACH
C   PASS, CHECKS TO SEE IF ALL FR-TO'S HAVE BEEN ROUTED, AND IF NOT
C   CALLS THE PASS UNLESS SIGNAL NUMBER IS LT OR EQ TO 0.
C THE SIGNAL SETS ARE EACH STORED ON A DISK, WINDING UP ON THE DATA CELL
C   AT COMPLETION.
      CONTINUE
C FIRST ARRAY - ICNTRL(25)
C  1 SIGNAL NUMBER --- IF LT OR EQ TO 0, DON'T ROUTE
C  2,3,4,5,6 SIGNAL NAME ( ONLY 2,3,4 USED IN THIS PROGRAM)
C  7  NUMBER OF ENTRIES IN THE PIN ARRAY FOR THAT SIGNAL (2 ENTRIES FOR EAC
C   NON-ASSIGNED CONNECTORS AND TEST POINTS NOT INCLUDED IN PIN ARRAY
C  8 NUMBER OF ENTRIES IN FROM-TO ARRAY (2 ENTRIES FOR EACH FROM-TO, BUSSIN
C   NO FROM-TO'S, AND 0 IN TO POSITION FOR UNASSIGNED CONN. AND TP)
C  9 INDEX OF TURN POINTS IN IPTH
C 10 LEVEL- NEGATIVE IF CONNECTOR TO BE RUN, 1-10 IF BUSSING.
C 11,12,13,14 NORTH, SOUTH, EAST AND WEST PINS (CLOSEST TO THAT EDGE)
C       ENTRY IS A NUMBER WHICH POINTS TO AN ENTRY OF IPNFT.
C 15 TEST POINT INDICATOR, NEG. IF NON-ASSIGNED TP
C 16 EQUIVALENCE NO. COUNTER - INCREMENTS WITH EACH NEW NUMBER ASSIGNED.
C 17 FAILURE COUNT. INITIALIZES TO 0 AT BEGINNING OF EACH PASS.
      RETURN
C SECON ARRAY - IPNFT(200)
C TWO ENTRIES FOR EACH PIN, NO. OF ENTRIES GIVEN IN ICNTRL(7).  GIVES X, Y,
C    ,E-NO., BL, AND ASSIGNED CONN. CODE;
C     TWO ENTRIES FOR EACH FROM-TO, NO. OF ENTRIES GIVEN IN ICNTRL(8).
C     INCLUDES FROM PIN NO., TO PIN, E-NO. OF FROM-TO (0 IF NOT ROUTED),
C     LO AND HI ENTRIES OF IPH
C THIRD ARRAY - IPTH(1000)
C     ENTRIES ARE TURN-POINTS OF PATHS, GIVEN BY X,Y,Z WITH BUFFER OF 0
C     BETWEEN EACH FR-TO. LOADED BY TRACKER.
C 2 ARRAYS DESCRIBE SPECIAL CASES OF BOARD (BUSSING, CONN., TEST POINTS)
C FIRST ARRAY - ISPCNT(20)
C  FIRST 10 ENTRIES FOR EACH LEVEL OF BUSSING. EACH ENTRY A LO, HI
C     POINTING TO ENTRIES IN ISPDEF
C  ONE OF NEXT 4 POSITIONS IS LO, HI FOR CONNECTOR PINS IN ISPDEF.
C  ONE OF NEXT 4 POSITIONS SAME AS ABOVE FOR TEST POINTS.
C SECOND ARRAY - ISPDEF(1000)
C  FIRST SECTION FOR BUSSING. TWO ENTRIES DEFINE A RECTANGULAR AREA FOR
C     BUSSING BY X,Y, Z.
C  NEXT TWO SECTIONS ARE PINS FOR CONNECTOR AND TEST POINT, EACH GIVEN
C     AN X,Y  TYPE
```

```
C       AN X,Y  TYPE
        END
```

PROGRAM LISTING IV

```
      SUBROUTINE FRMTO
      DIMENSION IPNET(800),ICNTRL(25),IP(400),IFRM(400),JFRM(400),ID(400
     1),JD(400),IBFRM(420),IBTO(420)
      COMMON/BLK/M(400),N(400)
      READ(72)ISTOP
      IF(ISTOP.EQ.1) STOP
      READ(5,90)JTEST
   90 FORMAT(A4)
      DATA ITEST/'PRNT'/,IG1/'END '/,IG2/'OF D'/,IG3/'ATA '/
      READ(72)IBMAXX,IBMAXY,IBMAXZ,IBMINX,IBMINY,IBMINZ
  111 READ(71)(ICNTRL(I),I=1,25)
      IF((ICNTRL(2).EQ.IG1).AND.(ICNTRL(3).EQ.IG2).AND.(ICNTRL(4).EQ.IG3
     1))GO TO 1003
      NN=ICNTRL(7)
      ICNTRL(11)=0
      ICNTRL(12)=0
      ICNTRL(13)=0
      ICNTRL(14)=0
  555 READ(71)(IPNET(I),I=1,NN)
         LOGICAL*1 LPINS(3200)
      EQUIVALENCE (IPNET,LPINS)
      IDEL=0
      MAXY=0
      MAXX=0
      MINX=2147483647
      MINY=2147483647
      K2=0
      K1=NN-1
      II=0
      I=0
      K7=K1
      DO 28 II=2,NN,2
      I=I+8
      IF(LPINS(I))GO TO 29
      GO TO 28
   29 IXL=(I/4)-1
      I=I-8
      DO 62 IN=1,2
      ITEMP1=IPNET(K7)
      IPNET(K7)=IPNET(IXL)
      IPNET(IXL)=ITEMP1
      IXL=IXL+1
   62 K7=K7+1
      K7=K7-4
      IDEL=IDEL+1
   28 CONTINUE
      I=NN/2
      IF(IDEL.EQ.I)IDEL=0
      IF(IDEL.GT.1) IDEL=0
      K1=K1-(IDEL+IDEL)
   31 DO 1 I=1,K1,2
      K2=K2+1
      CALL GET3(IPNET,I,IX,IY,IBLK)
      M(K2)=IX
      N(K2)=IY
      IF(MAXX.LT.IX)ICNTRL(13)=I
      IF(MAXX.LT.IX)MAXX=IX
      IF(IX.LT.MINX)ICNTRL(14)=I
      IF(IX.LT.MINX)MINX=IX
      IF(MAXY.LT.IY)ICNTRL(11)=I
      IF(MAXY.LT.IY)MAXY=IY
      IF(IY.LT.MINY)ICNTRL(12)=I
      IF(IY.LT.MINY)MINY=IY
```

```
    1 CONTINUE
      LST=NN-1
      IF((ICNTRL(10).GT.0).OR.(ICNTRL(1).LE.0)) GO TO 707
      N8=(NN/2)-IDEL
      L=0
      LL=N8-1
      IF(NN.EQ.2)GO TO 56
      IF(K1.EQ.1)GO TO 4397
      DO 4 I=2,N8
      IB(I)=0
      IFRM(I)=1
      CALL WEIGHT(M,1,I,N,1,I,K3)
    4 ID(I)=K3
      KFRM=1
      KTO=2
      MIN=ID(2)
    5 DO 6 I=2,N8
      IF(IB(I).GT.0.OR.ID(I).GE.MIN)GO TO 6
      KFRM=IFRM(I)
      KTO=I
      MIN=ID(I)
    6 CONTINUE
      L=L+1
      IBFRM(L)=KTO+KTO-1
      IBTO(L)=KFRM+KFRM-1
      IF(L.GE.LL)GO TO 1001
      IB(KTO)=1
      DO 8 I=2,N8
      JFRM(I)=KTO
      IF(IB(I).GT.0)GO TO 8
      CALL WEIGHT(M,KTO,I,N,KTO,I,K3)
      JD(I)=K3
    8 CONTINUE
      DO 9 I=2,N8
      IF(ID(I).LE.JD(I)) GO TO 9
      IFRM(I)=JFRM(I)
      ID(I)=JD(I)
    9 CONTINUE
      DO 10 I=2,N8
      IF(IB(I).EQ.0)GO TO 11
   10 CONTINUE
   11 KFRM=IFRM(I)
      KTO=I
      MIN=ID(I)
      GO TO 5
 1001 CONTINUE
 4397 CONTINUE
      IF(IDEL.EQ.0)GO TO 56
      K1=K1+2
      K5=NN-1
      DO 43 I=K1,K5,2
      K2=K2+1
      CALL GET3(IPNET,I,IX,IY,IBLK)
      M(K2)=IX
      N(K2)=IY
      MIN=2147483647
      DO 41 I2=1,N8
      CALL WEIGHT(M,K2,I2,N,K2,K2,K3)
      IF(MIN.LT.K3)GO TO 41
      MIN=K3
      I3=I2
   41 CONTINUE
      L=L+1
      IBFRM(L)=I
      IBTO(L)=I3+I3-1
   43 CONTINUE
   56 LST=L+L+NN-1
      JIN=0
      IF(ICNTRL(10).EQ.0)GO TO 85
      I=0
      IT=10
   57 ICNTRL(IT)=-ICNTRL(IT)
      CALL GET4(ICNTRL,IT,INORTH,ISOUTH,IEAST,IWEST)
```

```
      LST=LST+2
      J=1111111111
      IF(INORTH.NE.11)GO TO 81
      J=IBMAXY-MAXY
      I=11
   81 IF(ISOUTH.NE.12)GO TO 82
      K=MINY-IBMINY
      IF(J.LE.K)GO TO 82
      J=K
      I=12
   82 IF(IEAST.NE.13)GO TO 83
      K=IBMAXX-MAXX
      IF(J.LE.K)GO TO 83
      J=K
      I=13
   83 IF(IWEST.NE.14)GO TO 84
      K=MINX-IBMINX
      IF(J.LE.K)GO TO 84
      J=K
      I=14
   84 IPNET(LST)=1048576*I
      ICNTRL(IT)=-ICNTRL(IT)
   85 IF(ICNTRL(15).GE.0) GO TO 86
      JIN=JIN+1
      IF(JIN.EQ.2)GO TO 86
      IT=15
      GO TO 57
   86 J77=NN-1
      IF(L.EQ.0)GO TO 389
      DO 44 I=1,L
      J77=J77+2
      IFROM=IBFRM(I)
      ITO=IBTO(I)
      ITO=ITO*256
      IFROM=IFROM*1048576
   44 IPNET(J77)=IFROM+ITO
  389 CONTINUE
      J78=NN+1
      IMA=0
  707 K5=NN/2
      IF(ITEST.NE.JTEST)GO TO 1000
      WRITE(6,821)
  821 FORMAT(1X,50H**************************************************)
      K7=(LST-NN+1)/2
      WRITE(6,701)(ICNTRL(I),I=2,6),ICNTRL(1),K5,K7
  701 FORMAT(1X,'SIGNAL',2X,5A4,2X,'NUMBER',I5,2X,'HAS',I5,2X,'PINS AND'
     1  ,I5,2X,9HFROM-TO'S,//,20X,'*** PIN LIST ***')
      N7=(I/2)+1
      DO 740 I=1,NN,2
      CALL GET3(IPNET,I,IX,IY,ITYP)
  740 WRITE(6,750)N7,ITYP,IX,IY
  750 FORMAT(15X,'PIN',I4,5X,'TYPE',1X,I4,5X,'(',I3,',',I3,')')
      IF((ICNTRL(10).GT.0).OR.(ICNTRL(1).LE.0)) GO TO 112
      WRITE(6,760)
  760 FORMAT(19X,'*** FROM-TO LIST ***')
      DO 45 I=J78,LST,2
      CALL GET3(IPNET,I,IFROM,ITO,IBLK)
      IF(ITO.NE.0)GO TO 37
      JO=ICNTRL(IFROM)
      CALL GET3(IPNET,JO,IX,IY,IBLK1)
      IMA=IMA+1
      IF(ICNTRL(10).GE.C)GO TO 71
      IF(IMA.GT.1)GO TO 71
      J07=(JO/2)+1
      WRITE(6,107)J07,IX,IY
  107  FORMAT(6X,36HNON-ASSIGNED CONNECTOR RUN, FROM PIN,I4,3H  (,I3,1H,
     1,I3,1H))
      GO TO 70
   71  WRITE(6,119)IFROM,IX,IY
  119  FORMAT(6X,37HNON-ASSIGNED TEST POINT RUN, FROM PIN,I4,3H  (,I3,1H
     1,,I3,1H))
   70 CONTINUE
      GO TO 45
```

```
   37 CALL GET3(IPNET,IFROM,IX,IY,ITPE)
      CALL GET3(IPNET,ITO,IX1,IY1,ITPE1)
      JFROM=(IFROM/2)+1
      JTO=(ITO/2)+1
      WRITE(6,101)JFROM,IX,IY,ITPE,JTO,IX1,IY1,ITPE1
  101 FORMAT(10X,8HFROM PIN,I4,2H (,I3,1H,,I3,6H) TYPE,I8,7H TO PIN,I4,2
     1H (,I3,1H,,I3,6H) TYPE,I8)
   45 CONTINUE
 1000 ICNTRL(8)=(LST-NN+1)
  112 CONTINUE
C STORE CONTROL ARRAY AND PIN ARRAY ON TAPE HERE
      WRITE(73)ICNTRL
      WRITE(73)(IPNET(I),I=1,NN)
      IF(ICNTRL(8).EQ.0)GO TO 790
      NNN=NN+ICNTRL(8)
      NN=NN+1
      WRITE(73)(IPNET(I),I=NN,NNN)
  790 CONTINUE
      GO TO 111
 1003 CONTINUE
C STORE TAPE ON DATA SET HERE.............
      WRITE(73)ICNTRL
 1004 CONTINUE
      REWIND 73
      REWIND 71
  781 READ(73)ICNTRL
      WRITE(71)ICNTRL
      IF((IG1.EQ.ICNTRL(2)).AND.(IG2.EQ.ICNTRL(3)).AND.(IG3.EQ.ICNTRL(4)
     1))GO TO 782
      NN=ICNTRL(7)
      J=ICNTRL(8)
      READ(73)(IPNET(I),I=1,NN)
      WRITE(71)(IPNET(I),I=1,NN)
      IF(J.EQ.0)GO TO 780
      NNN=NN+J
      NN=NN+1
      READ(73)(IPNET(I),I=NN,NNN)
      WRITE(71)(IPNET(I),I=NN,NNN)
  780 CONTINUE
      GO TO 781
  782 REWIND 71
      REWIND 73
      WRITE(6,6197)
 6197 FORMAT(///' ----*****----****----COMPLETION OF FROM-TO PROGRAM----*
     $***----****----'///)
      WRITE(6,7582)
 7582 FORMAT(1H1)
      RETURN
      END


      SUBROUTINE WEIGHT(M,I,J,N,I9,J9,K3)
      DIMENSION M(400),N(400)
      K1=M(I)-M(J)
      K2=N(I)-N(J)
      IF(K1.LT.0)K1=M(J)-M(I)
      IF(K2.LT.0)K2=N(J)-N(I)
      K3=K1+K2
      RETURN
      END


      SUBROUTINE SORT
C
C        TOTAL SIGNAL COUNT INCREASED TO 3000 3-1-71---MFE
C
      IMPLICIT INTEGER (A-Z)
      DATA ITEST/'PRNT'/
      REWIND 72
      READ(5,90)JTEST
   90 FORMAT(A4)
      READ(72)STO
```

```
      IF(STO .EQ.1)GO TO 500
      INTEGER*4 SMPR(1000)/1000*0/,LO(1000)/1000*0/,HI(1000)/1000*0/,CNT
     1RL*4(25)/25*0/,PNET*4(800)/800*0/,SSET*4(30000)/30000*0/,I*4/0/,J*
     24/0/,I1*4/1/
      DATA END/'END '/,OF/'OF D'/,DATA/'ATA '/
C       THE PURPOSE OF THIS PROGRAM IS TO ORDER FROM-TO OUTPUT FROM
C     LEAST TO GREATEST SEMIPERIMETER PROGRAMMED 1-15-68 BY MFE.
      READ(72)MAXX,MAXY,MAXZ,MINX,MINY,MINZ
C READ 25-WORD CONTROL ARRAY
 2001 FORMAT(1X,I10,I10)
    1 READ(71)CNTRL
C CHECK FOR END OF DATA
      IF((CNTRL(2).EQ.END).AND.(CNTRL(3).EQ.OF).AND.(CNTRL(4).EQ.DATA))
     1GO TO 200
C READ PINS AND FROM-TOS
      NOPN=CNTRL(7)
      READ(71)(PNET(M),M=1,NOPN)
      FRTOST=NOPN+1
      NOFT=CNTRL(8)+NOPN
      IF(NOFT.NE.NOPN)READ(71)(PNET(M),M=FRTOST,NOFT)
      I=I+1
      J=J+1
      LO(I)=J
C CHECK FOR MORE THAN 1000 DIFFERENT SIGNALS
      IF(I.LE.1000)GO TO 2
      REWIND 72
      WRITE(72)I1
      WRITE(6,101)
  101 FORMAT(' MORE THAN 1000 SIGNALS IN DATA---PROGRAM CRATERED')
      STOP
    2 SMPR(I)=0
      IF(NOFT.EQ.NOPN) GO TO 3
C READY TO GENERATE SEMIPERIMETER FOR THIS SET
      SP=0
      DO 5 K=FRTOST,NOFT,2
      CALL GET3(PNET,K,F,T,TR)
      IF(T.NE.0)GO TO 4
      K7=CNTRL(F)
      CALL GET3(PNET,K7,XF,YF,TYP1)
      IF(F.GT.12)GO TO 75
      XT=XF
      IF(F.EQ.11)YT=MAXY
      IF(F.EQ.12)YT=MINY
      GO TO 5
   75 YT=YF
      IF(F.EQ.13)XT=MAXX
      IF(F.EQ.14)XT=MINX
      GO TO 5
    4 CALL GET3(PNET,T,XT,YT,TYP1)
      CALL GET3(PNET,F,XF,YF,TYP1)
    5 SP=SP+IABS(XF-XT)+IABS(YF-YT)
      IF(NOPN.EQ.2) SP = SP/2
      SMPR(I)=SP
C STORE 1ST 15 WORDS OF CNTRL-ARRAY IN SSET-ARRAY
    3 DO 57 K=1,15
      IF(J.LE.30000)GO TO 6
    8 REWIND 72
      WRITE(72)I1
      WRITE(6,102)
  102 FORMAT(' TOTAL ENTRIES OF ALL SIGNAL SETS EXCEEDED 30000---PROGRAM
     1 CRATERED')
      STOP
    6 SSET(J)=CNTRL(K)
   57 J=J+1
C STORE PINS AND FROM-TOS IN SSET ARRAY
      PNPET=NOFT
      DO 7 K=1,PNPET
      IF(J.GT.30000)GO TO 8
      SSET(J)=PNET(K)
    7 J=J+1
      J=J-1
      HI(I)=J
```

```
      GO TO 1
C READY TO SORT
  200 CALL ISORT(I,SMPR,LO,HI)
C READY TO PUT DATA BACK ON DS1.
      REWIND 71
      DO 201 J=1,25
  201 CNTRL(J)=0
      CNTRL(17)=1
      DO 202 J=1,400
  202 PNFT(J)=0
      DO 203 J=1,I
      DO 204 K=1,15
      TLO=LO(J)-1+K
  204 CNTRL(K)=SSET(TLO)
C READY TO WRITE CNTRL ON DS1
      IF(ITEST.EQ.JTEST) WRITE(6,400)(CNTRL(L),L=1,13)
  400 FORMAT(1X,I5,5X,5A4,5X,7I10)
      WRITE(71)CNTRL
      L=0
      LOWK=TLO+1
      HIK=HI(J)
      DO 205 K=LOWK,HIK
      L=L+1
  205 PNFT(L)=SSET(K)
C READY TO WRITE PINS ON DS1
      NOPN=CNTRL(7)
      WRITE(71)(PNFT(M),M=1,NOPN)
      FRTOST=NOPN+1
      NOFT=CNTRL(8)+NOPN
      DO 401 L=1,NOFT,2
      II=(L/2)+1
      CALL GET3(PNFT,L,X,Y,TYP)
  401 IF(ITEST.EQ.JTEST) WRITE(6,402)II,X,Y,TYP
  402 FORMAT(1X,4I10)
      IF(NOFT.NE.NOPN)WRITE(71)(PNFT(K),K=FRTOST,NOFT)
  203 CONTINUE
C READY TO WRITE END OF DATA ON DS1.
      CNTRL(2)=END
      CNTRL(3)=OF
      CNTRL(4)=DATA
      WRITE(71)CNTRL
  500 CONTINUE
      REWIND 71
      WRITE(6,6197)
 6197 FORMAT(///' ----****----****----COMPLETION OF SORT PROGRAM----****
     *----****----'///)
      WRITE(6,7582)
 7582 FORMAT(1H1)
      RETURN
      DEBUG SUBCHK
      END
```

PROGRAM LISTING V

```
      SUBROUTINE PASS1
      COMMON/PASSBK/IDLX1,IDLY1,IDLX2,IDLY2,IDLX3,IDLY3,IDLXC1,IDLYC1,ID
     1LXC2,IDLYC2,ICAL1,ICAL2,ICAL3
      COMMON/STDSBK/NUMST,NUMDST,IR1CON,IQUIT,IDIMSD,ISTDST(50)
      COMMON/ARRBLK/ICNTRL(25),IPNFT(800),ISPCNT(20),ISPDEF(1000)
      COMMON/REFBLK/IX,IY,IYCON,IZ,IZCON,IXMAX,IYMAX,IZMAX,IXMIN,IYMIN,
     1IZMIN,JXMAX,JYMAX,JZMAX,JXMIN,JYMIN,JZMIN,IPKNO,IFRDIM,IYCON2,
     2IZCON2,IYCPZC,IYCP1,LAYTYP(5),IZTB(20),IFRDMS
      COMMON/TRKBLK/IDMPTH,IWTCH,INDEX,IXST,IYST,IZST,IXDS,IYDS,IZDS,
     1IXWT(125),IYWT(125),IPTH(1000)
      COMMON/BNDBLK/IXZL,IYZL,IZZL,IXZH,IYZH,IZZH,IXHL,IYHL,IXHH,IYHH,
     1IXVL,IYVL,IXVH,IYVH,IDLX,IDLY,IDCX,IDCY
      COMMON/SFBK/ISF(120),ITSF
      COMMON/CNTBK/NCNT
C   THE PURPOSE OF PASS1 IS TO ROUTE A SIGNAL SET USING PASS1 BOUNDING
C AND TO ASSIGN EQUIVALENCE SET NUMBERS TO EACH PIN AND TO EACH PATH
```

```
C ROUTED.
C PASS1  BOUNDING  THE TWO POINTS ARE CONNECTED BY A PATH ALONG THE PERIME
C OF A RECTANGLE WHOSE EXTREMES ARE DEFINED BY THE POINTS, WITH A THICKNESS
C IDLX1, IDLY1 (INPUT DATA).  THE ROUTING IS RESTRICTED TO THIS PATH AREA A
C FURTHER MODIFIED BY LAYTYP WHICH DEFINES THE VERTICAL OR HORIZONTAL
C PREFERENCE OF THE LAYER.  FEED THROUGHS ARE ALLOWED ONLY AT INTERSECTIONS
C LAYER TYPE.
C
C ICNTRL(17) IS SET TO 0, INCREMENTED WITH EACH FAILURE
      ICNTRL(17)=0
C
C  IF NUMDST = 1 WELDING MUST BE DONE RIGHT OR LEFT.  BARRIERS ARE
C    PLACED ABOVE AND BELOW EACH PIN OF SIGNAL SET WITH A CODE OF "2".
C   IF "1" BARRIER ALREADY THERE, DC NOT CHANGE.
C
      IF(NUMDST.EQ.1) CALL RIBBON
C
C MAKE ALL PINS AND ROUTED PATHS AVAILABLE FOR SIGNAL SET
      NBRPN=ICNTRL(7)
      IPKNO=0
      DO 5 I=1,NBRPN,2
      CALL GET3(IPNFT,I,IFX,IFY,ITYP)
      CALL TYPES(1,ITYP,IFX,IFY)
    5 CONTINUE
      CALL MAINDF(0,IECL,1,0,1)
C CHECK FOR FUSS ROUTING-LEVEL FROM 1 TO 10
```

---

(106)

```
C
C  IS BUSSING REQUESTED?
C
      IF((ICNTRL(10).LT.1).OR.(ICNTRL(10).GT.10)) GO TO 11
C BARRIER BUSS BARS
```

---

(108)

```
      CALL BUSS
      GO TO 44
C NON-ASSIGNED CONNECTOR PINS
   11 I=NBRPN-1
```

---

(110)

```
C
C  IS THERE ANOTHER FROM-TO?
C
C IUPPER = NO. FROM TO'S
C ISTFT IS THE RELATIVE ADDRESS OF FIRST F.T.
C ITITFT IS THE RELATIVE ADDRESS OF LAST F.T.
      IUPPER=ICNTRL(8)/2
      ISTFT=NBRPN+1
      ITOTFT=ICNTRL(7)+ICNTRL(8)
      ITSF = 0
C LOOK FOR CHECKING FROM-TO'S. CONNECTORS INCLUDED
      DO 34 KOUNT=1,IUPPER
      I=I+2
C IPN1 = REL. A(FROM PIN)
C IPN2 = REL. A(TO PIN)
      CALL GET3(IPNFT,I,IPN1,IPN2,IFTECL)
```

---

(112)

```
C
C  HAS IT BEEN ROUTED?
C
C CHECK TO SEE IF FR-TO PREVIOUSLY ROUTED
C IF IFTECL = 0, PIN WAS NOT ROUTED.
      IF(IFTECL.NE.0) GC TC 34
```

---

(114)

```
C
C  IS THIS A NON-ASSIGNED CONNECTOR OR TESTPOINT
C
C CHECK FOR CONNECTOR OR TEST POINT
      IF(IPN2.NE.0) GO TC 12
```

```
      IF(ICNTRL(10).GE.0) GO TO 111
```

(138)

```
      CALL PASSIC(I,IPN1,IPN1)
      IF(ICNTRL(7).NE.NBRPN) I=I+2
      NBRPN=ICNTRL(7)
      GO TO 34
C CHECK FOR NON-ASSIGNED TEST POINT.
  111 IF(ICNTRL(15).GE.0) GO TO 112
C CALL PASSIC FOR NON-ASSIGNED CONNECTOR PINS.
      CALL PASSIC(I,IPN1,IPN1+4)
      GO TO 34
  112 WRITE(6,150) ICNTRL(2),ICNTRL(3),ICNTRL(4)
  150 FORMAT(1H1,'***FROM-TO LIST OF SIGNAL',3A4,'HAS UNROUTED ENTRY FOR
     1CONNECTOR OR TEST POINT, BUT ICNTRL(10) AND ICNTRL(15) ARE POSITIV
     2E')
      RETURN
   12 CALL GET3(IPNFT,IPN1,IFX,IFY,ITYP1)
      CALL GET3(IPNFT,IPN2,ITX,ITY,ITYP2)
C DEFINE CORNERS OF RUN-RECTANGLE
      LOX=MIN(IFX,ITX)
      LOY=MIN(IFY,ITY)
      IHX=MAX(IFX,ITX)
      IHY=MAX(IFY,ITY)
C DEFINE CORNERS OF RUN RECTANGLE + OR - DELTAX,DELTAY---AND J-X,Y,Z
C MAXES AND MINS.
      JXMIN=MAX(LOX-IDLX,IXMIN)
      IXZL=JXMIN
      JYMIN=MAX(LOY-IDLY,IYMIN)
      IYZL=JYMIN
      JXMAX=MIN(IHX+IDLX,IXMAX)
      IXZH=JXMAX
      JYMAX=MIN(IHY+IDLY,IYMAX)
      IYZH=JYMAX
      IZZL=JZMIN
      IZZH=JZMAX
C READY TO ZERO MAZE-RUN AREA AND CLOSE BOUNDING AREA ON LAYER 0
C CALL CLOSE FIRST
      CALL CLOSE
      CALL MZERO
```

(116)

```
C
C  CALL BOUNDING INSTRUCTIONS
C
C  READY TO BOUND RUN AREAS
      IXVL=JXMIN
      IXVH=MIN(LOX+IDLX,IXMAX)
      IYVL=JYMIN
      IYVH=JYMAX
      IZ=0
      DO 122 IX=IXVL,IXVH
      DO 122 IY=IYVL,IYVH
      IPKNO=IGTMZ(IDUM)
      IPKNO=IAND(IPKNO,2)
  122 CALL IPTMZ
      IXVH=JXMAX
      IXVL=MAX(IHX-IDLX,IXMIN)
      IZ=0
      DO 123 IX=IXVL,IXVH
      DO 123 IY=IYVL,IYVH
      IPKNO=IGTMZ(IDUM)
      IPKNO=IAND(IPKNO,2)
  123 CALL IPTMZ
      IXHL=JXMIN
      IXHH=JXMAX
      IYHH=MIN(LOY+IDLY,JYMAX)
      IYHL=JYMIN
      IZ=0
      DO 124 IX=IXHL,IXHH
      DO 124 IY=IYHL,IYHH
      IPKNO=IGTMZ(IDUM)
```

```
      IPKNO=IAND(IPKNO,1)
  124 CALL IPTMZ
      IYHH=JYMAX
      IYHL=MAX(IHY-IDLY,JYMIN)
      IZ=0
      DO 125 IX=IXHL,IXHH
      DO 125 IY=IYHL,IYHH
      IPKNO=IGTMZ(IDUM)
      IPKNO=IAND(IPKNO,1)
  125 CALL IPTMZ
```

---

(130)

```
C
C  DEFINE START AND DESTINATION POINTS
C
C READ TO LOAD STARTING AND DESTINATION CELLS
      CALL GET3(IPNFT,IPN1+1,IECL1,IB1,NON1)
      CALL GET3(IPNFT,IPN2+1,IECL2,IB2,NON2)
C DEFINE CLASSIFICATION OF RUN
C IF, KASE 1, NEITHER F NOR T PREVIOUSLY ROUTED.
C          2, BOTH F AND T PREVIOUSLY ROUTED.
C          3, F PIN PREVIOUSLY ROUTED.
C          4, T PIN PREVIOUSLY ROUTED.
      IF((IECL1.EQ.0).AND.(IECL2.EQ.0))KASE=1
      IF((IECL1.NE.0).AND.(IECL2.NE.0))KASE=2
      IF((IECL1.NE.0).AND.(IECL2.EQ.0))KASE=3
      IF((IECL1.EQ.0).AND.(IECL2.NE.0))KASE=4
C IRICON IS INITIALIZED TO 0 FOR FIRST LOADING OF ISTDST
C DEFINE MAZE RUN IN TERMS OF THE KASE DEFINED ABOVE
      IRICON=0
      NUMST=0
      IPKNO=3
      GO TO (13,14,15,16),KASE
C NEITHER FROM NOR TO ARE MEMBERS OF AN EQUIVALENCE SET
C   LOAD STARTING ARRAY WITH FROM SET. DESTINATIONS ARE TO SET.
C IF FIRST PARAMETER,
C         = 1, CALL IPTBD IN TYPES
C         = 2, CALL IPTBD AND LOAD ISTDST
C         = 3, LOAD ISTDST
   13 CALL TYPES(3,ITYP1,IFX,IFY)
      CALL TYPES(1,ITYP2,ITX,ITY)
      CALL STDST
      GO TO 17
C  BOTH FROM AND TO ARE IN E-CLASSES
   14 CALL TYPES(3,ITYP1,IFX,IFY)
      CALL TYPES(1,ITYP2,ITX,ITY)
C LOAD ALL CONNECTED PINS AS START OR DESTINATIONS
      ICNTOT=45-IZMAX
      DO 145 J=1,NBRPN,2
      CALL GET3(IPNFT,J+1,IEC,IBL,NON)
      IF(IEC.NE.IECL1) GO TO 144
      IF(NUMST.LT.ICNTOT) GO TO 143
      CALL STDST
      NUMST=0
  143 CALL GET3(IPNFT,J,IX,IY,IT)
      CALL TYPES(3,IT,IX,IY)
      GO TO 145
  144 IF(IEC.NE.IECL2) GO TO 145
      CALL GET3(IPNFT,J,IX,IY,IT)
      CALL TYPES(1,IT,IX,IY)
  145 CONTINUE
      CALL STDST
      NUMST=0
      CALL MAINDF(0,IECL1,0,1,0)
C MAINDF CALLS STDST WHEN FOURTH ARGUMENT IS 1
      CALL MAINDF(3,IECL2,0,0,1)
      GO TO 17
C ONLY FROM IN E-CLASS
C  LOAD TO IN START ARRAY. FROM SET IS DESTINATIONS.
   15 CALL TYPES(1,ITYP1,IFX,IFY)
C LOAD ALL CONNECTED PINS AS DESTINATIONS
      DO 146 J=1,NBRPN,2
```

```
      CALL GET3(IPNFT,J+1,IEC,IBL,NON)
      IF(IEC.NE.IECL1) GO TO 146
      CALL GET3(IPNFT,J,IX,IY,IT)
      CALL TYPES(1,IT,IX,IY)
  146 CONTINUE
      CALL TYPES(3,ITYP2,ITX,ITY)
      CALL MAINDF(3,IECL1,0,0,1)
      CALL STDST
      GO TO 17
C ONLY TO IN E-CLASS
C  LOAD FROM IN START ARRAY. TO SET IN DESTINATIONS.
   16 CALL TYPES(3,ITYP1,IFX,IFY)
      CALL TYPES(1,ITYP2,ITX,ITY)
      DO 147 J=1,NBRPN,2
      CALL GET3(IPNFT,J+1,IEC,IBL,NON)
      IF(IEC.NE.IECL2) GO TO 147
      CALL GET3(IPNFT,J,IX,IY,IT)
      CALL TYPES(1,IT,IX,IY)
  147 CONTINUE
      CALL MAINDF(3,IECL2,0,0,1)
      CALL STDST
C OLD HI +1 IS NEW LO.
   17 JDEX=INDEX+1
```

---

(132)

```
C
C  CALL MAZE
C
      K=MAZER(IQUIT)
 1522 FORMAT(1H0,12Z10)
      IF(ITSF.LT.120) GO TO 18
      WRITE(6,1000) ICNTRL(1), (ISF(J), J=1,ITSF)
 1000 FORMAT(1H0,I10,2X,120I1)
      ITSF = 0
   18 ITSF = ITSF + 1
      ISF(ITSF) = K
  152 FORMAT(1H0,10I10)
C RESTORE DESTINATION CELLS TO AVAILABLE
      IPKNO=0
      GO TO (20,22,21,22),KASE
C KASE1 HAD ONLY TYPES CALLED
   20 CALL TYPES(1,ITYP2,ITX,ITY)
      GO TO 222
C KASE3 HAD DESTINATIONS ON FROM SET
   21 CALL TYPES(1,ITYP1,IFX,IFY)
      DO 210 J=1,NBRPN,2
      CALL GET3(IPNFT,J+1,IEC,IBL,NON)
      IF(IEC.NE.IECL1) GO TO 210
      CALL GET3(IPNFT,J,IX,IY,IT)
      CALL TYPES(1,IT,IX,IY)
  210 CONTINUE
      CALL MAINDF(0,IECL1,0,0,1)
      GO TO 222
C KASE2 AND KASE4 HAD TYPES AND MAINDF CALLED
   22 CALL TYPES(1,ITYP2,ITX,ITY)
      DO 220 J=1,NBRPN,2
      CALL GET3(IPNFT,J+1,IEC,IBL,NON)
      IF(IEC.NE.IECL2) GO TO 220
      CALL GET3(IPNFT,J,IX,IY,IT)
      CALL TYPES(1,IT,IX,IY)
  220 CONTINUE
      CALL MAINDF(0,IECL2,0,0,1)
  222 IF(K.EQ.2) GO TO 26
C MAZER NOT SUCCESSFUL
      ICNTRL(17)=ICNTRL(17)+1
      GO TO 34
C MAZER WAS SUCCESSFUL. REDEFINE E-NO.
```

---

(134)

```
C
C  STORE INFORMATION ABOUT PATH FOUND AND PINS SELECTED
C
```

```
C STORE INDEX IN CONTROL ARRAY
   26 ICNTRL(9)=INDEX
      NCNT=NCNT+1
      GO TO (27,28,30,31),KASE
C GIVE NEW E-NO. TO F-T AND BOTH PINS
```

(136)

```
C
C  DEFINE EQUIVALENCE CLASS TO WHICH ROUTING BELONGS
C
   27 IECN=ICNTRL(16)+1
      ICNTRL(16)=IECN
      CALL PAK3(IPNFT,I,IPN1,IPN2,IECN)
      CALL PAK3(IPNFT,IPN1+1,IECN,IB1,NON1)
      CALL PAK3(IPNFT,IPN2+1,IECN,IB2,NON2)
      GO TO 32
C ASSIGN MIN(IECL1,IECL2) TO EVERYTHING
   28 IEC=MIN(IECL1,IECL2)
      IECMX=MAX(IECL1,IECL2)
      CALL PAK3(IPNFT,I,IPN1,IPN2,IEC)
      CALL PAK3(IPNFT,IPN1+1,IEC,IB1,NON1)
      CALL PAK3(IPNFT,IPN2+1,IEC,IB2,NON2)
      DO 29 J=ISTFT,ITOTFT,2
      CALL GET3(IPNFT,J,IF,IT,IE)
      IF(IE.NE.IECMX) GO TO 29
      CALL PAK3(IPNFT,J,IF,IT,IEC)
      CALL GET3(IPNFT,IF+1,ICLD,IBL,NON)
      CALL PAK3(IPNFT,IF+1,IEC,IBL,NON)
      CALL GET3(IPNFT,IT+1,ICLD,IBL,NON)
      CALL PAK3(IPNFT,IT+1,IEC,IBL,NON)
   29 CONTINUE
      GO TO 32
C FROM-TO GETS FROM E-NO.
   30 CALL PAK3(IPNFT,I,IPN1,IPN2,IECL1)
C GIVE FROM E-NO. TO TO PIN
      CALL PAK3(IPNFT,IPN2+1,IECL1,IB2,NON2)
      GO TO 32
C FROM-TO GETS TO E-NO.
   31 CALL PAK3(IPNFT,I,IPN1,IPN2,IECL2)
C GIVE TO E-NO. TO FROM PIN
      CALL PAK3(IPNFT,IPN1+1,IECL2,IB1,NON1)
C TRACKER LOADED IPTH WITH NEW TURN POINTS.
C  LOAD NEW LO, HI INTO IPNFT
   32 CALL PAK3(IPNFT,I+1,JDEX,INDEX,0)
C END OF LOOP FOR INTERNAL CONNECTIONS
   34 CONTINUE
      IF(ITSF.NE.0) WRITE(6,1000) ICNTRL(1),(ISF(I),I=1,ITSF)
C
C    REMOVE "2" BARRIER CODES.
   44 IF(NUMDST.EQ.1) CALL UNRIBN
C
C REBARRIER ALL PINS
      IPKNO = 1
      DO 50 I=1,NBRPN,2
      CALL GET3(IPNFT,I,IFX,IFY,ITYP)
      CALL TYPES(1,ITYP,IFX,IFY)
   50 CONTINUE
C REBARRIER ALL OF IPTH
      CALL MAINDF(1,IEC,1,0,1)
      RETURN
C SUBROUTINE PASS1 CHECKS FROM-TO'S FOR MEMBERS OF EQUIVALENCE SET.
C DEFINES THE KASE NUMBERS, MAKES EQUIVALANCED FROM-TO'S AVALIABLE FOR ROUT
C ANYWHERE A
C ANYWHERE ALONG PREVIOUSLY SIGNAL.  IT ASSIGNS EQUIVALANCE NUMBERS PER ROU
C "NODE", CALLS STDST, REMOVES BARRIER CODE OF 2 AROUND PINS WITH NUMB
C "NODE", CALLS STDST, REMOVES BARRIER CODE OF 2 AROUND PINS WITH NUMDST =
C REBARRIERS ALL PINS WITH IPKNO OF 1.
      END
```

PROGRAM LISTING VI

```
      SUBROUTINE PASS1C(I,KPIN,JPIN)
      COMMON /FRNT1/ IFRNT1(3000)
      COMMON/PASSBK/IDLX1,IDLY1,IDLX2,IDLY2,IDLX3,IDLY3,IDLXC1,IDLYC1,ID
     1LXC2,IDLYC2,ICAL1,ICAL2,ICAL3
      COMMON/STDSBK/NUMST,NUMDST,IR1CON,IQUIT,ICIMSC,ISTDST(50)
      COMMON/ARRBLK/ICNTRL(25),IPNFT(800),ISPCNT(20),ISPDEF(1000)
      COMMON/REFBLK/IX,IY,IYCON,IZ,IZCON,IXMAX,IYMAX,IZMAX,IXMIN,IYMIN,
     1IZMIN,JXMAX,JYMAX,JZMAX,JXMIN,JYMIN,JZMIN,IPKNO,IFRDIM,IYCON2,
     2IZCON2,IYCPZC,IYCP1,LAYTYP(5),IZTB(20),IFRCMS
      COMMON/TRKBLK/IDMPTH,IWTCH,INDEX,IXST,IYST,IZST,IXDS,IYDS,IZDS,
     1IXWT(125),IYWT(125),IPTH(1000)
      COMMON/BNDBLK/IXZL,IYZL,IZZL,IXZH,IYZH,IZZH,IXHL,IYHL,IXHH,IYHH,
     1IXVL,IYVL,IXVH,IYVH,IDLX,IDLY,IDCX,IDCY
      COMMON/SFBK/ISF(120),ITSF
      COMMON/CNTBK/NCNT
C     PASS1C WAS CALLED BECAUSE ICNTRL(10) WAS NEGATIVE, IMPLYING THERE
C   IS A CONNECTOR TO BE RUN, THAT IT HAS NOT BEEN PREVIOUSLY ROUTED,
C IF THIS RUN FAILS, E-NO. CNTR WILL INCREMENT, LEVEL WILL NOT CHANGE,
C IF SUCCESSFUL, LEVEL WILL NOT BE NEGATIVE AND THE FR-TO
C        WILL HAVE THE FROM-PIN, CONN PIN, ECL, AND LO-HI
C   ENTRY FOR IPTH.
      IR1CON=0
      NUMST=0
      NUMTOT=0
C BOUNDING IS FROM MPIN TO CONN. BY IDLX,IDLY
      MPIN=ICNTRL(KPIN)
      CALL GET3(IPNFT,MPIN,IXP,IYP,ITY)
      CALL GET3(IPNFT,MPIN+1,IECL,IBL,NON)
      IF(KPIN.EQ.11) N=1
      IF(KPIN.EQ.12) N=2
      IF(KPIN.EQ.13) N=3
      IF(KPIN.EQ.14) N=4
      GO TO (20,22,24,26),N
------------------------------------------------------------------------
                                                              (140)(142)
C
C CONNECTOR IS NORTH
C
   20 JXMIN=MAX(IXP-IDCX,IXMIN)
      JYMIN=MAX(IYP-IDCY,IYMIN)
      JXMAX=MIN(IXP+IDCX,IXMAX)
      JYMAX=IYMAX
      IXVL=JXMIN
      IXVH=JXMAX
      IYVL=JYMIN
      IYVH=JYMAX
      IXHL=JXMIN
      IXHH=JXMAX
      IYHL=JYMIN
      IYHH = MIN(IYP+IDCY,IYMAX)
      GO TO 30
------------------------------------------------------------------------
                                                              (140)(142)
C
C CONNECTOR IS SOUTH
C
   22 JXMIN=MAX(IXP-IDCX,IXMIN)
      JYMIN=IYMIN
      JXMAX=MIN(IXP+IDCX,IXMAX)
      JYMAX=MIN(IYP+IDCY,IYMAX)
      IXVL=JXMIN
      IXVH=JXMAX
      IYVL=JYMIN
      IYVH=JYMAX
      IXHL=JXMIN
      IXHH=JXMAX
      IYHL = MAX(IYP-IDCY,IYMIN)
      IYHH=JYMAX
      GO TO 30
```

```
C DELTAX FOR EAST AND WEST IS DELTAY. DELTAY IS DELTAX.
```

---

(140)(142)

```
C
C CONNECTOR IS EAST
C
   24 JXMIN=MAX(IXP-IDCY,IXMIN)
      JYMIN=MAX(IYP-IDCX,IYMIN)
      JXMAX=IXMAX
      JYMAX=MIN(IYP+IDCX,IYMAX)
      IXVL=JXMIN
      IXVH = MIN(IXP+IDCX,IXMAX)
      IYVL=JYMIN
      IYVH=JYMAX
      IXHL=JXMIN
      IXHH=JXMAX
      IYHL=JYMIN
      IYHH=JYMAX
      GO TO 30
```

---

(140)(142)

```
C
C CONNECTOR IS WEST
C
   26 JXMIN=IXMIN
      JYMIN=MAX(IYP-IDCX,IYMIN)
      JXMAX=MIN(IXP+IDCY,IXMAX)
      JYMAX=MIN(IYP+IDCX,IYMAX)
      IXVL = MAX(IXP -IDCX,IXMIN)
      IXVH=JXMAX
      IYVL=JYMIN
      IYVH=JYMAX
      IXHL=JXMIN
      IXHH=JXMAX
      IYHL=JYMIN
      IYHH=JYMAX
C
C BOUNDING FOR MZERO SAME AS CLOSE
   30 IXZL=JXMIN
      IYZL=JYMIN
      IXZH=JXMAX
      IYZH=JYMAX
      IZZL=JZMIN
      IZZH=JZMAX
```

---

(144)

```
C
C  PREPARE AREA DEFINED BY PARAMETERS FOR A MAZE EXECUTION
C
C CALL BOUNDING ROUTINES FOR CONNECTORS
      CALL CLOSE
      CALL MZERO
      IZ=0
      DO 122 IX=IXVL,IXVH
      DO 122 IY=IYVL,IYVH
      IPKNO=IGTMZ(IDUM)
      IPKNO=IAND(IPKNO,2)
  122 CALL IPTMZ
      DO 124 IX=IXHL,IXHH
      DO 124 IY=IYHL,IYHH
      IPKNO=IGTMZ(IDUM)
      IPKNO=IAND(IPKNO,1)
  124 CALL IPTMZ
C LOOP FOR ALL CONNECTOR PINS
C ITS LOCATION IS FOUND BY ISCNT TABLE.
  201 CALL GET2(ISPCNT,JPIN,LO,IH)
      ICNTOT=45-IZMAX
      DO 15 M=LO,IH
      IF(NUMST.LT.ICNTOT) GO TO 13
      CALL STOST
      NUMTOT=NUMTOT+NUMST
      IF(NUMTOT.GE.IDIMSC) GO TO 16
      NUMST=0
```

```
C IF NEGATIVE, CONNECTOR HAS BEEN ROUTED
   13 IF(ISPDEF(M).LT.0) GO TO 15
C LO,IH ENTRIES IN ISPDEF TABLE GIVE THE CONNECTOR PINS AND TYPE
      CALL GET3(ISPDEF,M,IXC,IYC,ITYP)
C CALL TYPES ONLY IF CONNECTOR WITHIN BOUNDS
      IF((N.LE.2).AND.((IXC.LT.JXMIN).OR.(IXC.GT.JXMAX)))GO TO 15
      IF((N.GE.3).AND.((IYC.LT.JYMIN).OR.(IYC.GT.JYMAX)))GO TO 15
-------------------------------------------------------------------------
                                                                    (146)
C
C  DEFINE ALL UNUSED CONNECTOR PINS WITHIN PREPARED AREA AS START POINTS
C
C MAKE CONNECTOR PIN AVAILABLE, LOAD INTO STDST
      IPKNO=0
      CALL TYPES(2,ITYP,IXC,IYC)
   15 CONTINUE
      CALL STDST
   16 NBRPN=ICNTRL(7)
      IPKNO=3
      DO 17 M=1,NBRPN,2
      CALL GET3(IPNET,M,IXP,IYP,ITY)
      CALL TYPES(1,ITY,IXP,IYP)
   17 CONTINUE
-------------------------------------------------------------------------
                                                                    (148)
C
C  DEFINE ALL PINS AND PATHS OF THE SIGNAL SET AS DESTINATION POINTS
C
C MAKE ALL PATHS DESTINATIONS.
      CALL MAINDF(3,IECL,1,0,1)
C OLD HI+1 IS NEW LO FOR MAZER
      JDEX=INDEX+1
-------------------------------------------------------------------------
                                                                    (150)
C
C  ROUTE
C
      K=MAZER(IQUIT)
      IF(ITSF.LT.120) GO TO 18
      WRITE(6,1000) ICNTRL(1), (ISF(J), J=1,ITSF)
 1000 FORMAT(1H0,I10,2X,120I1)
      ITSF = 0
   18 ITSF = ITSF + 1
      ISF(ITSF) = K
 1522 FORMAT(1H0,10Z13)
  152 FORMAT(1H0,10I10)
-------------------------------------------------------------------------
                                                                    (152)
C
C  RESTORE DESTINATION CELLS TO AVAILABLE STATUS
C
      IPKNO=0
      DO 33 M=1,NBRPN,2
      CALL GET3(IPNET,M,IXP,IYP,ITY)
      CALL TYPES(1,ITY,IXP,IYP)
   33 CONTINUE
      CALL MAINDF(0,IECL,1,0,1)
-------------------------------------------------------------------------
                                                                    (154)
C
C  REBARRIER CONNECTOR PINS
C
      IPKNO=1
      DO 35 M=LO,IH
C IF NEGATIVE, CONNECTOR HAS BEEN ROUTED
      IF(ISPDEF(M).LT.0) GO TO 35
      CALL GET3(ISPDEF,M,IXC,IYC,ITYP)
      CALL TYPES(1,ITYP,IXC,IYC)
   35 CONTINUE
-------------------------------------------------------------------------
                                                                    (156)
C
```

```
C  WAS ROUTING SUCCESSFUL
C
      IF(K.EQ.2) GO TO 40
      ICNTRL(17)=ICNTRL(17)+1
      RETURN
C MAZER SUCCESSFUL
C LOAD NEW LO,HI INTO IPNFT. TAKES E-NO. OF INTERNAL PIN OF BOTH GET NEW
C    NUMBER
```

---

(158)

```
C
C  SAVE PERTINENT INFORMATION CONCERNING PATH THAT WAS FOUND
C
C STORE INDEX IN CONTROL ARRAY
   40 ICNTRL(9)=INDEX
      NCNT=NCNT+1
      IF(KPIN.EQ.JPIN) ICNTRL(10)=-(ICNTRL(10))
      IF(KPIN.NE.JPIN) ICNTRL(15)=-(ICNTRL(15))
      CALL PAK3(IPNFT,I+1,JDEX,INDEX,0)
      CALL GET3(IPTH,INDEX,IX,IY,IZ)
C   THE FOLLOWING ASSIGNMENT STATEMENTS ARE DUMMYING THE ARGUMENTS SO
C   THAT DSTCHK CAN BE USED.  THEY ARE RESTORED AFTER THE CALL.
      ISVEX = IXDS
      ISVEY = IYDS
      ISVEZ = IZDS
      IXDS = IX
      IYDS = IY
      IZDS = IZ
      DO 43 M=LO,IH
      CALL GET3(ISPDEF,M,IXC,IYC,ITYP)
      CALL DSTCHK(IXC,IYC,ITYP,IFOUND)
      IF (IFOUND .EQ. 1) GO TO 44
   43 CONTINUE
      IXDS = ISVEX
      IYDS = ISVEY
      IZDS = ISVEZ
  430 WRITE(6,151) ICNTRL(2),ICNTRL(3),ICNTRL(4)
  151 FORMAT(1H1,'CONNECTOR PIN USED FOR ROUTING SIGNAL',3A4,'NOT FOUND
     1AFTER ROUTING')
      RETURN
   44 IC8=ICNTRL(8)
      IXDS = ISVEX
      IYDS = ISVEY
      IZDS = ISVEZ
      ICNTRL(7)=ICNTRL(7)+2
      K=ICNTRL(7)+ICNTRL(8)+1
      DO 433 J=1,IC8
      K=K-1
      L=K-2
  433 IPNFT(K)=IPNFT(L)
      NBRPN=NBRPN+1
      IPNFT(NBRPN)=ISPDEF(M)
      I=I+2
      ISPDEF(M)=-(ISPDEF(M))
C     SEARCH THROUGH PIN LIST FOR DESTINATION
C
      DO 436 J=1,NBRPN,2
      CALL GET3(IPNFT,J,LX,LY,LT)
      CALL DSTCHK (LX,LY,LT,IFOUND)
C    IFOUND = 0 MEANS IXDS,IYDS,IZDS WAS NOT ON THE PIN DEFINED BY
C     LX,LY,LT.
C   IFOUND = 1 MEANS IXDS,IYDS,IZDS WAS ON PIN DEFINED BY LX,LY,LZ.
C
      IF (IFOUND .EQ. 0) GO TO 436
      IF(MPIN.EQ.J) GO TO 442
      MPIN=J
      GO TO 441
  436 CONTINUE
      NDEX=JDEX-1
      IF(NDEX.NE.0) GO TO 4360
      WRITE(6,155) IXDS,IYDS,ICNTRL(1)
      RETURN
```

```
  155 FORMAT(1H1,'DEST.',2I5,'NOT FOUND IN PIN LIST FOR',I5,'NO PATHS')
C      DESTINATION NOT FOUND IN PIN LIST.
C      SEARCH THROUGH TURN-POINT ARRAY.
 4360 DO 437 J=1,NDEX
      IF(IPTH(J).EQ.0) GO TO 437
      CALL GET3(IPTH,J,MX,MY,MZ)
      IF((MX.EQ.IXDS).AND.(MY.EQ.IYDS).AND.(MZ.EQ.IZDS)) GO TO 438
      IF(IPTH(J+1).EQ.0)GO TO 437
      CALL GET3(IPTH,J+1,NX,NY,NZ)
      IF((NZ.NE.MZ).AND.(MX.EQ.IXDS).AND.(MY.EQ.IYDS)) GO TO 438
      IF((((IXDS.LE.NX).AND.(IXDS.GE.MX)).OR.((IXDS.GE.NX).AND.
     1(IXDS.LE.MX))).AND.(((IYDS.LE.NY).AND.(IYDS.GE.MY)).OR.
     2((IYDS.GE.NY).AND.(IYDS.LE.MY))).AND.(IZDS.EQ.MZ)) GO TO 438
  437 CONTINUE
      WRITE(6,153) IXST,IYST,IXDS,IYDS,IZDS,ICNTRL(1),ICNTRL(2),ICNTRL
     1(3),ICNTRL(4)
  153 FORMAT(1H1,'CONNECTOR PIN',I5,',',I5,'  CANNOT FIND DESTINATION',
     1I5,',',I5,',',I5,'  IN PIN LIST OR TURN-POINT ARRAY OF SIGNAL NO.
     2',I5,3A4)
      RETURN
C      DESTINATION FOUND IN TURN-POINT ARRAY. FIND LO,HI FOR LOCATING
C          EQUIVALENCE CLASS.
C
  438 IST = ICNTRL(7)+2
      IFN = ICNTRL(7) + ICNTRL(8)
      DO 439 K=IST,IFN,2
      IF(IPNFT(K).EQ.0) GO TO 439
      CALL GET3(IPNFT,K,JLO,JHI,JBL)
      IF((J.GE.JLO).AND.(J.LE.JHI))GO TO 440
  439 CONTINUE
      WRITE(6,154) IXST,IYST,ICNTRL(1),ICNTRL(2),ICNTRL(3),ICNTRL(4),
     2J,IXDS,IYDS,IZDS
      RETURN
  154 FORMAT(1H1,'CONNECTOR PIN',I5,',',I5,'  FOUND IN TURN-POINT ARRAY
     1FOR SIGNAL NO. ',I5,3A4,' BUT A LO, HI REFERENCE TO ITS POSITION
     2',I5,' CANNOT BE FOUND IN FROM-TO LIST. DESTINATION WAS',I5,',',
     3I5 ,',',I5)
C      LO,HI FOUND. FIND E-CLASS NO. AND ASSIGN TO CONNECTOR FROM-TO, PIN
```

(162)

```
C
C  DEFINE EQUIVALENCE CLASS TO WHICH THIS ROUTING BELONGS
C
  440 CALL GET3(IPNFT,K-1,MFR,MTO,MEC)
      IF((MPIN.EQ.MFR).OR.(MPIN.EQ.MTO)) GO TO 442
      MPIN=MFR
  441 CALL GET3(IPNFT,MPIN+1,IECL,IBL,NCN)
  442 IF(IECL.EQ.0) GO TO 45
```

(160)

```
C
C  SAVE PERTINENT INFORMATION ABOUT CONNECTOR PIN THAT WAS SELECTED
C
      CALL PAK3(IPNFT,I,MPIN,NBRPN,IECL)
      M=M-LO+1
      IF(KPIN.EQ.JPIN)   CALL PAK3(IPNFT,NBRPN+1,IECL,M  ,2)
      IF(KPIN.NE.JPIN)   CALL PAK3(IPNFT,NBRPN+1,IECL,M  ,3)
      IF(KPIN.EQ.JPIN) ICNTRL(18)=KPIN
      IF(KPIN.NE.JPIN) ICNTRL(19)=KPIN
      RETURN
   45 ICNTRL(16)=ICNTRL(16)+1
      IEC=ICNTRL(16)
      CALL PAK3(IPNFT,I,MPIN,NBRPN,IEC)
      CALL PAK3(IPNFT,MPIN+1,IEC,IBL,NCN)
      M=M-LO+1
      IF(KPIN.EQ.JPIN)   CALL PAK3(IPNFT,NBRPN+1,IEC ,M  ,2)
      IF(KPIN.NE.JPIN)   CALL PAK3(IPNFT,NBRPN+1,IEC ,M  ,3)
      IF(KPIN.EQ.JPIN) ICNTRL(18)=KPIN
      IF(KPIN.NE.JPIN) ICNTRL(19)=KPIN
      RETURN
      END
```

PROGRAM LISTING VII

```
      SUBROUTINE PASS2
      COMMON/STDSBK/NUMST,NUMDST,IR1CON,IQUIT,ICIMSD,ISTDST(50)
      COMMON/ARRBLK/ICNTRL(25),IPNFT(800),ISPCNT(20),ISPDEF(1000)
      COMMON/REFBLK/IX,IY,IYCON,IZ,IZCON,IXMAX,IYMAX,IZMAX,IXMIN,IYMIN,
     1IZMIN,JXMAX,JYMAX,JZMAX,JXMIN,JYMIN,JZMIN,IPKNO,IFRDIM,IYCON2,
     2IZCON2,IYCPZC,IYCP1,LAYTYP(5),IZTB(20),IFRDMS
      COMMON/TRKBLK/IDMPTH,IWTCH,INDEX,IXST,IYST,IZST,IXDS,IYDS,IZDS,
     1IXWT(125),IYWT(125),IPTH(1000)
      COMMON/BNDBLK/IXZL,IYZL,IZZL,IXZH,IYZH,IZZH,IXHL,IYHL,IXHH,IYHH,
     1IXVL,IYVL,IXVH,IYVH,IDLX,IDLY,IDCX,IDCY
      COMMON/PASSBK/IDLX1,IDLY1,IDLX2,IDLY2,IDLX3,IDLY3,IDLXC1,IDLYC1,ID
     1LXC2,IDLYC2,ICAL1,ICAL2,ICAL3
      COMMON/SFBK/ISF(120),ITSF
      COMMON/CNTBK/NCNT
C DOES NOT ROUTE BUSSING IF PASS1 CALLED
-----------------------------------------------------------------------
C                                                                 (170)
C  IS BUSSING REQUESTED
C
      IF((ICNTRL(10).LT.1).OR.(ICNTRL(10).GT.10)) GO TO 3
-----------------------------------------------------------------------
C                                                                 (172)
C  WAS PASS ONE CALLED
C
      IF(ICAL1.EQ.1) RETURN
C INITIALIZE FAILURE COUNT TO 0
    3 ICNTRL(17)=0
C
C  IF NUMDST = 1 WELDING MUST BE DONE RIGHT OR LEFT.  BARRIERS ARE
C    PLACED ABOVE AND BELOW EACH PIN OF SIGNAL SET WITH A CODE OF "2".
C   IF "1" BARRIER ALREADY THERE, DO NOT CHANGE.
C
      IF(NUMDST.EQ.1) CALL RIBBON
C
C MAKE ALL PINS AND ROUTED PATHS AVAILABLE FOR SIGNAL SET.
      NBRPN=ICNTRL(7)
      IPKNO=0
      DO 5 I=1,NBRPN,2
      CALL GET3(IPNFT,I,IFX,IFY,ITYP)
      CALL TYPES(1,ITYP,IFX,IFY)
    5 CONTINUE
      CALL MAINDF(0,IECL,1,0,1)
      IF((ICNTRL(10).LT.1).OR.(ICNTRL(10).GT.10)) GO TO 11
-----------------------------------------------------------------------
      CALL BUSS                                                   (174)
      GO TO 44
C DEFINE INDEX OF LAST FR-TO ENTRY IN CONTROL ARRAY
-----------------------------------------------------------------------
C                                                                 (176)
C  IS THERE ANOTHER FROM-TO
C
   11 I=NBRPN-1
      IUPPER=ICNTRL(8)/2
      ISTFT=NBRPN+1
      ITOTFT=ICNTRL(7)+ICNTRL(8)
      ITSF = 0
C LOOK FOR CHECKING FROM-TO'S. CONNECTORS INCLUDED IF PASS 1 NOT CALLED
      DO 34 KOUNT=1,IUPPER
      I=I+2
      CALL GET3(IPNFT,I,IPN1,IPN2,IFTECL)
-----------------------------------------------------------------------
C                                                                 (178)
C  HAS IT BEEN ROUTED
C
```

```
C CHECK TO SEE IF FR-TO PREVIOUSLY ROUTED
      IF(IFTFCL.NE.0) GC TO 34
C CHECK FOR CCNNECTOR OR TEST POINT
------------------------------------------------------------------------
C                                                                  (180)
C  IS THIS A NON-ASSIGNED CONNECTOR OR TEST POINT
C
      IF(IPN2.NE.0) GO TO 12
      IF(ICNTRL(10).GE.0) GO TO 111
------------------------------------------------------------------------
C
C  WAS PASS1 CALLED                                                (198)
C  CALL PASS1C                                                     (138)
C
      IF(ICAL1.NE.1) CALL PASS1C(I,IPN1,IPN1)
------------------------------------------------------------------------
C                                                                  (200)
C  CALL PASS2C
C
      IF(ICAL1.EQ.1) CALL PASS2C(I,IPN1,IPN1)
      IF(ICNTRL(7).NE.NBRPN) I=I+2
      NBRPN=ICNTRL(7)
      GO TO 34
  111 IF(ICNTRL(15).GE.C) GO TO 112
      IF(ICAL1.NE.1) CALL PASS1C(I,IPN1,IPN1+4)
      IF(ICAL1.EQ.1) CALL PASS2C(I,IPN1,IPN1+4)
      GO TO 34
  112 WRITE(6,150) ICNTRL(2),ICNTRL(3),ICNTRL(4)
  150 FORMAT(1H1,'***FROM-TO LIST OF SIGNAL',3A4,'HAS UNROUTED ENTRY FOR
     1CONNECTOR OR TEST POINT, BUT ICNTRL(10) AND ICNTRL(15) ARE POSITIV
     2E')
      RETURN
------------------------------------------------------------------------
C                                                                  (182)
C  CALL BOUNDING INSTRUCTIONS
C
C BOUNDING IS ONE RECTANGLE
   12 CALL GET3(IPNFT,IPN1,IFX,IFY,ITYP1)
      CALL GET3(IPNFT,IPN2,ITX,ITY,ITYP2)
      LOX=MIN(IFX,ITX)
      LOY=MIN(IFY,ITY)
      IHX=MAX(IFX,ITX)
      IHY=MAX(IFY,ITY)
C DEFINE CORNERS OF RECTANGLES + OR - DELTAX,DELTAY AND J-X,Y,Z MAXES
C AND MINS
      JXMIN=MAX(LOX-IDLX,IXMIN)
      IXZL=JXMIN
      JYMIN=MAX(LOY-IDLY,IYMIN)
      IYZL=JYMIN
      JXMAX=MIN(IHX+IDLX,IXMAX)
      IXZH=JXMAX
      JYMAX=MIN(IHY+IDLY,IYMAX)
      IYZH=JYMAX
      IZZL=JZMIN
      IZZH=JZMAX
C CALL CLOSE, THEN MZERC
      CALL CLOSE
      CALL MZERO
C USE SAME RECTANGLE FOR RUN AREA
      IXVL=JXMIN
      IXVH=JXMAX
      IYVL=JYMIN
      IYVH=JYMAX
      IZ=0
      DO 122 IX=IXVL,IXVH
      DO 122 IY=IYVL,IYVH
      IPKNO=IGTMZ(IDUM)
```

```
      IPKNO=IAND(IPKNO,2)
  122 CALL IPTMZ
      IXHL=JXMIN
      IXHH=JXMAX
      IYHL=JYMIN
      IYHH=JYMAX
      IZ=0
      DO 124 IX=IXHL,IXHH
      DO 124 IY=IYHL,IYHH
      IPKNO=IGTMZ(IDUM)
      IPKNO=IAND(IPKNO,1)
  124 CALL IPTMZ
```

(190)

```
C
C  DEFINE START AND DESTINATION POINTS
C
C LOAD STARTING AND DESTINATION CELLS
      CALL GET3(IPNFT,IPN1+1,IECL1,IB1,NON1)
      CALL GET3(IPNFT,IPN2+1,IECL2,IB2,NON2)
C DEFINE CLASSIFICATION OF RUN
      IF((IECL1.EQ.0).AND.(IECL2.EQ.0))KASE=1
      IF((IECL1.NE.0).AND.(IECL2.NE.0))KASE=2
      IF((IECL1.NE.0).AND.(IECL2.EQ.0))KASE=3
      IF((IECL1.EQ.0).AND.(IECL2.NE.0))KASE=4
C IR1CON IS INITIALIZED TO 0 FOR FIRST LOADING OF ISTDST
      IR1CON=0
      NUMST=0
C START AND DESTINATION POINTS DETERMINED BY KASE.
      IPKNO=3
      GO TO (13,14,15,16),KASE
C FIRST ARGUMENT IS 1 IF BARRIER,2 IF DEST., 3 IF AV., AND 4 IF AV. AND
C LOA DED
C KASE1,2,4 USE FROM AS START AND TO AS DEST.
C
C NEITHER FR NOR TO HAS BEEN ROUTED.
   13 CALL TYPES(3,ITYP1,IFX,IFY)
      CALL TYPES(1,ITYP2,ITX,ITY)
      CALL STDST
      GO TO 17
C BOTH FR AND TO HAVE E-NO'S.
   14 CALL TYPES(3,ITYP1,IFX,IFY)
      CALL TYPES(1,ITYP2,ITX,ITY)
C LOAD ALL CONNECTED PINS AS START OR DESTINATIONS
      ICNTOT=45-IZMAX
      DO 145 J=1,NBRPN,2
      CALL GET3(IPNFT,J+1,IEC,IBL,NCN)
      IF(IEC.NE.IECL1) GO TO 144
      IF(NUMST.LT.ICNTOT) GO TO 143
      CALL STDST
      NUMST=0
  143 CALL GET3(IPNFT,J,IX,IY,IT)
      CALL TYPES(3,IT,IX,IY)
      GO TO 145
  144 IF(IEC.NE.IECL2) GO TO 145
      CALL GET3(IPNFT,J,IX,IY,IT)
      CALL TYPES(1,IT,IX,IY)
  145 CONTINUE
      CALL STDST
      NUMST=0
      CALL MAINDF(0,IECL1,0,1,0)
C MAINDF CALLS STDST WHEN FOURTH ARGUMENT IS 1
      CALL MAINDF(3,IECL2,0,0,1)
      GO TO 17
C FROM IN E-CLASS. MAKE DESTINATIONS.
   15 CALL TYPES(1,ITYP1,IFX,IFY)
C LOAD ALL CONNECTED PINS AS DESTINATIONS
      DO 146 J=1,NBRPN,2
      CALL GET3(IPNFT,J+1,IEC,IBL,NCN)
      IF(IEC.NE.IECL1) GO TO 146
      CALL GET3(IPNFT,J,IX,IY,IT)
      CALL TYPES(1,IT,IX,IY)
```

```
  146 CONTINUE
      CALL TYPES(3,ITYPE2,ITX,ITY)
      CALL STDST
      CALL MAINDF(3,IECL1,0,0,1)
      GO TO 17
C TO HAS E-NO.  MAKE DESTINATIONS
   16 CALL TYPES(3,ITYP1,IFX,IFY)
      CALL TYPES(1,ITYP2,ITX,ITY)
C LOAD ALL CONNECTED PINS AS DESTINATIONS
      DO 147 J=1,NBRPN,2
      CALL GET3(IPNFT,J+1,IEC,IBL,NCN)
      IF(IEC.NE.IECL2) GO TO 147
      CALL GET3(IPNFT,J,IX,IY,IT)
      CALL TYPES(1,IT,IX,IY)
  147 CONTINUE
      CALL MAINDF(3,IECL2,0,0,1)
      CALL STDST
C HI+1 AFTER LAST TRACKER IS NEW LO FOR THIS CNE.
   17 JDEX=INDEX+1
```

---

```
C                                                                  (192)
C  CALL MAZE
C
      K=MAZER(IQUIT)
      IF(ITSF.LT.120) GO TO 18
      WRITE(6,1000) ICNTRL(1), (ISF(J), J=1,ITSF)
 1000 FORMAT(1H0,I10,2X,120I1)
      ITSF = 0
   18 ITSF = ITSF + 1
      ISF(ITSF) = K
  152 FORMAT(1H0,10I10)
C RESTORE DEST. CELLS TO AV.
      IPKNO=0
      GO TO (20,22,21,22),KASE
C ---------------------------------------------------------------------
C ONLY KASE3 HAD DEST. ON FROM SET
   20 CALL TYPES(1,ITYP2,ITX,ITY)
      GO TO 23
   21 CALL TYPES(1,ITYP1,IFX,IFY)
      DO 210 J=1,NBRPN,2
      CALL GET3(IPNFT,J+1,IEC,IBL,NCN)
      IF(IEC.NE.IECL1) GO TO 210
      CALL GET3(IPNFT,J,IX,IY,IT)
      CALL TYPES(1,IT,IX,IY)
  210 CONTINUE
      CALL MAINDF(0,IECL1,0,0,1)
      GO TO 23
   22 CALL TYPES(1,ITYP2,ITX,ITY)
      DO 220 J=1,NBRPN,2
      CALL GET3(IPNFT,J+1,IEC,IBL,NON)
      IF(IEC.NE.IECL2) GO TO 220
      CALL GET3(IPNFT,J,IX,IY,IT)
      CALL TYPES(1,IT,IX,IY)
  220 CONTINUE
      CALL MAINDF(0,IECL2,0,0,1)
   23 IF(K.EQ.2) GO TO 26
      ICNTRL(17)=ICNTRL(17)+1
      GO TO 34
C MAZER SUCCESSFUL. REDEFINE E-NO.
C STORE INDEX IN CONTROL ARRAY
```

---

```
C                                                                  (194)
C  STORE INFORMATION ABOUT PATH FOUND AND PINS SELECTED
C
   26 ICNTRL(9)=INDEX
      NCNT=NCNT+1
      GO TO (27,28,30,31),KASE
```

---

```
                                                                   (192)
C  DEFINE EQUIVALENCE CLASS TO WHICH ROUTING BELONGS
```

```
C
C NEW E-NO.
   27 IECN=ICNTRL(16)+1
      ICNTRL(16)=IECN
      CALL PAK3(IPNFT,I,IPN1,IPN2,IECN)
      CALL PAK3(IPNFT,IPN1+1,IECN,IB1,NON1)
      CALL PAK3(IPNFT,IPN2+1,IECN,IB2,NON2)
      GO TO 32
C TAKE MIN OF TWO E-NO'S.
   28 IEC=MIN(IECL1,IECL2)
      IECMX=MAX(IECL1,IECL2)
      CALL PAK3(IPNFT,I,IPN1,IPN2,IEC)
      CALL PAK3(IPNFT,IPN1+1,IEC,IB1,NON1)
      CALL PAK3(IPNFT,IPN2+1,IEC,IB2,NON2)
      DO 29 J=ISTFT,ITOTFT,2
      CALL GET3(IPNFT,J,IF,IT,IE)
      IF(IE.NE.IECMX) GO TO 29
      CALL PAK3(IPNFT,J,IF,IT,IEC)
      CALL GET3(IPNFT,IF+1,ICLD,IBL,NON)
      CALL PAK3(IPNFT,IF+1,IEC,IBL,NON)
      CALL GET3(IPNFT,IT+1,ICLD,IBL,NON)
      CALL PAK3(IPNFT,IT+1,IEC,IBL,NON)
   29 CONTINUE
      GO TO 32
C FROM E-NO. USED
   30 CALL PAK3(IPNFT,I,IPN1,IPN2,IECL1)
      CALL PAK3(IPNFT,IPN2+1,IECL1,IB2,NON2)
      GO TO 32
C TO E-NO. USED
   31 CALL PAK3(IPNFT,I,IPN1,IPN2,IECL2)
      CALL PAK3(IPNFT,IPN1+1,IECL2,IB1,NON1)
C
C LOAD NEW LO, HI FROM TRACKER INTO IPNFT
C
   32 CALL PAK3(IPNFT,I+1,JDEX,INDEX,0)
   34 CONTINUE
      IF(ITSF.NE.0) WRITE(6,1000) ICNTRL(1),(ISF(I),I=1,ITSF)
C
C     REMOVE "2" BARRIER CODES.
   44 IF(NUMDST.EQ.1) CALL UNRIBN
C
C REBARRIER ALL PINS
      IPKNO = 1
      DO 50 I=1,NBRPN,2
      CALL GET3(IPNFT,I,IFX,IFY,ITYP)
      CALL TYPES(1,ITYP,IFX,IFY)
   50 CONTINUE
C REBARRIER ALL OF IPTH
      CALL MAINDF(1,IEC,1,0,1)
      RETURN
      END
```

PROGRAM LISTING VIII

```
      SUBROUTINE PASS2C(I,KPIN,JPIN)
      COMMON/PASSBK/IDLX1,IDLY1,IDLX2,IDLY2,IDLX3,IDLY3,IDLXC1,IDLYC1,ID
     1LXC2,IDLYC2,ICAL1,ICAL2,ICAL3
      COMMON/STDSBK/NUMST,NUMDST,IR1CON,IQUIT,ICIMSD,ISTOST(50)
      COMMON/ARRBLK/ICNTRL(25),IPNFT(800),ISPCNT(20),ISPDEF(1000)
      COMMON/REFBLK/IX,IY,IYCON,IZ,IZCON,IXMAX,IYMAX,IZMAX,IXMIN,IYMIN,
     1IZMIN,JXMAX,JYMAX,JZMAX,JXMIN,JYMIN,JZMIN,IPKNO,IFRDIM,IYCON2,
     2IZCON2,IYCPZC,IYCP1,LAYTYP(5),IZTB(20),IFROMS
      COMMON/TRKBLK/IDMPTH,IWTCH,INDEX,IXST,IYST,IZST,IXDS,IYDS,IZDS,
     1IXWT(125),IYWT(125),IPTH(1000)
      COMMON/BNDBLK/IXZL,IYZL,IZZL,IXZH,IYZH,IZZH,IXHL,IYHL,IXHH,IYHH,
     1IXVL,IYVL,IXVH,IYVH,IDLX,IDLY,IDCX,IDCY
      COMMON/SFBK/ISF(120),ITSF
      COMMON/CNTBK/NCNT
C     PASS2C WAS CALLED BECAUSE ICNTRL(10) WAS NEGATIVE, IMPLYING THERE
C   IS A CONNECTOR TO BE RUN, THAT IT HAS NOT BEEN PREVIOUSLY ROUTED,
```

```
C IF THIS RUN FAILS, E-NO. CNTR WILL INCREMENT, LEVEL WILL NOT CHANGE,
C IF SUCCESSFUL, LEVEL WILL NOT BE NEGATIVE AND THE FR-TO
C       WILL HAVE THE FROM-PIN, CONN PIN, ECL, AND LO-HI
C    ENTRY FOR IPTH.
      IRICON=0
      NUMST=0
      NUMTOT=0
C     BOUNDING IS FROM SIGNAL SET TO CONN. BY IDLX,IDLY
      MPIN=ICNTRL(KPIN)
      CALL GET3(IPNFT,MPIN+1,IECL,IBL,NON)
      IF(KPIN.EQ.11) N=1
      IF(KPIN.EQ.12) N=2
      IF(KPIN.EQ.13) N=3
      IF(KPIN.EQ.14) N=4
      LN=ICNTRL(11)
      LS=ICNTRL(12)
      LE=ICNTRL(13)
      LW=ICNTRL(14)
      GO TO (20,22,24,26),N
-----------------------------------------------------------------------
                                                            (140)(142)
C
C CONNECTOR IS NORTH
C
   20 CALL GET3(IPNFT,LW,IXP,IYP,ITY)
      JXMIN=MAX(IXP-IDCX,IXMIN)
      CALL GET3(IPNFT,LS,IXP,IYP,ITY)
      JYMIN=MAX(IYP-IDCY,IYMIN)
      CALL GET3(IPNFT,LE,IXP,IYP,ITY)
      JXMAX=MIN(IXP+IDCX,IXMAX)
      JYMAX=IYMAX
      GO TO 30
-----------------------------------------------------------------------
                                                            (140)(142)
C
C CONNECTOR IS SOUTH
C
   22 CALL GET3(IPNFT,LW,IXP,IYP,ITY)
      JXMIN=MAX(IXP-IDCX,IXMIN)
      JYMIN=IYMIN
      CALL GET3(IPNFT,LE,IXP,IYP,ITY)
      JXMAX=MIN(IXP+IDCX,IXMAX)
      CALL GET3(IPNFT,LN,IXP,IYP,ITY)
      JYMAX=MIN(IYP+IDCY,IYMAX)
      GO TO 30
C DELTAX FOR EAST AND WEST IS DELTAY. DELTAY IS DELTAX.
-----------------------------------------------------------------------
                                                            (140)(142)
C
C CONNECTOR IS EAST
C
   24 CALL GET3(IPNFT,LW,IXP,IYP,ITY)
      JXMIN=MAX(IXP-IDCX,IXMIN)
      CALL GET3(IPNFT,LS,IXP,IYP,ITY)
      JYMIN=MAX(IYP-IDCX,IYMIN)
      JXMAX=IXMAX
      CALL GET3(IPNFT,LN,IXP,IYP,ITY)
      JYMAX=MIN(IYP+IDCX,IYMAX)
      GO TO 30
-----------------------------------------------------------------------
                                                            (140)(142)
C
C CONNECTOR IS WEST
C
   26 JXMIN=IXMIN
      CALL GET3(IPNFT,LS,IXP,IYP,ITY)
      JYMIN=MAX(IYP-IDCX,IYMIN)
      CALL GET3(IPNFT,LE,IXP,IYP,ITY)
      JXMAX=MIN(IXP+IDCY,IXMAX)
      CALL GET3(IPNFT,LN,IXP,IYP,ITY)
      JYMAX=MIN(IYP+IDCX,IYMAX)
C
```

```
C BOUNDING FOR MZERO,HOP, AND VOP SAVE AS CLOSE
   30 IXZL=JXMIN
      IXVL=JXMIN
      IXHL=JXMIN
      IYZL=JYMIN
      IYVL=JYMIN
      IYHL=JYMIN
      IXZH=JXMAX
      IXVH=JXMAX
      IXHH=JXMAX
      IYZH=JYMAX
      IYVH=JYMAX
      IYHH=JYMAX
      IZZL=JZMIN
      IZZH=JZMAX
```

(144)

```
C
C CALL BOUNDING ROUTINES FOR CONNECTORS
C
      CALL CLOSE
      CALL MZERO
      IZ=0
      DO 122 IX=IXVL,IXVH
      DO 122 IY=IYVL,IYVH
      IPKNO=IGTMZ(IDUM)
      IPKNO=IAND(IPKNO,2)
  122 CALL IPTMZ
      DO 124 IX=IXHL,IXHH
      DO 124 IY=IYHL,IYHH
      IPKNO=IGTMZ(IDUM)
      IPKNO=IAND(IPKNO,1)
  124 CALL IPTMZ
C LOOP FOR ALL CONNECTOR PINS
C ITS LOCATION IS FOUND BY ISCNT TABLE.
  201 CALL GET2(ISPCNT,JPIN,LO,IH)
      ICNTOT=45-IZMAX
      DO 15 M=LO,IH
      IF(NUMST.LT.ICNTOT) GO TO 13
      CALL STDST
      NUMTOT=NUMTOT+NUMST
      IF(NUMTOT.GE.IDIMSD) GC TO 16
      NUMST=0
C IF NEGATIVE, CONNECTOR HAS BEEN ROUTED
   13 IF(ISPDEF(M).LT.0) GO TO 15
C LO,IH ENTRIES IN ISPDEF TABLE GIVE THE CONNECTOR PINS AND TYPE
      CALL GET3(ISPDEF,M,IXC,IYC,ITYP)
C CALL TYPES ONLY IF CONNECTOR WITHIN BOUNDS
      IF((N.LE.2).AND.((IXC.LT.JXMIN).OR.(IXC.GT.JXMAX)))GO TO 15
      IF((N.GE.3).AND.((IYC.LT.JYMIN).OR.(IYC.GT.JYMAX)))GO TO 15
```

(146)

```
C
C MAKE CONNECTOR PIN AVAILABLE, LOAD INTO STDST
C
      IPKNO=0
      CALL TYPES(2,ITYP,IXC,IYC)
   15 CONTINUE
      CALL STDST
   16 NBRPN=ICNTRL(7)
      IPKNO=3
      DO 17 M=1,NBRPN,2
      CALL GET3(IPNFT,M,IXP,IYP,ITY)
      CALL TYPES(1,ITY,IXP,IYP)
   17 CONTINUE
```

(148)

```
C
C MAKE ALL PATHS DESTINATIONS.
C
      CALL MAINDF(3,IECL,1,0,1)
```

```
C OLD HI+1 IS NEW LC FOR MAZER
      JDEX=INDEX+1
```

---

(150)

```
      K=MAZER(IQUIT)
      IF(ITSF.LT.120) GC TO 18
      WRITE(6,1000) ICNTRL(1), (ISF(J), J=1,ITSF)
 1000 FORMAT(1H0,I10,2X,120I1)
      ITSF = 0
   18 ITSF = ITSF + 1
      ISF(ITSF) = K
 1522 FORMAT(1H0,10Z13)
  152 FORMAT(1H0,10I10)
```

---

(152)

```
C
C RESTORE DESTINATION CELLS TO AVAILABLE
C
      IPKNO=0
      DO 33 M=1,NBRPN,2
      CALL GET3(IPNFT,M,IXP,IYP,ITY)
      CALL TYPES(1,ITY,IXP,IYP)
   33 CONTINUE
      CALL MAINDF(0,IECL,1,0,1)
```

---

(154)

```
C
C REBARRIER CONNECTOR PINS
C
      IPKNO=1
      DO 35 M=LO,IH
C IF NEGATIVE, CONNECTOR HAS BEEN ROUTED
      IF(ISPDEF(M).LT.0) GO TO 35
      CALL GET3(ISPDEF,M,IXC,IYC,ITYP)
      CALL TYPES(1,ITYP,IXC,IYC)
```

---

(156)

```
   35 CONTINUE
      IF(K.EQ.2) GO TO 40
      ICNTRL(17)=ICNTRL(17)+1
      RETURN
C MAZER SUCCESSFUL
C LOAD NEW LO,HI INTO IPNFT. TAKES E-NO. OF INTERNAL PIN OF BOTH GET NEW
C   NUMBER
```

---

(158)

```
C
C STORE INDEX IN CONTROL ARRAY
C
   40 ICNTRL(9)=INDEX
      NCNT=NCNT+1
      IF(KPIN.EQ.JPIN) ICNTRL(10)=-(ICNTRL(10))
      IF(KPIN.NE.JPIN) ICNTRL(15)=-(ICNTRL(15))
      CALL PAK3(IPNFT,I+1,JDEX,INDEX,0)
      CALL GET3(IPTH,INDEX,IX,IY,IZ)
C   THE FOLLOWING ASSIGNMENT STATEMENTS ARE DUMMYING THE ARGUMENTS SO
C   THAT DSTCHK CAN BE USED.  THEY ARE RESTORED AFTER THE CALL.
      ISVEX = IXDS
      ISVEY = IYDS
      ISVEZ = IZDS
      IXDS = IX
      IYDS = IY
      IZDS = IZ
      DO 43 M=LO,IH
      CALL GET3(ISPDEF,M,IXC,IYC,ITYP)
      CALL DSTCHK(IXC,IYC,ITYP,IFOUND)
      IF (IFOUND .EQ. 1) GO TO 44
   43 CONTINUE
      IXDS = ISVEX
      IYDS = ISVEY
      IZDS = ISVEZ
  430 WRITE(6,151) ICNTRL(2),ICNTRL(3),ICNTRL(4)
```

```
 151 FORMAT(1H1,'CONNECTOR PIN USED FOR ROUTING SIGNAL',3A4,'NOT FOUND
    1AFTER ROUTING')
     RETURN
  44 IC8=ICNTRL(8)
     IXDS = ISVEX
     IYDS = ISVEY
     IZDS = ISVEZ
     ICNTRL(7)=ICNTRL(7)+2
     K=ICNTRL(7)+ICNTRL(8)+1
     DO 433 J=1,IC8
     K=K-1
     L=K-2
 433 IPNFT(K)=IPNFT(L)
     NBRPN=NBRPN+1
     IPNFT(NBRPN)=ISPDEF(M)
     I=I+2
     ISPDEF(M)=-(ISPDEF(M))
C    SEARCH THROUGH PIN LIST FOR DESTINATION
C
     DO 436 J=1,NBRPN,2
     CALL GET3(IPNFT,J,LX,LY,LT)
     CALL DSTCHK (LX,LY,LT,IFOUND)
C   IFOUND = 0 MEANS IXDS,IYDS,IZDS WAS NOT ON THE PIN DEFINED BY
C    LX,LY,LT.
C  IFOUND = 1 MEANS IXDS,IYDS,IZDS WAS ON PIN DEFINED BY LX,LY,LZ.
C
     IF (IFOUND .EQ. 0) GO TO 436
     IF(MPIN.EQ.J) GO TO 442
     MPIN=J
     GO TO 441
 436 CONTINUE
     NDEX=JDEX-1
     IF(NDEX.NE.0) GO TO 4360
     WRITE(6,155) IXDS,IYDS,ICNTRL(1)
     RETURN
 155 FORMAT(1H1,'DEST.',2I5,'NOT FOUND IN PIN LIST FOR',I5,'NO PATHS')
C    DESTINATION NOT FOUND IN PIN LIST.
C    SEARCH THROUGH TURN-POINT ARRAY.
4360 DO 437 J=1,NDEX
     IF(IPTH(J).EQ.0) GO TO 437
     CALL GET3(IPTH,J,MX,MY,MZ)
     IF((MX.EQ.IXDS).AND.(MY.EQ.IYDS).AND.(MZ.EQ.IZDS)) GO TO 438
     IF(IPTH(J+1).EQ.0)GO TO 437
     CALL GET3(IPTH,J+1,NX,NY,NZ)
     IF((NZ.NE.MZ).AND.(MX.EQ.IXDS).AND.(MY.EQ.IYDS)) GO TO 438
     IF((((IXDS.LE.NX).AND.(IXDS.GE.MX)).OR.((IXDS.GE.NX).AND.
    1(IXDS.LE.MX))).AND.(((IYDS.LE.NY).AND.(IYDS.GE.MY)).OR.
    2((IYDS.GE.NY).AND.(IYDS.LE.MY)))).AND.(IZDS.EQ.MZ)) GO TO 438
 437 CONTINUE
     WRITE(6,153) IXST,IYST,IXDS,IYDS,IZDS,ICNTRL(1),ICNTRL(2),ICNTRL
    1(3),ICNTRL(4)
 153 FORMAT(1H1,'CONNECTOR PIN',I5,',',I5,'  CANNOT FIND DESTINATION',
    1I5,',',I5,',',I5,'  IN PIN LIST OR TURN-POINT ARRAY OF SIGNAL NO.
    2',I5,3A4)
     RETURN
C    DESTINATION FOUND IN TURN-POINT ARRAY. FIND LO,HI FOR LOCATING
C        EQUIVALENCE CLASS.
C
 438 IST = ICNTRL(7)+2
     IFN = ICNTRL(7) + ICNTRL(8)
     DO 439 K=IST,IFN,2
     IF(IPNFT(K).EQ.0) GO TO 439
     CALL GET3(IPNFT,K,JLO,JHI,JBL)
     IF((J.GE.JLO).AND.(J.LE.JHI))GO TO 440
 439 CONTINUE
     WRITE(6,154) IXST,IYST,ICNTRL(1),ICNTRL(2),ICNTRL(3),ICNTRL(4),
    2J,IXDS,IYDS,IZDS
     RETURN
 154 FORMAT(1H1,'CONNECTOR PIN',I5,',',I5,'  FOUND IN TURN-POINT ARRAY
    1FOR SIGNAL NO. ',I5,3A4,' BUT A LO, HI REFERENCE TO ITS POSITION
    2',I5,' CANNOT BE FOUND IN FROM-TO LIST. DESTINATION WAS',I5,',',
    3I5 ,',',I5)
```

```
C     LO,HI FOUND. FIND E-CLASS NO. AND ASSIGN TO CONNECTOR FROM-TO, PIN
-----------------------------------------------------------------------------
                                                                       (162)
  440 CALL GET3(IPNFT,K-1,MFR,MTC,MEC)
      IF((MPIN.EQ.MFR).OR.(MPIN.EQ.MTO)) GO TO 442
      MPIN=MFR
  441 CALL GET3(IPNFT,MPIN+1,IECL,IBL,NCN)
  442 IF(IECL.EQ.0) GO TO 45
-----------------------------------------------------------------------------
                                                                       (160)
      CALL PAK3(IPNFT,I,MPIN,NBRPN,IECL)
      M=M-LO+1
      IF(KPIN.EQ.JPIN)   CALL PAK3(IPNFT,NBRPN+1,IECL,M  ,2)
      IF(KPIN.NE.JPIN)   CALL PAK3(IPNFT,NBRPN+1,IECL,M  ,3)
      IF(KPIN.EQ.JPIN) ICNTRL(18)=KPIN
      IF(KPIN.NE.JPIN) ICNTRL(19)=KPIN
      RETURN
   45 ICNTRL(16)=ICNTRL(16)+1
      IEC=ICNTRL(16)
      CALL PAK3(IPNFT,I,MPIN,NBRPN,IEC)
      CALL PAK3(IPNFT,MPIN+1,IEC,IBL,NON)
      M=M-LO+1
      IF(KPIN.EQ.JPIN)   CALL PAK3(IPNFT,NBRPN+1,IEC ,M  ,2)
      IF(KPIN.NE.JPIN)   CALL PAK3(IPNFT,NBRPN+1,IEC ,M  ,3)
      IF(KPIN.NE.JPIN) ICNTRL(19)=KPIN
      IF(KPIN.EQ.JPIN) ICNTRL(18)=KPIN
      RETURN
      END
-----------------------------------------------------------------------------

         ENTRY CLOSE,MZERO
         EXTRN BNDBLK
         EXTRN REFBLK
*
**    COMMON/BNDBLK/IXZL,IYZL,IZZL,IXZH,IYZH,IZZH,IXHL,IYHL,IXHH,IYHH,
**   1IXVL,IYVL,IXVH,IYVH,IDLX,IDLY,IDCX,IDCY
*
BOUND    CSECT
*
*
* CLOSE BARRIERS H-V BITS OF LAYERC WITHIN A RECTANGLE
*        DEFINED BY JAMX-MINS OF REFBLK.
*
CLOSE    STM   14,9,12(13)
         BALR  8,0
         USING *,8
         L     1,=A(REFBLK)
         L     6,8(0,1)       YCON TC R6
         L     7,60(0,1)      JYMIN TO R7
         S     7,=F'1'        (JYMIN-1) TO R7
         L     5,48(0,1)      JYMAX TO R5
         SR    5,7                   SUBT.JYMIN-1,FROM R5
         A     5,=F'2'               (JYMAX+1)-(JYMIN-1)+1 TO R5
         MR    6,6            (JYMIN-1)*YCON TC R7
         L     6,8(0,1)       YCON TO R6
         A     7,112(0,1)     (JYMIN-1)*YCON&ZTB(0) TO R7
         L     4,56(0,1)      JXMIN TO R4
         S     4,=F'1'
         SRA   4,1            (JXMIN-1)/2 TO R4
         AR    4,7
         LR    9,4
         N     9,=X'FFFFFFFC'        C1 IN R9---FULL WORD ADDRESS THIT
*                                    CONTAINS(JXMIN,JYMIN,ZTB(0))
         L     2,=F'4'
         L     3,44(0,1)      JXMAX TO R3
         A     3,=F'1'
         SRA   3,1
         AR    3,7
*                                   C2 IN R3---          ADDRESS THAT
*                                   CONTAINS (JXMAX,JYMIN,O)
         STM   3,4,C1C2
```

```
         L      1,=X'33333333'                      MASK TO R1
         BC     15,CL1
CL2      LM     3,4,C1C2        RESTORE C1,C2
         AR     4,6             Y INCREMENT ON MIN
         LR     9,4
         N      9,=X'FFFFFFFC'
         AR     3,6             Y INCREMENT CN MAX
         STM    3,4,C1C2        REDEFINE C1 AND C2
CL1      L      7,0(0,9)        * LO
         OR     7,1             * H-V BIT BARRIER
         ST     7,0(0,9)        * LOOP
         BXLE   9,2,CL1         X LOOP END
         BCT    5,CL2           Y LOOP END
         LM     14,9,12(13)          RESTORE REGISTERS
         BCR    15,14           RETURN
*
MZERO    STM    14,12,12(13)
         BALR   11,0
         USING  *,11
         L      2,=A(BNDBLK)
         L      1,8(0,2)             ZZL TO R1
         L      10,20(0,2)           ZZH TO R10
         SR     10,1            SUB ZZL FRCM R10
         A      10,=F'1'        (ZZH-ZZL+1) TO R10(ZCCUNT)
         SLA    1,2             ZZL*4 TO R1
         L      3,=A(REFBLK)
         LA     4,4(0,0)
         L      8,8(0,3)        YCON TO R8
         L      7,16(0,2)            YZH TO R7
         L      9,4(0,2)             YZL TO R7
         S      9,=F'1'              YZL-1
         SR     7,9             SUBT. YZL FRCM YZH,STORE IN R7
         A      7,=F'2'                          YCNT TO R7
         MR     8,8                              YCON*(YZL-1)
         L      8,8(0,3)        YCON TO R8
         A      9,112(1,3)      ADD ZTB(ZZL*4) TO R9
         L      6,0(0,2)             XZL TO R6
         S      6,=F'1'              XZL-1
         SRA    6,1                  XZL/2 TO R6
         AR     6,9                  C1=XZL/2 + YZL*YCON + ZTB(ZZL*4)
         LR     12,6
         N      12,=X'FFFFFFFC'
         L      5,12(0,2)            XZH TO R5
         A      5,=F'1'                          XZH +1 TO R5
         SRA    5,1                              (XZH+1)/2 TO R5
         AR     5,9                              C2=((XZH+1)/2+(YZL-1)*YCON
*                                                   ZTB(ZZL*4)) TO R5
         L      9,16(0,3)       ZCON TO R9
         STM    5,6,C1C2        Y LOOP
         STM    5,7,C1C2YC      Z LOOP
         L      1,8(0,2)             ZZL TO R1
         S      1,=F'1'             SUBTRACT 1 TO SET CCND. &ODE
         BC     8,ZR4               BRANCH IF ZZL HAD BEEN 1
         L      3,=X'CCCCCCCC'       MASK TO R3
         BC     15,ZR1               LAYER C LCWER LIMIT, SO NO FULL WORD
*                                        CHECK
*
** LOOP TO PREVENT LAYER 0 FROM CHANGING
ZR4      LR     1,12                 C1 TO R1
         S      1,112(4,3)           C1-ZTB(4) TO R1
         L      3,=X'CCCCCCCC'       MASK TC R3
         BNL    ZR1                  BRANCH IF LAYER C IS NOT AFFECTED
         LCR    1,1
         SLA    1,2                  (C1-ZTB(4))*4 TO R1
         EX     0,NOTFUL(1)          PICK UP SPECIAL MASK
         L      1,0(0,12)            LCAD R1 WITH C(C1)
         NR     1,2                  AND R1 WITH SPECIAL MASK
         ST     1,0(0,12)            STORE NEW C(C1)
         BC     15,ZZ                TRANSFER INSIDE NORMAL LCOP
*
* NORMAL FULL-WORD LOOP
ZR3      LM     5,7,C1C2YC      ORIG C1,C2,YCNT
         AR     5,9             ADD ZCCN TO C2
```

```
         AR    6,9              ADD ZCCN TO C1
         LR    12,6
         N     12,=X'FFFFFFFC'
         STM   5,7,C1C2YC       ORIG ZCCN LOST
         STM   5,6,C1C2         FOR USE IN ZR2
         BC    15,ZR1
ZR2      LM    5,6,C1C2         ONLY C1C2 RESTORED
         AR    5,8              C2 INCREMENTED BY YCON
         AR    6,8              C1 ALSO
         LR    12,6
         N     12,=X'FFFFFFFC'
         STM   5,6,C1C2         C2,C1,YCNT UPDATED
ZR1      L     2,0(0,12)        CONTENTS OF C1 LOADED INTO R2
         NR    2,3              C(C1).N.MASK
         ST    2,0(0,12)        NEW FULL-WORD ENTRY
ZZ       BXLE  12,4,ZR1         IF C1+4.LE.C2,REPEAT LOOP
         BCT   7,ZR2            REPEAT ZR2 LOOP UNTIL YCNT=0
         BCT   10,ZR3           REPEAT ZR3 LOOP UNTIL ZCNT=0
         LM    14,12,12(13)
         BCR   15,14            RETURN
NOTFUL   DS    1F
         L     2,=X'FFCCCCCC'
         L     2,=X'FFFFCCCC'
         L     2,=X'FFFFFFCC'
C1C2     DS    2F                    C1,C2 IN CLOSE HAVE THE VALUES.
C1C2YC   DS    3F               C1,C2 IM MZERO HAVE THE VALUES.
         END
```

PROGRAM LISTING IX

```
      SUBROUTINE PASS3
      COMMON/BNDBLK/IXZL,IYZL,IZZL,IXZH,IYZH,IZZH,IXHL,IYHL,IXHH,IYHH,
     1IXVL,IYVL,IXVH,IYVH,IDLX,IDLY,IDCX,IDCY
      COMMON/PASSBK/IDLX1,IDLY1,IDLX2,IDLY2,IDLX3,IDLY3,IDLXC1,IDLYC1,ID
     1LXC2,IDLYC2,ICAL1,ICAL2,ICAL3
      COMMON/STDSBK/NUMST,NUMDST,IR1CON,ICUIT,ICIMSO,ISTDST(50)
      COMMON/ARRBLK/ICNTRL(25),IPNFT(800),ISPCNT(20),ISPDEF(1000)
      COMMON/REFBLK/IX,IY,IYCON,IZ,IZCON,IXMAX,IYMAX,IZMAX,IXMIN,IYMIN,
     1IZMIN,JXMAX,JYMAX,JZMAX,JXMIN,JYMIN,JZMIN,IPKNO,IFRDIM,IYCON2,
     2IZCON2,IYCPZC,IYCP1,LAYTYP(5),IZTB(20),IFRDMS
      COMMON/TRKBLK/IDMPTH,IWTCH,INDEX,IXST,IYST,IZST,IXDS,IYDS,IZDS,
     1IXWT(125),IYWT(125),IPTH(1000)
      COMMON/SAVE/IMIS,ISAV(400)
      COMMON/SFBK/ISF(120),ITSF
      COMMON/CNTBK/NCNT
      DIMENSION IXA(100),IYA(100)
C PASS3 ROUTES A SIGNAL SET USING PASS3 BOUNDING.
C E-NO. ASSIGNED TO EACH ROUTED PIN AND PATH
C E-NO. ASSIGNED TO EACH ROUTED PIN AND PATH
C BUSSING AND CONNECTORS AND TEST POINTS NOT ROUTED.
```

---

```
C                                                                  (206)
C  IS BUSSING REQUESTED
C
C RETURN IF BUSSING
      IF((ICNTRL(10).LT.1).OR.(ICNTRL(10).GT.10)) GO TO 2
      RETURN
```

---

```
C                                                                  (208)
C  IS THERE A SINGLE OCCURENCE OF A TEST POINT OR CONNECTOR
C
C  RETURN IF SINGLE OCCURENCE CONNECTOR OR TP AND PASS1 WAS CALLED
    2 IF(ICNTRL(7).NE.2) GO TO 4
```

---

```
C                                                                  (210)
C  WAS PASS1 CALLED
```

```
C
      IF(ICAL1.NE.0) RETURN
C ICNTRL(17) IS SET TO 0, INCREMENTED WITH EACH FAILURE
    4 ICNTRL(17)=0
C
C  IF NUMDST = 1 WELDING MUST BE DONE RIGHT OR LEFT.  BARRIERS ARE
C    PLACED ABOVE AND BELOW EACH PIN OF SIGNAL SET WITH A CODE OF "2".
C   IF "1" BARRIER ALREADY THERE, DC NOT CHANGE.
C
      IF(NUMDST.EQ.1) CALL RIBBON
C
C MAKE ALL PINS AND ROUTED PATHS AVAILABLE FOR THIS SIGNAL SET
      NBRPN=ICNTRL(7)
      IPKNO=0
      DO 5 I=1,NBRPN,2
      CALL GET3(IPNFT,I,IFX,IFY,ITYP)
      CALL TYPES(1,ITYP,IFX,IFY)
    5 CONTINUE
      CALL MAINDF(0,IECL,1,0,1)
C DEFINE INDES OF LAST FR-TO ENTRY IN CONTRCL ARRAY.
```

---

(212)

```
C
C  IS THERE ANOTHER FROM-TO
C
   11 I=NBRPN-1
      IUPPER=ICNTRL(8)/2
      ITOTFT=ICNTRL(7)+ICNTRL(8)
      ISTFT=NBRPN+1
      ITSF = 0
      DO 34 KOUNT=1,IUPPER
      I=I+2
      CALL GET3(IPNFT,I,IPN1,IPN2,IFTECL)
```

---

(214)

```
C
C  HAS IT BEEN ROUTED
C
C CHECK TO SEE IF FR-TO PREVIOUSLY ROUTED
      IF(IFTECL.NE.0) GO TO 34
```

---

(216)

```
C
C  IS IT A NON-ASSIGEND CONNECTOR OR TEST PCINT
C
C CHFCK FOR CONNECTOR OR TEST POINT
      IF(IPN2.NE.0) GO TC 12
      IF(ICAL1.NE.1) GO TO 110
      ICNTRL(17)=ICNTRL(17)+1
      GO TO 34
  110 IF(ICNTRL(10).GE.C) GO TO 111
      CALL PASS2C(I,IPN1,IPN1)
      IF(ICNTRL(7).NE.NBRPN) I=I+2
      NBRPN=ICNTRL(7)
      GO TO 34
  111 IF(ICNTRL(15).GE.C) GC TC 112
C
```

---

(200)

```
      CALL PASS2C(I,IPN1,IPN1+4)
      GO TO 34
  112 WRITE(6,150) ICNTRL(2),ICNTRL(3),ICNTRL(4)
  150 FORMAT(1H1,'***FROM-TO LIST OF SIGNAL',3A4,'HAS UNROUTED ENTRY FOR
     1CONNECTCR OR TEST POINT, BUT ICNTRL(10) AND ICNTRL(15) ARE POSITIV
     2E')
      RETURN
C DEFINE CORNERS OF RECTANGLE WHICH INCLUDES ALL OF SIGNAL SET
```

---

(218)

```
C
C  CALL BOUNDING INSTRUCTIONS
C
```

```
   12 CALL GET3(IPNFT,IPN1,IFX,IFY,ITYP1)
      CALL GET3(IPNFT,IPN2,ITX,ITY,ITYP2)
      CALL GET3(IPNFT,IPN1+1,IECL1,IB1,NON1)
      CALL GET3(IPNFT,IPN2+1,IECL2,IB2,NON2)
C DEFINE CLASSIFICATION OF RUN
      IF((IECL1.EQ.0).AND.(IECL2.EQ.0)) KASE=1
      IF((IECL1.NE.0).AND.(IECL2.NE.0)) KASE=2
      IF((IECL1.NE.0).AND.(IECL2.EQ.0)) KASE=3
      IF((IECL1.EQ.0).AND.(IECL2.NE.0)) KASE=4
C BOUND AND LOAD ST AND DEST. IN SAME LOOP
      IR1CON=0
      NUMST=0
      IPKNO=3
      GO TO (13,14,15,16),KASE
C ONLY TWO POINTS INVOLUED. BOUNDING IS LIKE PASS2.
   13 LOX=MIN(IFX,ITX)
      LOY=MIN(IFY,ITY)
      IHX=MAX(IFX,ITX)
      IHY=MAX(IFY,ITY)
      JXMIN=MAX(LOX-IDLX,IXMIN)
      IXZL=JXMIN
      JYMIN=MAX(LOY-IDLY,IYMIN)
      IYZL=JYMIN
      JXMAX=MIN(IHX+IDLX,IXMAX)
      IXZH=JXMAX
      JYMAX=MIN(IHY+IDLY,IYMAX)
      IYZH=JYMAX
      IZZL=JZMIN
      IZZH=JZMAX
      CALL CLOSE
      CALL MZERO
      CALL TYPES(3,ITYP1,IFX,IFY)
      CALL TYPES(1,ITYP2,ITX,ITY)
      CALL STDST
      GO TO 17
C BOTH FR AND TO HAVE E-NO'S
```

---

(226)

```
C
C  DEFINE START AND DESTINATIONS POINTS
C
C LOAD ALL CONNECTED PINS AS START OR DESTINATIONS
   14 ICN=0
      IMIS=0
      DO 141 J=1,NBRPN,2
      CALL GET3(IPNFT,J+1,IEC, IBL,NON)
      IF(IEC.NE.IECL1) GO TO 140
  143 CALL GET3(IPNFT,J,IX,IY,IT)
      CALL TYPES(4,IT,IX,IY)
      ICN=ICN+1
      IXA(ICN)=IX
      IYA(ICN)=IY
      GO TO 141
  140 IF(IEC.NE.IECL2) GO TO 141
      CALL GET3(IPNFT,J,IX,IY,IT)
      CALL TYPES(1,IT,IX,IY)
      ICN=ICN+1
      IXA(ICN)=IX
      IYA(ICN)=IY
  141 CONTINUE
      CALL ISORT(ICN,IXA)
      LOX=IXA(1)
      IHX=IXA(ICN)
      CALL ISORT(ICN,IYA)
      LOY=IYA(1)
      IHY=IYA(ICN)
      JXMIN=MAX(LOX-IDLX,IXMIN)
      IXZL=JXMIN
      JYMIN=MAX(LOY-IDLY,IYMIN)
      IYZL=JYMIN
      JXMAX=MIN(IHX+IDLX,IXMAX)
      IXZH=JXMAX
```

```
      JYMAX=MIN(IHY+IDLY,IYMAX)
      IYZH=JYMAX
      IZZH=JZMAX
      IZZL=JZMIN
      CALL CLOSE
      CALL MZERO
C MAIN DF CALLS STDST WHEN 4TH ARGUMENT IS 1.
      CALL STDST
      NUMST=0
      IF(IMIS.EQ.0) GO TO 1422
      DO 142 KKK=1,IMIS
      NUMST=NUMST+1
      ISTDST(NUMST)=ISAV(KKK)
      IF(NUMST.LT.50) GO TO 142
      CALL STDST
      NUMST=0
  142 CONTINUE
      CALL STDST
      NUMST=0
 1422 CALL MAINDF(0,IECL1,0,1,0)
      CALL MAINDF(3,IECL2,0,0,1)
      GO TO 17
C ONLY FROM IN E-CLASS. MAKE DESTINATIONS
C LOAD ALL CONNECTED PINS AS DESTINATIONS
   15 ICN=1
      IXA(ICN)=ITX
      IYA(ICN)=ITY
      DO 151 J=1,NBRPN,2
      CALL GET3(IPNFT,J+1,IEC, IBL,NON)
      IF(IEC.NE.IECL1) GO TC 151
      CALL GET3(IPNFT,J,IX,IY,IT)
      CALL TYPES(1,IT,IX,IY)
      ICN=ICN+1
      IXA(ICN)=IX
      IYA(ICN)=IY
  151 CONTINUE
      CALL ISORT(ICN,IXA)
      LOX=IXA(1)
      IHX=IXA(ICN)
      CALL ISORT(ICN,IYA)
      LOY=IYA(1)
      IHY=IYA(ICN)
      JXMIN=MAX(LOX-IDLX,IXMIN)
      IXZL=JXMIN
      JYMIN=MAX(LOY-IDLY,IYMIN)
      IYZL=JYMIN
      JXMAX=MIN(IHX+IDLX,IXMAX)
      IXZH=JXMAX
      JYMAX=MIN(IHY+IDLY,IYMAX)
      IYZH=JYMAX
      IZZH=JZMAX
      IZZL=JZMIN
      CALL CLOSE
      CALL MZERO
      CALL TYPES(3,ITYP2,ITX,ITY)
      CALL MAINDF(3,IECL1,0,0,1)
      CALL STDST
      GO TO 17
C ONLY TO IN E-CLASS. MAKE DESTINATIONS
C LOAD ALL CONNECTED PINS AS DESTINATIONS
   16 ICN=1
      IXA(ICN)=IFX
      IYA(ICN)=IFY
      DO 160 J=1,NBRPN,2
      CALL GET3(IPNFT,J+1,IEC, IBL,NCN)
      IF(IEC.NE.IECL2) GO TO 160
      CALL GET3(IPNFT,J,IX,IY,IT)
      CALL TYPES(1,IT,IX,IY)
      ICN=ICN+1
      IXA(ICN)=IX
      IYA(ICN)=IY
```

```
  160 CONTINUE
      CALL ISORT(ICN,IXA)
      LOX=IXA(1)
      IHX=IXA(ICN)
      CALL ISORT(ICN,IYA)
      LOY=IYA(1)
      IHY=IYA(ICN)
      JXMIN=MAX(LOX-IDLX,IXMIN)
      IXZL=JXMIN
      JYMIN=MAX(LOY-IDLY,IYMIN)
      IYZL=JYMIN
      JXMAX=MIN(IHX+IDLX,IXMAX)
      IXZH=JXMAX
      JYMAX=MIN(IHY+IDLY,IYMAX)
      IYZH=JYMAX
      IZZL=JZMIN
      IZZH=JZMAX
      CALL CLOSE
      CALL MZERO
      CALL TYPES(3,ITYP1,IFX,IFY)
      CALL MAINDF(3,IECL2,0,0,1)
      CALL STDST
C OPEN RUN AREA
   17 IXVL=JXMIN
      IXVH=JXMAX
      IYVL=JYMIN
      IYVH=JYMAX
      IZ=0
      DO 122 IX=IXVL,IXVH
      DO 122 IY=IYVL,IYVH
      IPKNO=IGTMZ(IDUM)
      IPKNO=IAND(IPKNO,2)
  122 CALL IPTMZ
      IXHL=JXMIN
      IXHH=JXMAX
      IYHL=JYMIN
      IYHH=JYMAX
      IZ=0
      DO 124 IX=IXHL,IXHH
      DO 124 IY=IYHL,IYHH
      IPKNO=IGTMZ(IDUM)
      IPKNO=IAND(IPKNO,1)
  124 CALL IPTMZ
C HI+1 IS NEW LO
      JDEX=INDEX+1
```

(228)

```
C
C  CALL MAZE
C
      K=MAZER(IQUIT)
      IF(ITSF.LT.120) GO TO 18
      WRITE(6,1000) ICNTRL(1), (ISF(J), J=1,ITSF)
 1000 FORMAT(1H0,I10,2X,120I1)
      ITSF = 0
   18 ITSF = ITSF + 1
      ISF(ITSF) = K
  152 FORMAT(1H0,10I10)
C RESTORE DEST. CELLS TO AV.
      IPKNO=0
      GO TO (20,22,21,22),KASE
C
C ONLY KASE3 HAD DEST. ON FROM SET
   20 CALL TYPES(1,ITYP2,ITX,ITY)
      GO TO 23
   21 CALL TYPES(1,ITYP1,IFX,IFY)
      DO 210 J=1,NBRPN,2
      CALL GET3(IPNFT,J+1,IEC,IBL,NON)
      IF(IEC.NE.IECL1) GO TO 210
      CALL GET3(IPNFT,J,IX,IY,IT)
      CALL TYPES(1,IT,IX,IY)
```

```
      CALL MAINDF(0,IECL1,0,0,1)
      GO TO 23
   22 CALL TYPES(1,ITYP2,ITX,ITY)
      DO 220 J=1,NBRPN,2
      CALL GET3(IPNFT,J+1,IEC,IBL,NON)
      IF(IEC.NE.IECL2) GO TO 220
      CALL GET3(IPNFT,J,IX,IY,IT)
      CALL TYPES(1,IT,IX,IY)
  220 CONTINUE
      CALL MAINDF(0,IECL2,0,0,1)
   23 IF(K.EQ.2) GO TO 26
      ICNTRL(17)=ICNTRL(17)+1
      GO TO 34
C MAZER SUCCESSFUL. REDEFINE E-NO.
C STORE INDEX IN CONTROL ARRAY
```

---

(230)

```
C
C  STORE INFORMATION ABOUT PATH FOUND AND PINS SELECTED
C
   26 ICNTRL(9)=INDEX
      NCNT=NCNT+1
      GO TO (27,28,30,31),KASE
C NEW E-NO.
   27 IECN=ICNTRL(16)+1
      ICNTRL(16)=IECN
      CALL PAK3(IPNFT,I,IPN1,IPN2,IECN)
      CALL PAK3(IPNFT,IPN1+1,IECN,IB1,NON1)
      CALL PAK3(IPNFT,IPN2+1,IECN,IB2,NON2)
      GO TO 32
```

---

(232)

```
C
C  DEFINE EQUIVALENCE CLASS TO WHICH ROUTING BELONGS
C
C TAKE MIN OF TWO E-NO'S.
   28 IEC=MIN(IECL1,IECL2)
      IECMX=MAX(IECL1,IECL2)
      CALL PAK3(IPNFT,I,IPN1,IPN2,IEC)
      CALL PAK3(IPNFT,IPN1+1,IEC,IB1,NON1)
      CALL PAK3(IPNFT,IPN2+1,IEC,IB2,NON2)
      DO 29 J=ISTFT,ITOTFT,2
      CALL GET3(IPNFT,J,IF,IT,IE)
      IF(IE.NE.IECMX) GO TO 29
      CALL PAK3(IPNFT,J,IF,IT,IEC)
      CALL GET3(IPNFT,IF+1,IOLD,IBL,NON)
      CALL PAK3(IPNFT,IF+1,IEC,IBL,NON)
      CALL GET3(IPNFT,IT+1,IOLD,IBL,NON)
      CALL PAK3(IPNFT,IT+1,IEC,IBL,NON)
   29 CONTINUE
      GO TO 32
C FROM E-NO. USED
   30 CALL PAK3(IPNFT,I,IPN1,IPN2,IECL1)
      CALL PAK3(IPNFT,IPN2+1,IECL1,IB2,NON2)
      GO TO 32
C TO E-NO. USED
   31 CALL PAK3(IPNFT,I,IPN1,IPN2,IECL2)
      CALL PAK3(IPNFT,IPN1+1,IECL2,IB1,NON1)
C
C LOAD NEW LO, HI FROM TRACKER INTO IPNFT
C
   32 CALL PAK3(IPNFT,I+1,JDEX,INDEX,0)
   34 CONTINUE
      IF(ITSF.NE.0) WRITE(6,1000) ICNTRL(1),(ISF(I),I=1,ITSF)
C
C    REMOVE "2" BARRIER CODES.
   44 IF(NUMDST.EQ.1) CALL UNRIBN
C
C REBARRIER ALL PINS
      IPKNO = 1
      DO 50 I=1,NBRPN,2
      CALL GET3(IPNFT,I,IFX,IFY,ITYP)
```

```
      CALL TYPES(1,ITYP,IFX,IFY)
   50 CONTINUE
C REBARRIER ALL OF IPTH
      CALL MAINDF(1,IEC,1,0,1)
      RETURN
      END
```

ROUTING CHECK

At the end of the routing routine, a second check routine 36 (referring to FIG. 3) is run to check for completion of the router. Input data to the routing check will be the output of the routing routine. One set of checks made on the routing is directed to the signatures. One of the signature checks determines if more than one signature has been connected to the same terminal pin of a logic element. Another signature check is made to find any feedthroughs having more than one signature connected thereto. A third signature check determines if all the signatures have been routed; this is a completeness test.

Another set of checks made by the routing check routine concerns the interconnecting lines and their location. One of the interconnecting line checks determines if two interconnecting lines having different signatures cross on the same layer of a circuit board. Another interconnecting line check is made to find any circuit board cell occupied by an unused terminal pin which is crossed by an interconnecting line. Another interconnecting path check determines if any of the paths have been routed diagonally. For the program of the Program Listing III, the interconnecting paths are restricted to horizontal and vertical directions. A fourth check on the interconnecting line is made to find any lines which do not terminate at a logic element terminal pin, a connector pin, or a test point.

After all the above checks have been completed, the routing check routine checks each path to determine if continuity exists between all pins having a common signature. In performing this check, one pin of a signature is chosen as the start point. Starting with the cell in which this pin is located, the routine makes a cell by cell check to see if adjacent cells have a routing code for the signature in question. If at any time the adjacent cells, other than the one from which the check has advanced, do not contain a routing code, then the continuity for that path is open. The continuity check continues in this manner until a terminal pin of the same signature is located. It then backtracks to the original starting pin and runs the same check to terminal pins located on branch lines from the original check. This continuity check is made on all signatures of the logic system. Upon completions of the continuity check, the routing check routine ends.

At the end of the check routine, an inquiry 37, referring to FIG. 3, is made to determine if the routing is complete. If the answer to this inquiry is "no," an error list is printed and the incomplete or incorrect interconnecting paths are completed or corrected manually by step 38 using the error list. Since any alteration of the original routing by the routing routine may introduce additional errors, the routing check routine 36 is again called to check the modified routing.

As explained previously, the routing routine may be run several times to complete any interconnections not made in the first run. Instead of altering and completing the interconnection manually, a negative answer to inquiry 37 may be used to recall the routing routine. The rerun of the routing routine attempts to alter and correct the errors noted by the routing check routine.

Input data to a rerun of the routing routine after the check routine includes all previous input information and, in addition, input data concerning the errors and incompletions noted by the check routine. Since some of the incompletions may have resulted from too restrictive bounding limitations, these bounding limitations are relaxed in subsequent runs of the router.

Again, upon completion of the routing routine, the routing check routine 36 is run and the inquiry 37 made to determine if the routing was complete. A "yes" answer to inquiry 37 advances the data processing machine to step 40 wherein a direct access record is made of the interconnecting paths. This tape includes a first section for path layout on the top side of a printed circuit board, a second section for path layout on the bottom side of a printed circuit board, and a third section containing tooling instructions for feedthrough holes.

GENERATING ARTWORK

Figure 12:
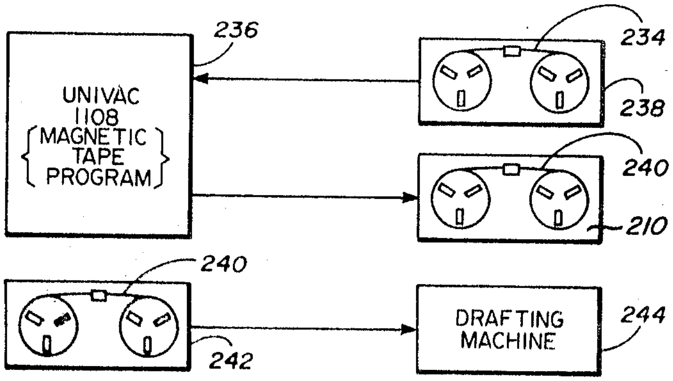
FIG. 12 is a block diagram of a system for generating artwork for a printed circuit board.

Referring to FIG. 12, there is shown a block diagram of a system for generating the artwork for a logic system to be fabricated on a printed circuit board. The information on a direct access record 234 produced by one of the output devices of the system of FIG. 1 is transferred to a computer 236 by means of a tape deck 238. The computer 236, for example, a UNIVAC 1108, contains a magnetic tape program which converts the format of the information on the record 234 to a format for recording on a magnetic tape 240. Information is transferred from the computer 236 to a tape deck 210 for writing on the magnetic tape 240. Tape 240 then contains the commands for generating artwork for a printed circuit board. This information is arranged in sections by board side.

To generate artwork with the tape 240, the tape is read by a playback device 242 having an output connected to a drafting machine 244, for example, a CALCOMP plotter. Commands on the tape 240 guide a pin over a glass plate mounted in the drafting machine 244. The pin outlines various element interconnections, interconnections to input/output connectors and interconnections to test points.

Figure 13:
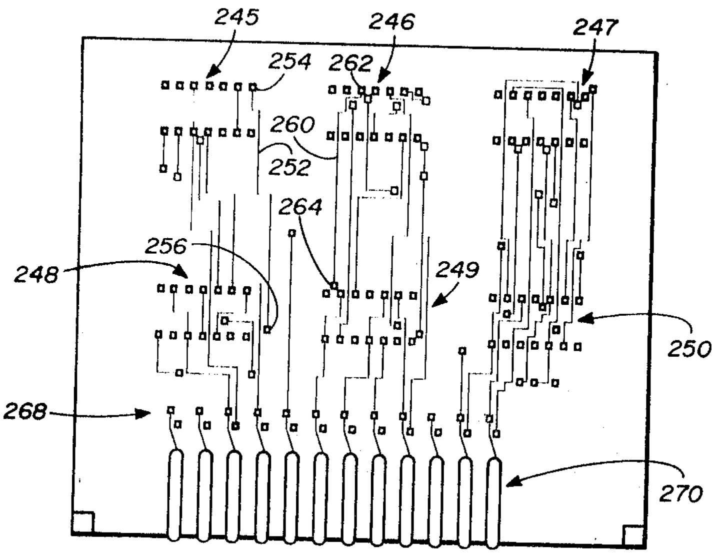
FIG. 13 illustrates the artwork for the top side of a two-sided printed circuit board for the system of FIG. 2.
Figure 14:
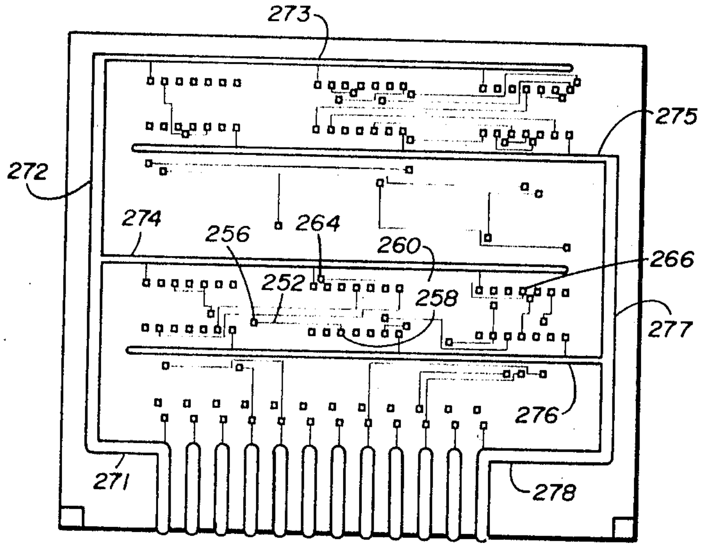
FIG. 14 illustrates the artwork for the bottom side of a two-sided printed circuit board for the logic system of FIG. 2.

Referring to FIGS. 13 and 14, there is shown the artwork produced by the drafting machine 244 for the logic system of FIG. 2. FIG. 13 is the artwork for the topside of a two-sided printed circuit board and FIG. 14 is the artwork for the bottom side of the board. In FIG. 13, the interconnections are Class 1 and run in a generally vertical direction. In FIG. 14, the routing lines are of Class 2 and tend to run in the horizontal direction. Note, however, that there are horizontally oriented lines in FIG. 13 and vertically oriented lines in FIG. 14. Thus, the routing routine is not restricted to only vertical lines on one side and horizontal lines on the other, but lines that tend to be vertical and tend to be horizontal.

Referring specifically to FIG. 13, the numbers 245 through 250 identify the pin locations for packages of logic elements (e.g., integrated circuits). The other small squares illustrated in FIG. 13 are feedthroughs from the top to the bottom of the board. Consider the interconnecting path 252 which starts at pin 254 and runs to feedthrough 256. At the feedthrough 256, the line 252 changes to the bottom side of the board and it continues in a horizontal direction to terminate at pin 258, as shown at FIG. 14. As another example, interconnecting line 260 runs from terminal pin 262 to feedthrough 264 on the top side of the board. Note that line 260 includes several small horizontal sections on the top side of the board; however, the line 260 tends to the vertical in FIG. 13. Line 260 transfers at the feedthrough 264 to the bottom side of the board and terminates at terminal pin 266.

On the top side of the board, as illustrated in FIG. 13, interconnecting lines from the feedthroughs at row 268 terminate at the input/output connector 270. These lines include a diagonal section that is not drawn by instructions from the magnetic tape 240, but must be drawn by hand. Referring to FIG. 14, the bus bars 271 through 278 are machine drawn if bussing was called for in the routing routine; otherwise, these lines would also be hand-drawn.

If bussing was not completed in the routing routine, the routing check routine would note errors for each of the lines terminating at the bus bars 271 through 278. The errors noted would show that the interconnecting lines did not terminate at a terminal pin or at an input/output connector pin. Similar errors would be noted for the feedthroughs 268 since they do not terminate at a terminal pin or the input/output connector pin.

Although the invention has been described with respect to a two-sided printed circuit board, it should be understood that multiple layers of two-sided boards may be used. As the logic system increases in complexity, more boards would be required to complete the routing routine, assuming a given board size requirement. It should also be evident that various modifications are possible in the processes described.

We claim:

1. In a process for producing coded representations of circuit artwork for a desired logic system by a data processing machine from coded input information of such desired logic system wherein the data processing machine generates representations of packages of the logic system elements from the input information, assigns locations to the packages from the input information and from the representations of the packages and generates a coded representation of the circuit artwork comprising a representation of interconnections between the logic system elements, the steps in the routine for assigning locations to the packages comprising:

a. computing an evaluating score and a best legitimate location for each of the packages from the input information of the desired logic system and from the representations of packages of the logic system elements in accordance with preselected criteria to determine the order in which the packages are to be assigned locations; and b. assigning the package having the best computed evaluating score to the best legitimate locations for such package and assigning the remaining packages to the respective best legitimate location for each of such remaining packages in order according to the respective computed evaluating score of such remaining packages until all packages have been assigned locations.

2. In the process of claim 1, the step of computing an evaluating score for each of the packages in accordance with preselected criteria includes the step of dividing the number of packages to which a package under consideration is to be connected and which have previously been assigned locations by the total number of packages to which the package under consideration is to be connected.

3. In the process of claim 1, the step of computing the best legitimate location for the packages in accordance with preselected criteria includes the step of comparing the respective sums of the signature wireability of each package to determine the best legitimate location for each package.

4. In the process of claim 3, the step of computing the best legitimate location for each package in accordance with preselected criteria further includes the step of assigning a location to a package with the smallest sum of the signature wireability first among a group of packages having the same computed evaluating score.

5. In the process of claim 1, the step of computing the best legitimate location for each package in accordance with preselected criteria includes the step of selecting an available location not already assigned to a previously located package as a legitimate position for a package under consideration.

6. In the process of claim 1, the step of recomputing the evaluating score and the best legitimate location for each package affected by the assignment of a location to a previously located package before assigning locations to the remaining packages.

7. In a process for producing coded representations of circuit artwork for a desired logic system by a data processing machine from coded input information of such desired logic system wherein the data processing machine generates representations of multielement packages of the logic system elements from the input information, assigns locations to the multielement packages from the input information and from the representations of the multielement packages and generates a coded representation of the circuit artwork comprising a representation of interconnections between the logic system elements, the steps in the routine for assigning locations to the packages comprising:

a. generating data representations which identify a multielement package having terminal pins to be connected to an input/output connector as a multielement package to be assigned a location associated with such input/output connector;

b. computing an evaluating score and a best legitimate location for each of the multielement packages to be assigned locations including those identified to be assigned a location associated with the input/output connector from the input information of the desired logic system and from the representations of packages of the logic system elements in accordance with preselected criteria to determine the order in which the multielement packages are to be assigned locations; and c. assigning the multielement package having the best computed evaluating score to the best legitimate location for such package and assigning each of the remaining multielement packages to the respective best legitimate location for each of such remaining packages in order according to the respective computed evaluating score of such remaining multielement packages until all multielement packages have been assigned locations.

8. In the process of claim 7, the step of computing the best legitimate location for each of the multielement packages in accordance with preselected criteria includes the step of selecting a location closest to the input/output connector for the multielement package with the greatest number of signatures in common with such input/output connector and selecting locations for each of the remaining multielement packages identified with such input/output connector at locations progressively further from the input/output connector in order according to the respective decreasing number of signatures such remaining multielement packages have in common with such input/output connector until all multielement packages identified with such input/output connector have been assigned locations.

9. In the process of claim 7, the step of computing the best legitimate location for each of the multielement packages in accordance with preselected criteria includes the step of selecting a location closest to the input/output connector for the multielement package with the greatest number of signatures in common with such input/output connector and selecting locations for each of the remaining multielement packages at progressively further locations from the input/output connector in order according to the respective decreasing number of signatures such remaining packages have in common with such input/output connector until a multielement package has been assigned to each location associated with such input/output connector.

10. In the process of claim 9, the step of cancelling the signatures of the input/output connector in common with a multielement package which has been assigned to a location associated with the input/output connector before consideration of further multielement packages for assignment to a location associated with such input/output connector.

11. In the process of claim 7, the step of computing an evaluating score for each of the multielement packages in accordance with preselected criteria includes the step of dividing the number of multielement packages to which a multielement package under consideration is to be connected and which have been previously assigned locations by the total number of packages to which the package under consideration is to be connected.

12. In the process of claim 7, the step of computing a best legitimate location for each of the multielement packages in accordance with preselected criteria includes the step of comparing the respective sums of the signature wireability of each multielement package to determine the best legitimate location for each multielement package.

13. In the process of claim 7, the step of computing the best legitimate location for each multielement package in accordance with preselected criteria includes the step of selecting an available location not already assigned to a previously located multielement package as a legitimate position for a multielement package under consideration.

14. In the process of claim 7, the step of recomputing the evaluating score and the best legitimate location for each multielement package affected by the assignment of a location to a previously located multielement package before assigning locations to the remaining multielement packages.

15. In a process for producing coded representations of circuit artwork for a desired logic system by a data processing machine from coded input information of such desired logic system wherein the data processing machine generates representations of packages of the logic system elements from the input information, assigns locations to the packages from the input information and from the representations of the packages and generates a coded representation of the circuit artwork comprising a representation of interconnections between the logic system elements, the steps in the routine for assigning locations to the packages comprising:

a. computing an evaluating score and a best legitimate location for each of the packages from the input information of the desired logic system and from the representations of packages of the logic system elements in accordance with preselected criteria to determine the order in which the packages are to be assigned locations;

b. assigning the package having the best computed evaluating score to the best legitimate location for such package and assigning each of the remaining packages to the respective best legitimate location for each of such remaining packages in order according to the respective computed evaluating score of such remaining packages until all packages have been assigned locations;

c. selectively comparing the signature wireabilities of a pair of packages which have been assigned locations with the signature wireabilities of the same pair of packages if the assigned locations of such pair of packages were to be interchanged; and d. interchanging the assigned locations of the pair of packages if the interchange of such assigned locations improves the signature wireability as determined by the comparison of step (c).

16. In the process of claim 15, the repeating of steps (c) and (d) for additional pairs of packages which have been assigned locations until the total improvement of the signature wireability determined by the comparison of step (c) is less than one percent of the total wireability of the complete desired logic system.

17. In the process of claim 15, the assigned location of the pair of packages is interchanged during step (d) when the sum of the signature wireabilities of the affected signatures in the interchanged position is less than the sum of the affected signature wireabilities of such pair of packages in their original position.

18. In a process for producing coded representations of circuit artwork for a desired logic system by a data processing machine from coded input information of such desired logic system wherein the data processing machine generates representations of packages of the logic system elements from the input information, assigns locations to the packages from the input information and from the representations of the packages and generates a coded representation of the circuit artwork comprising a representation of interconnections between the logic system elements, the steps in the outing for assigning locations to the packages comprising:

a. computing an evaluating score and a best legitimate location for each of the packages from the input information of the desired logic system and from the representations of packages of the logic system elements in accordance with preselected criteria to determine the order in which the packages are to be assigned locations;

b. assigning the package having the best computed evaluating score to the best legitimate location for such package and assigning each of the remaining packages to the respective best legitimate location for such remaining packages in order according to the respective computed evaluating score of such remaining packages until all packages have been assigned locations;

c. temporarily interchanging the assigned locations of two of the packages which have been assigned locations;

d. computing the signature wireability for affected signatures of the two packages as would exist after the temporary interchange of assigned locations;

e. computing the signature wireability for affected signatures of the two packages as would exist before the temporary interchange of assigned locations;

f. comparing the computed signature wireabilities of the two packages as would exist before and after the temporary interchange to determine if the interchange results in an improved signature wireability; and g. reassigning the two packages to the interchanged locations if it is determined during step (f) that an improved signature wireability would result thereby.

19. In the process of claim 18, the repeating of steps (c)–(f) for other selected pairs of packages until a possible interchange of the assigned location for all of the packages has been considered.

20. In the process of claim 18, (h) the repeating of steps (c)–(g) for other selected pairs of packages;

i. the step of computing the total improvement of signature wireability resulting from the reassignment of packages to interchanged locations; and j. the repeating of step (h) if the total improvement of signature wireability is greater than 1 percent of the total signature wireability.

21. In the process of claim 18, the step of computing an evaluating score for each of the packages includes the step of dividing the number of packages to which a package under consideration is to be connected and which have previously been assigned locations by the total number of packages to which the package under consideration is to be connected.

22. In the process of claim 18, the step of computing the best legitimate location for each package includes the steps of:

a. comparing the respective sums of the signature wireability of each package; and b. assigning a location to a package with the smallest sum of the signature wireability first among a group of packages having the same computed evaluating score.

23. In the process of claim 18, the step of computing the best legitimate location for each package includes the step of selecting an available location not already assigned to a previously located package as a legitimate position for a package under consideration.

24. In the process of claim 18 the step of recomputing the evaluating score and the best legitimate location for each package affected by the assignment of a location of a previously located package before assigning locations to the remaining packages.

* * * * *